(12) United States Patent
Yamao et al.

(10) Patent No.: US 9,051,733 B2
(45) Date of Patent: Jun. 9, 2015

(54) VIBRATION DAMPING DEVICE

(75) Inventors: Toshitaka Yamao, Kumamoto (JP); Takuro Katayama, Kumamoto (JP); Koji Azuma, Kumamoto (JP)

(73) Assignees: National University Corporation Kumamoto University, Kumamoto (JP); Kimigafuchi Gakuen, Kumamoto (JP)

( * ) Notice: Subject to any disclaimer, the term of this patent is extended or adjusted under 35 U.S.C. 154(b) by 22 days.

(21) Appl. No.: 13/704,573

(22) PCT Filed: Jun. 14, 2011

(86) PCT No.: PCT/JP2011/063574
§ 371 (c)(1),
(2), (4) Date: Dec. 14, 2012

(87) PCT Pub. No.: WO2011/158823
PCT Pub. Date: Dec. 22, 2011

(65) Prior Publication Data
US 2013/0104467 A1    May 2, 2013

(30) Foreign Application Priority Data
Jun. 14, 2010 (JP) .................................. 2010-134903

(51) Int. Cl.
| | | |
|---|---|---|
| E04B 1/98 | (2006.01) | |
| E02D 31/08 | (2006.01) | |
| F16F 7/08 | (2006.01) | |
| E04H 9/02 | (2006.01) | |

(52) U.S. Cl.
CPC . *E04B 1/98* (2013.01); *E04B 1/985* (2013.01); *E04H 9/021* (2013.01); *E04H 9/02* (2013.01); *E04H 9/028* (2013.01); *F16F 7/08* (2013.01)

(58) Field of Classification Search
CPC ... E04C 2003/023; E04H 9/027; E04H 9/021; E04H 9/024; E04H 9/022; E04H 9/02; E04H 9/00; E04B 1/98; E04B 1/985; E02D 31/08

USPC ........... 52/167.4, 167.3, 167.1, 167.2, 167.7, 52/167.8
See application file for complete search history.

(56) References Cited

U.S. PATENT DOCUMENTS

| | | | | |
|---|---|---|---|---|
| 2,014,643 A | * | 9/1935 | Bakker | 384/49 |
| 2,359,036 A | * | 9/1944 | Harper | 296/35.1 |
| 3,349,418 A | * | 10/1967 | Hein | 14/73.5 |

(Continued)

FOREIGN PATENT DOCUMENTS

| | | | | | |
|---|---|---|---|---|---|
| JP | 56-131724 | | 10/1981 | | |
| JP | 02217541 A | * | 8/1990 | ................ | E04B 1/36 |
| JP | 03180675 A | * | 8/1991 | ................ | E04H 9/02 |
| JP | 05231473 A | * | 9/1993 | ................ | F16F 15/04 |
| JP | 06264643 A | * | 9/1994 | ................ | E04H 9/02 |
| JP | 10-073145 | | 3/1998 | | |
| JP | 2003-027767 | | 1/2003 | | |

(Continued)

*Primary Examiner* — Phi A
(74) *Attorney, Agent, or Firm* — Jordan and Hamburg LLP

(57) ABSTRACT

A vibration damping device for suppressing vibrations of a structure includes: a slide body mechanism having a concave slide body and a convex slide body which are fixed to the structure and are arranged so as to be slidable relative to each other in a reciprocating manner; and a biasing means which pushes the slide bodies to each other. Each slide body has: a first slide surface having a shape which increases a height of the slide body mechanism 2 along with the increase of a displacement amount of the slide body in one sliding direction from a neutral position relative to the counterpart slide body; and a second slide surface having a shape by which the height of the slide body mechanism is increased along with the increase of the displacement of the slide body in the other sliding direction from the neutral position.

7 Claims, 60 Drawing Sheets

(56) References Cited

U.S. PATENT DOCUMENTS

| | | | | |
|---|---|---|---|---|
| 5,335,463 | A | * | 8/1994 | Reinhall ................. 52/167.1 |
| 5,867,951 | A | | 2/1999 | Yaguchi et al. |
| 6,126,136 | A | * | 10/2000 | Yen et al. ................. 248/560 |
| 7,472,518 | B2 | * | 1/2009 | Tsai ........................ 52/167.6 |
| 2010/0269424 | A1 | * | 10/2010 | Marioni .................... 52/167.2 |
| 2012/0174500 | A1 | * | 7/2012 | Yakoub ..................... 52/167.4 |

FOREIGN PATENT DOCUMENTS

| | | |
|---|---|---|
| JP | 2005-201287 | 7/2005 |
| JP | 2006-241815 | 9/2006 |
| JP | 2007-177864 | 7/2007 |
| JP | 2007-262691 | 10/2007 |
| JP | 3138899 | 12/2007 |
| JP | 2009-062733 | 3/2009 |

* cited by examiner

FRONTWARD MOVING TIME

REARWARD MOVING TIME

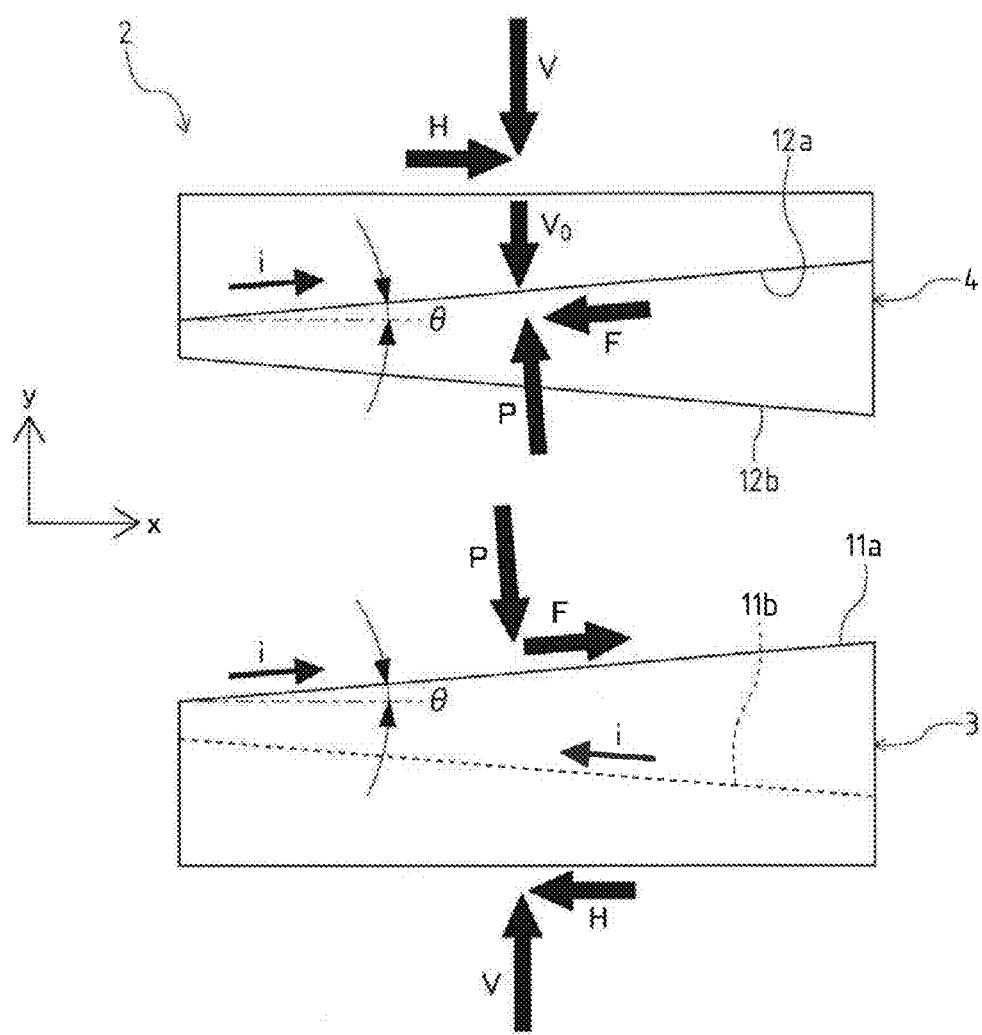

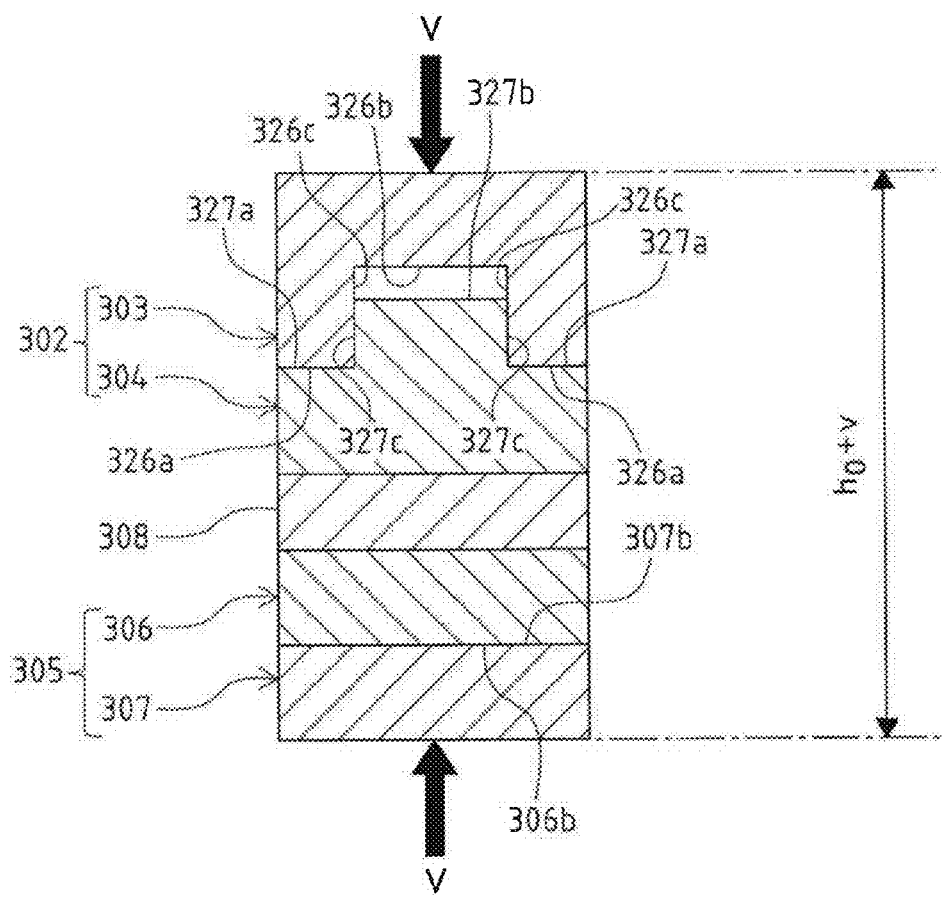

SIZE OF SLIDE SURFACE AND APPARENT CONTACT AREA

| NAME AND SYMBOL | SURFACE NUMBER | WIDTH × LENGTH (mm × mm) | CONTACT AREA (mm²) |
|---|---|---|---|
| CONCAVE SLIDE BODY ·(303) | 326a | 72.2 × 220 | 67.8 × 220 = 14,916 |
| | 326b | 33.9 × 220 | |
| CONVEX SLIDE BODY ·(304) | 327a | 67.8 × 300 | |
| | 327b | 36.6 × 300 | |
| FLAT SURFACE SLIDE BODY ·(306) | 306b | 145 × 300 | 145 × 220 = 31,900 |
| FLAT SURFACE SLIDE BODY ·(307) | 307b | 145 × 220 | |

VIBRATION DAMPING DEVICE

BACKGROUND OF THE INVENTION

The present invention relates to a vibration damping device which suppresses vibrations of a structure.

Conventionally, a vibration damping device which suppresses vibrations of a structure (hereinafter also simply referred to as "damping device") is classified into a viscosity-type damping device, a friction-type damping device, and a plastic-type damping device.

A viscosity-type damping device is, for example, an oil damper, a dash pot or the like and, in general, a damping force of the damping device is in proportion to a speed (frequency) of vibrations of a structure (natural vibrations). Accordingly, in the viscosity-type damping device, the longer a period of vibrations of a structure, the more difficult the acquisition of a sufficient damping force becomes. In view of the above, in the viscosity-type damping device, when a damping device is applied to a long-period structure having a relatively long period of vibrations, for acquiring a desired damping force, in comparison to a case where a damping device is applied to a short-period structure having a relatively short period of vibrations, there exists a drawback that it is necessary to make the damping device large-sized or to impart high permeance to the damping device to acquire a desired damping force. Large-sizing of the device and the acquisition of high performance pushes up the installation cost.

In a friction-type damping device, in general, the magnitude of a fractional force which acts as a damping force is set to a fixed value irrelevant to the displacement by the vibrations of a structure. Accordingly, the friction-type damping device has a drawback that when the amplitude of vibrations is relatively small, the damping device cannot sufficiently exhibit the function thereof due to the seizure between slide surfaces which generate a frictional force, while when the amplitude of vibrations is relatively large, an equivalent viscous damping coefficient decreases as the amplitude increases. Here, the equivalent viscous damping coefficient is obtained by converting the damping performance of the damping device into the viscous damping coefficient of the viscosity-type damping device, and is a numerical value which becomes an index for damping performance of the damping device in the form of a single body.

The plastic-type damping device, in general, possesses both a kinetic characteristic of an elastic body and a kinetic characteristic of a plastic body. Accordingly, the plastic-type damping device has a drawback that when the vibrations are of small amplitude, the damping device functions as an elastic body so that an equivalent viscous damping coefficient is small, while when the vibrations are of large amplitude, the damping device functions as a complete elastic body so that the equivalent viscous damping coefficient decreases along with the increase of amplitude.

In view of the drawbacks which the above-mentioned respective damping devices have, the ideal damping device is a damping device where a damping effect is maintained even when a cycle of a natural vibration mode of a structure is lengthened, and the equivalent viscous damping coefficient does not decrease along with the increase of amplitude. With the use of such a damping device, it is thought that the vibration energies ranging from vibration energy of small amplitude to vibration energy of large amplitude can be absorbed efficiently for various and disparate structures regardless of a length of a cycle of the vibrations of a structure.

Here, attention is paid to a friction-type damping device where the mechanism for generating a damping force is relatively simple. In the friction-type damping device, it is thought that the influence which the lengthening of a period of vibrations exerts on a damping effect is relatively small so that the magnitude of a frictional force changes along with the displacement generated by the vibrations of a structure whereby the drawback attributed to the above-mentioned magnitude of the amplitude is overcome thus realizing the acquisition of an ideal damping device. As techniques relating to the friction-type damping device, there are techniques disclosed in JP-A-2007-177864 and JP-A-2005-201287.

JP-A-2007-177864 discloses the constitution having a mechanism which increases or decreases the damping of an earthquake motion corresponding to the magnitude of amplitude of the earthquake motion. JP-A-2005-201287 discloses the constitution where a plurality of supports which sandwich balls by upper and lower discs, guide rods which guide the movement of upper and lower plates and the like are provided between the upper and lower plates which are relatively movable in the horizontal direction, and a frictional force is increased corresponding to a moving amount of the upper and lower plates in the horizontal direction.

In the technique disclosed in JP-A-2007-177864, the mechanism which increases or decreases the damping of an earthquake motion corresponding to the magnitude of amplitude of the earthquake motion is a link mechanism constituted of a plurality of links, while in the technique disclosed in JP-A-2005-201287, the mechanism which is the combination of the upper and lower discs, the balls, the guide rods and the like is adopted. Accordingly, in both techniques disclosed in JP-A-2007-177864 and JP-A-2005-201287, the mechanism for generating a damping force by a frictional force is complicated and requires a large number of parts so that both techniques are not suitable for practical use.

SUMMARY OF THE INVENTION

The present invention has been made in view of the above-mentioned background, and it is an object of the present invention to provide a vibration damping device which can efficiently absorb vibration energies ranging from vibration energy of small magnitude to vibration energy of large magnitude, regardless of a length of a period of vibrations of a structure and which device is of simple structure thus acquiring high practicability and general-use property.

According to the present invention, there is provided a vibration damping device for suppressing vibrations of a structure, the vibration damping device including: a slide body mechanism having at least a pair of slide bodies which is directly or indirectly fixed to the structure and is arranged so as to be slidable relative to each other in a reciprocating manner in a state where the slide bodies face each other in an opposed manner; and a biasing means which biases the slide body mechanism in the direction that the slide bodies which are arranged so as to be slidable relative to each other in a reciprocating manner are pushed to each other thus applying a compressive force in the direction which is increased along with the increase of a displacement amount due to the relative slide movement between the pair of slide bodies, wherein each slide body which constitutes the slide body mechanism has a first slide surface having a shape by which a size of the slide body mechanism in the direction that the slide bodies face each other in an opposed manner is increased along with the increase of a displacement amount of the slide body in one sliding direction out of reciprocating sliding directions from a neutral position within a range of reciprocating sliding relative to the sliding counterpart slide body, and a second slide surface having a shape by which a size of the slide body mechanism in the opposing direction is increased along with the increase of a displacement amount of the slide body in the other sliding direction out of the reciprocating sliding directions from the neutral position relative to the sliding counterpart slide body, and, in each slide body, the first slide surface and the second slide surface are present at a common position in the relative reciprocating slide direction.

Further, in the vibration damping device according to the present invention, it is preferable that one of the slide bodies has a groove which is formed along the relative reciprocating directions and has an end portion thereof opened on a side opposite to the sliding counterpart slide body and has a concave shape as viewed in the relative reciprocating directions, and another of the slide bodies has a projecting portion which is formed along the relative reciprocating directions and is formed in a projecting manner on an end portion thereof on a side opposite to slide body and has a convex shape as viewed in the relative reciprocating directions, and the slide bodies have set an end surface of the groove portion on an open side and a proximal end surface of the projecting portion as either one slide surface of the first slide surface and the second slide surface, and have set a bottom surface of the groove portion and an end surface of the projecting portion on a projection side as the other slide surface of the first slide surface and the second slide surface.

Further, in the vibration damping device according to the present invention, it is preferable that the biasing means includes: a slide-body side fixing portion which is directly or indirectly fixed to one of the slide bodies; a structure side fixing portion which is directly or indirectly fixed to the structure; and a leaf spring portion having a curved plate shape which is formed between the slide-body side fixing portion and the structure side fixing portion and is elastically deformable.

Further, in the vibration damping device according to the present invention, it is preferable that the vibration damping device further includes a planar slide body mechanism which includes at least a pair of slide bodies which are directly or indirectly fixed to the structure, are provided in a slidable manner relative to each other in a reciprocating manner in a state where the slide bodies face each other, and have slide surfaces thereof formed into a planar surface respectively.

Further, in the vibration damping device according to the present invention, it is preferable that, the slide body mechanism is constituted in an extensible and shrinkable manner by relative reciprocating sliding, and a damping force of the structure against the vibrations of the structure is generated as an axial force along the extending and shrinking direction by the relative reciprocating sliding.

According to the present invention, the vibration damping device can efficiently absorb vibration energy ranging from small magnitude to large magnitude regardless of a length of a period of vibrations of a structure while being of simple structure thus acquiring both high practicability and general-use property.

BRIEF DESCRIPTION OF THE DRAWINGS

FIG. 10 is a free body view showing one operation state of the slide body mechanism according to the first embodiment of the present invention;

FIGS. 11(a) and 11(b) are views showing a hysteresis curve of a horizontal force and a relative displacement in a kinetic model of the vibration damping device according to the first embodiment of the present invention, wherein FIG. 11(a) is the view showing a comparison based on a slide surface and FIG. 11(b) is the view showing a comparison based on an initial compressive force;

FIGS. 21(a) and 21(b) are views showing hysteresis curves of a horizontal force and a horizontal displacement of a rigid frame on which the vibration damping device according to the first embodiment of the present invention is mounted, wherein FIG. 21(a) is a view showing a change in the hysteresis curves brought about by an initial compressive force, and FIG. 21(b) is a view showing a change in hysteresis curves brought about by a gradient of the slide surface;

FIGS. 22(a) and 22(b) are views showing an equivalent viscous damping coefficient of a rigid frame on which the vibration damping device according to the first embodiment of the present invention is mounted, wherein FIG. 22(a) is a view showing a change in equivalent viscous damping coefficient brought about by a spring constant ratio, and FIG. 22(b) is a view showing a change in equivalent viscous damping coefficient brought about by an initial compressive force;

FIG. 50 is a cross-sectional view taken along a line L-L in FIG. 49;

DETAILED DESCRIPTION OF THE INVENTION

The present invention intends to, in a slide-type (friction-type) vibration damping device of simple structure which contributes to a passive vibration control of a structure, realize the kinetic characteristic where a frictional force which constitutes a damping force is increased along with the increase of a relative displacement amount (slide amount) between at least one pair of slide bodies which are arranged relatively slidable to each other. The embodiments of the present invention are explained hereinafter.

Figure 1:
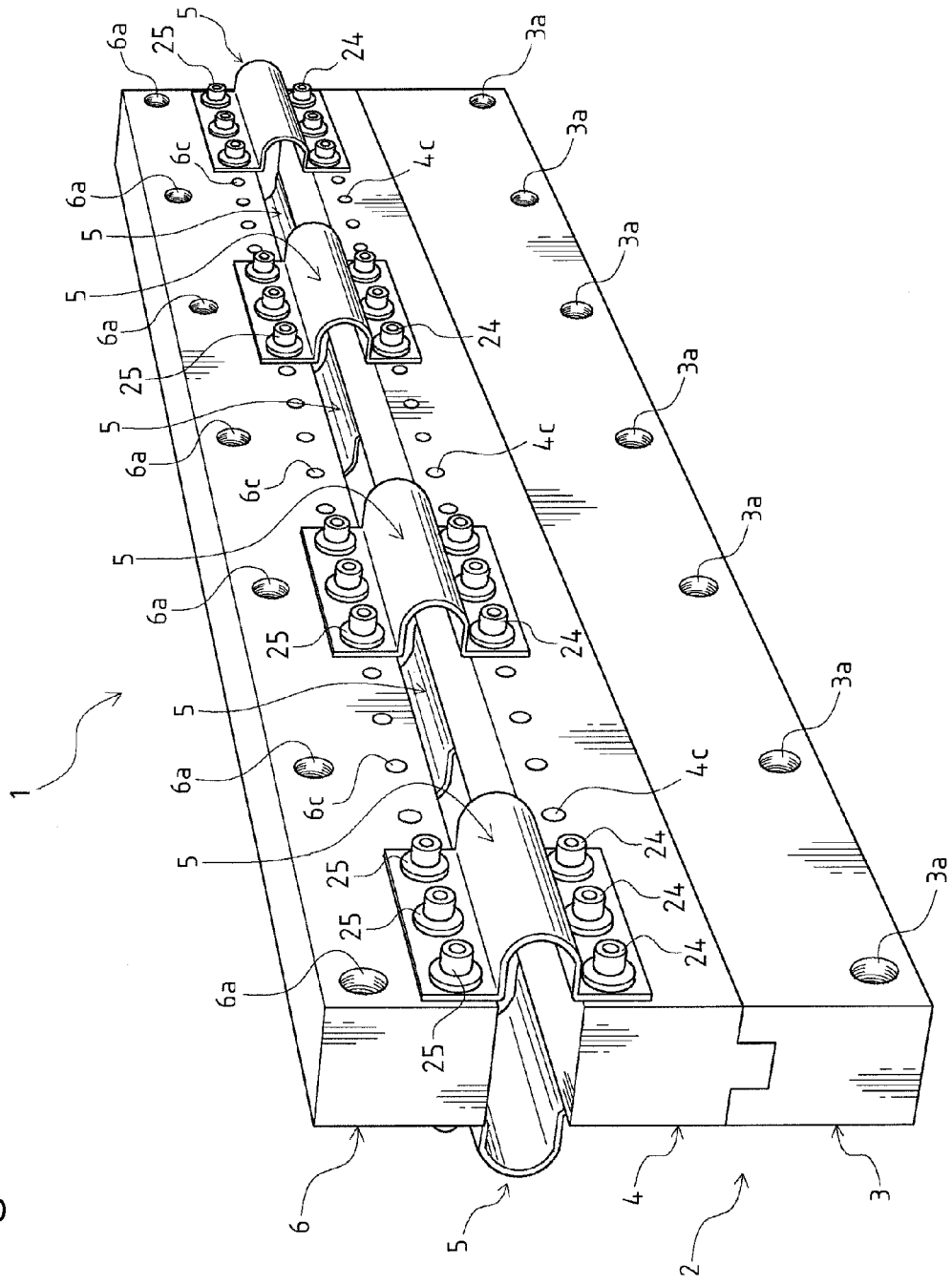
FIG. 1 is a perspective view showing the constitution of a vibration damping device according to a first embodiment of the present invention.

The first embodiment of the present invention is explained. As shown in FIG. 1, the vibration damping device (simply referred to as "damping device" hereinafter) 1 according to this embodiment is a device which suppresses the vibrations of a structure by being mounted on the structure, and includes: a slide body mechanism 2 having a concave slide body 3 and a convex slide body 4; a plurality of (8 pieces in this embodiment) leaf springs 5; and a support beam 6. The damping device 1 of this embodiment is a slide-type damping device, and is configured such that a frictional force generated due to relative sliding between the concave slide body 3 and the convex slide body 4 is used as a damping force, and the frictional force is increased in proportion to an absolute value of the relative displacement between the slide bodies.

In this embodiment, the concave slide body 3 and the convex slide body 4 which constitute the slide body mechanism 2 are slide bodies which make a pair and are mounted in a relatively reciprocally slidable manner in a state where the slide bodies face each other. The concave slide body 3 and the convex slide body 4 are made of metal such as stainless steel, for example. However, provided that the concave slide body 3 and the convex slide body 4 have sufficient strength as members which constitute the damping device 1, a material for forming the concave slide body 3 and the convex slide body 4 is not particularly limited and may be a polymer material such as a plastic, for example.

As shown in FIG. 1, the slide body mechanism 2 which is constituted of the concave slide body 3 and the convex slide body 4 has an approximately rectangular thick plate shaped profile as a whole. The concave slide body 3 and the convex slide body 4 are respectively formed of a member having an approximately quadrangular columnar shape or a rectangular thick plate shape. The concave slide body 3 and the convex slide body 4 are mounted in a slidable manner relative to each other in a state where surfaces of the slide bodies on one side thereof face each other in an opposed manner while setting the longitudinal direction of the one slide body as the relative slide direction with respect to the counterpart slide body. The concave slide body 3 and the convex slide body 4 have the same size in the longitudinal direction and in the plate-thickness direction of the slide body mechanism 2.

In the damping device 1 of this embodiment, a side where the concave slide body 3 is provided is assumed as a lower side of the slide mechanism, and a side which constitutes an opposite side and on which the convex slide body 4 is provided is assumed as an upper side of the slide mechanism 2. Accordingly, in this embodiment, the concave slide body 3 and the convex slide body 4 are slidably mounted in a state where the concave slide body 3 and the convex slide body 4 vertically face each other in an opposed manner.

The concave slide body 3 and the convex slide body 4 are respectively directly or indirectly fixed to a structure which is an object subjected to the suppression of vibrations by the damping device 1 (hereinafter simply referred to as "structure"). In this embodiment, the concave slide body 3 is directly fixed to the structure such as a wall which is positioned on a lower side of the damping device 1. In fixing the concave slide body 3 to the structure, as shown in FIG. 1, hole portions 3a for fixing which are formed in a lower end portion of the concave slide body 3 are used. The hole portions 3a are provided for allowing the insertion of fixing jigs such as bolts in the concave slide body 3 in the plate-thickness direction of the slide body mechanism 2, and a plurality of hole portions 3a are formed in the lower end portion of the concave slide body 3 at predetermined intervals along the longitudinal direction of the concave slide body 3.

Also in this embodiment, the convex slide body 4 is indirectly fixed to a structure such as a wall positioned above the damping device 1 by way of a plurality of leaf springs 5 and a support beam 6. The support beam 6 is fixed to an upper side of the convex slide body 4 by way of the plurality of leaf springs 5. The support beam 6 is a member of an approximately quadrangular columnar shape having the approximately same size as the concave slide body 3 and the convex slide body 4 with respect to a size in the longitudinal direction and a size in the plate thickness direction of the slide body mechanism 2. The support beam 6 is supported on the upper side of the convex slide body 4 by the plurality of leaf springs 5 in a state where the support beam 6 is arranged approximately parallel to the convex slide body 4 and is spaced apart from the convex slide body 4 by a predetermined distance.

The support beam 6 arranged above the convex slide body 4 by way of the plurality of leaf springs 5 in this manner is fixed to the structure. In fixing the support beam 6 to the structure, as shown in FIG. 1, hole portions 6a for fixing formed on an upper end portion of the support beam 6 are used. The hole portions 6a are provided for allowing the insertion of fixing jigs such as bolts in the support beam 6 in the plate-thickness direction of the slide body mechanism 2, and a plurality of hole portions 6a are formed in an upper end portion of the support beam 6 at predetermined intervals along the longitudinal direction of the support beam 6. The support beam 6 is made of a metal material such as stainless steel, for example, in the same manner as the concave slide body 3 and the convex slide body 4.

The leaf springs 5 downwardly bias the slide body mechanism 2 from above in a state where the leaf springs 5 are interposed between the support beam 6 which is directly connected to the structure and the convex slide body 4. That is, in a state where the damping device 1 is mounted on the structure, the leaf springs 5 apply a biasing force in the direction that the concave slide body 3 and the convex slide body 4 which slide relative to each other in a reciprocating manner are pushed to each other in the direction along which the concave slide body 3 and the convex slide body 4 face each other in an opposed manner (hereinafter referred to as "slide body pushing direction") to the slide body mechanism 2. In this manner, in the damping device 1 of this embodiment, the leaf springs 5 function as a biasing means which biases the slide body mechanism 2 in the slide body pushing direction.

The damping device 1 having the above-mentioned constitution receives a biasing force in the slide body pushing direction from the leaf springs 5 by changing a height (size in the vertical direction, the same definition being used hereinafter) of the slide body mechanism 2 against a biasing force of the leaf springs 5 due to the relative sliding between the concave slide body 3 and the convex slide body 4 which constitute the slide body mechanism 2. Then, the damping device 1 increases the height of the slide body mechanism 2 along with the increase of the displacement amount caused by the relative sliding between the concave slide body 3 and the convex slide body 4 (hereinafter referred to as "slide body displacement amount") thus increasing a biasing force in the slide body pushing direction which the damping device 1 receives from the leaf springs 5.

Due to such a constitution, the damping device 1 is configured such that a frictional force which acts as a damping force and is generated between the concave slide body 3 and the convex slide body 4 is increased in proportion to the increase of the slide body displacement amount. The change in the height of the slide body mechanism 2 caused along with the change in the slide body displacement amount is allowed by the shrinkage/extension due to elastic deformation of the leaf springs 5 which are mounted on an upper side of the convex slide body 4 and support the support beam 6, and a gap formed between the convex slide body 4 and the support beam 6. Hereinafter, the specific constitution of the damping device 1 of this embodiment is explained.

Firstly, the structure of the slide body mechanism 2 which is constituted of the concave slide body 3 and the convex slide body 4 is explained in conjunction with FIG. 2 to FIG. 7. In the explanation made hereinafter, for the sake of convenience, the direction that the convex slide body 4 slides in the reciprocating manner relative to the concave slide body 3 is set as the operating direction, and one direction of the operating direction is set as the frontward direction, and the other direction of the operating direction is set as the backward direction.

The concave slide body 3 and the convex slide body 4 have a neutral position within a range where the concave slide body 3 and the convex slide body 4 are slidable relative to each other in a reciprocating manner, and a displacement amount caused by the relative sliding from the neutral position corresponds to a slide body displacement amount. That is, the convex slide body 4 slides in a reciprocating manner by sliding frontward or rearward with respect to the concave slide body 3 using the neutral position as the reference (displacement amount=0), thus changing the slide body displacement amount.

The concave slide body 3 and the convex slide body 4 respectively have, as slide surfaces thereof, two kinds of slide surfaces which are formed as slanted surfaces having inclinations opposite to each other with respect to the relative sliding direction, and are assembled together in a state where the slide surfaces face each other in an opposed manner and can be brought into contact with each other. Further, the concave slide body 3 and the convex slide body 4 are constituted such that, in a state where the convex slide body 4 is positioned in front of the neutral position, only the slide surfaces of one kind are brought into contact with each other out of two kinds of slide surfaces, while in a state where the convex slide body 4 is positioned behind the neutral position, only the slide surfaces of the other kind are brought into contact with each other out of two kinds of slide surfaces.

The slide surfaces which are brought into contact with each other in a state where the convex slide body 4 is positioned in front of the neutral position are formed as slanted surfaces having an ascending gradient toward a front side so as to raise the convex slide body 4 along with the displacement due to the sliding of the convex slide body 4 toward a front side from the neutral position. On the other hand, the slide surfaces which are brought into contact with each other in a state where the convex slide body 4 is positioned behind the neutral position are formed as slanted surfaces having an ascending gradient toward a rear side so as to raise the convex slide body 4 along with the displacement due to the sliding of the convex slide body 4 toward a rear side from the neutral position.

The slide body mechanism 2 which is constituted by assembling the concave slide body 3 and the convex slide body 4 together increases a height thereof in proportion to an absolute value of the slide body displacement amount depending on the inclination of the slide surface that each slide body has. The leaf springs 5 which are fixed to the convex slide body 4 and are also fixed to the structure by way of the support beam 6 apply a compressive force from above to the slide body mechanism 2 which is constituted of the concave slide body 3 and the convex slide body 4 by making use of the increase of the height of the slide body mechanism 2 corresponding to the increase of the slide body displacement amount. The damping device 1 generates a frictional force having a characteristic that the frictional force is increased in proportion to an absolute value of the slide body displacement amount on a slide surface between the concave slide body 3 and the convex slide body 4 by making use of the compressive force applied to the slide body mechanism 2 along with the increase of the height of the slide body mechanism 2.

As shown in FIG. 2 to FIG. 7, in the slide body mechanism 2, the concave slide body 3 and the convex slide body 4 have a recessed portion and a projecting portion respectively at portions on sides thereof which face each other in an opposed manner, and the concave slide body 3 and the convex slide body 4 are slidably engaged with each other by fitting engagement due to these recessed portion and projecting portion. The slide body mechanism 2 includes, as the recessed portion and the projecting portion, a groove portion 11 formed on a concave slide body 3 side and a projecting portion 12 formed on a convex slide body 4 side.

That is, in the damping device 1 of this embodiment, the concave slide body 3 which constitutes one of the two slide bodies 3 and 4 which slide relative to each other in a reciprocating manner has the groove portion 11 on an end portion thereof on a side (upper side) which faces the convex slide body 4 constituting a sliding counterpart slide body in an opposed manner. The groove portion 11 opens upward while extending in the direction that the concave slide body 3 slides relative to the convex slide body 4 in a reciprocating manner (operating direction), and forms a convex shape as viewed in the operating direction.

The groove portion 11 is a portion in the form of a groove having a plate-shaped space open upward in an upper-side portion of the concave slide body 3. Accordingly, on the upper-side end portion of the concave slide body 3, groove end surfaces 11a which are two portions forming open-side end surfaces of the groove portion 11 and a groove bottom surface 11b which is a bottom surface of the groove portion 11 are formed. Two groove end surfaces 11a are surfaces from which the groove is indented in the groove portion 11 and these groove end surfaces 11a are formed coplanar. Between two groove end surfaces 11a and the groove bottom surface 11b, inner side surfaces 11c which face each other in an opposed manner in the plate-thickness direction of the slide body mechanism 2 (the lateral direction in FIG. 4, referred to as "widthwise direction" hereinafter) are formed. The inner side surfaces 11c which face each other in an opposed manner are formed approximately parallel to each other.

In the groove portion 11, the groove bottom surface 11b is formed between two groove end surfaces 11a in the widthwise direction and below the groove end surfaces 11a. The groove portion 11 is formed over the whole concave slide body 3 in the longitudinal direction. Accordingly, the groove portion 11 forms, on an upper end portion of the concave slide body 3, a portion having a recessed shape as viewed in the longitudinal direction of the concave slide body 3 by surface portions including two groove end surfaces 11a, one groove bottom surface 11b and two inner side surfaces 11c (see FIG. 3).

Further, in the damping device 1 of this embodiment, the convex slide body 4 which constitutes another of the slide bodies 3 and 4 which slide relative to each other in a reciprocating manner has the projecting portion 12 on an end portion thereof on a side flower side) which faces the concave slide body 3 constituting a sliding counterpart slide body in an opposed manner. The projecting portion 12 extends along the operating direction and projects downward thus forming a projecting shape as viewed in the operating direction.

The projecting portion 12 is a portion where a plate-shaped projection projects downward at a lower end portion of the convex slide body 4. Accordingly, on the lower end portion of the convex slide body 4, shoulder surfaces 12a which are two portions forming a proximal end surfaces of the projecting portion 12 and a projecting portion end surface 12b forming a projection-side end surface of the projecting portion 12 are formed. Two shoulder surfaces 12a are surfaces of the projecting portion 12 from which a plate-shaped projection projects, and these shoulder surfaces 12a are formed coplanar. Outer side surfaces 12c which are directed to sides opposite to each other in the widthwise direction (lateral direction in FIG. 4) are formed between two shoulder surfaces 12a and the projecting portion end surface 12b. The outer side surfaces 12c which are directed to sides opposite to each other are formed approximately parallel to each other.

In the projecting portion 12, the projecting portion end surface 12b is formed between two shoulder surfaces 12a in the widthwise direction and below the shoulder surfaces 12a. The projecting portion 12 is formed over the whole length in the longitudinal direction of the convex slide body 4. Accordingly, the projecting portion 12 forms, on a lower end portion of the convex slide body 4, a convex-shaped portion as viewed in the longitudinal direction of the convex slide body 4 by surface portions including two shoulder surfaces 12a, one projecting portion end surface 12b and two outer side surfaces 12c (see FIG. 3).

The groove portion 11 and the projecting portion 12 which are slidably engaged with each other by fitting engagement are formed such that a size (a size in the widthwise direction) of the groove of the groove portion 11 and a size (a size in the widthwise direction) of the projection of the projecting portion 12 are set substantially equal. That is, a size between the inner side surfaces 11c which form the groove portion 11 and a size between the outer side surfaces 12c which form the projecting portion 12 are set substantially equal.

As described above, in the constitution where the concave slide body 3 and the convex slide body 4 are slidably engaged with each other by fitting engagement between the groove portion 11 and the projecting portion 12, surfaces of a portion of the concave slide body 3 which form the groove portion 11 are used as slide surfaces of the concave slide body 3 for the convex slide body 4, and surfaces of a portion of the convex slide body 4 which forms the projecting portion 12 are used as slide surfaces of the convex slide body 4 for the concave slide body 3. The concave slide body 3 and the convex slide body 4 respectively have two kinds of slide surfaces as described above.

Out of two kinds of slide surfaces which the concave slide body 3 and the convex slide body 4 respectively have, slide surfaces of one kind are brought into contact with each other in a state where the convex slide body 4 is positioned in front of the neutral position with respect to the concave slide body 3. Further, out of the same two kinds of slide surfaces, the slide surfaces of one kind are formed of a slanted surface having an ascending gradient toward a front side such that the convex slide body 4 is raised along with the displacement of the convex slide body 4 caused by sliding toward a front side from the neutral position.

Out of two kinds of slide surfaces which the concave slide body 3 and the convex slide body 4 have respectively, the slide surfaces of the other kind are brought into contact with each other in a state where the convex slide body 4 is positioned behind the neutral position with respect to the concave slide body 3. Further, out of the same two kinds of slide surfaces, the slide surfaces of other kind are formed of a slanted surface having an ascending gradient toward a rear side such that the convex slide body 4 is raised along with the displacement of the convex slide body 4 caused by sliding toward a rear side from the neutral position.

Hereinafter, the former slide surfaces (the above-mentioned one slide surfaces) are referred to as "front-side-use slide surfaces", and the latter slide surfaces (the above-mentioned the other slide surfaces) are referred to as "rear-side-use slide surfaces". Further, in the damping device 1 of this embodiment, the direction indicated by an arrow A1 in FIG. 2 and FIG. 5 respectively (the right depth direction in FIG. 2 and the right direction in FIG. 5) indicates the frontward direction, and the direction indicated by an arrow A2 in FIG. 2 and FIG. 5 respectively (the left viewer's side direction in FIG. 2 and the left direction in FIG. 5) indicates the rearward direction.

As shown in FIG. 2 to FIG. 7, in this embodiment, in the concave slide body 3, the groove end surfaces 11a which form the groove portion 11 are used as the front-side-use slide surfaces. In the same manner, in the concave slide body 3, the groove bottom surface 11b which forms the groove portion 11 is used as the rear-side-use slide surface. Accordingly, the groove end surfaces 11a which constitute the front-side-use slide surfaces are formed as slanted surfaces which are directed upward and ascend toward a front side over the whole length in the longitudinal direction of the concave slide body 3. Further, the groove bottom surface 11b which constitutes the rear-side-use slide surface is formed as a slanted surface which is directed upward and ascends toward a rear side over the whole length in the longitudinal direction of the concave slide body 3.

In the convex slide body 4, the shoulder surfaces 12a which form the projecting portion 12 are used as the front-side-use slide surfaces. In the same manner, in the convex slide body 4, the projecting portion end surface 12b which forms the projecting portion 12 is used as the rear-side-use slide surface. Accordingly, the shoulder surfaces 12a which constitute the front-side-use slide surfaces are formed as slanted surfaces which are directed downward and ascend toward a front side over the whole length in the longitudinal direction of the convex slide body 4. Further, the projecting portion end surface 12b which constitutes the rear-side-use slide surface is formed as a slanted surface which is directed downward and ascends toward a rear side over the whole length in the longitudinal direction of the convex slide body 4. In this manner, the concave slide body 3 and the convex slide body 4 respectively have two front-side-use slide surfaces and one rear-side-use slide surface.

As described above, in this embodiment, with respect to the slide engagement between the concave slide body 3 and the convex slide body 4, the groove end surfaces 11a of the groove portion 11 and the shoulder surfaces 12a of the projecting portion 12 form the front-side-use slide surfaces, while the groove bottom surface 11b of the groove portion 11 and the projecting portion end surface 12b of the projecting portion 12 form the rear-side-use slide surfaces. In this embodiment, the gradients (inclinations) of the groove end surfaces 11a and the shoulder surface 12a which form the front-side-use slide surfaces are equal, and the gradients (inclinations) of the groove bottom surface 11b and the projecting portion end surface 12b which form the rear-side-use slide surfaces are equal.

Figure 2:
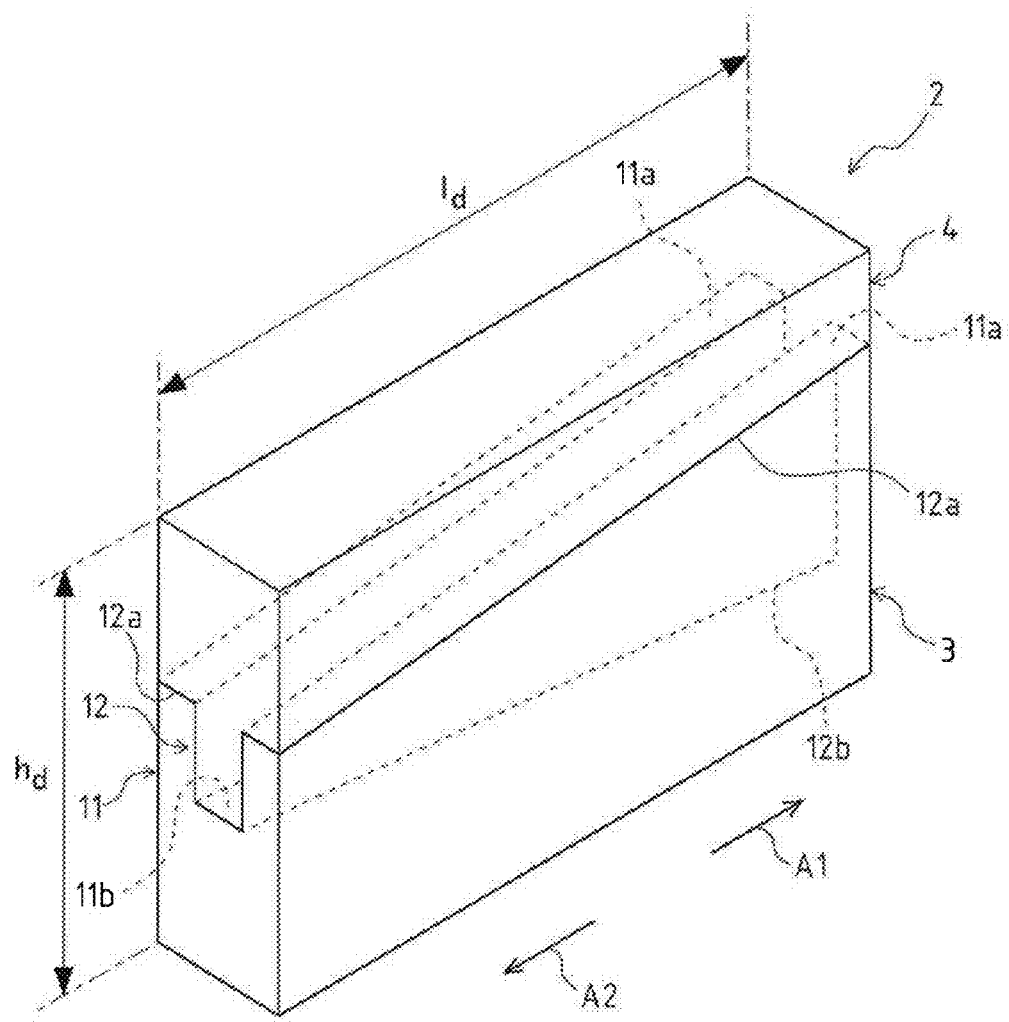
FIG. 2 is a perspective view showing the constitution of a slide body mechanism according to the first embodiment of the present invention.
Figure 5:
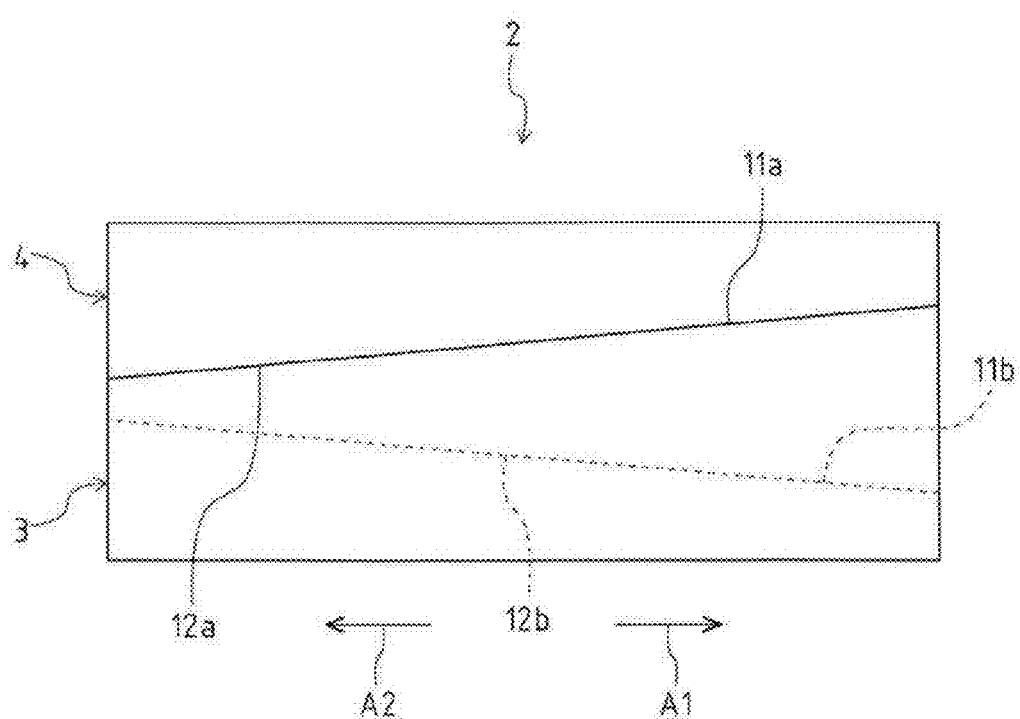
FIG. 5 is a side view showing the constitution of the slide body mechanism according to the first embodiment of the present invention.

In the slide body mechanism 2, as shown in FIG. 2 and FIG. 5, a state where both ends of the concave slide body 3 and the convex slide body 4 having the same length in the longitudinal direction are aligned with each other as described above corresponds to a state where the convex slide body 4 is at a neutral position with respect to the concave slide body 3 (hereinafter referred to as "neutral state"). In both a moving step of the convex slide body 4 toward a front side from the neutral state and a moving step of the convex slide body 4 toward a rear side from the neutral state, due to the respective gradients of the front-side-use slide surfaces and the rear-side-use slide surfaces, a height of the slide body mechanism 2 is increased along with the increase of a slide body displacement amount.

Accordingly, during the movement of the convex slide body 4 toward a front side from the neutral state, only the front-side-use slide surfaces of the concave slide body 3 and the front-side-use slide surfaces of the convex slide body 4 are brought into contact with each other. That is, only the groove end surfaces 11a and the shoulder surfaces 12a are brought into contact with each other. On the other hand, during the movement of the convex slide body 4 toward a rear side from the neutral state, only the rear-side-use slide surface of the concave slide body 3 and the rear-side-use slide surface of the convex slide body 4 are brought into contact with each other. That is, only the groove bottom surface 11b and the projecting portion end surface 12b are brought into contact with each other. Further, in the neutral state, a state is brought about where the front-side-use slide surfaces of the concave slide body 3 and the front-side-use slide surfaces of the convex slide body 4 are brought into contact with each other and, at the same time, the rear-side-use slide surface of the concave slide body 3 and the rear-side-use slide surface of the convex slide body 4 are brought into contact with each other. In this manner, the groove end surfaces 11a and the shoulder surfaces 12a which constitute the front-side-use slide surfaces are front-side dedicated slide surfaces which function as slide surfaces in a state where the convex, slide body 4 is positioned in front of the neutral position with respect to the concave slide body 3. On the other hand, the groove bottom surface 11b and the projecting portion end surface 12b which constitute the rear-side-use slide surfaces are rear-side dedicated slide surfaces which function as slide surfaces in a state where the convex slide body 4 is positioned behind the neutral position with respect to the concave slide body 3.

As described above, the respective slide bodies, that is, the concave slide body 3 and the convex slide body 4 which constitute slide body mechanism 2 include the front-side-use slide surfaces and the rear-side-use slide surfaces respectively. In this embodiment, the front-side-use slide surfaces which the concave slide body 3 and the convex slide body 4 respectively have function as first slide surfaces having a shape which increases a height of the slide body mechanism 2 along with the increase of a displacement amount toward a front side from the neutral position within a range where the concave slide body 3 and the convex slide body 4 slide relative to each other in a reciprocating manner. That is, in this embodiment, the groove end surface 11a of the concave slide body 3 and the shoulder surface 12a of the convex slide body 4 which constitute the front-side-use slide surfaces function as the first slide surfaces respectively.

Further, in this embodiment, the rear-side-use slide surfaces which the concave slide body 3 and the convex slide body 4 respectively have function as second slide surfaces having a shape which increases a height of the slide body mechanism 2 along with the increase of a displacement amount toward a rear side from the neutral position with respect to the sliding counterpart slide body. That is, in this embodiment, the groove bottom surface 11b of the concave slide body 3 and the projecting portion end surface 12b of the convex slide body 4 which constitute the rear-side-use slide surfaces function as the second slide surfaces respectively.

However, in this embodiment, when the moving direction along which the height of the slide body mechanism 2 is increased with respect to the first slide surfaces (one direction of the operating direction) is the rearward direction, the moving direction along which the height of the slide body mechanism 2 is increased with respect to the second slide surfaces (the other direction of the operating direction) becomes the frontward direction. In this case, the rear-side-use slide surfaces function as the first slide surfaces, and the front-side-use slide surfaces function as the second slide surfaces. That is, the first slide surfaces and the second slide surfaces respectively correspond to the slide surfaces where the moving direction of the slide body from the neutral position which increases the height of the slide body mechanism 2 differs from each other with respect to the operating direction.

Accordingly, in the constitution where the front-side-use slide surfaces and the rear-side-use slide surfaces are formed on the concave slide body 3 and the convex slide body 4 respectively, when the inclination of the groove end surfaces 11a and the shoulder surfaces 12a which constitute the front-side-use slide surfaces, and the inclination of the groove bottom surface 11b and the projecting portion end surface 12b which constitute the rear-side-use slide surface are reversed from the inclination shown in the drawing, the groove bottom surface 11b and the projecting portion end surface 12b constitute the front-side-use slide surfaces, and the groove end surfaces 11a and the shoulder surfaces 12a constitute the rear-side-use slide surfaces. That is, the concave slide body 3 and the convex slide body 4 are formed such that the concave slide body 3 and the convex slide body 4 employ the groove end surfaces 11a and the shoulder surfaces 12a as either one of the front-side-use slide surfaces and the rear-side-use slide surfaces, and employ the groove bottom surface 11b and the projecting portion end surface 12b as the other of the front-side-use slide surfaces and the rear-side-use slide surfaces.

The front-side-use slide surfaces and rear-side-use slide surfaces which the concave slide body 3 and the convex slide body 4 respectively have are present at a common position in the operating direction. That is, in the concave slide body 3, the groove end surfaces 11a which constitute the front-side-use slide surfaces and the groove bottom surface 11b which constitutes the rear-side-use slide surface are present at the common position in the operating direction, while in the convex slide body 4, the shoulder surfaces 12a which constitute the front-side-use slide surfaces and the projecting portion end surface 12b which constitutes the rear-side-use slide surface are present at the common position in the operating direction.

Here, "present at the common position in the operating direction" means that "present at the same position in the operating direction". To be more specific, for example, in the case of the concave slide body 3, the groove end surfaces 11a which constitute the front-side-use slide surfaces and the groove bottom surface 11b which constitute the rear-side-use slide surface are arranged so as to overlap with each other in the widthwise direction as viewed in a plan view (as viewed from above) from a side where the groove portion 11 opens (an upper side). In other words, in the concave slide body 3, both the groove end surfaces 11a and the groove bottom surface 11b which are formed along the operating direction while being directed upward are arranged in a mode where the groove end surfaces 11a and the groove bottom surface 11b are arranged parallel to each other in the widthwise direction as viewed in a plan view.

To be more specific, in this embodiment, both the front-side-use slide surfaces and the rear-side-use slide surfaces which the concave slide body 3 and the convex slide body 4 respectively have are formed over the whole length of the concave slide body 3 or the convex slide body 4 in the longitudinal direction. Accordingly, in each one of the concave slide body 3 and the convex slide body 4, both ends of the front-side-use slide surface and the rear-side-use slide surface agree with each other in the operating direction. For example, in the case of the concave slide body 3, both ends of the groove end surfaces 11a which constitute the front-side-use slide surfaces and the groove bottom surface 11b which constitutes the rear-side-use slide surface agree with each other in the operating direction.

That is, in this embodiment, in each one of the concave slide body 3 and the convex slide body 4, the position of the front-side-use slide surface and the position of the rear-side-use slide surface in the operating direction agree with each other. Accordingly, in the constitution where the concave slide body 3 and the convex slide body 4 have the same size in the longitudinal direction, in a neutral state, all slide surfaces which the slide body mechanism 2 has, that is, the groove end surfaces 11a, the groove bottom surface 11b, the shoulder surfaces 12a and the projecting portion end surfaces 12b are present at the common position in the operating direction.

However, with respect to the front-side-use slide surface and the rear-side-use slide surface which each one of the concave slide body 3 and the convex slide body 4 has, the presence of the front-side-use slide surface and the rear-side-use slide surface at the common position in the operating direction is not limited to the case where the position of the front-side-use slide surface and the rear-side-use slide surface agree with each other in the operating direction as described in this embodiment. That is, the presence of the front-side-use slide surface and the rear-side-use slide surface at the common position in the operating direction includes the case where at least a portion of the front-side-use slide surface which each slide body has and at least a portion of the rear-side-use slide surface which each slide body has are present at the common position in the operating direction. In other words, it is sufficient that the front-side-use slide surface and the rear-side-use slide surface which each slide body has are formed such that at least a portion of the front-side-use slide surface and a portion of the rear-side-use slide surface overlap with each other in the widthwise direction as viewed in a top plan view with respect to the concave slide body 3 and as viewed in a bottom plan view with respect to the convex slide body 4.

Further, with respect to materials for forming the concave slide body 3 and the convex slide body 4 which constitute the slide body mechanism 2 in the damping device 1, one slide body is preferably made of a hard material and the other slide body is preferably made of a soft material. As the hard material used as a material for forming the concave slide body 3 or the convex slide body 4, stainless steel is named. As the soft material used as a material for forming the concave slide body 3 or the convex slide body 4, bronze or the like is named.

Accordingly, for example, when the concave slide body 3 which constitutes one slide body is formed using stainless steel as a material thereof, the convex slide body 4 which constitutes the other slide body is formed using bronze softer than stainless steel.

By selecting the materials of the respective slide bodies consisting of the concave slide body 3 and the convex slide body 4, the stability of the dynamic coefficient of friction on a slide surface which each slide body possesses can be enhanced. Further, durability of the slide surface can be enhanced from a viewpoint that seizure due to a friction between the slide surfaces can be prevented. Still further, for enhancing the durability of the slide surface, a slide body which contains a solid lubricant or the like or a slide body whose slide surface is formed of a material containing a solid lubricant or the like may be used.

Figure 6:
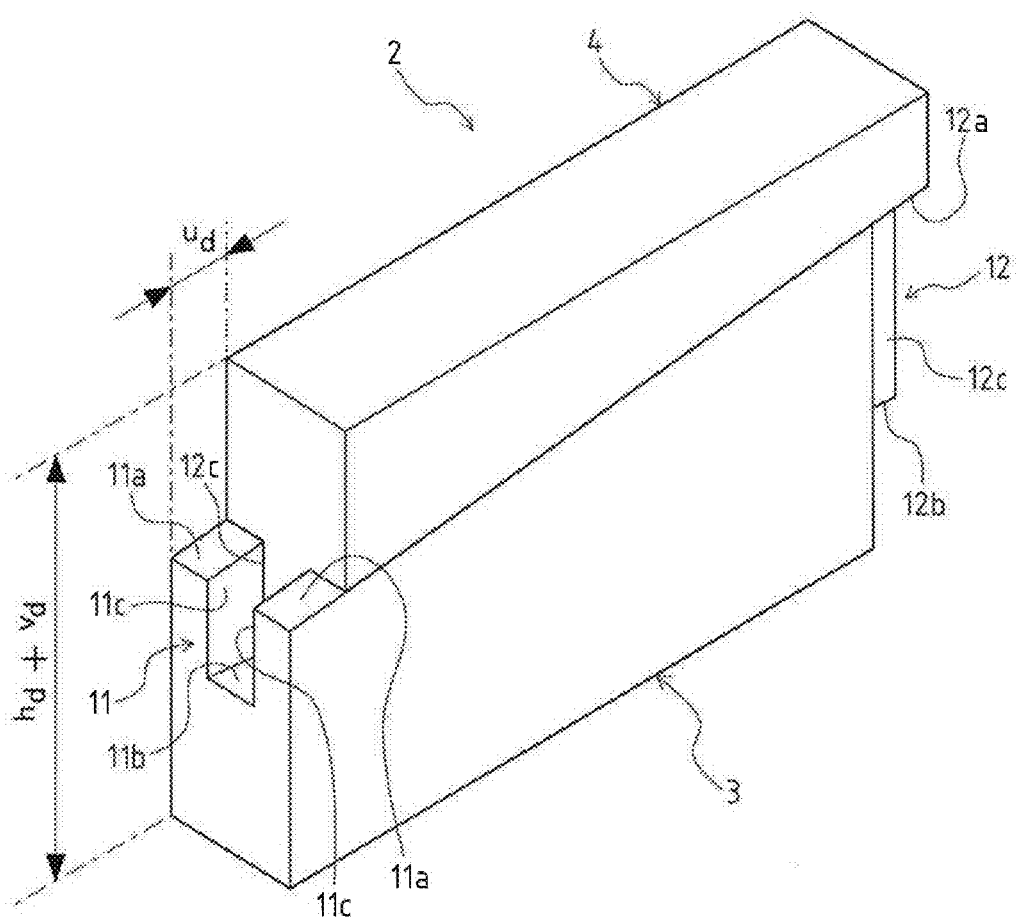
FIG. 6 is a perspective view showing one operation state of the slide body mechanism according to the first embodiment of the present invention.

The damping device 1 having the above-mentioned constitution can acquire the following manner of operation. FIG. 6 shows a state where the convex slide body 4 is positioned in front of the neutral position (a frontwardly moved state) with respect to the concave slide body 3. Assume a frontward displacement amount (slide body displacement amount) of the convex slide body 4 from the neutral position as $u_d$. In the frontwardly moved state shown in FIG. 6, the groove end surfaces 11a of the concave slide body 3 and the shoulder surfaces 12a of the convex slide body 4 which constitute the front-side-use slide surfaces are brought into contact with each other, and the groove bottom surface 11b of the concave slide body 3 and the projecting portion end surface 12b of the convex slide body 4 which constitute the rear-side-use slide surfaces are not brought into contact with each other.

Figure 7:
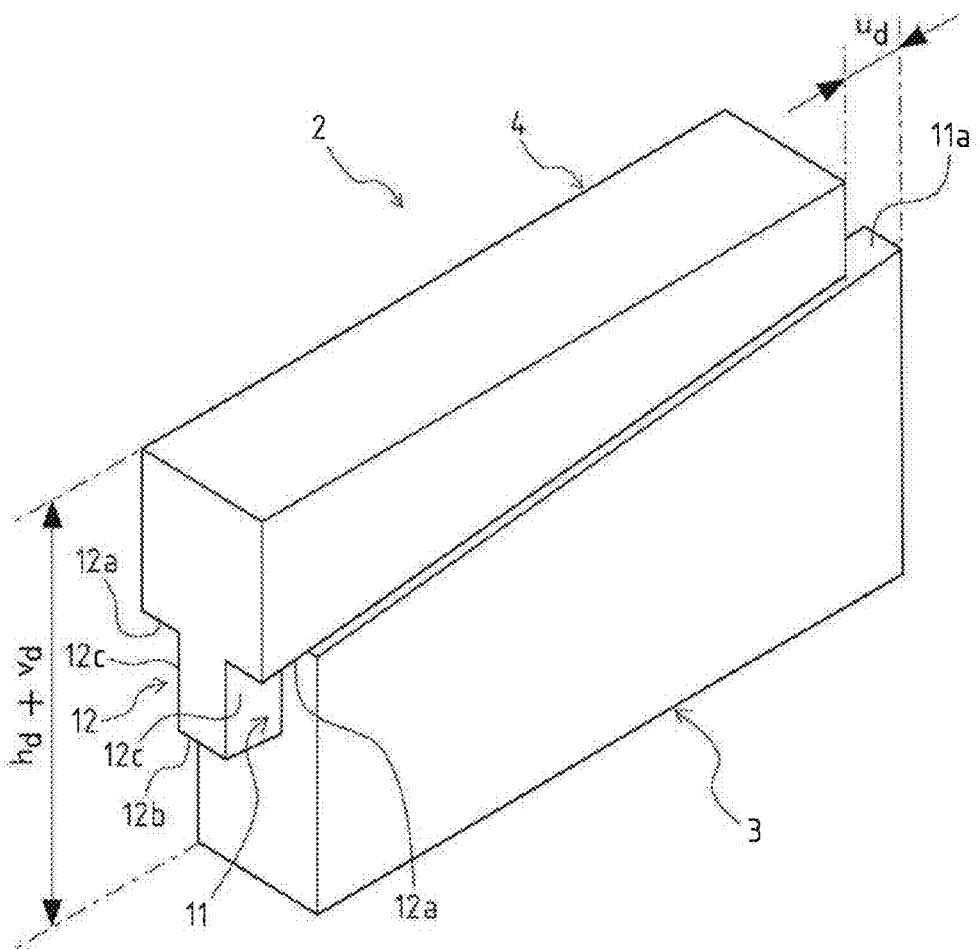
FIG. 7 is a perspective view showing one operation state of the slide body mechanism according to the first embodiment of the present invention.

FIG. 7 shows a state where the convex slide body 4 is positioned behind the neutral position (a rearwardly moved state) with respect to the concave slide body 3. Assume a rearward displacement amount (slide body displacement amount) of the convex slide body 4 from the neutral position as $u_d$ in the same manner as the frontwardly moved state. In the rearwardly moved state shown in FIG. 7, the groove bottom surface 11b of the concave slide body 3 and the projecting portion end surface 12b of the convex slide body 4 which constitute the rear-side-use slide surfaces are brought into contact with each other, and the groove end surfaces 11a of the concave slide body 3 and the shoulder surfaces 12a of the convex slide body 4 which constitute the front-side-use slide surfaces are not brought into contact with each other.

Assuming a height of the slide body mechanism 2 when the slide body mechanism 2 is at a neutral state as $h_d$ as shown in FIG. 2, when a relative displacement of a displacement amount $u_d$ is generated between the concave slide body 3 and the convex slide body 4 as shown in FIG. 6 and FIG. 7, a height of the slide body mechanism 2 is changed to $h_d+v_d$. Here, $v_d$ is a change amount of the height of the slide body mechanism 2 generated by the relative displacement of the displacement amount $u_d$ between the concave slide body 3 and the convex slide body 4, and is expressed by the following formula (1).

$$v_d = i|u_d| \qquad (1)$$

Here, "i" is a gradient (inclination) of the respective slide surfaces consisting of the front-side-use slide surface and the rear-side-use slide surface which are equal as described previously, $u_d$ in the formula (1) takes a positive value in the frontward, movement and takes a negative value in the rearward movement.

As expressed in the formula (1), a change amount $v_d$ in height of the slide body mechanism 2 is in proportion to a value (absolute value) of a relative displacement amount $u_d$ between the concave slide body 3 and the convex slide body 4. By making use of such a characteristic that a height of the slide body mechanism 2 is increased in proportion to a slide body displacement amount in this manner, the damping device 1 generates a compressive force in the slide body pushing direction which is increased in proportion to a slide body displacement amount. That is, in the damping device 1, with the increase of the height of the slide body mechanism 2 in proportion to the slide body displacement amount, the convex slide body 4 applies a force which works against a biasing force caused by the leaf spring 5 in the slide body pushing direction, and a compressive force in the slide body pushing direction is applied to the slide body mechanism 2 as a reaction force.

In the damping device 1, the concave slide body 3 and the convex slide body 4 are formed such that these bodies are engaged with each other by fitting engagement by way of the groove portion 11 and the projecting portion 12 and, as described previously, the width size of the groove of the groove portion 11 and the width size of the projection of the projecting portion 12 becomes substantially equal. Due to such a constitution, a gap in the widthwise direction formed between the groove portion 11 and the projecting portion 12 in a state where the groove portion 11 and the projecting portion 12 are engaged with each other by fitting engagement can be eliminated as much as possible and hence, the concave slide body 3 and the convex slide body 4 slide relative to each other without having a play in the widthwise direction.

Figure 3:
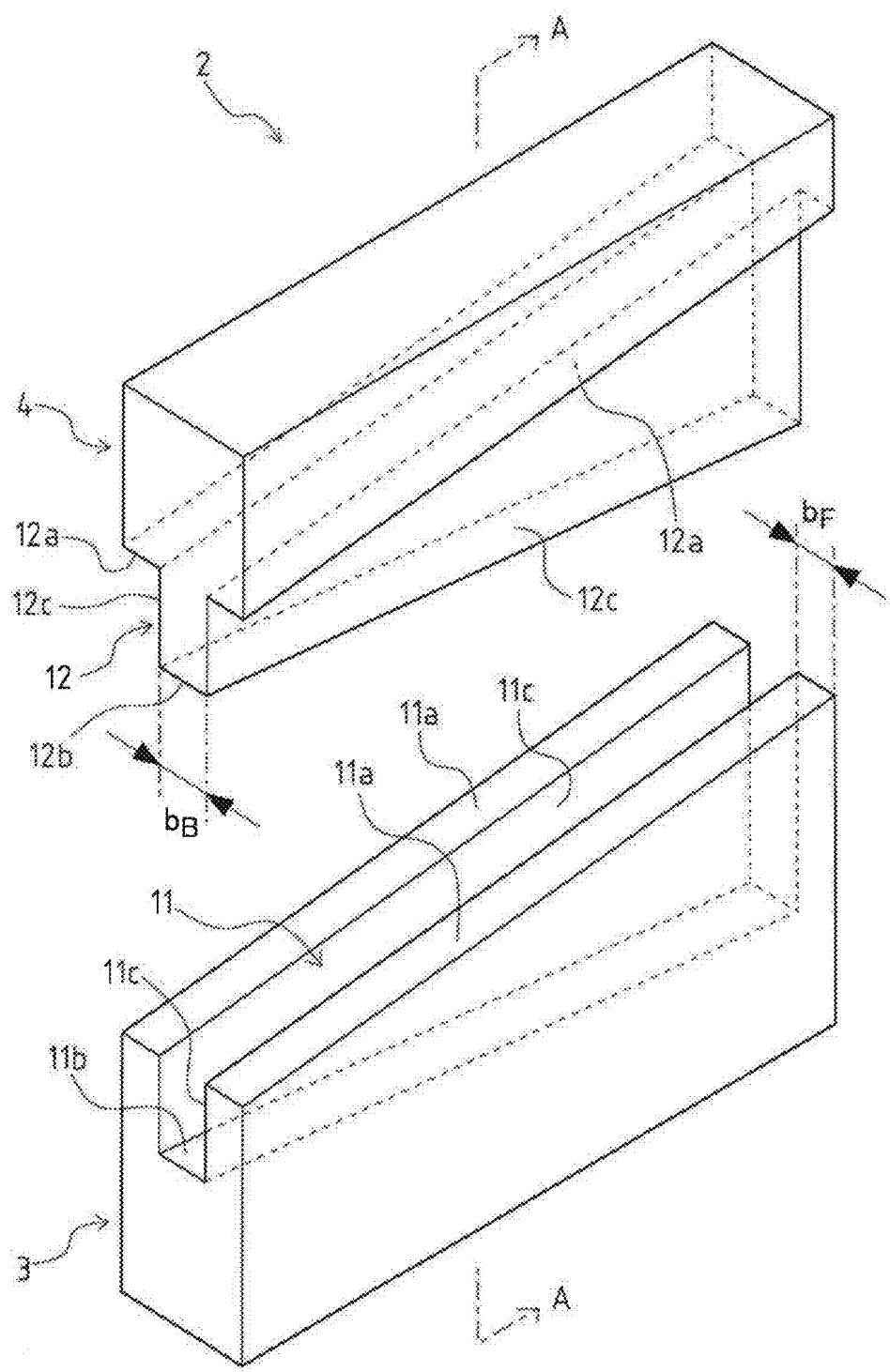
FIG. 3 is an exploded perspective view showing the constitution of the slide body mechanism according to the first embodiment of the present invention.
Figure 4:
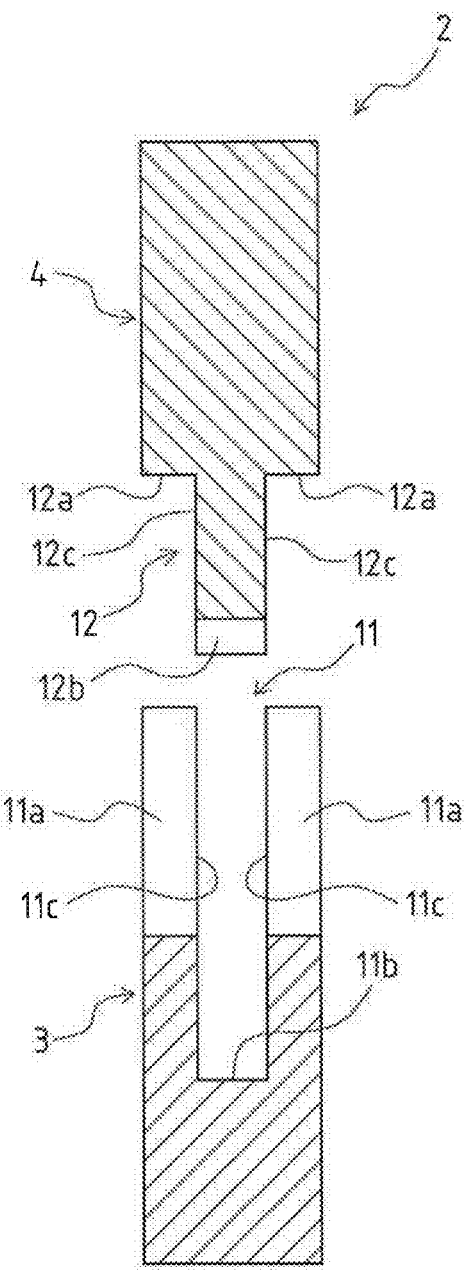
FIG. 4 is a cross-sectional view of the slide body mechanism taken along a line A-A in FIG. 3 in the direction of an arrow.

Regardless of whether the convex slide body 4 is in a frontward moving time or a rearward moving time, in the concave slide body 3 and the convex slide body 4 which slide relative to each other, there is no possibility that eccentricity occurs in the transverse direction (in the widthwise direction) orthogonal to the operating direction and, further, the respective slide surfaces of the convex slide body 4 and the concave slide body 3 are brought into contact with each other over the approximately whole length $l_d$ (see FIG. 2) of each slide body. In FIG. 3, symbol $b_F$ indicates a width of the groove end surface 11a and the shoulder surface 12a which constitute the front-side-use slide surface, and symbol $b_B$ indicates a width of the groove bottom surface 11b and the projecting portion end surface 12b which constitute the rear-side-use slide surface.

Figure 8:
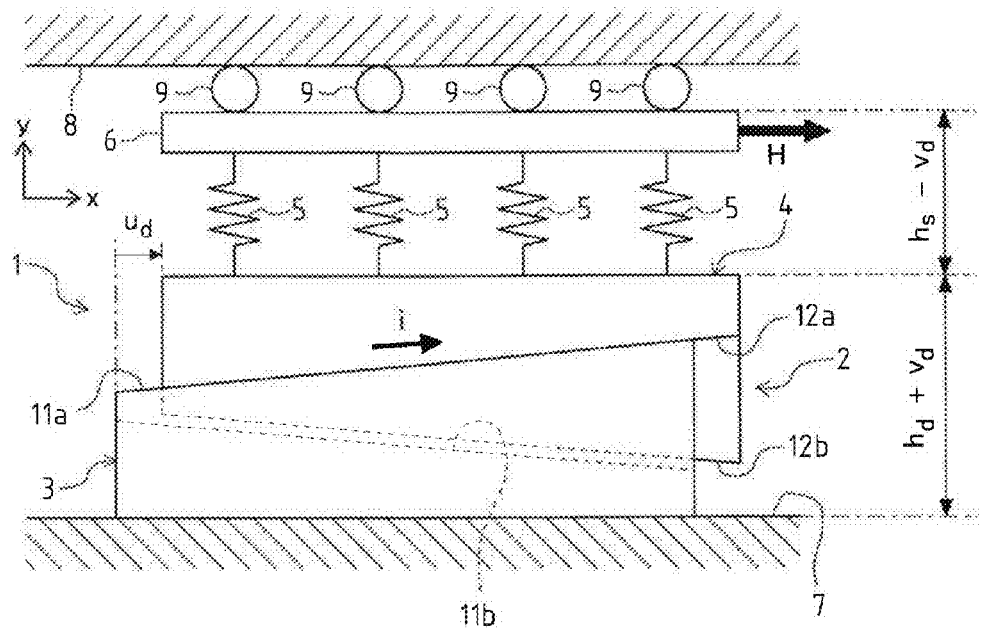
FIG. 8 is a view showing a kinetic model of the vibration damping device according to the first embodiment of the present invention in one operation state.
Figure 9:
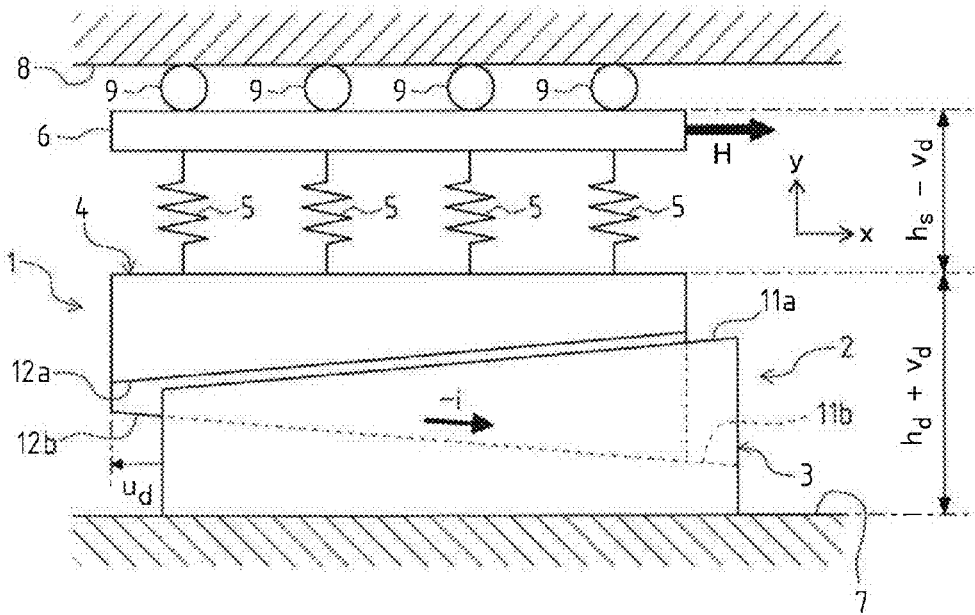
FIG. 9 is a view showing a kinetic model of the vibration damping device according to the first embodiment of the present invention in another operation state.

The damping device 1 of this embodiment having the above-mentioned constitution is kinetically analyzed using a static kinetic model. FIG. 8 and FIG. 9 show a kinetic model of the damping device 1 which includes the concave slide body 3, the convex slide body 4, the leaf springs 5 and the support beam 6.

As shown in FIG. 8 and FIG. 9, in this kinetic model, the concave slide body 3 is fixed to a lower side wall 7 corresponding to a structure. The convex slide body 4 is assembled to the concave slide body 3, and the leaf springs 5 and the support beam 6 are mounted on an upper side of the convex slide body 4. The support beam 6 is fixed to an upper side wall 8 corresponding to the structure by way of rollers 9. That is, the rollers 9 are arranged between the support beam 6 and the upper side wall 8. The rollers 9 support the support beam 6 such that the support beam 6 is movable with respect to the upper side wall 8 in the horizontal direction (x-axis direction) and is fixed in the vertical direction (y-axis direction, vertical direction).

In this kinetic model, the damping device 1 includes the rollers 9 for explaining the kinetic characteristic of the damping device 1. However, it is not always necessary for the damping device 1 to include the roller 9. In this kinetic model, the distance in the vertical direction between the lower side wall 7 and the upper side wall 8 is constant and hence, the lower side wall 7 and the upper side wall 8 do not move in the horizontal direction as well as in the vertical direction. In this kinetic model, as the elastic deformation generated in the damping device 1, only the elastic deformation of the leaf springs 5 is taken into account, and the elastic deformation of the concave slide body 3, convex slide body 4 and the support beam 6 are ignored. In this kinetic model, using a neutral state as the reference (displacement amount=0), a displacement amount of the convex slide body 4 toward a front side from the neutral state is set to take a positive value, and a displacement amount of the convex slide body 4 toward a rear side from the neutral state is set to take a negative value. The total height constituted of the height of the leaf spring 5 and the height of the support beam 6 in a state where the concave slide body 3 and the convex slide body 4 are in a neutral state is set to $h_s$.

FIG. 8 shows a state where the convex slide body 4 is in a frontward moving time which is caused by applying a horizontal force H to the support beam 6 in the x-axis direction. When convex slide body 4 is in a frontward moving time, in the damping device 1, a positive displacement amount $u_d>0$ is generated as a slide body displacement amount. When convex slide body 4 is in a frontward moving time, only the groove end surfaces 11a of the concave slide body 3 and the shoulder surfaces 12a of the convex slide body 4 which constitute the front-side-use slide surfaces are brought into contact with each other.

FIG. 9 shows a state where the convex slide body 4 is in a rearward moving time which is caused by applying a horizontal force H to the support beam 6 in the direction opposite to the direction shown in FIG. 8 (the −x-axis direction). When convex slide body 4 is in a rearward moving time, in the damping device 1, a negative displacement amount $u_d<0$ is generated as a slide body displacement amount. When convex slide body 4 is in a rearward moving time, only the groove bottom surface 11b of the concave slide body 3 and the projecting portion end surface 12b of the convex slide body 4 which constitute the rear-side-use slide surfaces are brought into contact with each other.

As shown in FIG. 8 and FIG. 9, regardless of whether the convex slide body 4 is in a frontward moving time or in a rearward moving time, when the relative displacement of the displacement amount $u_d$ is generated between the slide bodies, a height of the slide body mechanism 2 is increased by $v_d$, and the total height of the leaf spring 5 and the support beam 6 is decreased by $v_d$. A change amount in height where the change amount $v_d$ is increased with respect to the slide body mechanism 2 and the change amount $v_d$ is decreased with respect to the total height of the leaf spring 5 and the support beam 6 is equal to a shrinkage of the leaf spring 5. In this manner, in the damping device 1, a change in height of the slide body mechanism 2 due to the relative displacement between the slide bodies is ensured by a gap between the convex slide body 4 and the support beam 6 along with the extension and the shrinkage of the leaf springs 5.

The relationship between the change amount $v_d$ in height of the slide body mechanism 2 and a slide body displacement amount $u_d$ is expressed by the formula (1). Accordingly, a compressive force which is increased in proportion to an absolute value of the slide body displacement amount is applied to the slide body mechanism 2.

As shown in FIG. 8 and FIG. 9, when a horizontal force H is applied to the support beam 6, the deformation in the horizontal direction is generated in the leaf springs 5. Here, to consider a function that the damping device 1 possesses, the smaller the difference between a work made by the relative displacement between the slide bodies which constitute the slide body mechanism 2 and a work which the horizontal force H makes, the more a damping effect brought about by the damping device 1 is increased. Accordingly, it is desirable that the elastic deformation of the leaf springs 5 in the horizontal direction due to the applying of the horizontal force to the support beam 6 is small compared to a slide body displacement amount.

FIG. 10 is a free body view of the slide body mechanism 2 at a point of time of advancing (($du_d/dt$)>0) where a relative speed ($du_d/dt$) of the convex slide body 4 with respect to the concave slide body 3 is positive in a frontward moving time ($u_d$>0) of the convex slide body 4 shown in FIG. 8.

In FIG. 10, V indicates a compressive force generated by the leaf spring 5, $V_0$ indicates an initial compressive force such as own weights of the convex slide body 4, the leaf spring 5 and the support beam 6, H indicates a horizontal force applied to the support beam 6 as shown in FIG. 8, P indicates a vertical resistance force (normal component of reaction) which perpendicularly is applied to the slide surface (front-side-use slide surface) of the concave slide body 3 and the convex slide body 4, and F indicates a Coulomb frictional force which acts parallel to the slide surfaces of the concave slide body 3 and the convex slide body 4. A friction generated by the rollers 9 is ignored.

Assuming dynamic coefficients of friction of the front-side-use slide surfaces (groove end surfaces 11a, shoulder surfaces 12a) of the concave slide body 3 and the convex slide body 4 as $\mu_F$ respectively, the relationship between a frictional force F and a vertical resistance force P is expressed by the following formula (2).

$$F=\mu_F P \quad (2)$$

Assuming a vertical spring constant of the leaf spring 5 as $S_y$, a compressive force V is expressed by the following formula (3).

$$V=S_y v_d \quad (3)$$

The following formula (4) is obtained by incorporating the relationship expressed by the formula (1) into the formula (3).

$$V=S_y i|u_d| \quad (4)$$

The formulae of equilibrium relating to a force of the convex slide body 4 shown in FIG. 10 in the x-axis direction and a force in the y-axis direction become the following formulae (5) and (6) respectively.

$$H-F\cos\theta-P\sin\theta=0 \quad (5)$$

$$-V-V_0-F\sin\theta+P\cos\theta=0 \quad (6)$$

Here, θ is an angle with respect to the horizontal direction (x-axis direction) of the front-side-use slide surface.

By eliminating the vertical resistance force P, the frictional force F and the compressive force V from the formulae (2), (4), (5) and (6), the following formula (7) is obtained as a relationship formula between the horizontal force H and the displacement amount $u_d$.

$$H=\lambda(S_y i|u_d|+V_0) \quad (7)$$

Here, λ indicates a motion resistance coefficient decided in accordance with the following formula (8) using a dynamic coefficient of friction and a gradient of the front-use slide surface.

$$\lambda=(\mu_F+i)(1-i\mu_F)^{-1}, u_d>0, (du_d/dt)>0 \quad (8)$$

In the same manner, the relationship between a horizontal force H and a displacement amount $u_d$ in a frontward moving time and a retracting time ($u_d$>0, ($du_d/dt$)<0), in a rearward moving time and a retracting time ($u_d$<0, ($du_d/dt$)<0), and in a rearward moving time and in an advancing time ($u_d$<0, ($du_d/dt$)>0) is also expressed by the formula (7). However, motion resistance coefficients which correspond to the respective cases are expressed by the following formulae (9), (10) and (11).

$$\lambda=-(\mu_F-i)(1+i\mu_F)^{-1}, u_d>0, (du_d/dt)<0 \quad (9)$$

$$\lambda=(\mu_B-i)(1+i\mu_B)^{-1}, u_d<0, (du_d/dt)>0 \quad (10)$$

$$\lambda=-(\mu_B+i)(1-i\mu_B)^{-1}, u_d<0, (du_d/dt)<0 \quad (11)$$

Here, $\mu_B$ indicates the dynamic coefficients of friction of the rear-side-use slide surfaces (groove bottom surface 11b, projecting portion end surface 12b) of the concave slide body 3 and the convex slide body 4 respectively.

Assuming operation amplitude of the damping device 1 as $a_d$, a force which generates a shrinkage $a_d$ in the leaf spring 5 of the damping device 1 is expressed by $S_y a_d$. By dividing both sides of the formula (7) by $S_y a_d$, the following formula (12) is obtained.

Figure 11A:
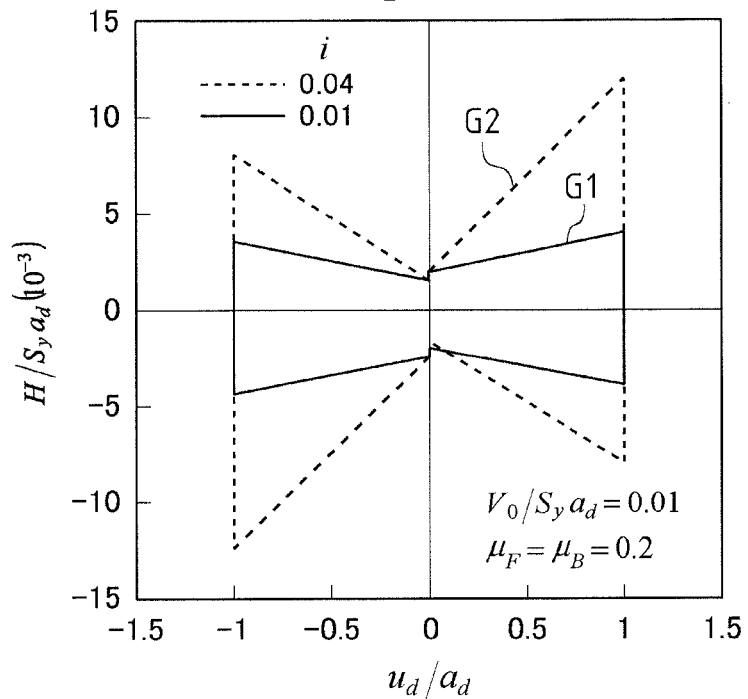
Figure 11B:
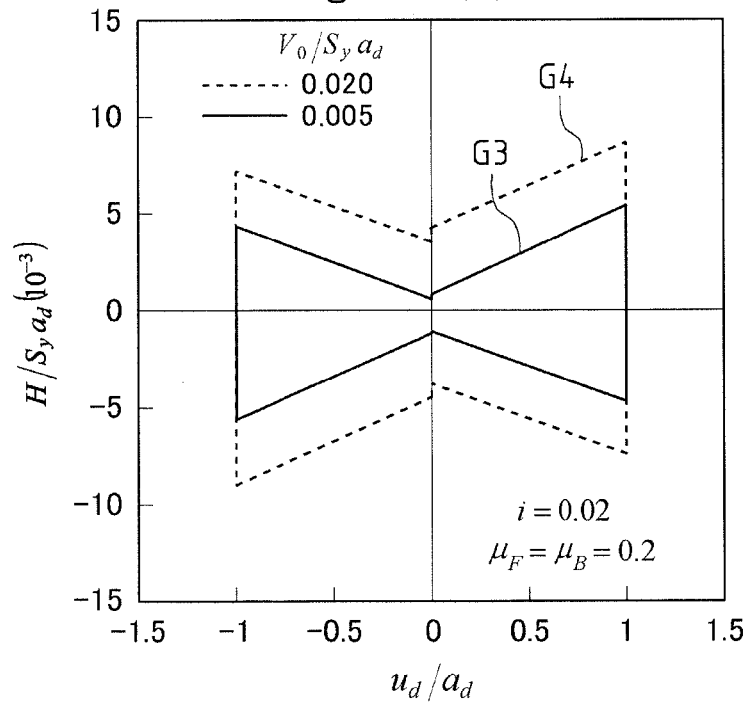

[Numerical formula 1]

$$\frac{H}{S_y a_d} = \lambda\left(\frac{V_0}{S_y a_d} + \frac{i|u_d|}{a_d}\right) \quad (12)$$

shows FIGS. 11(a), 11(b) show one example of hysteresis curves of a horizontal force and the relative displacement expressed by formula (12). In graphs shown in FIG. 11(a), (b) respectively, the non-dimensionalized relative displacement $u_d/a_d$ is taken on an axis of abscissas, and a non-dimensionalized horizontal force $H/S_y a_d$ is taken on an axis of ordinates.

FIG. 11(a) shows a comparison between hysteresis curves in a case where a gradient "i" of slide surfaces which the concave slide body 3 and the convex slide body 4 respectively have (hereinafter also simply referred to as "slide surface") is 0.01 and a case where the gradient "i" is 0.04. In FIG. 11(a), a graph G1 indicated by a solid line is a hysteresis curve when the gradient "i" is 0.01, and a graph G2 indicated by a broken line is a hysteresis curve when the gradient "i" is 0.04. Also in the cases shown in FIG. 11(a), a non-dimensionalized initial compressive force $V_0/S_y a_d$ is 0.01 ($V_0/S_y a_d$=0.01), and both dynamic coefficients of friction $\mu_F$, $\mu_B$ of the front-side-use slide surface and the rear-side-use slide surface are 0.2 ($\mu_F$=$\mu_B$=0.2).

FIG. 11(b) shows a comparison between the hysteresis curves in a case where an initial compressive force $V_0/S_y a_d$ is 0.005 and a case where an initial compressive force $V_0/S_y a_d$ is 0.020. In FIG. 11(b), a graph G3 indicated by a solid line is a hysteresis curve when the initial compressive force $V_0/S_y a_d$ is 0.005, and a graph G4 indicated by a broken line is a hysteresis curve when the initial compressive force $V_0/S_y a_d$ is 0.020. Further, in the cases shown in FIG. 11(b), both dynamic coefficients of friction $\mu_F$, $\mu_B$ of the front-side-use slide surface and the rear-side-use slide surface are 0.2 ($\mu_F$=$\mu_B$=0.2), and a gradient "i" of the slide surfaces is 0.02 (i=0.02). It is expected that hysteresis curves under both conditions shown in FIG. 11(a), (b) take a shape similar to a shape of a butterfly when the butterfly spreads its wings.

It is considered from FIG. 11(a) that, when a gradient "i" of the slide surfaces becomes large, regardless of whether the slide body mechanism 2 is in a frontward moving time, in a rearward moving time, in an advancing time or in a retracting time, the inclination of the hysteresis curve is increased so that an area surrounded by the hysteresis curve is increased. On the other hand. It is considered from FIG. 11(b) that, when an initial compressive force is increased, although the inclination of the hysteresis curve is not changed, an intercept of the hysteresis curve taken on an axis of ordinates is increased and the hysteresis curve is moved in parallel in the vertical direction and hence, an area surrounded by the hysteresis curve is increased as a whole.

In FIGS. 11(a) and (b) respectively, a vertical spring constant $S_y$ which is non-dimensionalized is taken on an axis of ordinates and hence, it is considered that when only the vertical spring constant $S_y$ is increased, an area surrounded by the hysteresis curve is increased. When only a dynamic coefficient of friction of the slide surface is increased, the feature shown in FIG. 11(a) and the feature shown in FIG. 11(b) simultaneously appear so that an area surrounded by the hysteresis curve is increased. The area surrounded by the hysteresis curve indicates a kinetic energy consumed by a frictional force. Accordingly, it is considered that, the damping device 1 having a desired energy absorbing ability can be realized by suitably combining a dynamic coefficient of friction of the slide surface, a gradient of the slide surface, a vertical spring constant and an initial compressive force.

Assuming an initial compressive force as zero in the formula (12) and ignoring a gradient "i" of the slide surface in formulae (8) to (11), the hysteresis curve which the damping device 1 draws is equal to a curve of hysteresis damping which is introduced by Clough and Penzien (Spring Technique Research Institute: spring, Maruzen Co, Ltd, pp. 253 to 256, 1970). Although this curve of hysteresis damping is introduced as a numerical model, no reference is made with respect to a specific device and a kinetic model which generate the hysteresis damping.

A ring spring is put into practice as an energy absorbing device having a hysteresis curve similar to the hysteresis curve shown in FIG. 11. The ring spring is constituted by assembling and stacking an outer ring having a conical surface an inner peripheral surface and an inner ring having a conical surface as an outer peripheral surface such that the conical surfaces are brought into contact with each other. In such a constitution, by increasing or decreasing the number of ring springs, magnitude of a frictional force can be adjusted. With the use of the ring spring, a relatively large frictional force can be obtained and hence, the ring spring is used as a buffer device for mechanical parts or the like. However, it is estimated that the ring spring is not used as a damping device for suppressing vibrations of a structure.

Subsequently, an equivalent viscous damping coefficient (equivalent damping constant) of the damping device 1 is explained, in a kinetic model shown in FIG. 8 and FIG. 9, a kinetic energy consumed in one cycle is equal to the area surrounded by the hysteresis curve in FIGS. 11(a) and (b) respectively. Here, one cycle corresponds to one reciprocation of sliding of the convex slide body 4 with reference to the concave slide body 3 in the damping device 1.

With respect to the damping device 1, it is considered that, practically, a dynamic coefficient of friction of the slide surface is less than 0.3, and a gradient of the slide surface is approximately several %. Accordingly, it may be considered that a denominator in the respective formulae (8) to (11) is $1 \pm \mu_F \approx 1$, $1 \pm \mu_B \approx 1$. Assuming the dynamic coefficients of friction of the front-side-use slide surface and the rear-side-use slide surface as $\mu_F$=$\mu_B$=$\mu_0$ and a dissipation energy of the damping device 1 supported by the rollers 9 in one cycle as $\Delta_{fri}$, the dissipation energy $\Delta_{fri}$ is expressed by the following formula (13).

$$\Delta_{fri} \approx \mu_0 a_d (2 i S_y a_d + 4 V_0) \quad (13)$$

It is considered from the formula (13) that although the energy which the damping device 1 dissipates in one cycle becomes a quadratic function of amplitude $a_d$, the energy is irrelevant to frequency. On the other hand, assuming dissipation energy in one cycle when the damping device having a viscous damping coefficient $c_e$ is vibrated with a circular frequency $\theta$ and an amplitude $a_d$ as $\Delta_{vis}$, the dissipation energy $\Delta_{vis}$ is expressed by the following formula (14).

$$\Delta_{vis} = \pi c_e \theta a_d^2 \quad (14)$$

Assuming that a value of the right side of the formula (13) and a value of the right side of the formula (14) are equal, an equivalent viscous damping coefficient $c_e$ expressed by the following formula (15) is obtained.

[Numerical formula 2]

$$c_e = \frac{\mu_0}{\pi \theta} \left( 2 i S_y + \frac{4 V_0}{a_d} \right) \quad (15)$$

$c_e$ in the formula (15) gradually approximates a fixed value $c_{e0}$=$2\mu_0 i S_y/\pi\theta$ under a condition of $a_d \to \infty$. It is considered that the clamping device 1 of this embodiment can ensure an damping performance which is expressed by $c_{e0}$ even at a minimum value regardless of the magnitude of amplitude $a_d$. Further, a limit of amplitude at which the slide surfaces cause a seizure can be decreased by making an initial compressive force smaller and hence, the damping device 1 of this embodiment can exhibit a sufficient damping function ranging from a small amplitude time to a large amplitude time. Further, the formula (15) includes a circular frequency $\theta$ in a denominator as a variable and hence, $\theta$ is decreased. That is, the longer the cycle, the larger an equivalent viscous damping coefficient becomes. Accordingly, the damping device 1 of this embodiment is suitable as a damping device for a structure of a long cycle.

Figure 12:
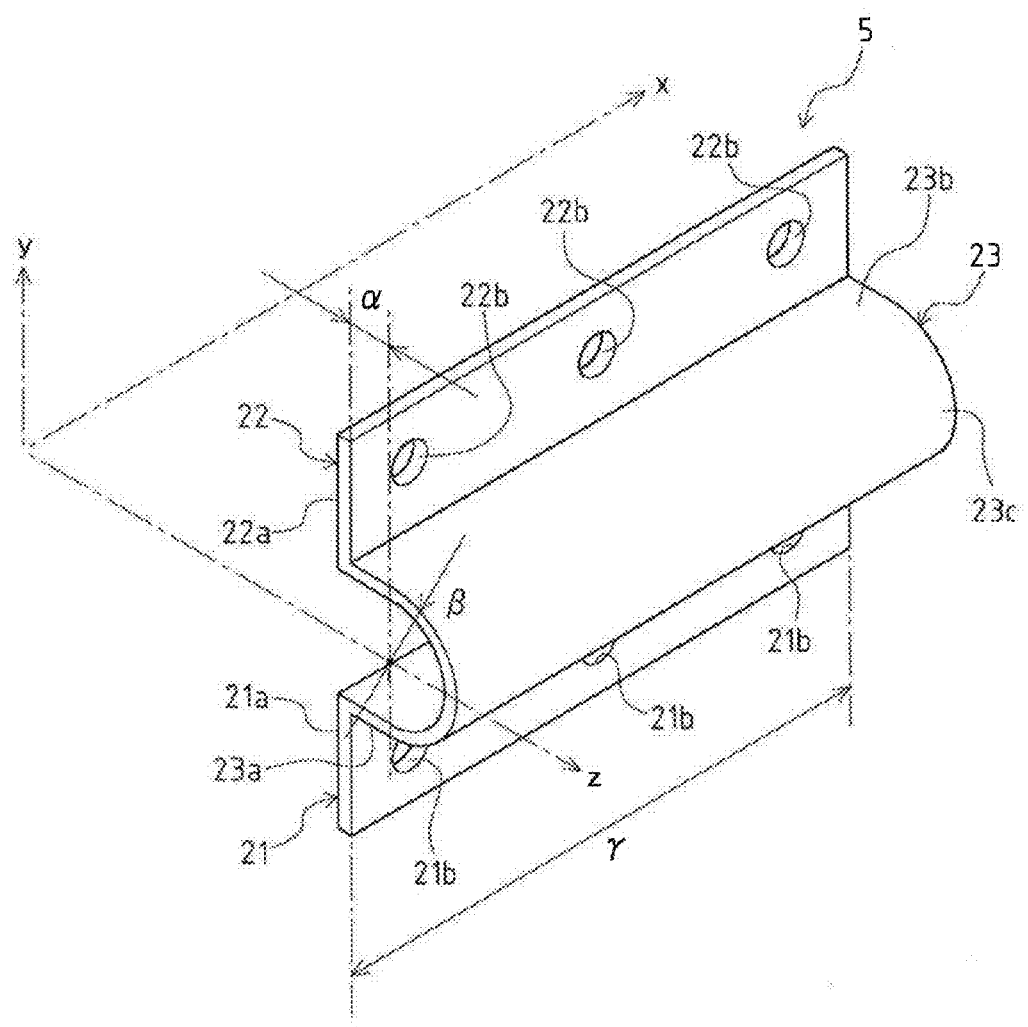
FIG. 12 is a perspective view showing the constitution of a leaf spring according to the first embodiment of the present invention.
Figure 13:
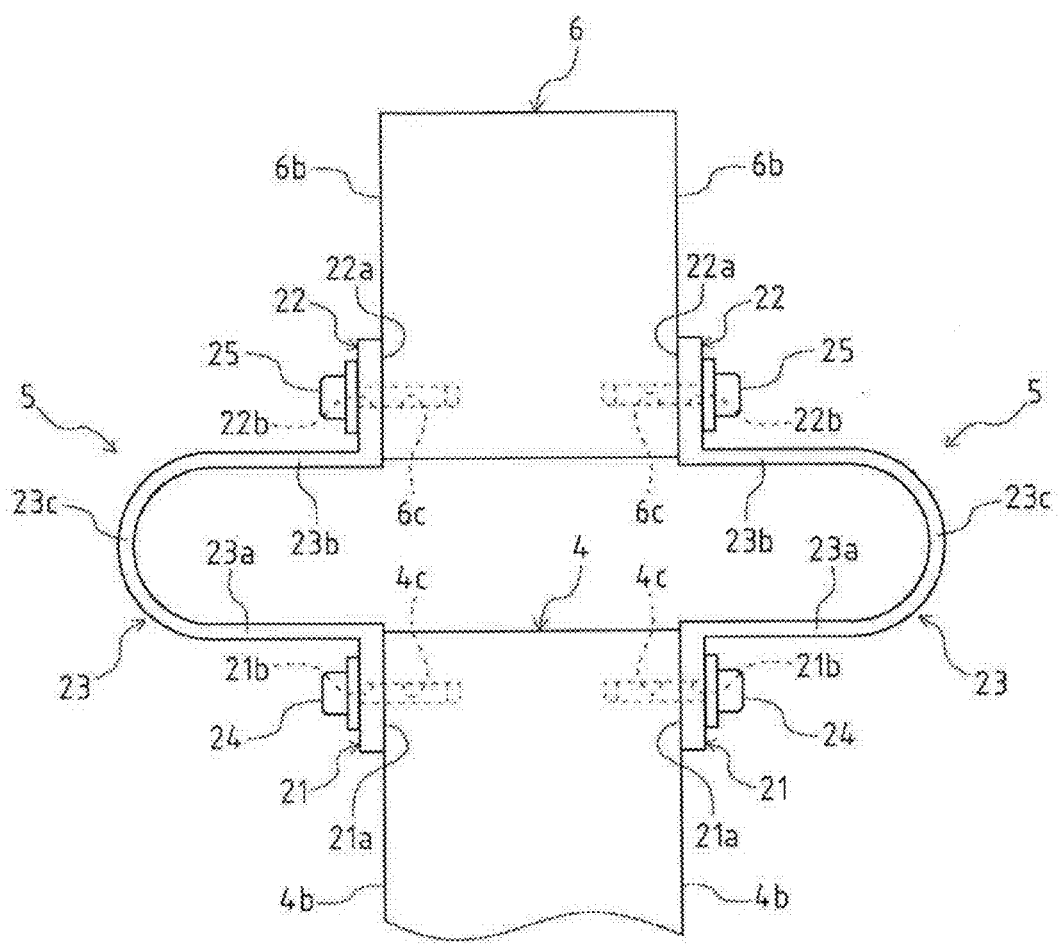
FIG. 13 is a view showing a fixed state of the leaf spring according to the first embodiment of the present invention.
Figure 14:
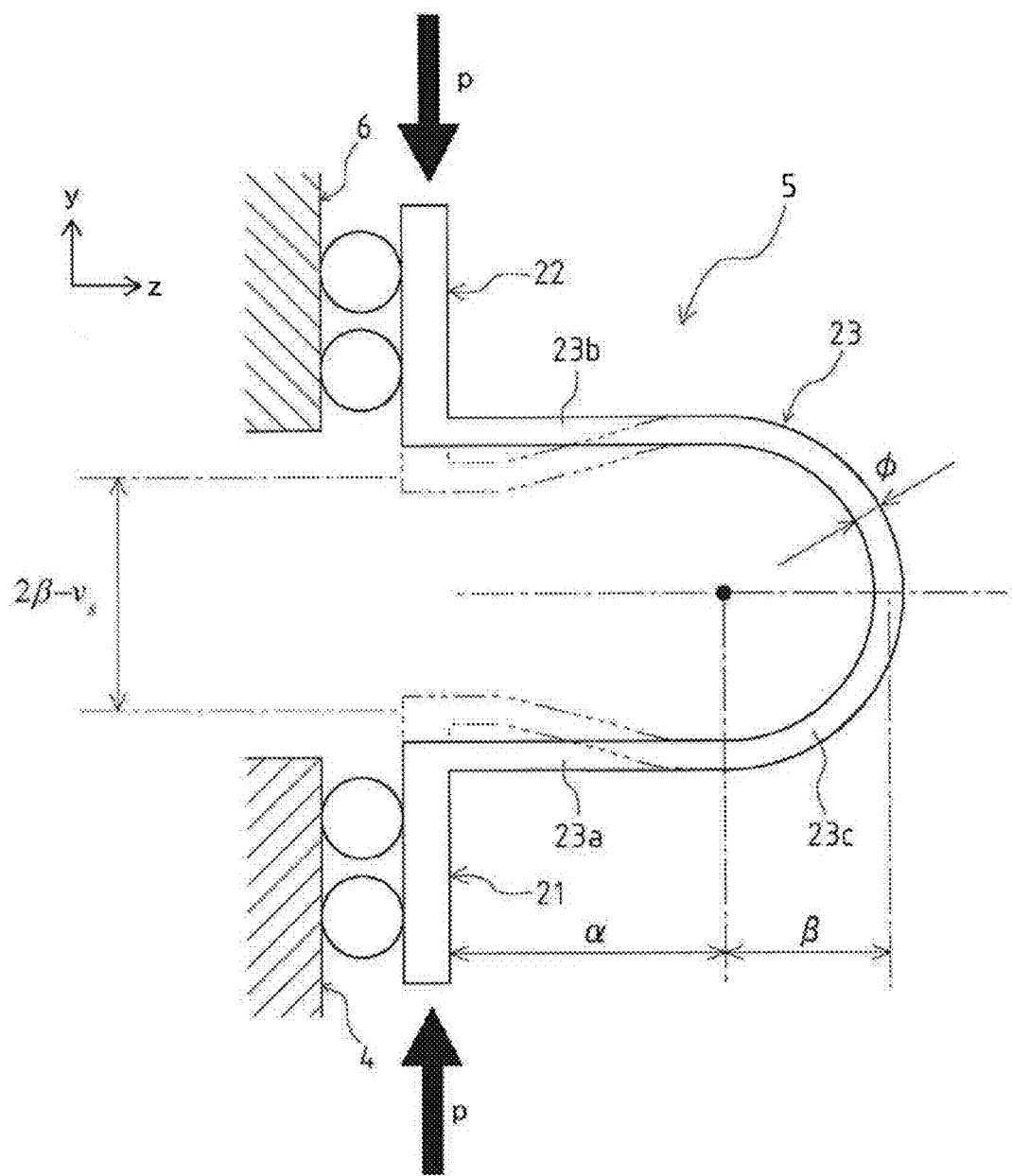
FIG. 14 is a view showing a kinetic model of the leaf spring according to the first embodiment of the present invention.

Next, the leaf spring 5 which functions as a biasing means for applying a biasing force in the slide body pushing direction to the slide body mechanism 2 in the damping device 1 of this embodiment is specifically explained in conjunction with FIG. 12 to FIG. 14.

As described above, the leaf springs 5 are provided between the convex slide body 4 and the support beam 6, and support the support beam 6 above the convex slide body 4 (see FIG. 1). As shown in FIG. 12 and FIG. 13, the leaf spring 5 includes a lower fixing portion 21 which is fixed to the convex slide body 4, an upper fixing portion 22 which is fixed to the support beam 6, and a leaf spring portion 23 which constitutes a body portion of the leaf spring 5.

The leaf spring 5 is formed by bending a sheet, of a member having a rectangular plate shape, and is formed as an approximately U-shaped leaf spring. That, is, respective portions such as the lower fixing portion 21, the upper fixing portion 22 and the leaf spring portion 23 which constitute the leaf spring 5 are integrally formed with each other by applying bending working or the like to a sheet of member having a rectangular plate shape. The leaf spring 5 is made of a metal material such as stainless steel, for example.

The lower fixing portion 21 is a portion having a rectangular planar shape which is formed on one end side (lower side) of the leaf spring 5. As described above, the lower fixing portion 21 which is fixed to the convex slide body 4 is fixed to the convex slide body A in a state where a plate surface 21a formed on one side of the lower fixing portion 21 is brought into contact with a side surface 4b of the convex slide body 4. In this manner, according to this embodiment, the lower fixing portion 21 of the leaf spring 5 functions as a slide body-side fixing portion which is fixed to the convex slide body 4. The lower fixing portion 21 which constitutes the slide body-side fixing portion may be fixed to the convex slide body 4 indirectly by way of another member. That is, the fixing of the slide body-side fixing portion which constitutes the leaf spring 5 as a biasing means to the slide body may include the indirect fixing of the slide body-side fixing portion to the convex slide body 4 by way of another member besides the direct fixing of the lower fixing portion 21 to the convex slide body 4.

The leaf spring 5 has a lower fixing portion 21 thereof fixed to the convex slide body 4 by bolts 24 which constitute fastening jigs. For this end, bolt holes 21b which allow the bolts 24 to pass therethrough are formed in the lower fixing portion 21. That is, the bolts 24 pass through the bolt holes 21b and are threadedly engaged with fastening holes 4c formed in the convex slide body 4 so that the leaf spring 5 is fixed to the convex slide body 4. In this embodiment, the bolt holes 21b are formed at three portions of the leaf spring 5 at equal intervals in the widthwise direction (x-axis direction in FIG. 12).

The upper fixing portion 22 is a portion having a rectangular planar shape which is formed on the other side (upper side) of the leaf spring 5. As described above, the upper fixing portion 22 which is fixed to the support beam 6 is fixed to the support beam 6 in a state where a plate surface 22a formed on one side of the upper fixing portion 22 is brought into contact with a side surface 6b of the support beam 6. As described above, the support beam 6 is fixed to the structure. Accordingly, the upper fixing portion 22 is indirectly fixed to the structure by way of the support beam 6. In this manner, according to this embodiment, the upper fixing portion 22 of the leaf spring 5 functions as a structure-side fixing portion which is indirectly fixed to the structure. In a case where the constitution of the support beam 6 is omitted in the damping device 1, the upper fixing portion 22 which constitutes a structure-side fixing portion may be directly fixed to the structure.

The leaf spring 5 has the upper fixing portion 22 thereof fixed to the support beam 6 by bolts 25 which constitute a fastening jig. For this end, bolt holes 22b which allow the bolts 25 to pass therethrough are formed in the upper fixing portion 22 in accordance with the substantially same arrangement as the bolt holes 21b formed in the lower fixing portion 21. The bolts 25 pass through the bolt holes 22b and are threadedly engaged with fastening holes 6c formed in the support beam 6 so that the leaf spring 5 is fixed to the support beam 6.

The leaf spring portion 23 is a plate-shaped portion having a curved shape which is formed between the lower fixing portion 21 and the upper fixing portion 22 which constitute upper and lower end portions of the leaf spring 5. The leaf spring portion 23 projects toward a side opposite to a gap formed between the convex slide body 4 and the support beam 6 (toward both left and right sides in FIG. 13) in a state where the leaf springs 5 are fixed to the convex slide body 4 and the support beam 6 by means of the lower fixing portion 21 and the upper fixing portion 22. That is, the leaf springs 5 are provided in a state where the leaf spring portion 23 projects from the convex slide body 4 and a side surface portion of the support, beam 6.

The leaf spring portion 23 includes: a lower flat plate portion 23a which is a planar portion bent at an approximately right angle with respect to the lower fixing portion 21 from an upper end of the lower fixing portion 21; an upper flat plate portion 23b which is a planar portion bent at an approximately right angle with respect to the upper fixing portion 22 from a lower end of the upper fixing portion 22; and a curved portion 23c which is formed between the lower flat plate portion 23a and the upper flat plate portion 23b and is a plate-shaped portion bent in a semi-circular shape.

In this manner, the leaf spring portion 23 is a portion formed between the lower fixing portion 21 and the upper fixing portion 22, and is an elastically deformable portion having a curved plate shape. The leaf spring portion 23 which is constituted of the lower flat plate portion 23a and the upper flat plate portion 23b arranged substantially parallel to each other, and the curved portion 23c which connects one end of the lower flat plate portion 23a and one end of the upper flat plate portion 23b is formed into a U shape.

The leaf spring portion 23 is a portion of the leaf spring 5 which is mainly elastically deformed, and is a portion which mainly generates a compressive force (biasing force) in the slide body pushing direction toward the slide body mechanism 2 from the leaf spring 5. To be more specific, in a state where the leaf spring 5 is fixed to the convex slide body 4 and the support beam 6 by way of the lower fixing portion 21 and the upper fixing portion 22, the leaf spring portions 23 generate a restoring force in the vertical direction (y-axis direction). Due to the elastic deformation of the leaf spring portion 23 in such a manner that the lower flat plate portion 23a and the upper flat plate portion 23b which are arranged parallel to each other approach each other or are moved away from each other, a restoring force in the vertical direction is generated. This restoring force of the leaf spring portion 23 acts as a compressive force in the slide body pushing direction toward the slide body mechanism 2 from the leaf spring 5.

As shown in FIG. 13, the leaf springs 5 having the above-mentioned constitution are mounted on the damping device 1 from both side-surface sides of the convex slide body 4 and the support beam 6 in such a state where approximately U-shaped open-sides of the leaf springs 5 face each other in an opposed manner. Further, in this embodiment, four pairs of leaf springs 5 (eight leaf springs 5 in total) are mounted on both side-surface sides of the convex slide body 4 and the support beam 6 along the longitudinal direction of the slide body mechanism 2 in such a state where each pair of leaf springs 5 are arranged opposite to each other (see FIG. 1).

In the damping device 1 of this embodiment, a fixing position of the leaf spring 5 is adjustable. To be more specific, as shown in FIG. 1, a large number of fastening holes 4c and a large number of fastening holes 6c for fixing the leaf springs 5 to the convex slide body 4 and the support beam 6 respectively are formed in the convex slide body 4 and the support beam 6 over the whole length in the longitudinal direction thereof at intervals corresponding to the arrangement intervals of the bolt holes 21b, 22b formed in the lower fixing portions 21 and the upper fixing portion 22. By arbitrarily selectively using three continuous fastening holes 4c, 6c out of the large number of fastening holes 4c, 6c formed in the convex slide body 4 and the support beam 6 respectively, the leaf springs 5 can be fixed at desired positions within ranges where the fastening holes 4c, 6c are formed in an adjustable manner.

In this embodiment, the constitution is adopted where the leaf springs 5 are fixed using the bolts 24, 25. However, the method of fixing the leaf springs 5 is not particularly limited. The leaf springs 5 may be fixed by welding or the like, for example. However, as described above, from a viewpoint of adjusting the fixing positions of the leaf springs 5, with respect to a method for fixing the leaf spring 5, it is desirable to adopt a method where the leaf springs 5 can be easily mounted and removed as in the method of this embodiment which uses the bolts 24, 25.

According to the leaf spring 5 having the above-mentioned constitution, with respect to the constitution for applying a compressive force to the slide body mechanism 2 from above, the damping device 1 of this embodiment can easily acquire a desired characteristic. Such a desired characteristic with respect to the constitution for applying a compressive force to the slide body mechanism 2 is the characteristic that the leaf spring 5 is hardly deformed in the horizontal direction (x-axis direction) and exhibits a desired damping ability (spring constant) in the vertical direction (y-axis direction).

That is, in the damping device 1, from a viewpoint of damping efficiency, it is desirable that the displacement generated by vibrations of the structure (including the displacement generated by vibrations of a part) is efficiently transmitted to the convex slide body 4. Further, the direction of vibrations which the damping device 1 of this embodiment intends to damp is the horizontal direction. Accordingly, with respect to the characteristic of the leaf spring 5 which supports the support beam 6 to be fixed to the structure on the convex slide body 4, the leaf spring 5 desirably has high rigidity so that the deformation of the leaf spring 5 is hardly generated in the horizontal direction.

Further, in the damping device 1, the leaf spring 5 applies a compressive force to the slide body mechanism 2 in the slide body pushing direction due to its elasticity so that a frictional force which constitutes a damping force of the damping device 1 is generated. Accordingly, to enable the damping device 1 to acquire a predetermined damping force, the leaf spring 5 is required to posses a desired spring constant in the vertical direction. Accordingly, a predetermined spring constant with respect to the leaf spring 5 is decided based on factors which influence a damping force of the damping device 1 such as magnitude of a gradient of the slide surface of the slide body which constitutes the slide body mechanism 2, a friction coefficient of the slide surface, the structure of a structural body and the like.

In the leaf spring 5 of this embodiment, the leaf spring portion 23 which mainly generates a compressive force to be applied to the slide body mechanism 2 is a plate-shaped portion bent in a U shape so that the leaf spring 5 has large rigidity in the widthwise direction whereby the leaf spring 5 is hardly deformed in the widthwise direction. Accordingly, by fixing the leaf spring 5 to the convex slide body 4 and the support beam 6 such that the widthwise direction of the leaf spring portion 23 becomes the horizontal direction, the leaf spring 5 can acquire a characteristic where the leaf spring 5 exhibits high rigidity and is hardly deformed in the horizontal direction.

The leaf spring portion 23 which is a plate-shaped portion bent in a U shape can acquire relatively high elasticity in the direction that the lower flat plate portion 23a and the upper flat plate portion 23b which constitute the leaf spring portion 23 face each other in an opposed manner. Accordingly, in the constitution where the leaf spring 5 is fixed to the convex slide body 4 and the support beam 6 such that the direction that the lower flat plate portion 23a and the upper flat plate portion 23b face each other in an opposed manner becomes the vertical direction, the leaf spring 5 can easily acquire desired damping ability (spring constant) by setting shapes and sizes of portions of the leaf spring portion 23.

In this manner, the leaf spring 5 of this embodiment can easily acquire a desired characteristic that the leaf spring 5 is hardly deformed in the horizontal direction and possesses desired damping ability (spring constant) in the vertical direction. Provided that the leaf spring 5 can easily acquire such a characteristic, the shape of the leaf spring 5 is not limited to the shape of this embodiment.

The leaf spring 5 according to this embodiment having such a constitution is kinetically analyzed using a kinetic model. In the explanation of the kinetic model, as shown in FIG. 12 and FIG. 14, assume a straight-line length of the leaf spring portion 23, that is, a size in the widthwise direction (z-axis direction) of each of the lower flat plate portion 23a and the upper flat plate portion 23b which form straight line portions (planar portions) of the leaf spring portion 23 as $\alpha$, assume a radius of curvature of the leaf spring portion 23, that is, a radius of curvature of a curved portion 23c for forming a curved portion (curved surface portion) of the leaf spring portion 23 as $\beta$, assume a length in the horizontal direction (x-axis direction) of the leaf spring 5 as $\gamma$, and assume a plate thickness of the leaf spring portion 23 of the leaf spring 5 as $\phi$. Further, in this kinetic model, assume a Young's modulus (Young's coefficient) of the leaf spring 5 as E, and assume a shear modulus of elasticity of the leaf spring 5 as G.

FIG. 14 shows a state where the vertical displacement $v_s$ is generated in the leaf spring 5 due to applying of a vertical force p to the leaf spring 5 in the vertical direction (y-axis direction) in this kinetic model (see double-dashed chained line). To consider the U-shaped leaf spring 5 shown in FIG. 14 as a U-shaped curved beam whose bending deformation on both ends is confined, a vertical spring constant $s_y$ which takes into account, only the deformation by bending is estimated by the following formulae (16), (17).

[Numerical formula 3]

$$s_y = \frac{\sigma \gamma E}{2} \times \left(\frac{\phi}{\beta}\right)^3 \quad (16)$$

[Numerical formula 4]

$$\sigma = \frac{1}{4\xi^3 + 3\pi - \frac{6(2-\xi^2)^2}{2\xi + \pi}} \quad (17)$$

Here, σ in the formula (17) is a coefficient where a ratio $\xi(=\alpha/\beta)$ between a straight line length α of the leaf spring portion 23 and a bending radius β of the leaf spring portion 23 is set as a variable. Using the formula (16) and the formula (17), a desired vertical spring constant $s_y$ of the leaf spring 5 can be obtained by properly selecting a ratio $\phi/\beta$ between a plate thickness φ of the leaf spring portion 23 and a bending radius β of the leaf spring portion 23, a ratio $\xi(=\alpha/\beta)$ between a straight line length α of the leaf spring portion 23 and a bending radius β of the leaf spring portion 23 and a material used for forming the leaf spring 5.

On the other hand, assuming the leaf spring portion 23 of the leaf spring 5 as a non-curved rectangular-plate-shaped portion which sets one end thereof on a lower fixing portion 21 side and the other end thereof on an upper fixing portion 22 side as fixed ends respectively, the leaf spring portion 23 can be regarded as a rectangular plate having a width (size in the x-axis direction) of γ, a height (a total of a length of the lower flat plate portion 23a, a length of an upper flat plate portion 23b, and a length of a curved portion 23c) of $2\alpha+\pi\beta$ and a thickness of φ. Accordingly, to approximate the deformation of the leaf spring 5 in the horizontal direction (x-axis direction) as the sum of the deformation by bending of a beam with both ends fixed and the deformation by shearing of the rectangular plate, a horizontal spring constant $s_x$ is expressed by the following formula (18).

[Numerical formula 5]

$$s_x \approx \frac{\gamma E}{2\xi + \pi} \times \frac{\left(\frac{\phi}{\beta}\right)}{\frac{\tau E}{G} + (2\xi + \pi)^2 \left(\frac{\beta}{\gamma}\right)^2} \quad (18)$$

In the formula (1.8), τ is a coefficient which expresses the distribution of shearing unit stress. To provisionally calculate a ratio between a horizontal spring constant $s_x$ in the formula (18) and a vertical spring constant $s_y$ in the formula (16) under conditions of $\xi=1$, $\tau 3/2$, $G/E \cong 0.385$ (assuming an isotropic material having a position ratio of 0.3), the following formula (19) is obtained.

[Numerical formula 6]

$$\frac{s_x}{s_y} \approx \frac{4.77}{\left(\frac{\phi}{\beta}\right)^2 \left\{3.90 + 26.4\left(\frac{\beta}{\gamma}\right)^2\right\}} \quad (19)$$

In the formula (19), assuming a ratio between a plate thickness φ of the leaf spring portion 23 and a radius of curvature β as $\phi/\beta=1/20$, and a ratio between a radius β of the leaf spring portion 23 and a length γ in the horizontal direction of the leaf spring portion 23 as $\beta/\gamma=1/10$, a spring constant ratio $s_x/s_y$ between a horizontal spring constant $s_x$ and a vertical spring constant $s_y$ becomes approximately 458. Accordingly, the relationship of $s_x \gg s_y$ can be obtained with respect to the leaf spring 5 by properly setting $\phi/\beta$ and $\beta/\gamma$.

In this embodiment, out of the lower fixing portion 21 and the upper fixing portion 22 of the leaf spring 5, one fixing portion is fixed to the concave slide body 3 or the convex slide body 4 using bolts or the like, and the other fixing portion is fixed to the support beam 6 using bolts or the like. Assuming the number of leaf springs 5 as n, the vertical spring constant of the damping device 1 is expressed by the following formula (20).

$$S_y = \Psi n s_y \quad (20)$$

In the formula (20), Ψ is a correction coefficient which is decided depending on a method of mounting the leaf spring 5, and is determined based on tests. Although a horizontal spring constant of the damping device 1 can be also decided in the same manner, the method is omitted here.

Subsequently, to verify the damping effect of the damping device 1 according to this embodiment, the static kinetic characteristic of a rigid frame on which the damping device 1 is mounted is explained.

As described above, when a horizontal force is applied to the damping device 1 of this embodiment, the damping device 1 is deformed due to the relative slide movement between the concave slide body 3 and the convex slide body 4 which constitute the upper and lower slide bodies. (See FIG. 8, FIG. 9) It is considered that, the deformation generated due to the relative slide movement between the slide bodies of the damping device 1 (hereinafter referred to as "slide deformation") is similar to the interlayer horizontal deformation between upper and lower layers of the rigid frame when a horizontal force is applied to the rigid frame.

Accordingly, it is considered that by mounting the damping device 1 to the rigid frame such that the slide deformation of the damping device 1 corresponds to the interlayer horizontal deformation of the rigid frame, the damping of vibrations of the rigid frame can be increased. Here, to study the practicability of the damping device 1 of this embodiment, the static kinetic characteristic of the rigid frame mounting the damping device 1 is theoretically clarified.

Figure 15:
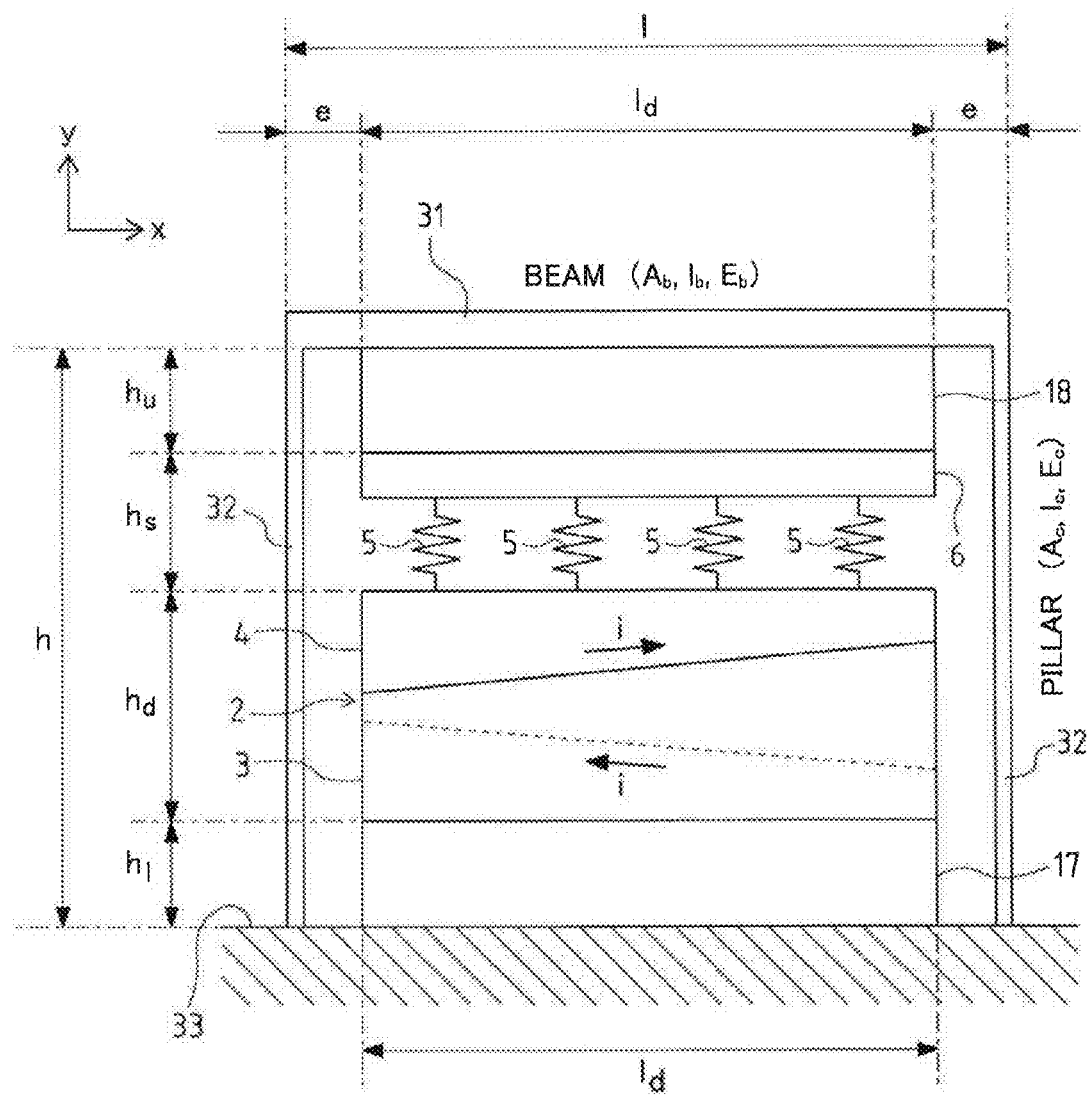
FIG. 15 is a side view showing one example of the arrangement of the vibration damping device according to the first embodiment of the present invention in a rigid frame.
Figure 16:
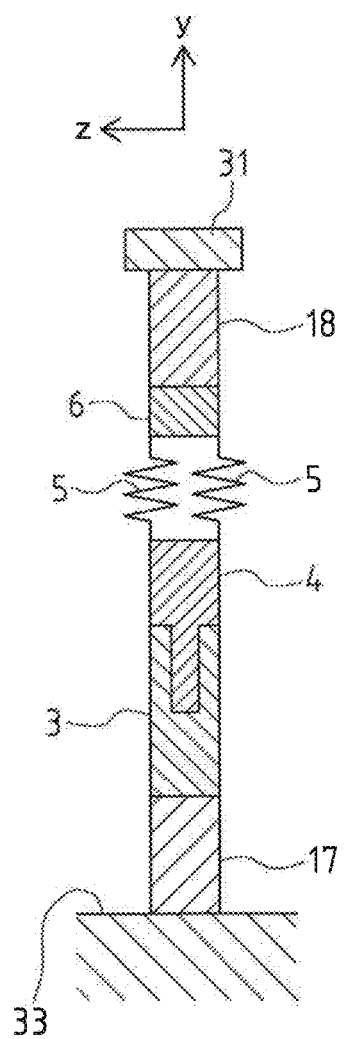
FIG. 16 is a front center cross-sectional view showing one example of the arrangement of the vibration damping device according to the first embodiment of the present invention in a rigid frame.

FIG. 15 and FIG. 16 show one example of the arrangement of the damping device 1 according to this embodiment on the rigid frame. As shown in FIG. 15 and FIG. 16, this example is an example where the clamping device 1 is arranged on a one-layer rigid frame which has a beam 31 and pillars 32 which support both end sides of beam 31 in the longitudinal direction (x-axis direction) and have lower ends thereof fixed to a base 33.

In this example, an upper side wall 18 is fixed to a lower side of the beam 31. The upper side wall 18 is arranged at a position where the upper side wall 18 is spaced-apart from the pillars 32 on both sides in the horizontal direction with a proper distance "e" by which the collision of the upper side wall 18 with the pillars 32 is prevented. The lower side wall 17 is fixed to an upper side of the base 33. The lower side wall 17 is, in the same manner as the upper side wall 18, arranged at a position where the lower side wall 17 is spaced-apart from the pillars 32 on both sides with a proper distance "e".

The damping device 1 is arranged between the lower side wall 17 and the upper side wall 18 in such a manner that the concave slide body 3 is fixed to the lower side wall 17 and the support beam 6 is fixed to the upper side wall 18. The leaf springs 5, in a state where the leaf springs 5 extend vertically between the convex slide body 4 and the support beam 6, are fixed to the respective side surfaces of the convex slide body 4 and the support beam 6 such that the leaf springs 5 sandwich the convex slide body 4 and the support beam 6 from both sides in the widthwise direction (z-axis direction).

As shown in FIG. 15 and FIG. 16, in this kinetic model, assume a length (size in the x-axis direction, the same definition being applicable hereinafter) of beam 31 as "l", a length of the lower side wall 17 and a length of the upper side wall 18 as $l_d$ respectively, assume a height of pillars 32 (size in the y-axis direction, the same definition being applicable hereinafter) as "h", and heights of the lower side wall 17 and the upper side wall 18 as $h_l$, $h_u$ respectively. Further, assume a cross-sectional area, a moment of inertia of area, and a Young's modulus of the beam 31 as $A_b$, $I_b$ and $E_b$ respectively, and assume a cross-sectional area, a moment of inertia of area, and a Young's modulus of pillars 32 as $A_c$, $I_c$, and $E_c$ respectively.

Further, in this kinetic model, it is assumed that the bending rigidity of beam 31 of the rigid frame is large compared to the bending rigidity of the pillars 32. That is, the relationship of $E_b I_b/l \gg E_c I_c/h$ is established and hence, the elastic deformation of the beam 31 is ignored. In this kinetic model, it is assumed that the rigidity in the x-axis direction and the rigidity in the y-axis direction of the lower side wall 17 and the upper side wall 18 are respectively large enough compared to spring constants $S_x$, $S_y$ of the damping device 1 in the x-axis direction and in the y-axis direction and hence, the elastic deformation of the lower side wall 17 and the upper side wall 18 is ignored. Also, the elastic deformation of the damping device 1 in the horizontal direction is ignored. Accordingly, it is assumed that the difference between the horizontal displacement u of beam 31 and the relative displacement $u_d$ between the concave slide body 3 and the convex slide body 4 of the damping device 1 is small enough to be ignored. That is, it is assumed that $u \approx u_d$.

Figure 17:
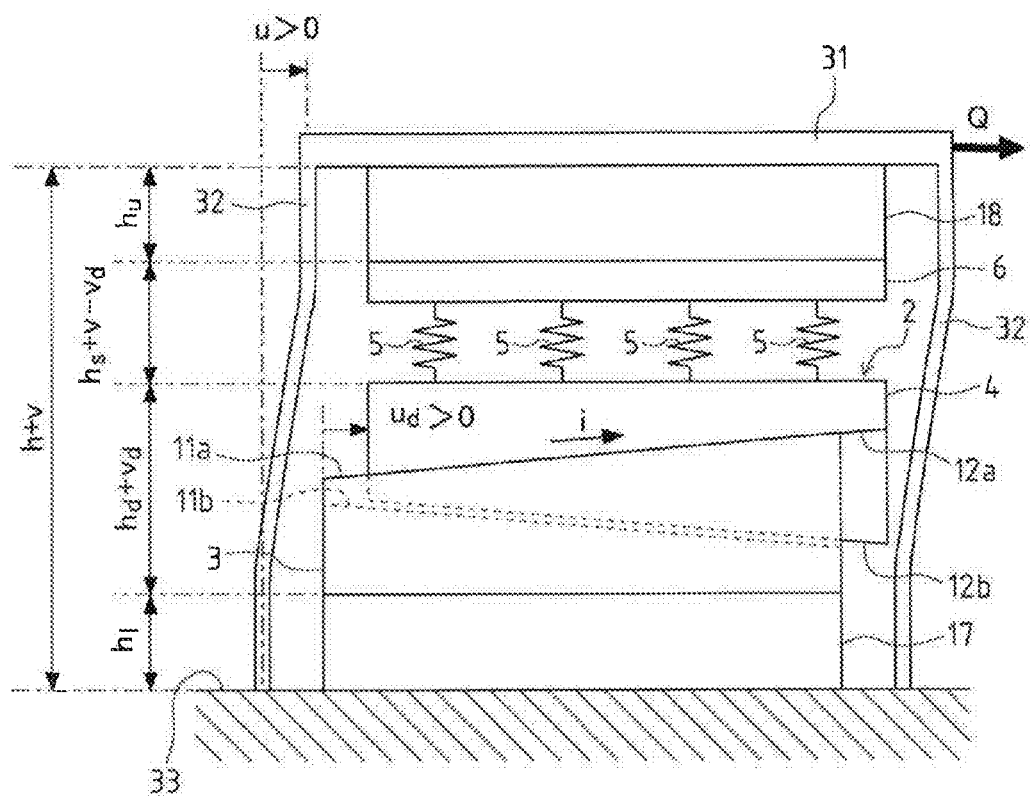
FIG. 17 is an explanatory view showing the vibration damping device according to the first embodiment of the present invention and one example of the deformation state of the rigid frame.
Figure 18:
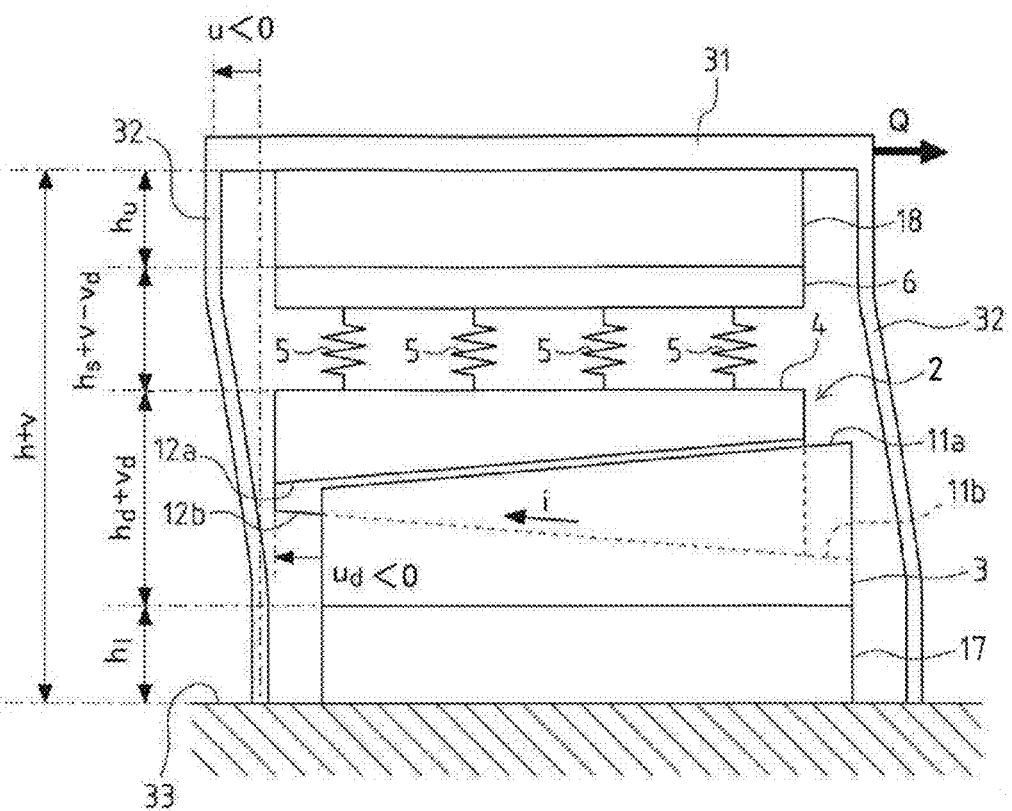
FIG. 18 is an explanatory view showing the vibration damping device according to the first embodiment of the present invention and one example of a deformation state of the rigid frame.

FIG. 17 and FIG. 18 are views to explain the deformation of the rigid frame and the damping device 1 when a horizontal force Q is applied to the beam 31 of the rigid frame. FIG. 17 shows the deformation of the rigid frame and the damping device 1 when the damping device 1 is in a frontward moving time. As shown in FIG. 17, the bending deformation and the axial deformation are generated in the pillars 32 of the rigid frame, and the displacement in the x-axis direction and in the y-axis direction is generated in the upper end of the pillars 32. Assume the displacement of the upper ends of pillars 32 in the x-axis direction as "u" and the displacement of the upper ends of pillars 32 in the y-axis direction as "v". FIG. 18 shows the deformation of the rigid frame and the damping device 1 when the damping device 1 is in a rearwardly moving time. Also in this case, in the same manner as a frontwardly moving state, the displacement in the x-axis direction and in the y-axis direction is generated in the upper ends of the pillars 32.

As shown in FIG. 17, in a frontward moving time of the clamping device 1, the positive relative displacement $u_d$ is generated in damping device 1, and the concave slide body 3 and the convex slide body 4 have front-side-use slide surfaces (groove end surfaces 11a and shoulder surfaces 12a) thereof brought into contact with each other thus generating a change in height $v_d$. As shown in FIG. 18, in a rearward moving time of the damping device 1, in the same manner as a frontwardly moving state, the negative relative displacement $u_d$ is generated in the damping device 1, and the concave slide body 3 and the convex slide body 4 have rear-side-use slide surfaces (groove bottom surface 11b, projecting portion end surface 12b) thereof brought into contact with each other thus generating a change in height $v_d$. Both in a frontward moving time and in a rearward moving time, the relationship expressed by the above-mentioned formula (1) is established between $u_d$ and $v_d$.

The sum $V_d$–v of a change amount in height of the slide body mechanism 2 and a change amount in height of the pillars 32 is absorbed by the elastic deformation of leaf springs 5. In proportion to the deformation amount of the elastic deformation of leaf springs 5, a compressive force is generated in the slide body mechanism 2 of the damping device 1, and a frictional force which resists to the horizontal movement caused by the deformation of the rigid frame is generated in the damping device 1 by this compressive force.

Figure 19:
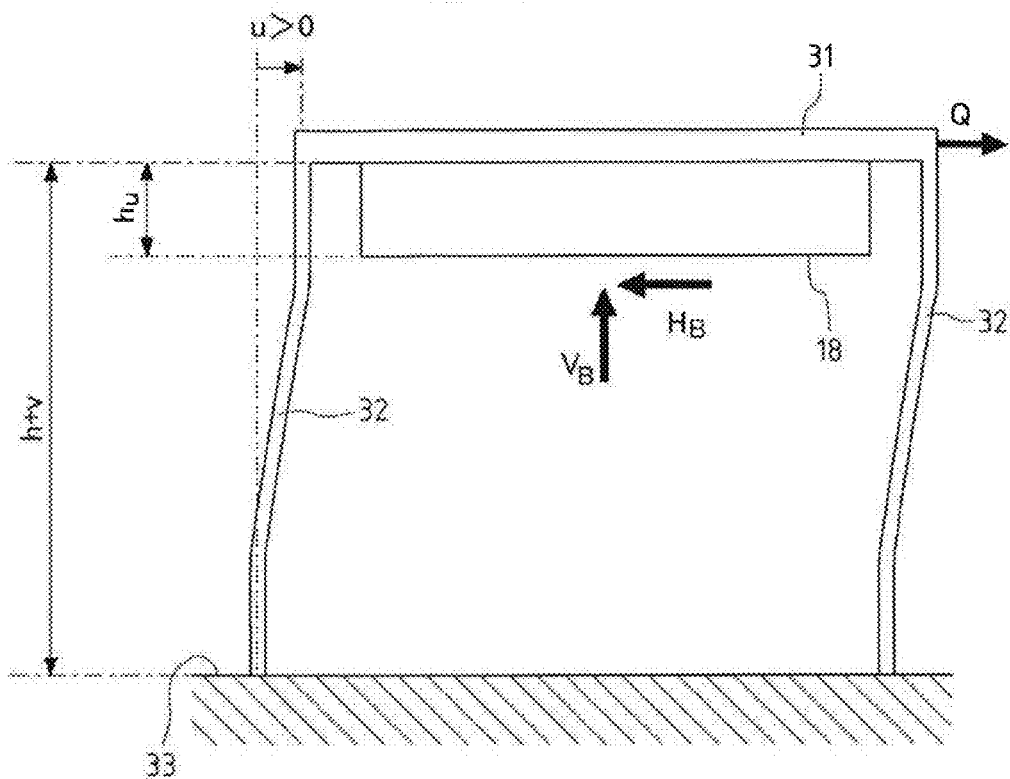
FIG. 19 is a free body view explicitly showing a force applied to a connecting portion between the vibration damping device according to the first embodiment of the present invention and a rigid frame.
Figure 20:
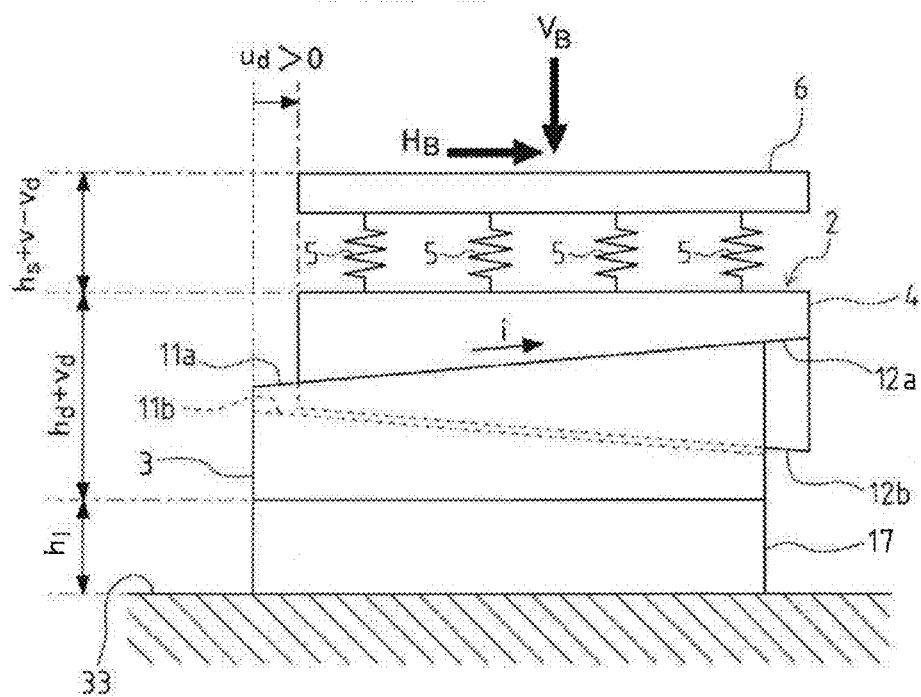
FIG. 20 is a free body view explicitly showing a force applied to a connecting portion between the vibration damping device according to the first embodiment of the present invention and a rigid frame.

FIG. 19 and FIG. 20 show a frontwardly moving state of the damping device 1 (see FIG. 17). These drawings are free body views where the rigid frame and the damping device 1 are separated from each other, and explicitly show a horizontal force $H_B$ and a vertical force $V_B$ which are applied to a connection portion between the damping device 1 and the rigid frame, that is, the upper side wall 18 and the fixed beam 6. FIG. 19 shows the forces applied to the rigid frame and FIG. 20 shows the forces applied to the damping device 1.

In the damping device 1 of this embodiment, by making use of a change in height of the slide body mechanism 2 generated by the relative slide movement between the concave slide body 3 and the convex slide body 4, leaf springs 5 are extended or shrunken so that a compressive force is generated. As shown in FIG. 17 and the like, in a state where the damping device 1 is mounted on the rigid frame, the leaf springs 5 are interposed between the beam 31 supported by the pillars 32 and the slide body mechanism 2. Accordingly, it is considered that a change in height of the pillars 32 of the rigid frame largely influences a compressive force which the damping device 1 generates.

Accordingly, to take into account the secondary displacement attributed to the deformation of the pillars 32, the displacement "v" of the upper ends of the pillars 32 in the y-axis direction is expressed by the following formula (21).

$$v = v_1 + v_2 \quad (21)$$

Here, $v_1$ is the primary displacement caused by the axial displacement of the pillars 32, and $v_2$ is a secondary displacement caused by bending of an axis of the pillar 32.

Assuming a vertical spring constant of the rigid frame which is determined by taking into account the axial displacement of the pillars 32 as $K_y$, the primary displacement is expressed by the following formula (22).

$$v_1 = V_B/K_y \quad (22)$$

With respect to the number of pillars 32, two pillars 32 are arranged on both ends of the beam 31 respectively and hence, the vertical spring constant $K_y$ is expressed by the following formula (23).

$$K_y = 2A_c E_c/h \quad (23)$$

To assume that the bending deformation of the pillar 32 is equivalent to the bending deformation of the beam with both ends fixed where the displacement at a support point "u" (horizontal displacement "u" of the beam 31) is generated, and to consider that the secondary displacement of the pillar 32 is the difference between an original length of the beam with both ends fixed and a curve length of a deflection curve of the beam with both ends fixed, the secondary displacement is expressed as the following formula (24).

$$v_2 = (-3/5h)u^2 \quad (24)$$

The formula (24) is can be simply obtained by integrating the deflecting curves of the beam with both ends fixed where the displacement at a support point is generated and hence, the explanation of the steps of induction of the formula (24) is omitted.

The shrinkage of leaf springs 5 is $(v_d-v)$ and hence, a vertical force applied to the damping device 1 is expressed by the following formula (25).

$$V_B = S_y(v_d - v) \quad (25)$$

To apply the formulae (1), (21), (22) and (24) together with $u_d = u$ to formula (25), the following formulae (26), (27) are obtained.

[Numerical formula 7]

$$V_B = S_{yc}\left(\dot{i}|u| + \frac{3}{5h}u^2\right) \quad (26)$$

[Numerical formula 8]

$$S_{yc} = \frac{S_y}{1 + S_y/K_y} \quad (27)$$

In the formulae (26) and (27), $S_{yc}$ is a synthesized vertical spring constant of the rigid frame and the damping device 1. To substitute a vertical force $V_B$ expressed by the formula (26) and a horizontal force $H_B$ shown in FIG. 19 and FIG. 20 with V and H in the formulae (5) and (6), the horizontal force $H_B$ is expressed by the following formula (28).

[Numerical formula 9]

$$H_B = \lambda\left\{S_{yc}\left(\dot{i}|u| + \frac{3}{5h}u^2\right) + V_0\right\} \quad (28)$$

Assuming a horizontal spring constant of the rigid frame as $K_x$, the relationship between a horizontal force Q and a horizontal displacement "u" is expressed by the following formula (29).

$$Q - H_B = K_x u \quad (29)$$

Since it is assumed that the deformation of the pillar 32 is equivalent with the deformation of the beam with both ends fixed where the displacement at a support point is generated, a horizontal spring constant of the rigid frame is expressed by the following formula (30).

$$K_x = 24 E_c I_c / h^3 \quad (30)$$

By substituting formula (28) into formula (29) and arranging the combined formula, the relational formula between a horizontal force and the horizontal displacement of the rigid frame on which the damping device 1 is mounted which is expressed by the following formula (31) is obtained.

[Numerical formula 10]

$$\frac{Q}{hS_{yc}} = \frac{K_x}{S_{yc}}\left(\frac{u}{h}\right) + \lambda\left\{\frac{V_0}{hS_{yc}} + \dot{i}\left|\frac{u}{h}\right| + \frac{3}{5}\left(\frac{u}{h}\right)^2\right\} \quad (31)$$

Figure 21A:
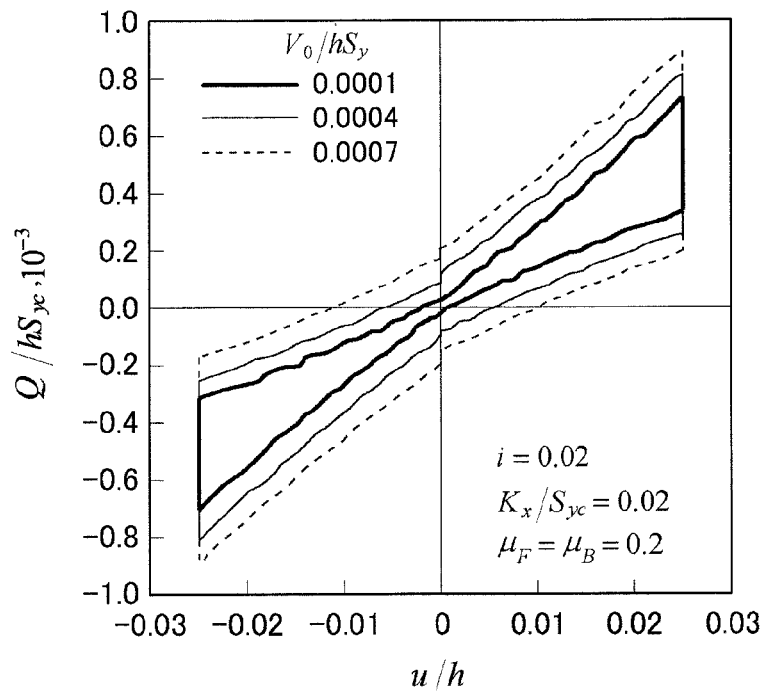
Figure 21B:
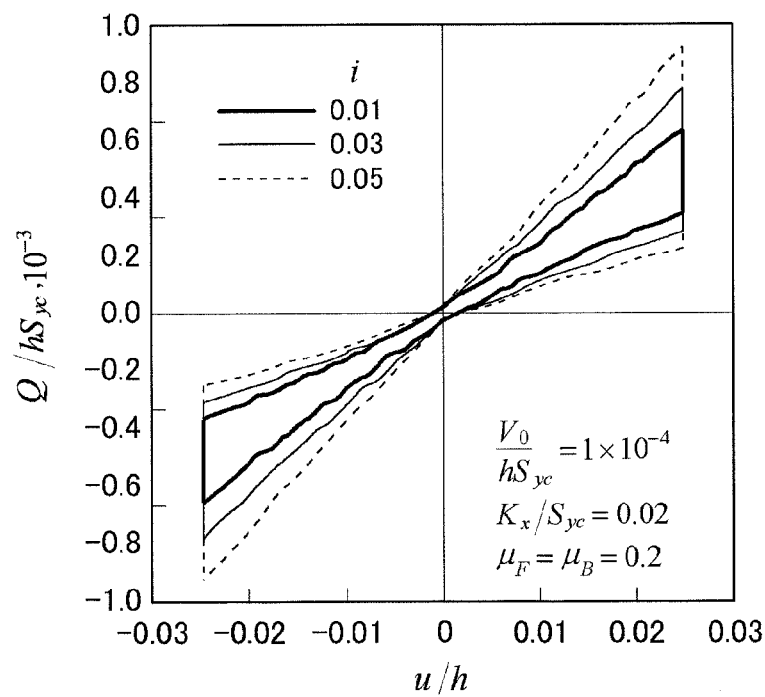

FIGS. 21(a), 21(b) are hysteresis curves of a horizontal force and a horizontal displacement of the rigid frame on which the damping device 1 is mounted expressed by the formula (31). FIGS. 21(a) and (b) respectively show a change in hysteresis curve formed corresponding to an initial compressive force and a gradient of the slide surface.

As shown in FIG. 21(a), when only the initial compressive force is increased, although the inclination of the curve in an advancing state or at the time of retracting is not changed, an intercept on an axis of ordinates is largely increased and hence, the curve translates vertically. Accordingly, it is considered that an area which the hysteresis curve surrounds is increased as a whole.

On the other hand, as shown in FIG. 21(b), when only a gradient of the slide surface is increased, although an intercept on an axis of ordinates is not changed, the inclination of the hysteresis curve in a frontward moving time/at a point of time of advancing and in a rearward moving time/in a retracting state is increased, and the inclination of the curve in a frontward moving time/at a point of time of retracting and in a rearward moving time/at a point of time of advancing is decreased. Accordingly, it is considered that an area which the hysteresis curve surrounds is increased. From FIGS. 21(a) and (b), it is expected that both hysteresis curves take a shape similar to the shape of a butterfly when the butterfly spreads its wings.

The left side of the formula (31) includes the synthesized vertical spring constant $S_{yc}$ of the rigid frame and the damping device 1. Assuming that the relationship between the vertical spring constant $K_y$ of the rigid frame and the vertical spring constant $S_y$ of the damping device 1 is $K_y \gg S_y$, it is regarded that $S_{yc} \cong S_y$. When only $S_y$ is increased under such assumption, the horizontal force Q on the left side of formula (31) is increased so that the area which the hysteresis curve surrounds is increased.

Accordingly, it is considered that by increasing a dynamic coefficient of friction, a gradient of the slide surface, an initial compressive force and a vertical spring constant, an area which the hysteresis curve of the horizontal force and the horizontal displacement of the rigid frame surrounds can be increased. It is considered that by combining these four parameters properly, a damping device 1 having an equivalent viscous damping coefficient which the rigid frame requires as a vibrating body can be manufactured.

An equivalent viscous damping coefficient is explained. To ignore the secondary displacement of the rigid frame, a horizontal force $H_B$ applied to the damping device 1 which is expressed by the formula (28) agrees with a horizontal force H expressed by the formula (7). Accordingly, by ignoring the secondary displacement of the rigid frame and by assuming that $K_y \gg S_y$, $1 \pm \mu_F \dot{i} \cong 1$, $1 \pm \mu_B \dot{i} \cong 1$ and $\mu_F = \mu_B = \mu_0$, an equivalent viscous damping coefficient $\zeta_e$ of the rigid frame on which the damping device 1 is mounted is defined by the following formula (32) as a ratio between an equivalent viscous damping coefficient $c_e$ expressed by the formula (15) and a critical damping coefficient $2\sqrt{MK_x}$ of the rigid frame.

[Numerical formula 11]

$$\zeta_e \equiv \frac{c_e}{2\sqrt{MK_x}} \quad (32)$$

Here, M is a mass of the rigid frame. As a clamping performance, an equivalent viscous damping coefficient at the time of resonance is important. Accordingly, a circular frequency θ in formula (15) is replaced with a natural frequency ω of the rigid frame expressed by the following formula (33).

[Numerical formula 12]

$$\omega = \sqrt{\frac{K_x}{M}} \quad (33)$$

It is assumed that the horizontal displacement of the rigid frame is equal to the relative displacement of the damping device 1 and hence, assuming the amplitude of the rigid frame as "a", $a_d$=a is established. Therefore, the equivalent viscous damping coefficient $\zeta_e$ in formula (32) is expressed by the following formula (34).

[Numerical formula 13]

$$\zeta_e = \frac{\mu_0}{\pi}\left(i\frac{S_y}{K_x} + \frac{2V_0}{aK_x}\right) \quad (34)$$

According to formula (34), it is considered that an equivalent viscous damping coefficient of the rigid frame on which the damping device 1 is mounted is determined based on a dynamic coefficient of friction and a gradient of the slide surface, a vertical spring constant of the damping device 1, a horizontal spring constant of the rigid frame, an initial compressive force and amplitude of the rigid frame. It is considered that as the amplitude of the rigid frame is increased, the influence exerted by the initial compressive force is decreased.

Figure 22A:
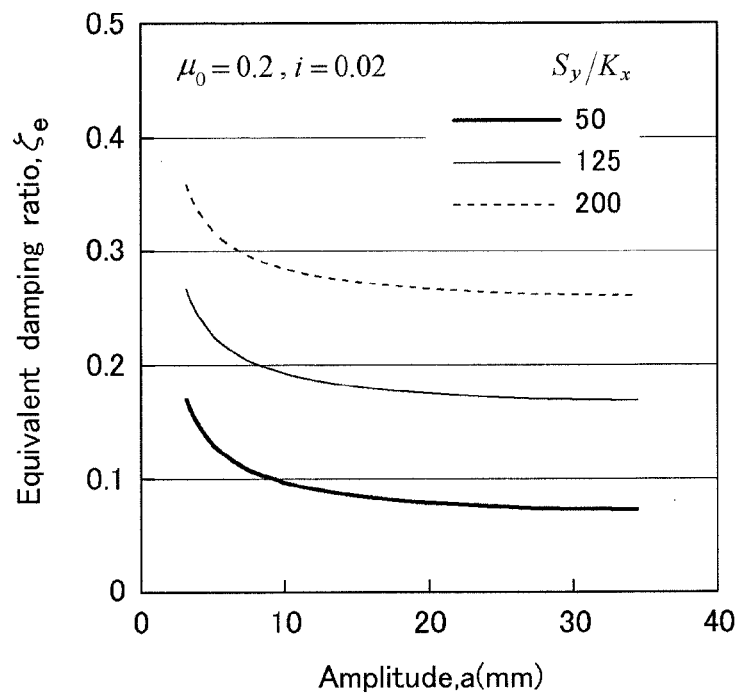
Figure 22B:
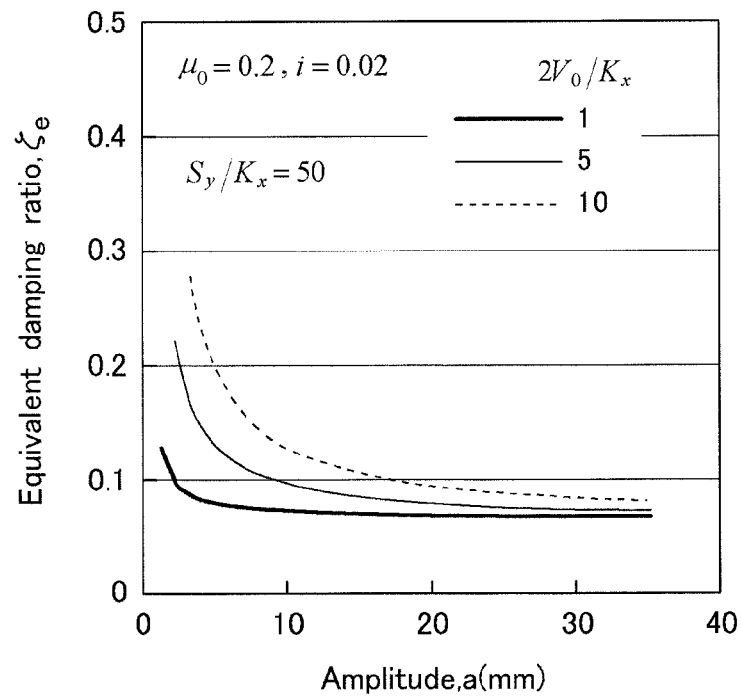

FIGS. 22(*a*), 22(*b*) show one example of an equivalent viscous clamping coefficient calculated based on the formula (34). FIG. 22(*a*) shows a change in equivalent viscous damping coefficient $\zeta_e$ when a gradient of the slide surface and a dynamic coefficient of friction are set as constants, and a spring constant ratio $S_y/K_x$ and amplitude "a" are set as parameters. FIG. 22(*b*) shows a change in equivalent viscous damping coefficient $\zeta_e$ when a gradient of the slide surface and a dynamic coefficient of friction are set as constants, and an initial compressive force and amplitude "a" are set as parameters.

From FIG. 22(*a*), it is considered that by increasing a spring constant ratio $S_y/K_x$, an equivalent viscous damping coefficient $\zeta_e$ can be increased. From FIG. 22(*b*), it is considered that by decreasing an initial compressive force, a change in an equivalent viscous damping coefficient $\zeta_e$ following a change in amplitude "a" can be decreased. From FIG. 22(*a*), (*b*) and the formula (34), it is considered that, as amplitude "a" is increased, the equivalent viscous damping coefficient $\zeta_e$ gradually approximates a fixed value $\zeta_{e0}=i\mu_0 S_y/\pi K_x$. Further, from the formula (34), it is considered that when a dynamic coefficient of friction and a gradient of the slide surface are increased, the equivalent viscous damping coefficient $\zeta_e$ is increased.

In the damping device 1 of this embodiment, the slide surface of the slide body mechanism 2 is formed as a slanted surface with a predetermined inclination at a fitting portion having a concave/convex shape which the concave slide body 3 and the convex slide body 4 have, but the slide surface is not limited to such a slanted surface. The shape which the slide surface of the slide body mechanism 2 is not particularly limited provided that shape is formed such that a height of the slide body mechanism 2 is increased along with the increase of the displacement amount of the slide body in the frontward or rearward direction from a neutral position with respect to the sliding counterpart slide body. That is, for the slide surface of the slide body mechanism 2, it is sufficient that the slide surface has a gradient by which, along with the increase of the displacement amount of the slide body from a neutral position in the frontward direction or in the rearward direction with respect to the sliding counterpart slide body, a height of the slide body mechanism 2 is increased.

Accordingly, as the slide surface of the slide body mechanism 2, for example, different from this embodiment where the slide surface is formed on the fitting portion having a concave/convex shape, the slide surface may be formed such that just one slide surfaces are brought into contact with each other, or may be formed such that the slide surface is a curved surface which is bent at least either in the operating direction or in the widthwise direction. When the slide surface of the slide body mechanism 2 is the curved surface which is bent in the operating direction, a gradient where a height of the slide body mechanism 2 is increased along with the increase of the displacement amount as mentioned above, for example, is defined as the inclination of a tangent of a curved line having a curved shape in the operating direction of the slide surface.

However, by forming the slide surface with a portion having a fitting shape which is constituted of the groove portion 11 of the concave slide body 3 and the projecting portion 12 of the convex slide body 4, in the slide body mechanism 2, the generation of eccentricity in the transverse direction orthogonal to the operating direction (in the widthwise direction) can be prevented so that the slide surfaces of the slide bodies can be brought into contact with each other over the substantially whole length of respective slide bodies. Accordingly, the damping device 1 of this embodiment having the simple constitution can be easily realized, and the damping device 1 of this embodiment can easily acquire high stability with respect to the relative sliding operation between the slide bodies. A concave/convex shape of the slide body mechanism 2 can be made upside down.

By forming the slide surface of the slide body mechanism 2 using a slanted surface having a predetermined gradient as this embodiment, a kinetic analysis can be easily performed, and the damping device 1 can acquire high practicability and general-use property. A lubricant or the like is applied to the slide surface of the slide body mechanism 2 for decreasing the difference between a dynamic coefficient of friction and a static coefficient of friction, or an oxide film or an oil film or the like is formed on the slide surface of the slide body mechanism 2 for preventing the seizure between metals, the corrosion of the slide body mechanism 2 and the like.

Although the damping device 1 of this embodiment includes the leaf springs 5 as the biasing means which biases the slide body mechanism 2 in the slide body pushing direction, for example, a coil spring, a cylinder mechanism, a solenoid actuator or the like may be used as biasing means provided to the damping device 1. However, as in the case of the damping device 1 of this embodiment, by adopting leaf springs 5 having an approximately U shape as the biasing means, a desired characteristic which the biasing means of the damping device 1 is required to possess can be easily realized by the simple structure as described above.

The leaf springs 5 which the damping device 1 includes as the biasing means may be arranged between the concave slide body 3 and the structure below the concave slide body 3. In this case, the leaf springs 5 arranged below the concave slide body 3 are provided such that, in the same manner as the leaf springs 5 arranged above the convex slide body 4 of this embodiment, for example, an upper side of the leaf springs 5 is fixed to the concave slide body 3 and a lower side of the leaf springs 5 is fixed to the structure indirectly or directly by way of the support beams or the like. That is, when the leaf springs 5 are arranged below the concave slide body 3, a fixing portion which constitutes a slide body-side fixing portion is fixed to concave slide body 3, and a fixing portion which constitutes a structure-side fixing portion is fixed to the structure directly or indirectly by way of the support beams or the like.

The damping device 1 of this embodiment explained above can efficiently absorb vibration energies ranging from vibration energy of small magnitude to vibration energy of large magnitude regardless of a length of a period of vibrations of a structure with the simple structure thus acquiring both high practicability and general-use property.

For example, when a skyscraper is the structure to which the present invention is applied, it is necessary for a damping device to cope with different types of vibrations such as vibrations having relatively small amplitude caused by a wind or vibrations having relatively large amplitude caused by a long period earthquake motion. In such cases, the damping device 1 of this embodiment can cope with a wide range of vibrations from vibrations having small amplitude to vibrations having large amplitude and hence, the damping device of one kind can cope with different types of vibrations easily without using different damping devices for respective types of vibrations.

According to the damping device 1 of this embodiment, it is possible to realize a damping device having the constitution where a damping force is increased in proportion to an absolute value of the displacement, that is, a damping device having the constitution where an equivalent viscous damping coefficient is not decreased even when the amplitude is increased so that the equivalent viscous damping coefficient is not lowered even when a natural vibration mode of a structure is lengthened. In the damping device 1 of this embodiment, the two slide bodies, the concave slide body 3 and the convex slide body 4 have the concave surface and the convex surface thereof meshed with each other, wherein only the front-side-use slide surfaces are brought into close contact with each other in a frontward moving time, and only the rear-side-use slide surfaces are brought into close contact with each other in a rearward moving time. When the relative displacement is generated between the concave slide body 3 and the convex slide body 4 which are assembled together, a height of the slide body mechanism 2 is changed due to a gradient of the slide body surface.

A suspension device (constitution including the leaf springs 5 and the support beam 6) which is fixed to either one of the concave slide body 3 and the convex slide body 4 applies a compressive force which is in proportion to a displacement in height of the slide body mechanism 2 to the slide surface. A frictional force which is in proportion to a product of the compressive force and a friction coefficient of the slide surface is generated on the slide surface. Accordingly, by directly mounting the slide body mechanism 2 of this embodiment on the structure body, the vibrations of the structure can be damped. Also, according to the damping device 1 into which the slide body mechanism 2 is incorporated, a damping device of a displacement proportional friction type can be easily realized.

The front-side-use slide surface and the rear-side-use slide surface which the respective slide bodies, that is, the concave slide body 3 and the convex slide body 4 include are present at a common place with respect to the operating direction and hence, the device can be easily formed into a compact shape particularly in the operating direction. Accordingly, the damping device 1 can be easily formed into a compact shape, and becomes advantageous in terms of practicability and general-use property.

Figure 23:
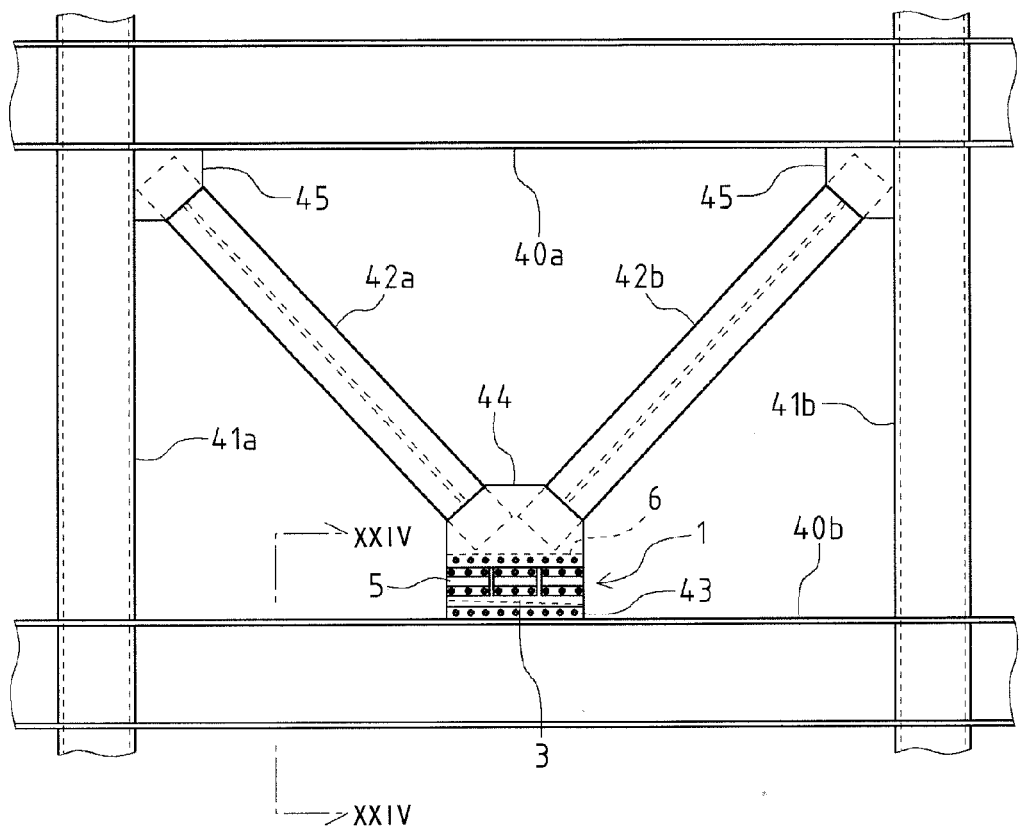
FIG. 23 is a view showing an application example of the vibration damping device according to the first embodiment of the present invention.
Figure 24:
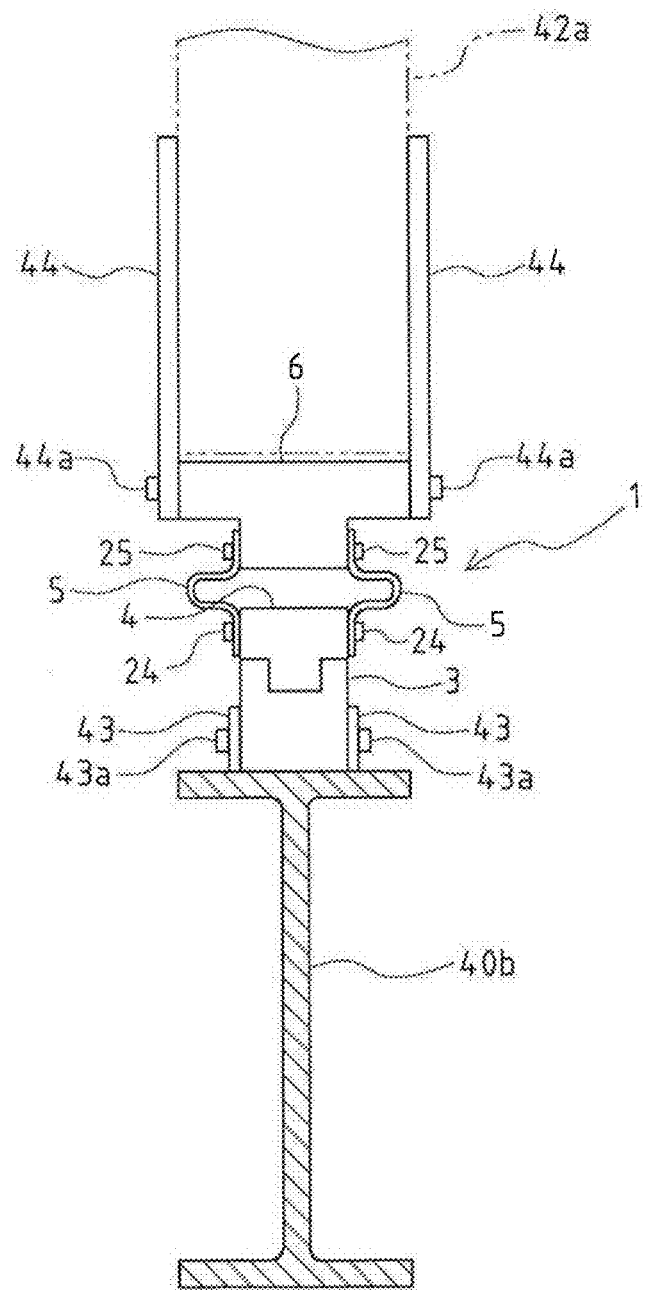
FIG. 24 is a cross-sectional view taken along a line XXIV-XXIV in FIG. 23 in the direction of an arrow.

An application example to which the damping device 1 according to the first embodiment of the present invention is applied is explained. FIG. 23 and FIG. 24 show one example of the arrangement when the damping device 1 is applied to a steel frame building. As shown in FIG. 23, this application example is an example where the damping device 1 is mounted on a frame structure of the steel frame building which is formed by making upper and lower beams (H-shaped steel materials) 40a, 40b arranged parallel to each other in the vertical direction and extending in the horizontal direction and the left and right pillars (quadrangular-shaped pillar) 41a, 41b arranged parallel to each other in the horizontal direction and extending in the vertical direction cross each other (hereinafter referred to as "steel frame"). Respective nodes where the respective upper and lower beams 40a, 40b and the respective left and right pillars 41a, 41b cross each other are constituted as rigid joints (hard-to-deform joints).

In this application example, inside the frame of the steel frame, the damping device 1 is arranged on an upper side of the lower-side beam 40b. The damping device 1 is arranged in the direction that the direction of the relative slide movement between the concave slide body 3 and the convex slide body 4 conforms to the direction that the upper and lower beams 40a, 40b are arranged (in the lateral direction in FIG. 23). The damping device 1 is fixed to the lower beam 40b at an approximately center position between the left and right pillars 41a, 41b, and the damping device 1 is mounted on the steel frame by way of a V-shaped brace which is constituted of left and right braces (H-shaped steel members) 42a, 42b which are arranged in an obliquely extending manner in the leftward and rightward directions as well as in the upward direction from the lateral center position where the damping device 1 is mounted.

To be more specific, the concave slide body 3 of the damping device 1 is fixed to an upper side of the lower beam 40b by way of a pair of connection plates 43 arranged on the upper surface of the lower beam 40b. The pair of connection plates 43 is mounted on the lower beam 40b in a projecting manner from the upper surface of the lower beam 40b, and is fixed to the concave slide body 3 by the bolts 43a (see FIG. 24) in a state where the concave slide body 3 is sandwiched by the connection plates 43 from both side surface sides (both left and right sides in FIG. 24).

The support beam 6 of the damping device 1 is connected to the V-shaped brace constituted of the left and right braces 42a, 42b by way of a pair of gusset plates 44. A pair of gusset plates 44 is fixed to the support beam 6 by bolts 44a (see FIG. 24) in a state where the support beam 6 is sandwiched by the gusset plates 44 from both side surface sides (both left and right sides in FIG. 24). A lower end portion of each of the left and right braces 42a, 42b is fixed between the pair of gusset plates 44, and upper end portions of the respective left and right braces 42a, 42b are fixed to corner portions formed by the upper beam 40a and the left and right pillars 41a, 41b by way of support plates 45 arranged between the beam 40a and the respective pillars 41a, 41b.

In this application example, the damping device 1 is mounted on the steel frame by way of the V-shaped brace such that the direction that the upper and lower beams 40a, 40b are displaced in the left and right horizontal directions and the operating direction of the damping device 1 agree with each other. Accordingly, a damping effect in the left and right horizontal directions can be obtained with respect to the steel frame. There may be a case where the displacement is generated in the horizontal direction orthogonal to the extending direction of the beams 40a, 40b (the direction perpendicular to a surface of the paper on which the drawing is on in FIG. 23) with respect to the upper and lower beams 40a, 40b. Even in such a case, the concave/convex meshing between the concave slide body 3 and the convex slide body 4 prevents the removal of the damping device 1 (the separation of the concave slide body 3 and the convex slide body 4).

In this application example, the respective members which constitute the damping device 1 are designed by taking into account a deformation characteristic of the upper and lower beams 40a, 40b in the vertical direction. This application example corresponds to, as described above, a case where the damping device 1 is mounted on a rigid frame. In this application example, the V-shaped brace which is connected to the damping device 1 can be substituted by a bearing wall (reaction wall). This application example is applicable to, besides the steel frame building, a concrete building, a steel encased reinforced concrete building, a wooden structure and the like in the same manner.

Figure 25:
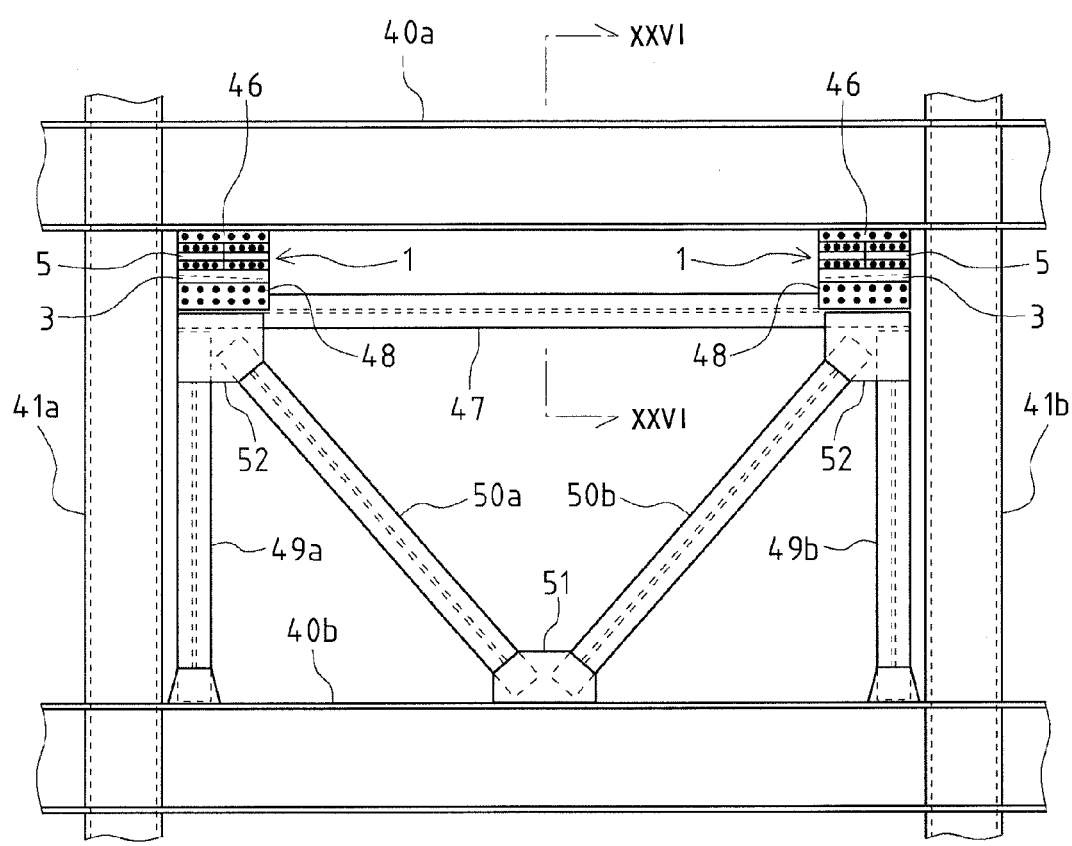
FIG. 25 is a view showing an application example of the vibration damping device according to the first embodiment of the present invention.
Figure 26:
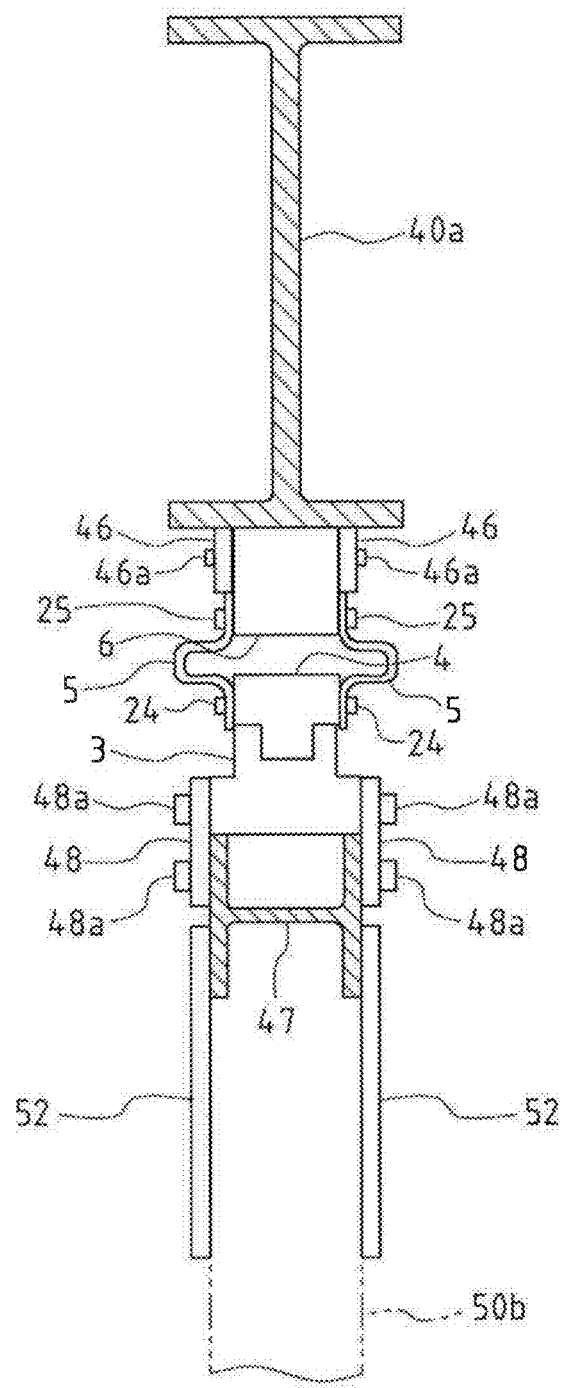
FIG. 26 is a cross-sectional view taken along a line XXVI-XXVI in FIG. 25 in the direction of an arrow.

Another application example of the damping device 1 according to the first embodiment of the present invention is explained. As shown in FIG. 25 and FIG. 26, this application example is, in the same manner as the above-mentioned application example, an application example where the damping device 1 is applied to a steel frame which is formed by upper and lower beams 40a, 40b and left and right pillars 41a, 41b. In this application example, the damping device 1 is arranged at two positions, that is, at both the left and right sides of a lower side of the upper beam 40a between the left and right pillars 41a, 41b (see FIG. 25). In this application example, in the same manner as the above-mentioned application example, the direction of the relative slide movement between a concave slide body 3 and a convex slide body 4 conforms to the direction that the upper and lower beams 40a, 40b are arranged.

In this application example, a support beam 6 of the damping device 1 is fixed to a lower surface of the upper beam 40a by way of a pair of connection plates 46 arranged in a state where the connection plates 46 project from the lower surface of the upper beam 40a. A pair of connection plates 46 is fixed to the support beam 6 by bolts 46a (see FIG. 26) in a state where the support beam 6 is sandwiched by connection plates 46 from both side surface sides (both left and right sides in FIG. 26). The concave slide body 3 of the damping device 1 is fixed to a beam 47 which is arranged below the upper beam 40a and is extended between the left and right pillars 41a, 41b parallel to the beam 40a (in the left and right horizontal directions) by way of a pair of connection plates 48. The pair of connection plates 48 is fixed to the concave slide body 3 and the beam 47 respectively by bolts 48a in a state where the concave slide body 3 and the beam 47 are sandwiched by the connection plates 48 from both side surface sides.

The damping devices 1 arranged on both the left and right sides and the beam 47 which supports the damping devices 1 are supported by the steel frame by way of a M-shaped frame structure constituted of left and right pillars (H-shaped steel) 49a, 49b and left and right braces 50a, 50b arranged in the oblique direction between the left and right pillars 41a, 41b.

The left and right pillars 49a, 49b which constitute the M-shaped frame structure are mounted on an upper surface of the lower beam 40b in an erected manner at left and right sides of the lower beam 40b. The left and right braces 50a, 50b which also constitute the M-shaped frame structure are arranged such that one ends of the braces 50a, 50b are fixed to the lower beam 40b at an approximately center position between the left and right pillars 41a, 41b, and the other ends of the braces 50a, 50b extends obliquely in the leftward and rightward directions and in the upward direction from the approximately center position.

The lower end portions of the left and right braces 50a, 50b which constitute the M-shaped frame structure are fixed to an upper surface of the lower beam 40b by way of a pair of support plates 51 in a state where the pair of support plates 51 projects from the upper surface of the beam 40b at the approximately center position of the upper surface of the lower beam 40b in the lateral direction. The upper end portions of the left and right braces 50a, 50b and the upper ends of the left and right pillars 49a are fixed to both left and right end portions of the beam 47 which supports the damping device 1 by way of a pair of gusset plates 52 respectively. The pair of gusset plates 52 arranged on the left and the right sides respectively are fixed to the beam 47, the pillars 49a, 49b and braces 50a, 50b in a state where the end portions of beam 47, the upper end portions of pillars 49a, 49b, and the upper end portions of the braces 50a, 50b are sandwiched by the gusset plates 52 from both side surface sides.

Accordingly, in this application example, in the same manner as the above-mentioned application example, the damping device 1 is mounted on the steel frame such that the direction that the upper and lower beams 40a, 40b are displaced in the left and right horizontal directions and the operating direction of the damping device 1 agree with each other. In this application example, the damping device 1 is arranged at two positions directly below the upper beam 40a and hence, in comparison with the above-mentioned application example, the influence exerted on a deformation characteristic of the upper and lower beams 40a, 40b in the vertical direction is small. In this application example, the V-shaped brace constituted of the left and right braces 50a, 50b or the M-shaped frame structure constituted of these braces 50a, 50b and the left and right pillars 49a, 49b can be replaced with a bearing wall (reaction wall). This application example, in the same manner as the above-mentioned application example, is applicable to a concrete building, a steel encased reinforced concrete building and the like in the same manner.

Figure 27:
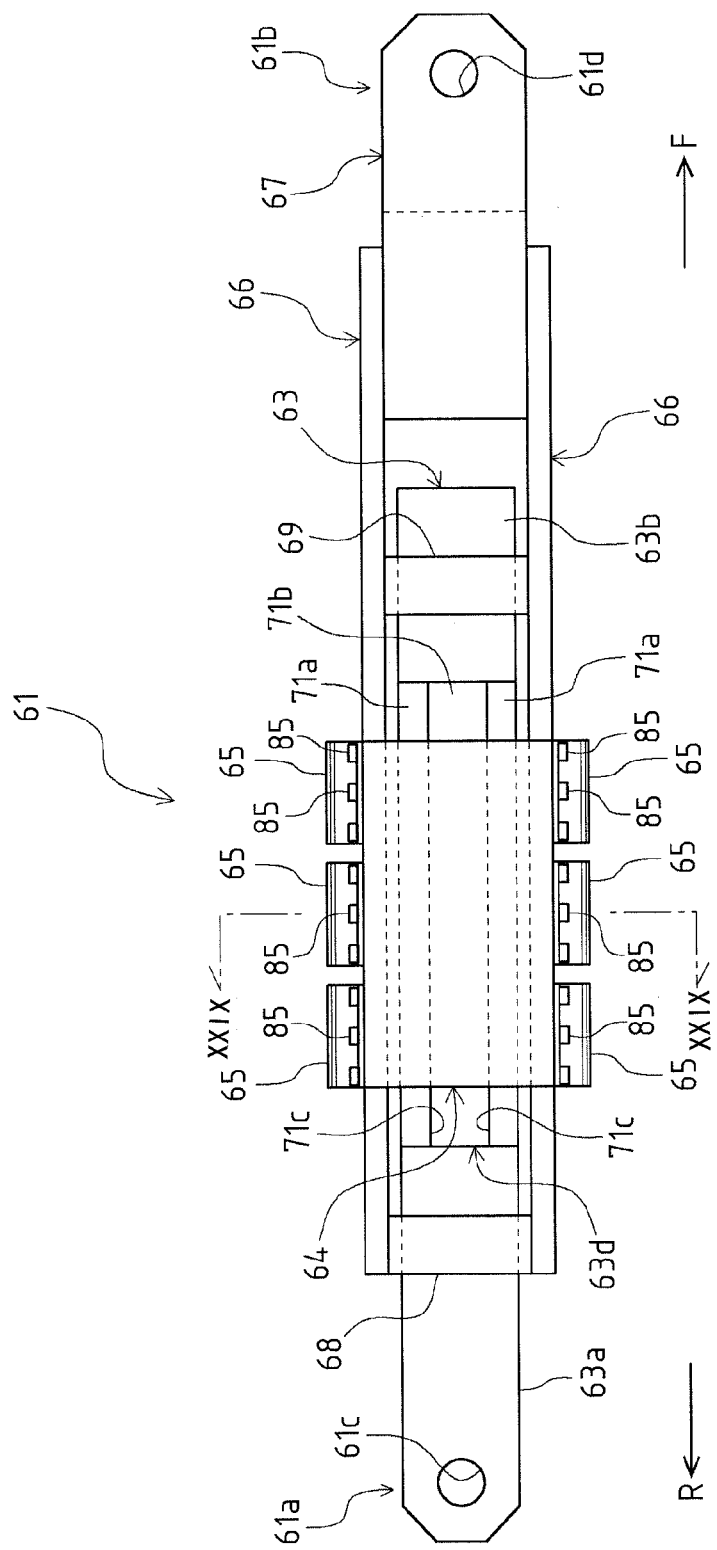
FIG. 27 is a plan view showing the constitution of a vibration damping device according to a second embodiment of the present invention.
Figure 28:
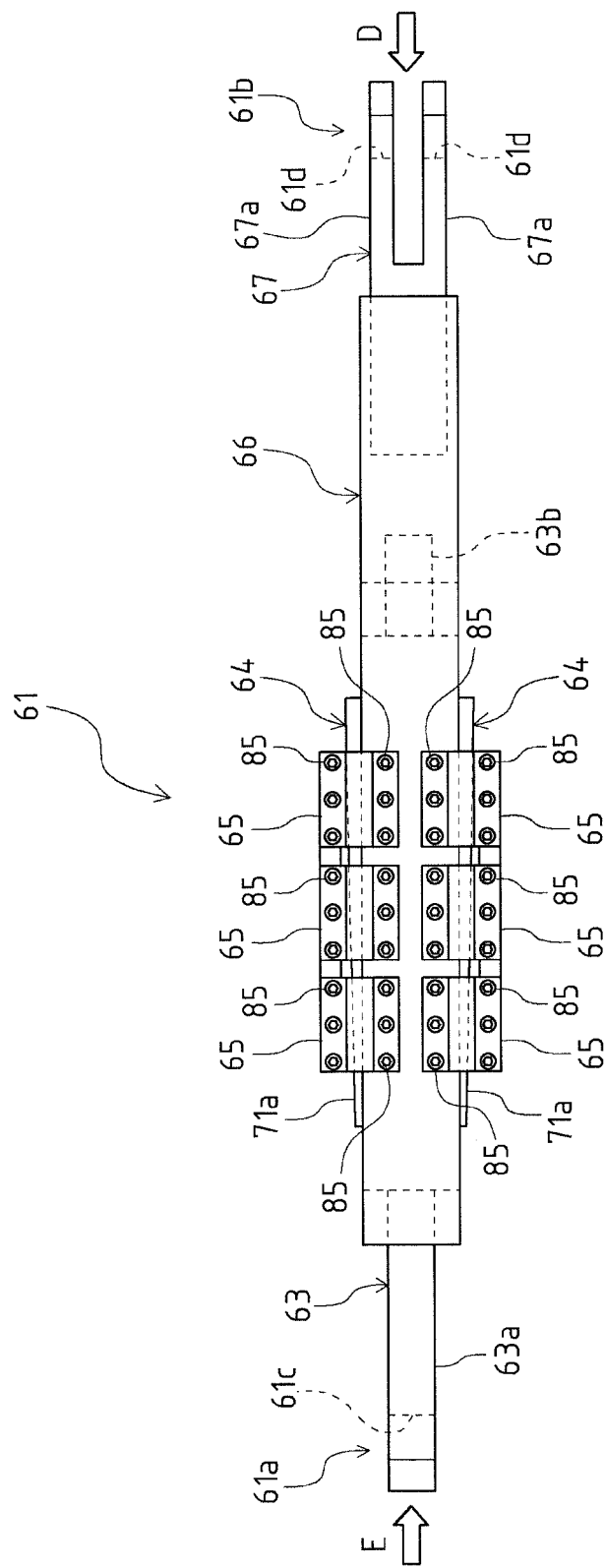
FIG. 28 is a side view showing the constitution of the vibration damping device according to the second embodiment of the present invention.

A second embodiment of the present invention is explained. Here, the explanation of the contents of the second embodiment which overlap with the contents of the first embodiment is omitted when necessary. As shown in FIG. 27 and FIG. 28, the damping device 61 of this embodiment is formed into a shaft shape as a whole, and the axial direction (the left-and-right direction in FIG. 27 and FIG. 28) of the damping device 61 is assumed as the direction along which a damping force is applied. In this manner, while the damping device 1 of the first embodiment is a shear-force-member-type damping device, the damping device 61 of this embodiment is characterized by expanding a shear-force-member-type damping device to an axial-force-member-type damping device by modifying the number of and the arrangement of concave slide bodies, convex slide bodies, leaf springs, and support beams. That is, the damping device 61 of this embodiment is configured to be extended or shrunken in a state where the damping device 61 is biased in the axial direction, and the damping device 61 applies a damping force in the axial direction along with the extending/shrinking movement of the damping device 61.

The damping device 61 has support portions (61a, 61b) which constitute portions to be fixed to the structure at both axial end portions thereof respectively. In this embodiment, one support portion (the support portion on a left side in FIG. 27) forms "the first support portion 61a", and the other support portion (the support portion on a right side in the same drawing) forms the second support portion 61b.

As shown in FIG. 27 to 33, the damping device 61 includes: a slide body mechanism 62 having a concave slide body 63 and two convex slide bodies 64; a plurality of (12 in this embodiment) leaf springs 65; and a pair of support bodies 66. In the same manner as the first embodiment, the damping device 61 of this embodiment is a slide-type damping device, and has the constitution where the damping device 61 uses a frictional force generated when the concave slide body 63 and the respective convex slide bodies 64 slide relative to each other as a damping force, and the frictional force is increased in proportion to an absolute value of the relative displacement between the respective slide bodies.

In this embodiment, the concave slide body 63 and the pair of convex slide bodies 64 which constitute the slide body mechanism 62 are three slide bodies which are arranged such that these slide bodies are slidable relative to each other in a reciprocating manner in a state where these bodies face each other in an opposed manner. To be more specific, the concave slide body 63 has an approximately pillar-shaped profile as a whole, and the convex slide bodies 64 have an approximately rectangular-plate-shaped profile as a whole. The pair of convex slide bodies 64 is arranged so as to sandwich the concave slide body 63 from both sides in a state where plate surfaces of the convex slide bodies 64 face each other in an opposed manner.

Due to such a constitution, the concave slide body 63 and the convex slide bodies 64 are arranged so as to be slidable relative to each other in a state where one convex slide body 64 faces one surface portion of the concave slide body 63 in an opposed manner, and the other convex slide body 64 faces the other surface portion of the concave slide body 63 in an opposed manner. That is, the concave slide body 63 and the pair of convex slide bodies 64 which faces both surface portions of the concave slide body 63 on sides opposite to each other in an opposed manner respectively are configured such that the concave slide body 63 and the convex slide bodies 64 are slidable relative to each other in a reciprocating manner in a state where the concave slide body 63 and the convex slide bodies 64 face each other in an opposed manner. The approximately pillar-shaped concave slide body 63 and the approximately rectangular-plate-shaped convex slide bodies 64 are arranged so as to be slidable relative to each other in a state where one surface portion of the concave slide body 63 and one surface portion of the convex slide body 64 face each other in an opposed manner while setting the longitudinal direction of one slide body as the sliding direction relative to the other slide body which constitutes a counterpart for one slide body.

In this manner, the slide body mechanism 62 of this embodiment includes one concave slide body 63 and two convex slide bodies 64 which use one concave slide body 63 in common as a relatively-sliding counterpart member. Two convex slide bodies 64 have the approximately same shape and the approximately same size. In the explanation made hereinafter, the direction along which two convex slide bodies 64 sandwich the concave slide body 63 (the vertical direction in FIG. 29) is assumed as the vertical direction. Accordingly, in this embodiment, the concave slide body 63 and the convex slide bodies 64 are slidably arranged in a state where the concave slide body 63 and the convex slide bodies 64 face each other in an opposed manner in the vertical direction.

Two convex slide bodies 64 consisting of the upper convex slide body 64 and the lower convex slide body 64 slide relative to the concave slide body 63 in a state where the convex slide bodies 64 are integrally supported by the leaf springs 65 and the support bodies 66. The support bodies 66 are strip-plate-shaped members, and are arranged at positions where the support bodies 66 sandwich the concave slide body 63 from both sides in the direction perpendicular to the direction along which the convex slide bodies 64 face each other in an opposed manner as viewed in the axial direction of the damping device 61 (lateral direction in FIG. 30, and FIG. 31, hereinafter referred to as "lateral direction"). That is, the pair of support bodies 66 is arranged in a state where plate surfaces of the support bodies 66 face each other in an opposed manner in the lateral direction with the concave slide body 63 interposed therebetween. The pair of support bodies 66 is arranged in a state where a gap is formed between the support body 66 and a left side surface of the concave slide body 63 and a gap is formed between the support body 66 and a right side surface of the concave slide body 63 (see FIG. 29).

The leaf spring 65 is an approximately U-shaped leaf spring having the substantially same constitution as the leaf spring 5 of the first embodiment (see FIG. 12). Accordingly, the leaf spring 65 has rectangular-planar-shaped fixing portions 81, 82 on both end sides thereof and has a plate-shaped leaf spring portion 83 having a curved shape between these fixing portions 81, 82. The leaf springs 65 are arranged on both left and right side surfaces of the convex slide bodies 64 and left or right side surfaces of the support bodies 66 in a state where the leaf springs 65 extend between the convex slide body 64 and the support body 66 in the vertical direction and also in a state where open sides of the leaf springs 65 having an approximately U shape face each other.

That is, the leaf spring 65 which is fixed to the upper convex slide body 64 and the support body 66 has one (upper) fixing portion 81 thereof fixed to the side surface of the upper convex slide body 64, and the other (lower) fixing portion 82 thereof fixed to the side surface of the support body 66. On the other hand, the leaf spring 65 which is fixed to the lower convex slide body 64 and the support body 66 has one (upper) fixing portion 82 thereof fixed to the support body 66, and the other (lower) fixing portion 81 thereof fixed to the lower convex slide body 64.

In the damping device 61 of this embodiment, three leaf springs 65 are arranged in a row on left and right sides of the damping device 61 respectively along the longitudinal direction of the damping device 61 in a state where three leaf springs 65 are arranged between the support bodies 66 and the upper and lower convex slide bodies 64. Accordingly, 12 leaf springs 65 in total are used (see FIG. 27, FIG. 28). In the same manner as the leaf springs 5 of the first embodiment, each leaf spring 65 has upper and lower fixing portions thereof fixed using three bolts 85 at three positions. Accordingly, bolt holes 64a, 66a into which bolts 85 are threaded respectively are formed in both side surfaces of the convex slide body 64 and the support body 66 (see FIG. 32).

In this manner, in the leaf spring 65 of the damping device 61 of this embodiment, the fixing portions 81 on a side where the leaf spring 65 is fixed to the upper and lower convex slide bodies 64 function as fixing portions on a slide body side, and the fixing portions 82 on a side where the leaf spring 65 is fixed to the support body 66 function as fixing portions a structure side. Further, the leaf spring 65 has a leaf spring portion 83 which is an elastically deformable member having a curved plate shape between the upper and lower fixing portions 81, 82.

In this embodiment, the leaf springs 65 bias the slide body mechanism 62 constituted of the concave slide body 63 and the pair of convex slide bodies 64 by pushing in the vertical direction. That is, the leaf springs 65 apply a biasing force in the direction along which the concave slide body 63 and the convex slide bodies 64 which are slidable relative to each other in a reciprocating manner are pushed in the direction along which the concave slide body 63 and the convex slide bodies 64 face with each other in an opposed manner (slide body pushing direction) act on the slide body mechanism 62.

To be more specific, the leaf springs 65 are fixed to the upper or the lower portion of the support body 66 in a state where the leaf springs 65 extend between the support body 66 and the upper or lower convex slide body 64 so that a compressive force (biasing force) is generated by the leaf spring portions 83 mainly in the vertical direction. That is, the leaf springs 65 which are arranged in the vertical direction are fixed to the support bodies 66 so that the leaf springs 65 apply a biasing force in the direction along which the upper and lower convex slide bodies 64 approach each other to the slide body mechanism 62. In this manner, in the damping device 61 of this embodiment, the leaf springs 65 function as a biasing means which biases the slide body mechanism 62 in the slide body pushing direction.

The concave slide body 63 and the convex slide bodies 64 are directly or indirectly fixed to the structure respectively. In this embodiment, the concave slide body 63 includes a support plate portion 63a which is a portion to be fixed to the structure. The support plate portion 63a is a plate-shaped portion, wherein the vertical direction of the support plate portion 63a is set as a plate thickness direction. The support plate portion 63a is formed on one longitudinal end side of the concave slide body 63. The support plate portion 63a extends from a portion of the concave slide body 63 where slide surfaces which are slidably engaged with the convex slide bodies 64 are formed. The support plate portion 63a is arranged in a state where the support plate portion 63a projects from the pair of support bodies 66 toward one in the axial direction of the damping device 61.

As described above, the support plate portion 63a which the concave slide body 63 includes is a portion constituting a first support portion 61a arranged on end portion of the damping device 61 in the axial direction. That is, the damping device 61 includes the support plate portion 63a constituting the first support portion 61a fixed to the structure at one end portion in the axial direction. Accordingly, a hole portion 61e for fixing the concave slide body 63 to the structure is formed in the support plate portion 63a. The hole portion 61c is provided for allowing a fixing jig such as a bolt to be inserted therein, and is formed such that the hole portion 61c penetrates the plate-shaped support plate portion 63a. In this manner, in the damping device 61 of this embodiment, the concave slide body 63 is directly fixed to the structure using the support plate portion 63a.

Further, in this embodiment, the convex slide bodies 64 are indirectly fixed to the structure by way of the plurality of leaf springs 65 and the support bodies 66. To be more specific, the damping device 61 includes a clevis 67 constituting a projecting portion on a side (right side in FIG. 27, FIG. 28) opposite to a side where the support plate portion 63a of the concave slide body 63 projects.

The clevis 67 is a member having a profile of an approximately rectangular thick plate shape as a whole, and is fixed to the pair of support bodies 66 in a state where the clevis 67 is sandwiched between the pair of support bodies 66 on the other axial end portion of the damping device 61 in a state where the plate-thickness direction of the clevis 67 is set as the vertical direction. The clevis 67 includes a support plate portion 67a on one longitudinal side thereof, wherein the support plate portion 67a is a pair of plate-shaped portions arranged parallel to each other in a state where the pair of plate-shaped portions faces each other in an opposed manner in the vertical direction. The clevis 67 is fixed between the pair of support bodies 66 in a state where the pair of support plate portions 67a projects from the pair of support bodies 66 toward the other axial end side of the damping device 61. Here, the clevis 67 is fixed to the support bodies 66 by a suitable method such as bolts or welding, for example, in a state where the clevis 67 is sandwiched between the pair of support bodies 66.

As described above, the support plate portions 67a which the clevis 67 includes are portions constituting a second support portion 61b arranged on an axial end portion of the damping device 61. That, is, the damping device 61 includes the support plate portions 67a as the second support portion 61b to be fixed to the structure at the other axial end portion of the damping device 61. Accordingly, a hole portion 61d for fixing the clevis 67 to the structure is formed in the support plate portions 67a. The hole portion 61d is provided for allowing a fixing jig such as a bolt to be inserted, and is formed such that the hole portion 61d penetrates the pair of plate-shaped support plate portions 67a in the vertical direction, in this manner, in the damping device 61 of this embodiment, the convex slide bodies 64 are indirectly fixed to the structure by way of the leaf springs 65, the support bodies 66 and the clevis 67.

In the damping device 61 having the above-mentioned constitution, as described above, two convex slide bodies 64 consisting of the upper and lower convex slide bodies 64 are integrally supported by the leaf springs 65 and the support bodies 66, and the clevis 67 is fixed to the pair of support bodies 66 which face each other in an opposed manner. Accordingly, the damping device 61 is formed as an integral body by fixing two convex slide bodies 64, twelve leaf springs 65, the pair of support bodies 66, and the clevis 67 to each other among the respective members. In such an integral constitution, the concave slide body 63 is supported in such a manner that the concave slide body 63 is slidable relative to the convex slide bodies 64. The direction of the relative movement between the integral constitution including the convex slide bodies 64 and the concave slide body 63 corresponds to the axial direction of the damping device 61.

In this manner, the integral constitution including the convex slide bodies 64 which support the concave slide body 63 in the relatively slidably manner includes two guide bodies 68, 69 which guide the movement of the concave slide body 63. One guide body 68 supports the concave slide body 63 in a movable manner in a state where the support plate portion 63a of the concave slide body 63 is allowed to pass through the guide body 68. The guide body 68 is a member having an approximately quadrangular annular columnar shape. Between the pair of support bodies 66, a hole portion which conforms to a profile of the support plate portion 63 is formed in the guide body 68, and the support plate portion 63a is allowed to pass through the hole portion.

On the other hand, the other guide body 69 supports the concave slide body 63 in a movable manner in a state where an extending portion 63b of the concave slide body 63 which is formed on a side opposite to a side where the support plate portion 63a is formed is allowed to pass through the guide body 69. The extending portion 63b is formed on the concave slide body 63 on a side opposite to the support plate portion 63a in a plate shape in the same manner as the support plate portion 63a, wherein the extending portion 63b extends from the portion of the concave slide body 63 where the slide surfaces are slidable relative to the convex slide bodies 64. Accordingly, the guide body 69 is constituted in the same manner as the guide body 68 such that a hole portion which conforms to a profile of the extending portion 63b is formed in the guide body 69 and the extending portion 63b is allowed to pass through the hole portion.

The guide bodies 68, 69 which guide the movement of the concave slide body 63 in this manner are fixed to the support bodies 66 by a suitable method such as bolts or welding, for example, in a state where the guide bodies 68, 69 are sandwiched between the pair of support bodies 66. That is, two guide bodies 68, 69 are fixed to the support bodies 66 and hence, the guide bodies 68, 69 are included in the integral constitution which is movable relative to the concave slide body 63.

The damping device 61 having the above-mentioned constitution changes a height (size in the vertical direction, the same definition being used hereinafter) of the slide body mechanism 62 against a biasing force of the leaf springs 65 due to the relative sliding between the concave slide body 63 and the pair of convex slide bodies 64 which constitute the slide body mechanism 62 so that the damping device 61 receives a biasing force in the slide body pushing direction from the leaf springs 65. Further, along with the increase of a displacement amount of the slide bodies consisting of the concave slide body 63 and the convex slide bodies 64, the damping device 61 increases the height of the slide body mechanism 62 thus increasing the biasing force in the slide body pushing direction which the damping device 61 receives from the leaf springs 65. Due to such a constitution, the damping device 61 is configured such that a frictional force which acts as a damping force and is generated between the concave slide body 63 and the convex slide bodies 64 is increased in proportion to the increase of a displacement amount of the slide bodies.

The structure of the slide body mechanism 62 which is constituted of the concave slide body 63 and the convex slide bodies 64 is specifically explained. Here, the convex slide bodies 64 which are arranged on an upper portion and a lower portion of the slide body mechanism 62 and make a pair are formed symmetrically in the vertical direction with respect to the relationship with the concave slide body 63. Accordingly, in the explanation made hereinafter, only the relationship between the upper convex slide body 64 and the concave slide body 63 is mainly explained and, the explanation of the relationship between the lower convex slide body 64 and the concave slide body 63 is omitted while describing them using the same symbols. In the explanation made hereinafter, for the sake of convenience, the direction along which the convex slide body 64 slides with respect to the concave slide body 63 is assumed as the operating direction, one direction of the operating direction (right side in FIG. 27, see arrow F) is assumed as a front side, and the other direction of the operating direction (left side in the same drawing, see arrow R) is assumed as a rear side.

As shown in FIG. 27 to FIG. 33, in the slide body mechanism 62, in the same manner as the slide body mechanism 2 of the first embodiment, the concave slide body 63 and the convex slide body 64 have a recessed portion and a projecting portion respectively at portions on sides where the concave slide body 63 and the convex slide body 64 face each other in an opposed manner, and the concave slide body 63 and the convex slide body 64 are slidably engaged with each other by fitting engagement clue to the recessed portion and projecting portion. Accordingly, the slide body mechanism 62 includes, as the concave/convex portion, a groove portion 71 formed on a concave slide body 63 side and a projecting portion 72 formed on a convex slide body 64 side.

That is, in the damping device 61 of this embodiment, the concave slide body 63 has the groove portion 71 on an end portion (surface portion) thereof on a side which faces the convex slide body 64 constituting a sliding counterpart slide body in an opposed manner. The groove portion 71 opens upward while extending along the direction that the concave slide body 63 slides relative to the convex slide body 64 in a reciprocating manner (operating direction), and forms a concave shape as viewed in the operating direction.

In the concave slide body 63, the groove portion 71 is formed on a slide surface forming portion 63d having a larger vertical size than that of other portions such as the support plate portion 63a and the extending portion 63b. That is, in the concave slide body 63, the slide surface forming portion 63d is a portion which projects more in the vertical direction than other portions such as the support plate portion 63a and the extending portion 63b. On both sides of the slide surface forming portion 63d in the longitudinal direction (axial direction of the damping device 61), the support plate portion 63a and the extending portion 63b are respectively formed along the longitudinal direction of the slide surface forming portion 63d in an extending manner from vertically intermediate portions of the slide surface forming portion 63d.

On an upper surface portion of the concave slide body 63 on which the groove portion 71 is formed, groove end surfaces 71a which are two portions forming open-side end surfaces of the groove portion 71 and a groove bottom surface 71b which is a bottom surface of the groove portion 71 are formed. Two groove end surfaces 71a are formed coplanar. Between two groove end surfaces 71a and the groove bottom surface 71b, inner side surfaces 71c which face each other in an opposed manner in the lateral direction are formed. The inner side surfaces 71c which face each other in an opposed manner are formed approximately parallel to each other.

Figure 29:
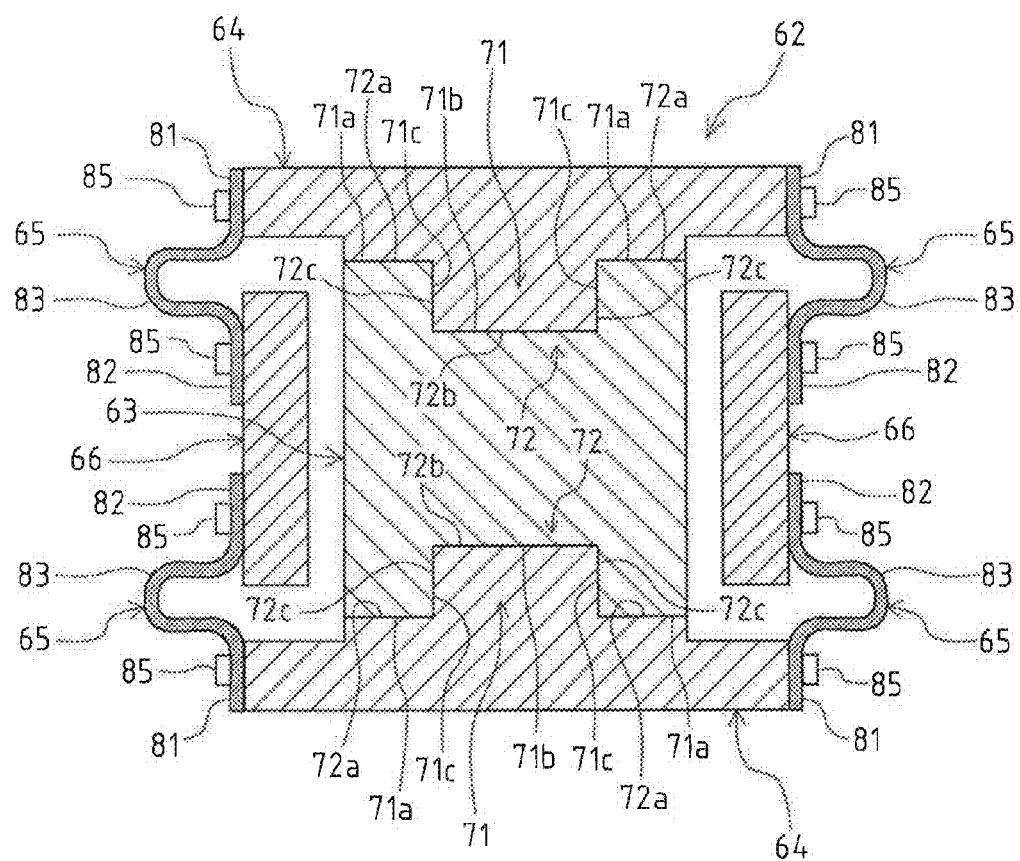
FIG. 29 is a cross-sectional view taken along a line XXIX-XXIX in FIG. 27.
Figure 30:
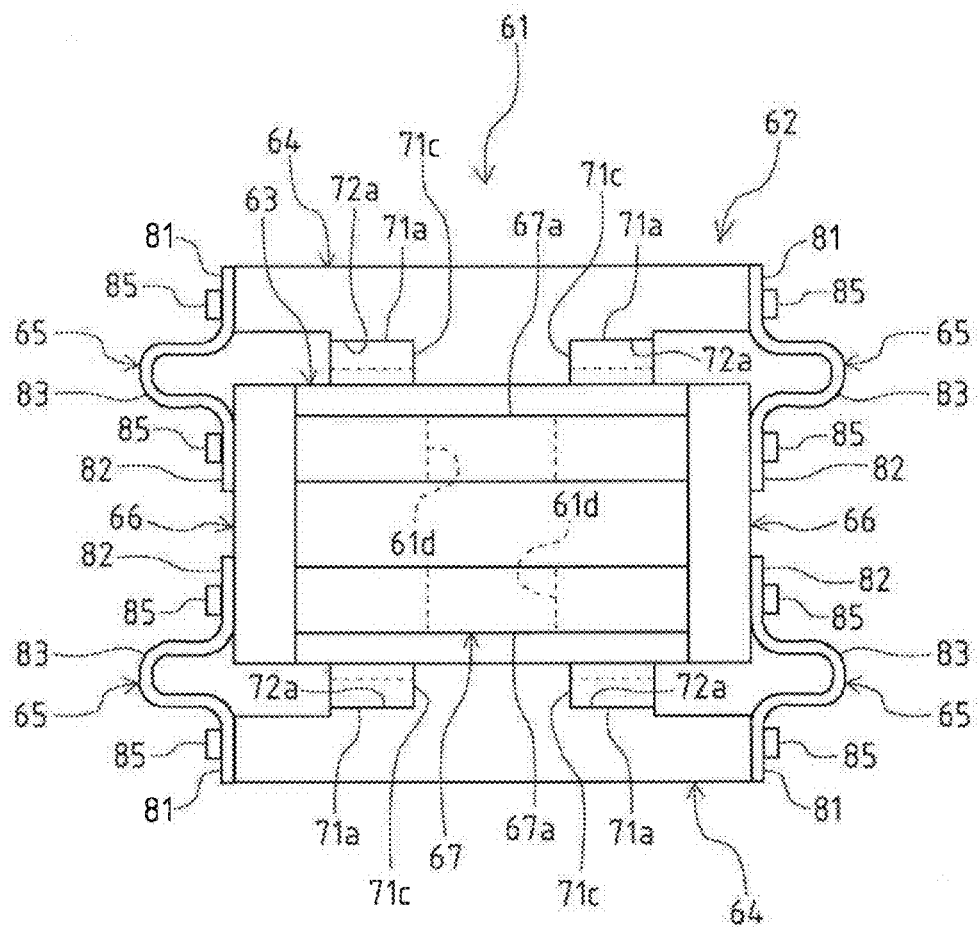
FIG. 30 is a view as viewed in the direction of an arrow D in FIG. 28.
Figure 31:
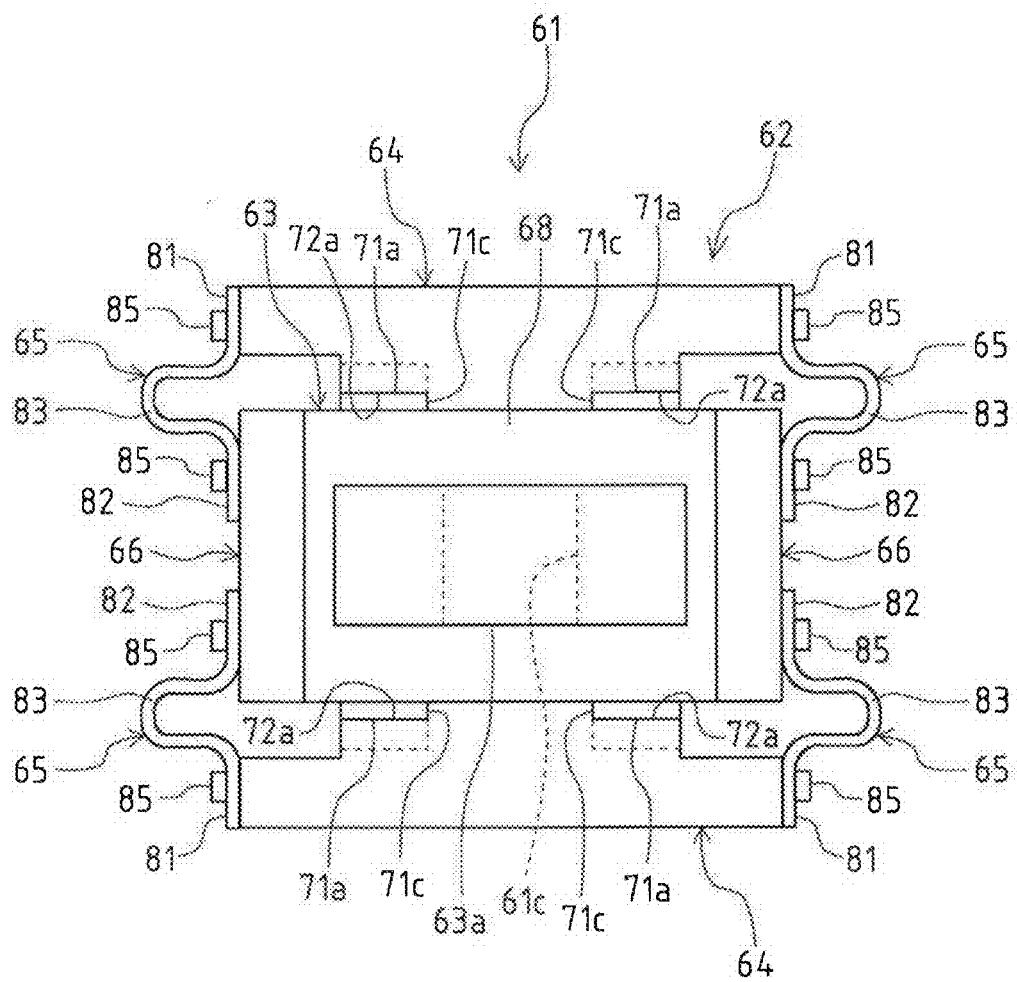
FIG. 31 is a view as viewed in the direction of an arrow E in FIG. 28.
Figure 32:
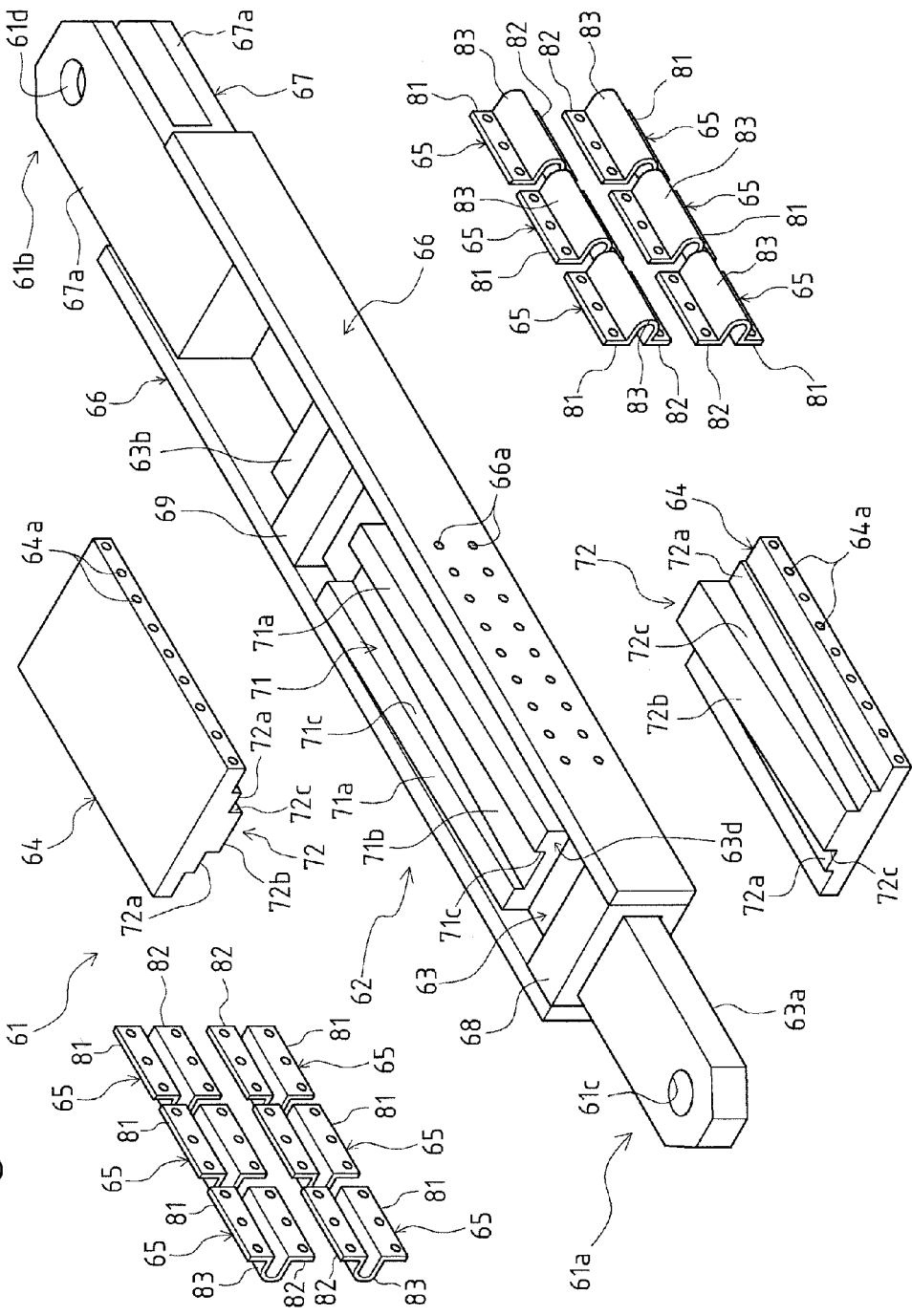
FIG. 32 is an exploded perspective view showing the constitution of the vibration damping device according to the second embodiment of the present invention.
Figure 33:
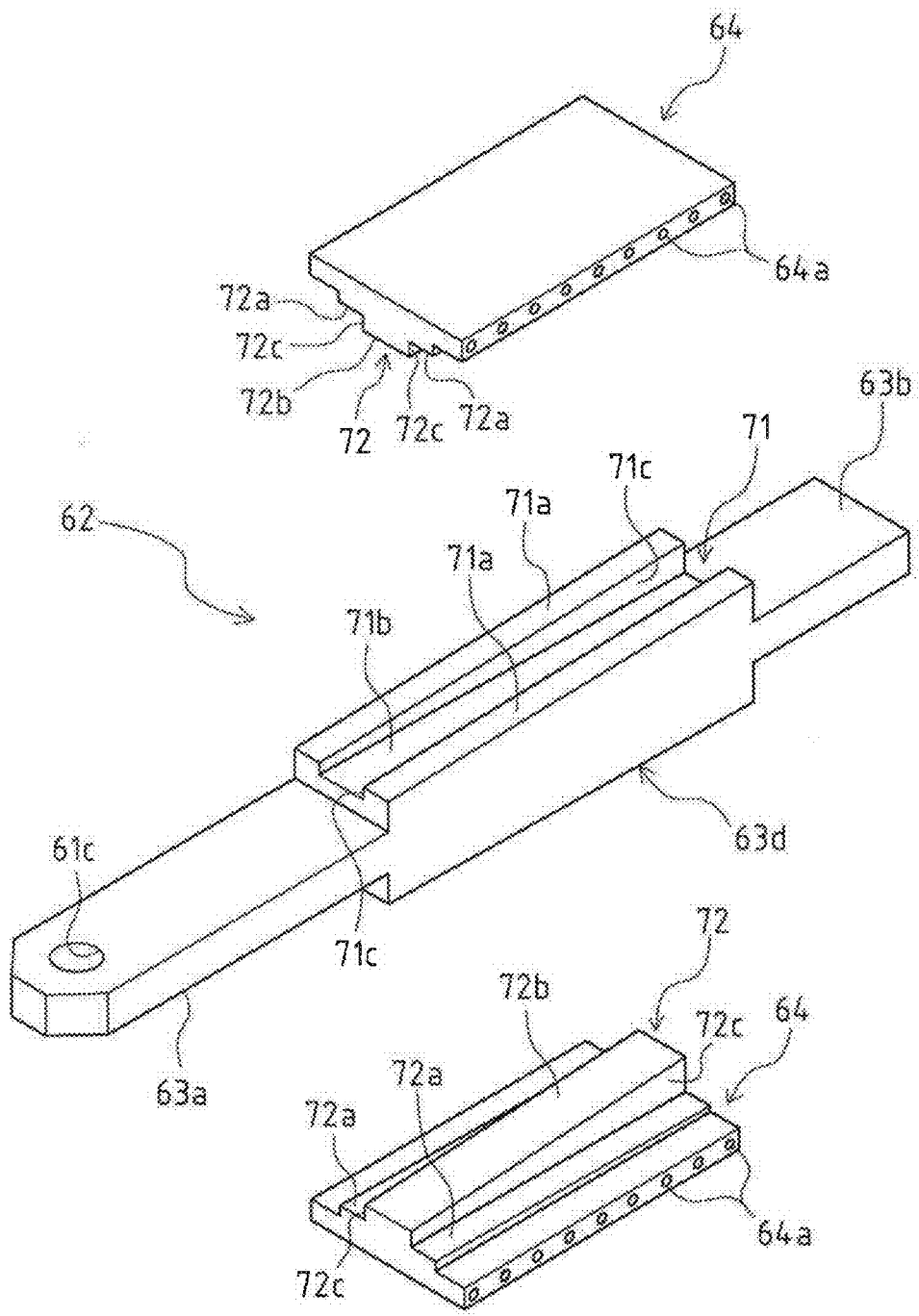
FIG. 33 is an exploded perspective view showing the constitution of a slide body mechanism according to the second embodiment of the present invention.

In this manner, the concave slide body 63 having the groove portions 71 on the surface portions on sides where the concave slide body 63 face the convex slide bodies 64 in an opposed manner have the groove portion 71 on both upper and lower surface sides thereof so that the concave slide body 63 has an approximately H shape as a cross-sectional shape as viewed in the axial direction (see FIG. 29).

Further, in the damping device 61 of this embodiment, the convex slide body 64 has the projecting portion 72 on an end portion (surface portion) thereof on a side where the convex slide body 64 faces the concave slide body 63 which is the sliding counterpart slide body in an opposed manner. The projecting portion 72 extends along the operating direction and projects downward thus forming a projecting shape as viewed in the operating direction.

The projecting portion 72 is a portion where a projection projects downward on a lower end surface portion of the convex slide body 64. Accordingly, on a lower end portion of the convex slide body 64, shoulder surfaces 72a forming proximal end surfaces of the projecting portion 72 at two positions and a projecting portion end surface 72b forming a projection-side end surface of the projecting portion 72 are formed. Two shoulder surfaces 72a are surfaces of the projecting portion 72 from which a projection projects, and these shoulder surfaces 72a are formed to arranged coplanar with each other. Outer side surfaces 72c which are directed toward sides opposite to each other in the lateral direction are formed between two shoulder surfaces 72a and the projecting portion end surface 72b. The outer side surfaces 72c which are directed to sides opposite to each other are formed approximately parallel to each other.

The groove portion 71 and the projecting portion 72 which are slidably engaged with each other by fitting engagement are formed such that a width size of the groove of the groove portion 71 and a width size of the projection of the projecting portion 72 are set substantially equal. That is, a size between the inner side surfaces 71c which form the groove portion 71 and a size between the outer side surfaces 72c which form the projecting portion 72 are set substantially equal.

As described above, in the constitution where the concave slide body 63 and the convex slide body 64 are slidably engaged with each other by fitting engagement between the groove portion 71 and the projecting portion 72, in the same manner as the case in the first embodiment, the concave slide body 63 and the convex slide body 64 have two kinds of slide surfaces respectively.

That is, out of two kinds of slide surfaces, the slide surfaces of one kind are formed of a slanted surface (front-side-use slide surface) having an ascending gradient toward a front side such that the slide surfaces of one kind are brought into contact with each other in a state where the convex slide body 64 is positioned in front of the neutral position with respect to the concave slide body 63 and the convex slide body 64 is raised along with the displacement of the convex slide body 64 toward a front side from the neutral position. Further, out of two kinds of slide surfaces, the slide surfaces of other kind are formed of a slanted surface (rear-side-use slide surface) having an ascending gradient toward a rear side such that the slide surfaces of the other kind are brought into contact with each other in a state where the convex slide body 64 is positioned behind the neutral position with respect to the concave slide body 63, and the convex slide body 64 is raised along with the displacement of the convex slide body 64 by sliding toward a rear side from the neutral position.

As shown in FIG. 29 to FIG. 33, in this embodiment, in the same manner as the first embodiment, in the concave slide body 63, the groove end surfaces 71a which form the groove portion 71 are used as the front-si de-use slide surfaces, and the groove bottom surface 71b which forms the groove portion 71 is used as the rear-side-use slide surface. In the convex slide body 64, the shoulder surfaces 72a which form the projecting portion 72 are used as the front-side-use slide surfaces, and the projecting portion end surface 72b which forms the projecting portion 72 is used as the rear-side-use slide surface. In this manner, the concave slide body 63 and the convex slide body 64 respectively have two front-side-use slide surfaces and one rear-side-use slide surface.

In the slide body mechanism 62, a state where the convex slide body 64 is at a center position in the long-side direction (longitudinal direction) with respect to the slide surface forming portion 63d corresponds to a state where the convex slide body 64 is at a neutral position with respect to the concave slide body 63 (neutral state). In both a moving step of the convex slide body 64 toward a front side from the neutral state and a moving step of the convex slide body 64 toward a rear side from the neutral state, due to the respective gradients of the front-side-use slide surfaces and the rear-side-use slide surfaces, a height of the slide body mechanism 62 is increased in proportion to the increase of a displacement amount of the slide body.

Accordingly, during the movement of the convex slide body 64 toward a front side from the neutral state, only the front-side-use slide surfaces of the concave slide body 63 and the front-side-use slide surfaces of the convex slide body 64 are brought into contact with each other. That is, only the groove end surfaces 71a and the shoulder surfaces 72a are brought. Into contact with each other. On the other hand, during the movement of the convex slide body 64 toward a rear side from the neutral state, only the rear-side-use slide surface of the concave slide body 63 and the rear-side-use slide surface of the convex slide body 64 are brought into contact with each other. That is, only the groove bottom surface 71b and the projecting portion end surface 72b are brought into contact with each other. Further, in the neutral state, a state is brought about where the front-side-use slide surfaces of the concave slide body 63 and the front-side-use slide surfaces of the convex slide body 64 are brought into contact with each other and, at the same time, the rear-side-use slide surface of the concave slide body 63 and the rear-side-use slide surface of the convex slide body 64 are brought into contact with each other.

In the damping device 61 of this embodiment, in the same manner as the first embodiment, the groove end surfaces 71a of the concave slide body 63 and the shoulder surfaces 72a of the convex slide body 64 which constitute the front-side-use slide surfaces function as the first slide surfaces respectively. Further, the groove bottom surface 71b of the concave slide body 63 and the projecting portion end surface 72b of the convex slide body 64 which constitute the rear-side-use slide surfaces function as the second slide surfaces respectively.

As described above, the damping device 61 of this embodiment includes, as the slide bodies which are arranged so as to be slidable relative to each other in a reciprocating manner in a state where these slide bodies are directly or indirectly fixed to the structure and face each other in an opposed manner, three slide bodies in total consisting of one concave slide body 63 and two convex slide bodies 64 which are arranged above and below the concave slide body 63. That is, it is sufficient that the slide body mechanism 62 includes at least one pair of slide bodies as slide bodies which are arranged to be slidable relative to each other. Accordingly, the slide body mechanism 62 may have the constitution which includes four or more concave slide bodies and the convex slide bodies which are arranged alternately in the vertical direction, for example. Further, although the slide body mechanism 62 includes the convex slide bodies 64 on both upper and lower sides of the concave slide body 63 in this embodiment, one of the convex slide bodies 64 arranged on the upper and lower sides of the concave slide body 63 may be omitted. Further, the concave and convex shapes formed in the slide body mechanism 62 may be reversed vertically.

Further, in the damping device 61 of this embodiment, the slide body mechanism 62 is configured to be extended or shrunken due to the relative sliding in a reciprocating manner, and a damping force against vibrations of the structure is applied in the form of an axial force which is generated along the extending/shrinking direction due to the relative sliding in a reciprocating manner. That is, in the damping device 61 of this embodiment, the direction along which the concave slide body 63 and the convex slide bodies 64 slide relative to each other is set as the axial direction, and the first support portion 61a and the second support portion 61b which are fixed to the structure are provided on both axial end sides of the slide body mechanism 62 thus constituting an axial-force-member-type damping device.

The damping device 61 of this embodiment can, in addition to advantageous effects substantially equal to the advantageous effects acquired by damping device 1 of the first embodiment, acquire the following advantageous effects. The damping device 61 of this embodiment is an axial-force-member-type damping device and hence, the damping device can acquire the higher general-purpose-use property.

To be more specific, by changing the setting of a size of the damping device 61 in the axial direction or the like, the damping device 61 of this embodiment is easily applicable to houses in general or the supporting of pipes used in various plants. Particularly, the piping in the plant has the complicated structure compared to the piping used structures in general and hence, it is desirable to use the damping device 61 of this embodiment in such piping. Further, the damping device 61 of this embodiment can be mounted on the structure by fixing the first support portion 61a and the second support portion 61b on both axial end portions of the damping device 61. Accordingly, the damping device 61 of this embodiment can be also easily applied to existing structures.

According to the damping device 61 of this embodiment, the number of slide surfaces is two times as large as the number of slide surfaces in the damping device 1 of the first embodiment and hence, the damping performance can be doubled. Therefore, with respect to the damping device 61 of this embodiment, according to the static kinetic characteristic explained in conjunction with the damping device 1 of the first embodiment, the relationship between a force and the deformation and an equivalent viscous damping coefficient can be expressed by the following formulae (35), (36), and (37).

$$H = 2\lambda(S_y i |u_d| + V_0) \quad (35)$$

[Numerical formula 14]

$$\frac{H}{S_y a_d} = 2\lambda \left( \frac{V_0}{S_y a_d} + \frac{i|u_d|}{a_d} \right) \quad (36)$$

[Numerical formula 15]

$$c_e = \frac{2\mu_0}{\pi \theta} \left( 2iS_y + \frac{4V_0}{a_d} \right) \quad (37)$$

The formula (35) corresponds to the formula (7) explained in conjunction with the first embodiment, and expresses the relationship between a force and the relative displacement. The formula (36) corresponds to the formula (12) explained in conjunction with the first embodiment, and expresses the relationship between a force and the relative displacement. The formula (37) corresponds to the formula (15) explained in conjunction with the first embodiment, and expresses an equivalent viscous damping coefficient.

Figure 34:
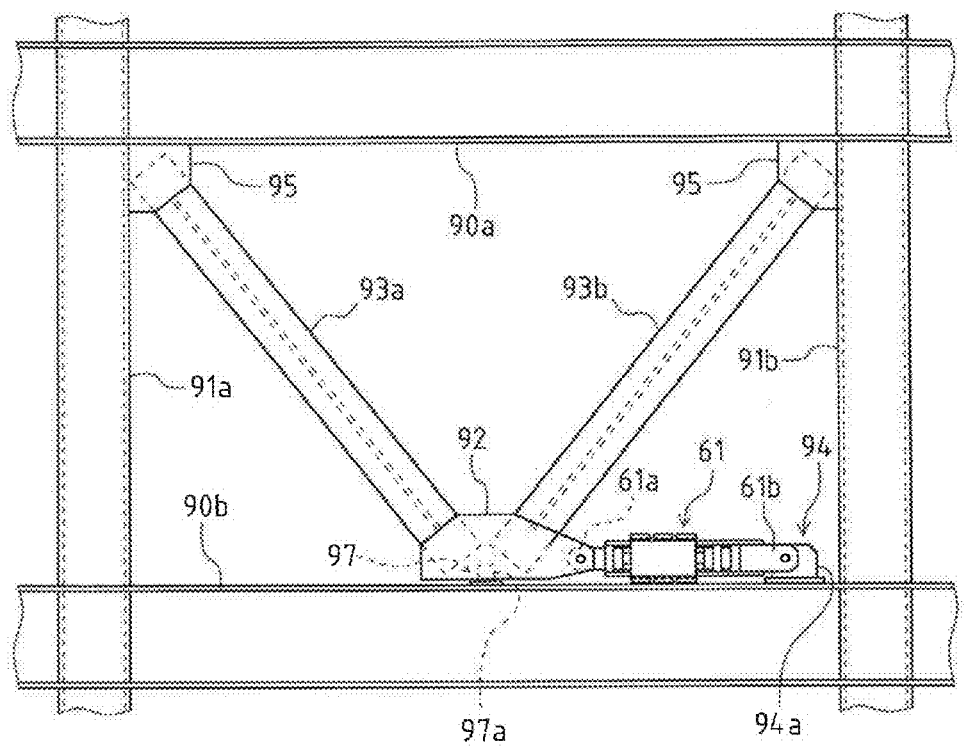
FIG. 34 is a front view showing the application example of the vibration damping device according to the second embodiment of the present invention.
Figure 35:
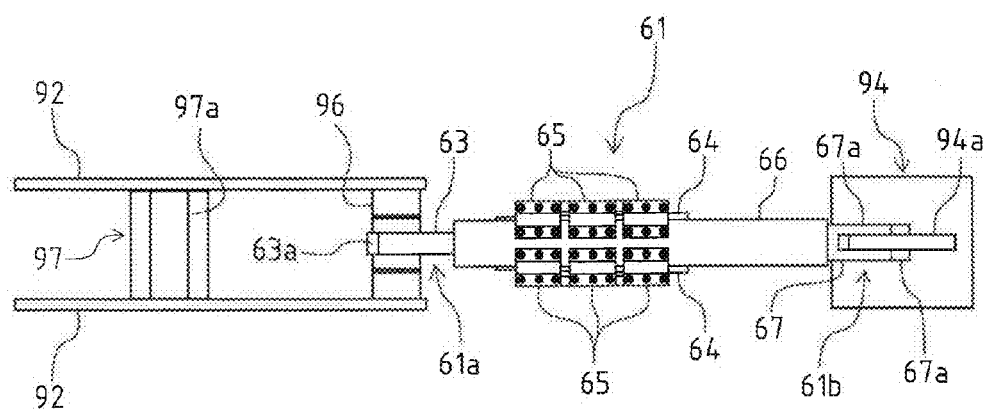
FIG. 35 is a plan view showing the application example of the vibration damping device according to the second embodiment of the present invention.

An application example of the damping device 61 according to the second embodiment of the present invention is explained. FIG. 34 and FIG. 35 show one example of the arrangement of the damping device 61 where the damping device 61 is applied to a steel frame building. In the same manner as the above-mentioned application example of the damping device 1 of the first embodiment, this application example is an application example of the damping device 61 which is applied to a steel frame formed of upper and lower beams 90a, 90b and left and right pillars 91a, 91b. In this application example, between the left and right pillars 91a, 91b, on an upper side of the lower beam 90b, the damping device 61 is arranged at one portion on a right side (see FIG. 34). In this application example, in the same manner as the above-mentioned application example of the first embodiment, the damping device 61 is arranged such that the sliding direction along which the concave slide body 63 and the convex slide bodies 64 slide relative to each other (the axial direction of the damping device 61) extends along the direction along which the upper and lower beams 90a, 90b are arranged.

To be more specific, the damping device 61 is arranged on the lower beam 90b such that the axial direction of the damping device 61 becomes approximately parallel to the extending direction (lateral direction) of the beam 90b. The first support portion 61a which is provided to one axial end portion of the damping device 61 (left end portion in FIG. 34) is fixed to a V-shaped brace constituted of left and right braces 93a, 93b arranged within the steel frame by way of a pair of gusset plates 92 mounted on the lower beam 90b. Further, the second support portion 61b which is provided to the other axial end portion of the damping device 61 (right end portion in FIG. 34) is fixed to a connection base 94 mounted on the lower beam 90b.

The pair of gusset plates 92 is arranged at an approximately center position in the lateral direction of the lower beam 90b. The left and right braces 93a, 93b which constitute the V-shaped brace respectively have a lower end side thereof fixed between the pair of gusset, plates 92, and are arranged such that the left and right braces 93a, 93b extend obliquely toward left and right upper portions from the approximately center position where the gusset plate 92 is positioned. An upper end of the left brace 93a is fixed to a corner portion formed by the upper beam 90a and the left pillar 91a by way of a support plate 95 arranged between the beam 90a and the pillar 91a, and an upper end of the right brace 93b is fixed to a corner portion formed by the upper beam 90a and the right pillar 91b by way of a support plate 95 arranged between the beam 90a and the pillar 91b. That is, in this application example, the damping device 61 is mounted on the steel frame such that the first support portion 61a is supported by the V-shaped brace which is constituted of the left and right braces 93a, 93b by way of the pair of gusset plates 92, and the second support portion 61b is supported by the connection base 94.

The damping device 61 is arranged such that the penetrating direction of the hole portions 61c, 61d formed in the first support portion 61a and the second support portion 61b (see FIG. 27) take the horizontal direction which is perpendicular to the extending direction of the beams 90a, 90b (the direction perpendicular to a surface of paper on which the drawing is drawn in FIG. 34). The first support portion 61a is connected to the pair of gusset, plates 92 such that the support plate portion 63a is supported on a support shaft portion 96 interposed between the pair of gusset plates 92 using the hole portion 61c. On the other hand, the second support portion 61b is connected to the connection base 94 such that the support plate portion 67a is supported on the support plate 94a using the hole portion 61d in a state where the support plate 94a which is mounted on the connection base 94 in a raised manner is sandwiched between the pair of support plate portions 67a of the clevis 67.

Further, in this application example, a stopper 97 is arranged between the pair of gusset plates 92. The stopper 97 includes an engaging portion 97a formed as a projecting portion on an upper side of the lower beam 90a. The engaging portion 97a has an approximately same size as a distance between the pair of gusset plates 92 in the direction along which the pair of gusset plates 92 face each other in an opposed manner (vertical direction in FIG. 35), and is arranged in a state where the engaging portion 97a is approximately brought into contact with the pair of gusset plates 92.

As described above, in this application example, the damping device 61 is mounted on the steel frame by way of the V-shaped brace such that the direction along which the upper and lower beams 90a, 90b are displaced in the left-and-right horizontal direction and the operating direction of the damping device 61 agree with each other. Due to such a constitution, the steel frame can acquire a damping effect in the left-and-right horizontal direction.

There may be a case where the upper and lower beams 90a, 90b are displaced in the horizontal direction orthogonal to the extending direction of the beams 90a, 90b (the direction perpendicular to a surface of paper on which the drawing is drawn in FIG. 34). Even in such a case, the engaging portion 97a of the stopper 97 restricts the movement of the pair of gusset plates 92 so that the removal of the damping device 61 is prevented. The displacement of the beams 90a, 90b in the horizontal direction orthogonal to the extending direction of the beams 90a, 90b can be absorbed by forming the first support portion 61a and the second support portion 61b formed on both end portions of the damping device 61 as spherical supports. In this application example, the V-shaped brace which is connected to the damping device 61 may be replaced with a bearing wall (reaction wall). This application example is also applicable to, in addition to a steel frame building, a concrete building, a steel encased reinforced concrete building, a wooden building or the like in the same manner.

Figure 36:
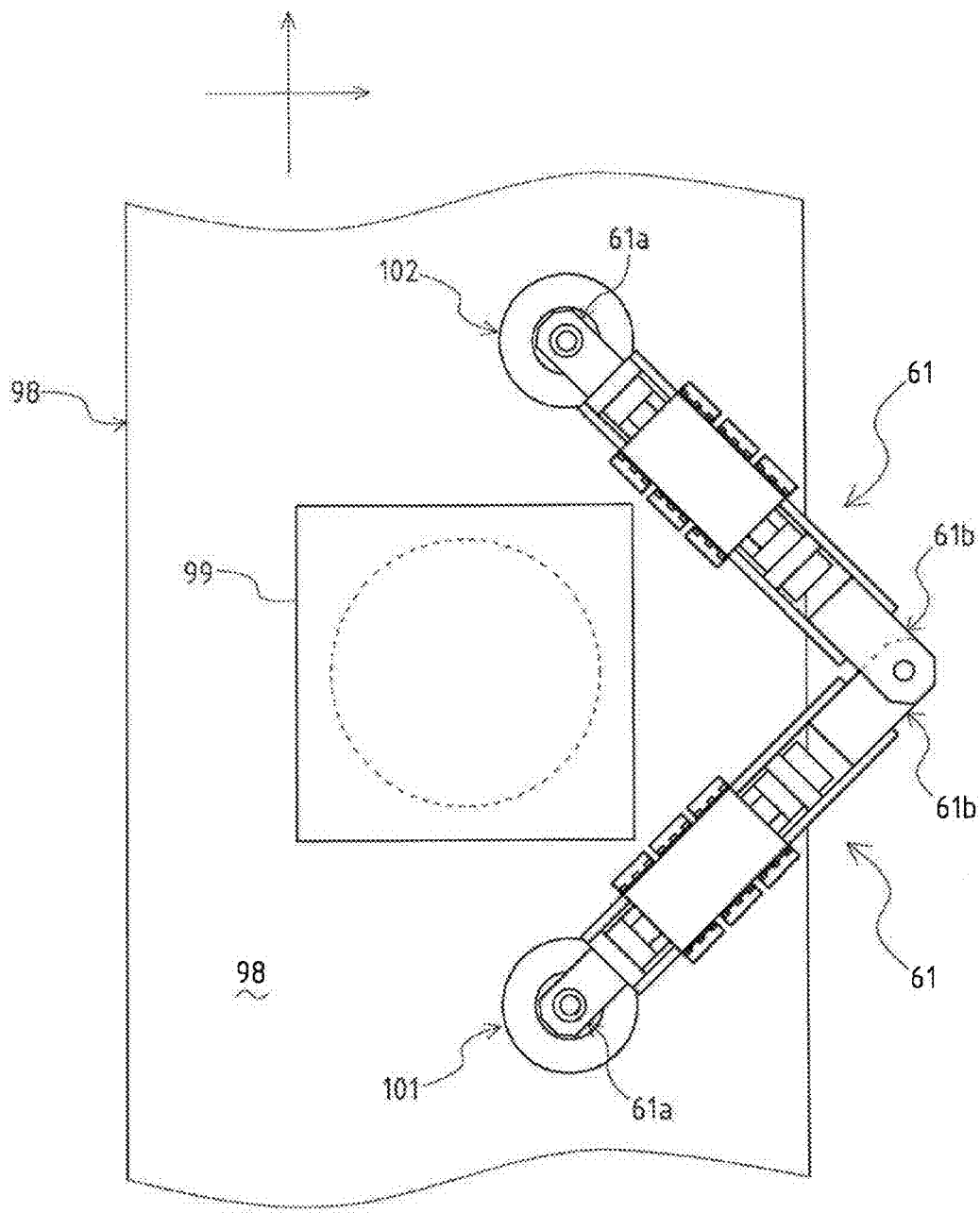
FIG. 36 is a plan view showing the application example of the vibration damping device according to the second embodiment of the present invention.
Figure 37:
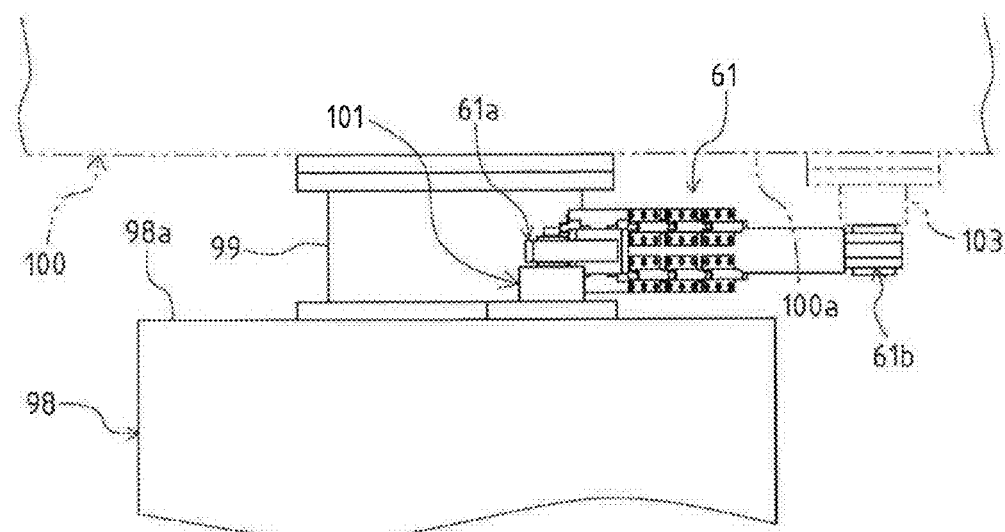
FIG. 37 is a side view showing the application example of the vibration damping device according to the second embodiment of the present invention.

Another application example of the damping device 61 according to the second embodiment of the present invention is explained. FIG. 36 and FIG. 37 show one example of the arrangement of the damping devices 61 in a case where the damping devices 61 are applied to a quake absorbing bridge. As shown in FIG. 36 and FIG. 37, in the quake absorbing bridge, a bridge girder 100 is supported on a bridge pier 98 by way of a quake absorbing support 99. In the quake absorbing bridge, the bridge girder 100 moves in the bridge axial direction (the vertical direction in FIG. 36) and also moves in the direction perpendicular to the bridge axial direction (the lateral direction in the same drawing). That is, in the quake absorbing bridge, the bridge girder 100 mainly moves within a plane in the horizontal direction at a height position where the bridge girder 100 is supported on the bridge pier 98.

As shown in FIG. 36 and FIG. 37, two damping devices 61 are combined with each other in this application example. A support portion (first support portion 61a in this application example) provided to one end side of each damping device 61 is supported on an upper side of the bridge pier 98, and a support portion (second support portion 61b in this application example) provided to the other end side of each damping device 61 is supported on a lower side of the bridge girder 100 which is supported on the bridge pier 98 by way of the quake absorbing support 99.

To be more specific, the first support portions 61a of the respective damping devices 61 are respectively supported by connection bases 101, 102 which are arranged around the quake absorbing support 99 on an upper surface 98a of the bridge pier 98. Further, both second support portions 61b of two damping devices 61 are supported by a connection base 103 mounted on a lower surface 100a of the bridge girder 100. The first support portions 61a and the second support portions 61b of the respective damping devices 61 are rotatably supported on the respective connection bases 101, 102, 103 using the hole portions 61c, 61d (see FIG. 27). Accordingly, the second support portions 61b of two damping devices 61 are coaxially and rotatably supported on the connection base 103. In this application example, with respect, to two damping devices 61, the first support portions 61a are supported by two different portions (connection base 101, 102) on the bridge pier 98, and the second support portions 61b are supported on one common portion (connection base 103) on the lower surface of the bridge girder 100 and hence, two damping devices 61 are arranged in a V shape as viewed in a plan view (see FIG. 36).

In this application example, the combination of two damping devices 61 arranged in a V shape can cope with vibrations generated in the arbitrary direction within a plane in the horizontal direction along which the bridge girder 100 moves and hence, a damping effect can be acquired in any directions. By forming the first support portion 61a and the second support portion 61b on both end portions of the damping device 61 as spherical supports, the respective damping devices 61 can be inclined in the vertical direction and hence, a damping effect which also takes into account the vertical movement of the bridge girder 100 can be acquired.

Figure 38:
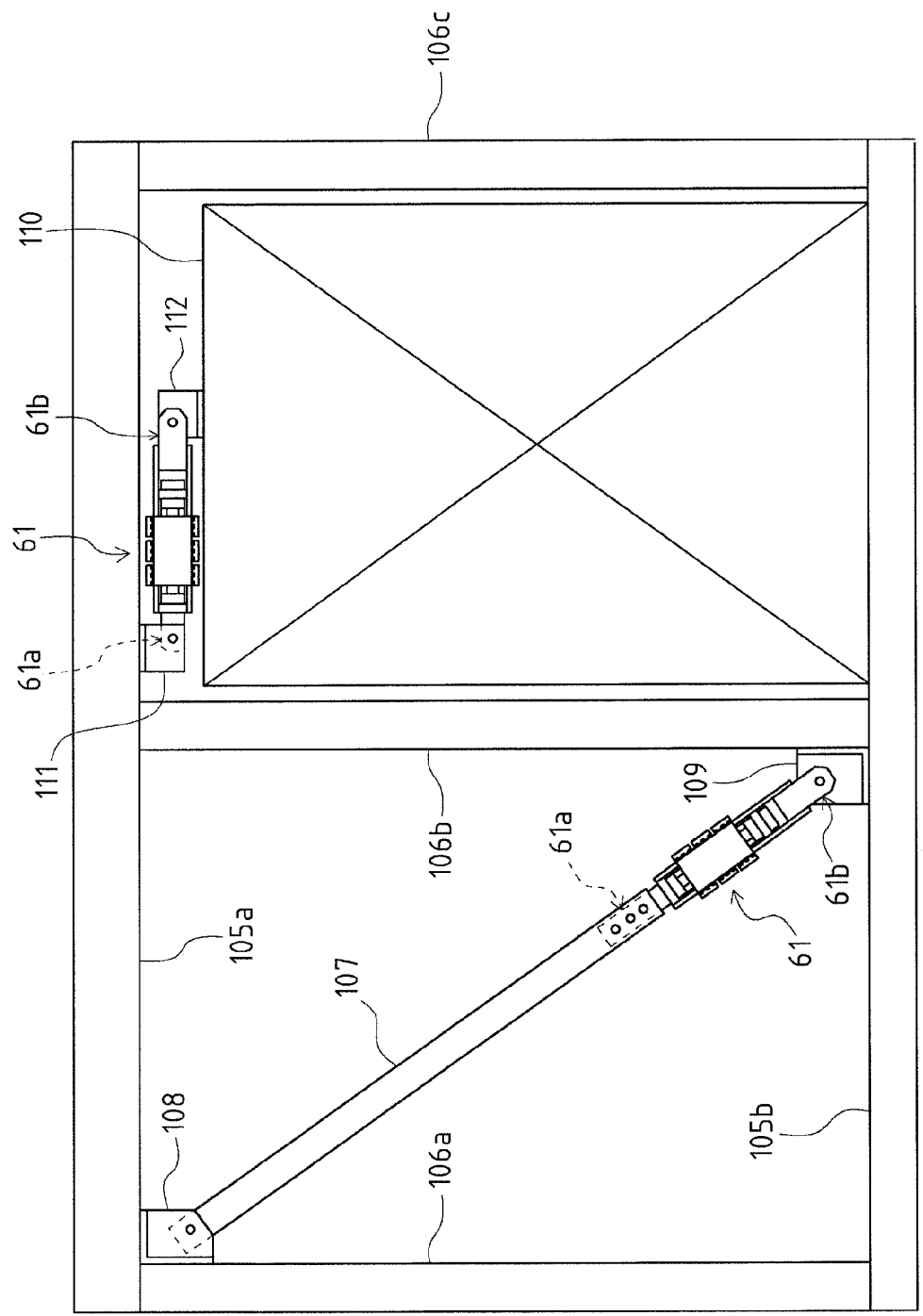
FIG. 38 is a view showing the application example of the vibration damping device according to the second embodiment of the present invention.

Another application example of the damping device 61 according to the second embodiment of the present invention is explained. FIG. 38 shows one example of the arrangement of the clamping device 61 in a case where the damping devices 61 are applied to a wooden house. As shown in FIG. 38, the wooden house of this example has the frame structure (hereinafter referred to as "wood frame") formed of upper and lower beams 105a, 105b which are arranged parallel to each other in the vertical direction and extend in the horizontal direction, and three pillars 106a, 106b, 106c which are arranged parallel to each other and extend in the vertical direction.

As shown in FIG. 38, this application example includes an example where the damping device 61 is used as a diagonal member in the wooden house (see the damping device 61 shown on a left side in FIG. 38), and an example where the damping device 61 is used together with a bearing wall (reaction wall) 110 (see the damping device 61 shown on a right side in the same drawing).

As shown in FIG. 38, the damping device 61 which is used as the diagonal member is mounted on the wood frame in a state where the damping device 61 is connected to a rod 107 which is arranged diagonally in a portion surrounded by the upper and lower beams 105a, 105b and a pair of pillars 106a, 106b which is arranged adjacent to each other. The damping device 61 is connected to one end side of the rod 107 such that the axial direction of the damping device 61 extends along the longitudinal direction of the rod 107. In this application example, the damping device 61 and the rod 107 are connected to each other by fixing a first support portion 61a of the damping device 61 to one end portion of the rod 107 using a bolt or the like.

A joint body of the damping device 61 and the rod 107 is diagonally arranged in the portion surrounded by the upper and lower beams 105a, 105b and the pair of pillars 106a, 106b which is adjacent to each other, wherein, in FIG. 38, one side of the joint body arranged on a left pillar 106a side constitutes an upper side of the connected body, the other side of the joint body arranged on a center pillar 106b side constitutes a lower side of the joint body, and a damping device 61 is mounted on the lower side of the joint body. Both end portions of the joint body constituted of the damping device 61 and the rod 107 are supported by the wood frame by way of connection plates 108, 109 respectively.

The upper connection plate 108 is arranged at a corner portion formed by the upper beam 105a and the left pillar 106a and between the beam 105a and the pillar 106a, and supports an upper end portion of the joint body constituted o the damping device 61 and the rod 107, that is, an upper end portion of the rod 107. On the other hand, the lower connection plate 109 is arranged at a corner portion formed by the lower beam 105b and the center pillar 106b and between the beam 105b and the pillar 106b, and supports a lower end portion of the joint body constituted of the damping device 61 and the rod 107, that is, a second support portion 61b of the damping device 61.

In this manner, according to the constitution where the damping device 61 is used as the diagonal member in the wood frame, due to the provision of the damping devices 61, the constitution can acquire a damping effect by way of the diagonally-arranged rod 107 with respect to the displacement of the upper and lower beams 105a, 105b in the left-and-right horizontal direction.

Further, as shown in FIG. 38, the damping device 61 which is used in combination with the bearing wall (reaction wall)

110 is arranged between the bearing wall 110 formed on the lower beam 105b and the upper beam 105a both of which are arranged between the center pillar 106b and the pillar 106c on a right side in FIG. 38. The damping device 61 is arranged such that the axial direction of the damping device 61 is approximately parallel to the beam 105a.

In this application example, a first support portion 61a of the damping device 61 is supported on the upper beam 105a by way of a connection plate 111 mounted on a lower surface of the upper beam 105a. A second support portion 61b of the damping device 61 is supported on the bearing wall 110 by way of a connection plate 112 arranged on an upper surface of the bearing wall 110.

In this manner, according to the constitution where the damping device 61 is used in combination with the bearing wall 110 in the wood frame, due to the provision of the damping device 61, the constitution can acquire a damping effect by way of the bearing wall 110 which is mounted on the lower beam 105b with respect to the displacement of the upper and lower beams 105a, 105b in the left-and-right horizontal direction.

As described above, the damping device 61 of this embodiment which is constituted as an axial-force-member-type damping device is applicable to various structures such as a steel frame building, a concrete building, a wooden building or a quake absorbing bridge so that the damping device 61 of this embodiment has a high general-purpose-use property. Further, as described in the above-mentioned application example, the damping device 61 of this embodiment can be easily mounted on the structure by mounting the connection base, the connection plate or the like to the structure and hence, the damping device 61 of this embodiment is also easily applicable to existing structures.

Figure 39:
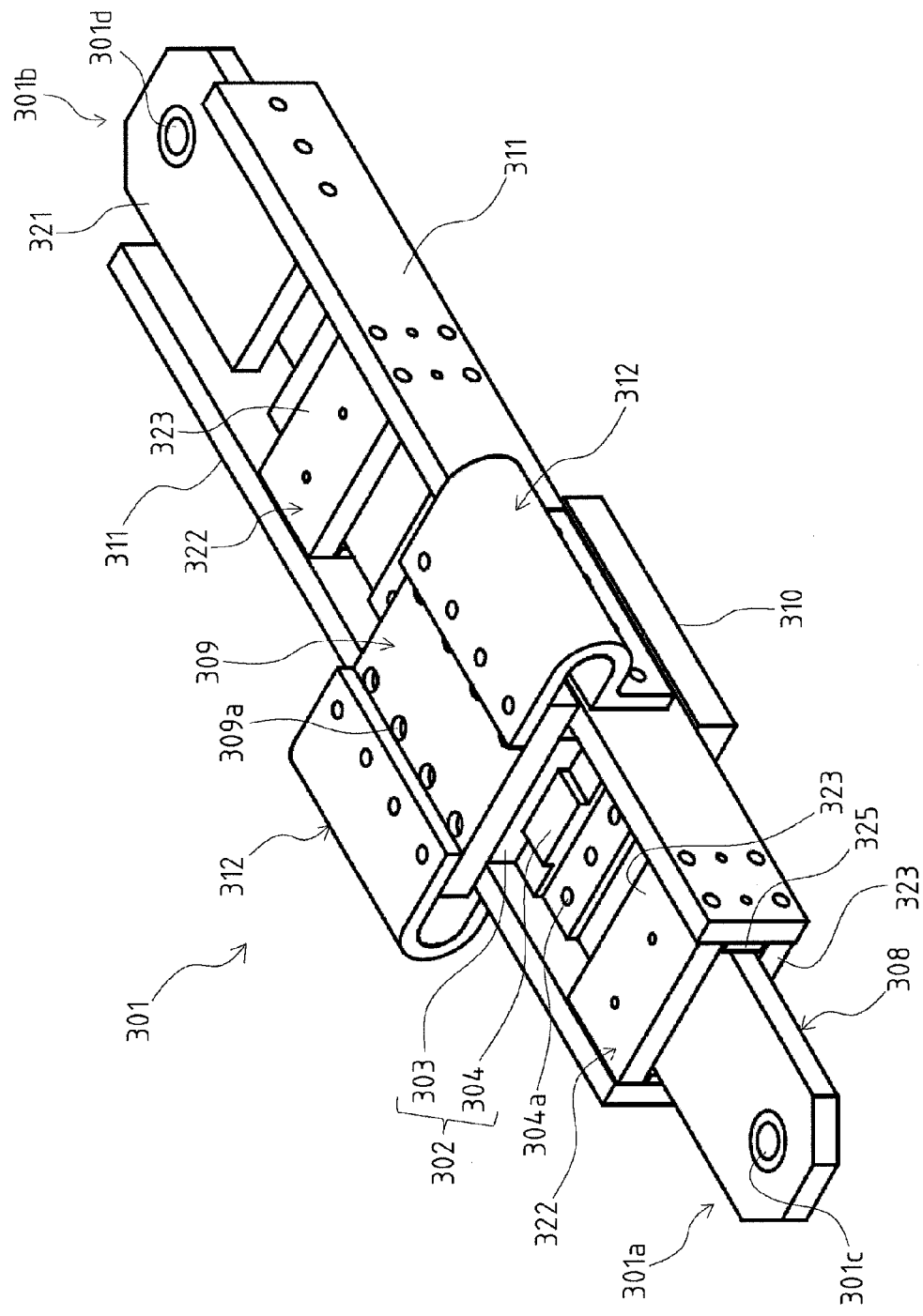
FIG. 39 is a perspective view showing the constitution of a vibration damping device according to a third embodiment of the present invention.

A third embodiment of the present invention is explained. Here, the explanation of contents which overlaps with the above-mentioned explanation of the contents of the above-mentioned embodiments is omitted when necessary. As shown in FIG. 39, a damping device 301 of this embodiment is formed into a shaft shape as a whole in the same manner as the damping device 61 of the second embodiment, and the axial direction of the damping device 301 is assumed as the direction along which a damping force is generated. That is, the damping device 301 of this embodiment is an axial-force-member-type damping device and is configured to be extended or shrunken in a state where the damping device 301 is biased in the axial direction, and the damping device 301 generates a damping force in the axial direction along with the extending/shrinking movement of the damping device 301. Different from the constitution of the damping device 61 of the first embodiment where the concave/convex combination constituted of the concave slide body and the convex slide body is provided to both surfaces sides which are arranged opposite to each other, the damping device 301 of this embodiment adopts the constitution where the concave/convex combination constituted of the concave slide body and the convex slide body is provided to only one side.

The damping device 301 has support portions (301a, 301b) which constitute portions to be fixed or connected to the structure at both axial end portions thereof respectively. In this embodiment, one support portion (a support portion on a left side in FIG. 39) is assumed as a "first support portion 301a", and the other support portion (a support portion on a right side in the same drawing) is assumed as a second support portion 301b.

As shown in FIG. 39 to 42, the damping device 301 includes: a slide body mechanism 302 having a concave slide body 303 and a convex slide body 304; a planar surface slide body mechanism 305 which includes a pair of flat plate slide bodies (306,307); a center axial force member 308; a concave/convex side support plate 309; a plane surface side support plate 310; a pair of side axial force members 311; and a pair of leaf springs 312. In the same manner as the first embodiment, the damping device 301 of this embodiment is a slide-type damping device, and has the constitution where the damping device 301 uses a frictional force generated when the concave slide body 303 and the convex slide body 304 slide relative to each other and a friction force generated when the pair of flat plate slide bodies (306,307) slide relative to each other as a damping force, and these frictional forces are increased in proportion to an absolute value of the relative displacement between the respective slide bodies.

In this embodiment, the concave slide body 303 and the convex slide body 304 which constitute the convex/concave slide body mechanism 302 are a pair of slide bodies which are arranged such that these slide bodies are slidable relative to each other in a reciprocating manner in a state where these bodies face each other in an opposed manner. To be more specific, as shown in FIG. 41, FIG. 42, FIG. 44, FIG. 45 and the like, both the concave slide body 303 and the convex slide body 304 have an approximately rectangular plate-shaped profile as a whole, and a portion having a concave shape or a portion having a convex shape is formed on a plate surface portion on one side. The concave slide body 303 and the convex slide body 304 are provided in a concave/convex fitting engagement state where the portion which has a concave shape and the portion which has a convex shape face each other in an opposed manner.

Accordingly, the concave slide body 303 and the convex slide body 304 are arranged so as to be slidable relative to each other in a state where the convex slide body 303 and the convex slide body 304 face each other in an opposed manner and are engaged with each other by concave/convex fitting engagement. Both the concave slide body 303 and the convex slide body 304 having a profile of an approximately rectangular plate shape are arranged so as to be slidable relative to each other in a state where one surface portion of the concave slide body 303 and one surface portion of the convex slide body 304 face each other in an opposed manner while setting the longitudinal direction of one slide body as the sliding direction relative to the other slide body which constitutes a counterpart for one slide body. That is, a slide surface is formed on a portion having a concave shape with respect to the concave slide body 303, a slide surface is formed on a portion having a convex shape with respect to the convex slide body 304, and the concave slide body 303 and the convex slide body 304 are provided in a state where their slide surfaces face each other in an opposed manner. The slide direction of the concave slide body 303 and the convex slide body 304 corresponds to the axial direction of the damping device 301.

In this manner, the concave/convex slide body mechanism 302 of this embodiment is constituted of one concave slide body 303 and one convex slide body 304. In this embodiment, assume the direction that the concave slide body 303 and the convex slide body 304 face each other (vertical direction in FIG. 41) as the vertical direction of the damping device 301, wherein a concave slide body 303 side becomes an upper side and a convex slide body 304 side which is opposite to the concave slide body 303 side becomes a lower side. Also in this embodiment, assume the direction orthogonal to the direction that the concave slide body 303 and the convex slide body 304 face each other in an opposed manner as viewed in the axial direction of the damping device 301 (lateral direction in FIG. 41) as the lateral direction of the damping device 301.

The inner flat plate slide body 306 and the outer flat-plate slide body 307 which form a pair of flat-plate slide bodies constituting the flat surface slide body mechanism 305 are, in the same manner as the concave slide body 303 and the convex slide body 304 which constitute the concave/convex slide body mechanism 302, a pair of slide bodies which are arranged so as to be slidable relative to each other in a state where the inner flat plate slide body 306 and the outer flat-plate slide body 307 face each other in an opposed manner. However, different from the concave/convex slide body mechanism 302, the flat surface slide body mechanism 305 is provided in a state where the respective slide surfaces are formed of a planar surface and the planar surfaces are brought into contact with each other.

To be more specific, as shown in FIG. 41, FIG. 42, FIG. 46, FIG. 47 and the like, both the inner flat plate slide body 306 and the outer flat-plate slide body 307 have a profile of an approximately rectangular plate shape as a whole, and a portion which forms a plane constituting a slide surface for the counterpart slide body is formed on a plate surface portion of each slide body. The inner flat plate slide body 306 and the outer flat-plate slide body 307 are arranged in a state where the slide surfaces of the respective slide bodies 306, 307 face each other in an opposed manner and are brought into contact with each other.

Accordingly, the inner flat plate slide body 306 and the outer flat-plate slide body 307 are arranged so as to be slidable relative to each other in a state where the slide bodies 306, 307 are brought into contact with each other in an opposedly facing manner. Both the inner flat plate slide body 306 and the outer flat-plate slide body 307 having a profile of an approximately rectangular plate shape are arranged so as to be slidable relative to each other in a state where one surface portion of the inner flat plate slide body 306 and one surface portion of the outer flat-plate slide body 307 face each other in an opposed manner while setting the longitudinal direction of one slide body as the sliding direction relative to the other slide body which constitutes a counterpart for one slide body. That is, the inner flat plate slide body 306 and the outer flat-plate slide body 307 are arranged in a state where the respective slide surfaces face each other in an opposed manner. The slide direction of the inner flat plate slide body 306 and the outer flat-plate slide body 307 corresponds to the slide direction of the damping device 301.

Figure 42:
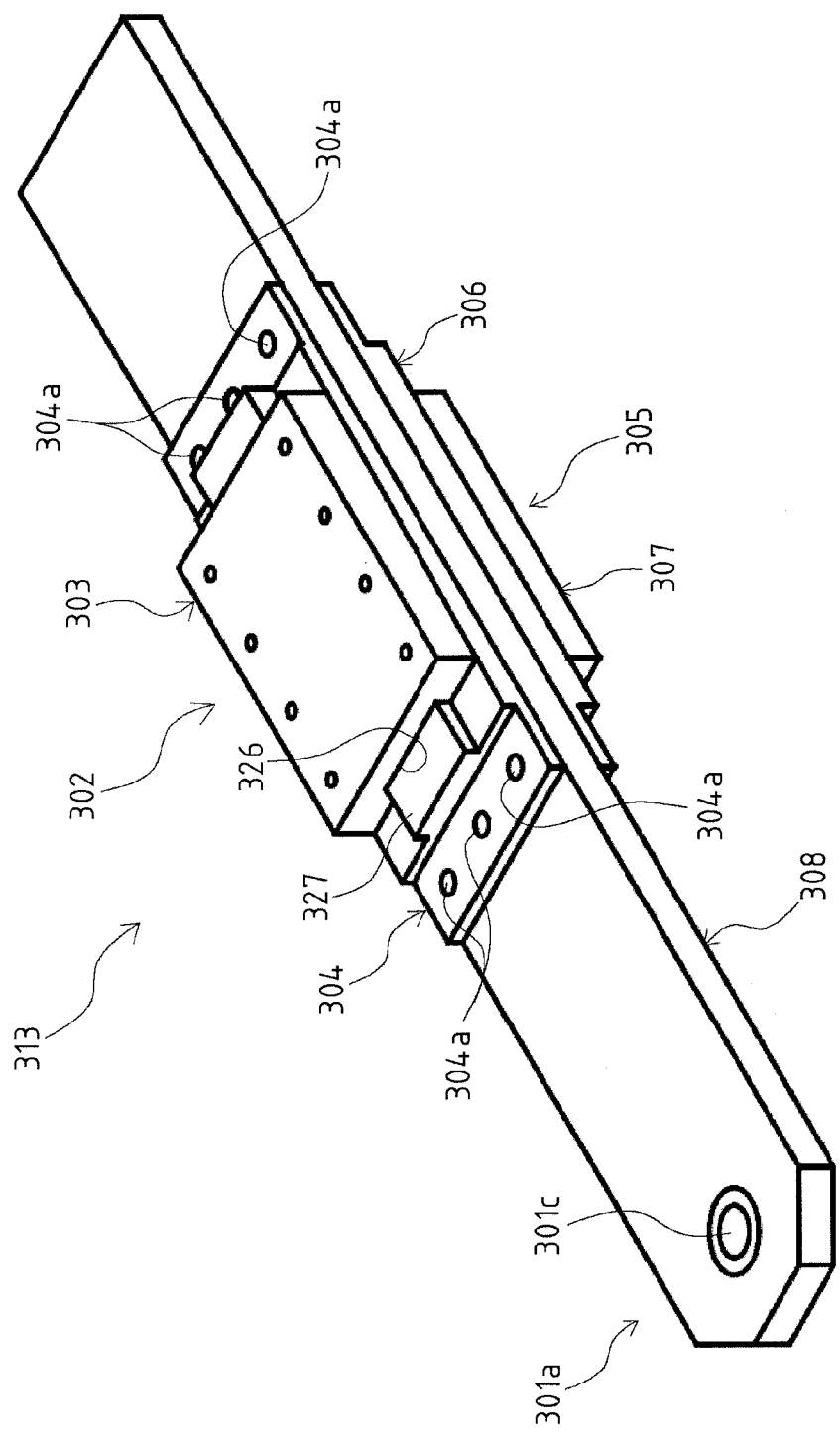
FIG. 42 is a perspective view showing the constitution of a slide mechanism which the vibration damping device according to the third embodiment of the present invention includes.

The concave/convex slide body mechanism 302 and the flat surface slide body mechanism 305 are arranged vertical with a center axial force member 308 sandwiched therebetween. As shown in FIG. 42 and the like, the center axial force member 308 is an elongated member having an approximately rectangular plate shape, and is arranged such that the longitudinal direction of the center axial force member 308 is aligned with the axial direction of the damping device 301. The concave/convex slide body mechanism 302 is mounted on an upper plate surface side which is one of plate surface sides of the center axial force member 308, while the flat surface slide body mechanism 305 is mounted on an a lower plate surface side which is the other of the plate surface sides of the center axial force member 308. In this manner, the concave/convex slide body mechanism 302 and the flat, surface slide body mechanism 305 are arranged in a state where these mechanisms sandwich the center axial force member 308 in the vertical direction.

The concave/convex slide body mechanism 302 is provided in a state where the convex slide body 304 is fixed to the center axial force member 308. The convex slide body 304 is fixed to the center axial force member 308 in a state where a plate surface of the convex slide body 304 on a side opposite to a side where the convex slide body 304 has a convex-shaped portion to be fitted into the concave slide body 303 is brought into contact with an upper surface of the center axial force member 308. Fixing hole 304a used for fixing the convex slide body 304 to the center axial force member 308 are formed in the convex slide body 304. That is, the convex slide body 304 is fixed to the center axial force member 308 by fastening means such as bolts using the fixing hole 304a. In this embodiment, the fixing holes 304a are formed in both end sides of the convex slide body 304 in the longitudinal direction such that the fixing holes 304a are formed at three positions along each side in the lateral direction, that is, at six positions in total. A plate thickness of both end portions of the convex slide body 304 in the longitudinal direction where the fixing holes 304a are formed is set smaller than thicknesses of other portions.

The flat surface slide body mechanism 305 is provided in a state where the inner flat plate slide body 306 is fixed to the center axial force member 308. The inner flat plate slide body 306 is fixed to the center axial force member 308 in a state where a plate surface of the inner flat plate slide body 306 on a side opposite to a side where the inner flat plate slide body 306 has a slide surface which is brought, into contact with the outer flat-plate slide body 307 is brought into contact with a lower surface of the center axial force member 308. Fixing holes 306a used for fixing the inner flat plate slide body 306 to the center axial force member 308 are formed in the inner flat plate slide body 306. That is, the inner flat plate slide body 306 is fixed to the center axial force member 308 by fastening means such as bolts using the fixing holes 306a. In this embodiment, the fixing holes 306a are formed in both end sides of the inner flat, plate slide body 306 in the longitudinal direction such that the fixing holes 306a are formed at three positions along each side in the lateral direction, that is, at six positions in total. A plate thickness of both end portions of the inner flat plate slide body 306 in the longitudinal direction where the fixing holes 306a are formed is set smaller than thicknesses of other portions.

Figure 44A:
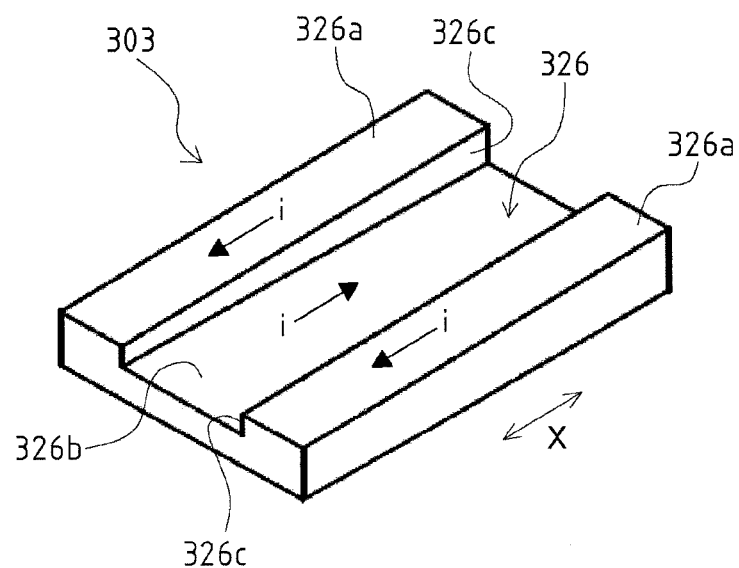
FIGS. 44(a) and 44(b) are perspective views showing the constitution of a concave/convex slide body mechanism which the vibration damping device according to the third embodiment of the present invention includes.
Figure 44B:
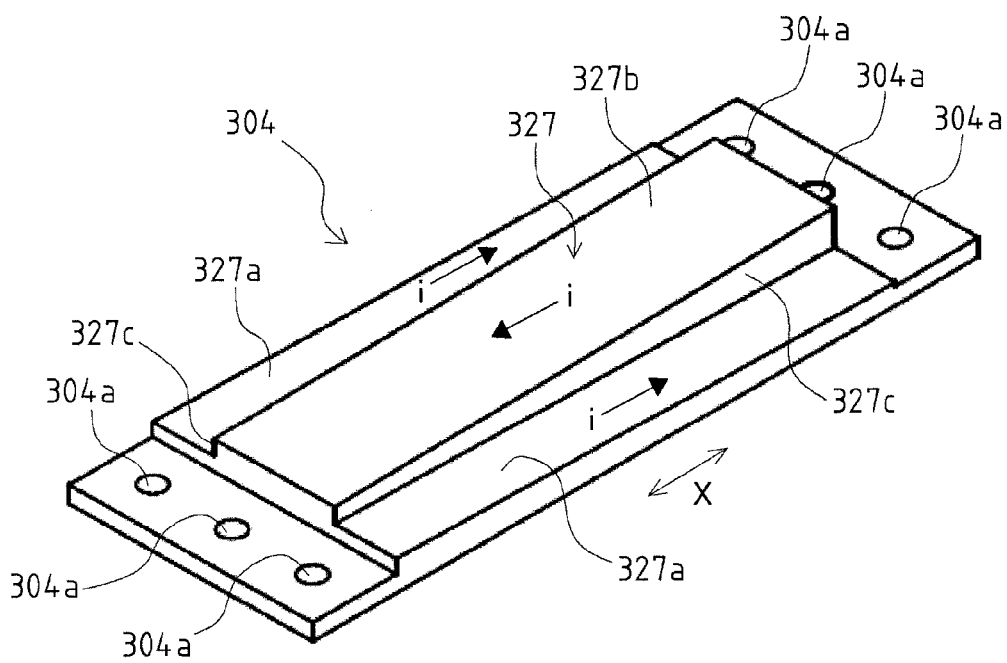
Figure 45:
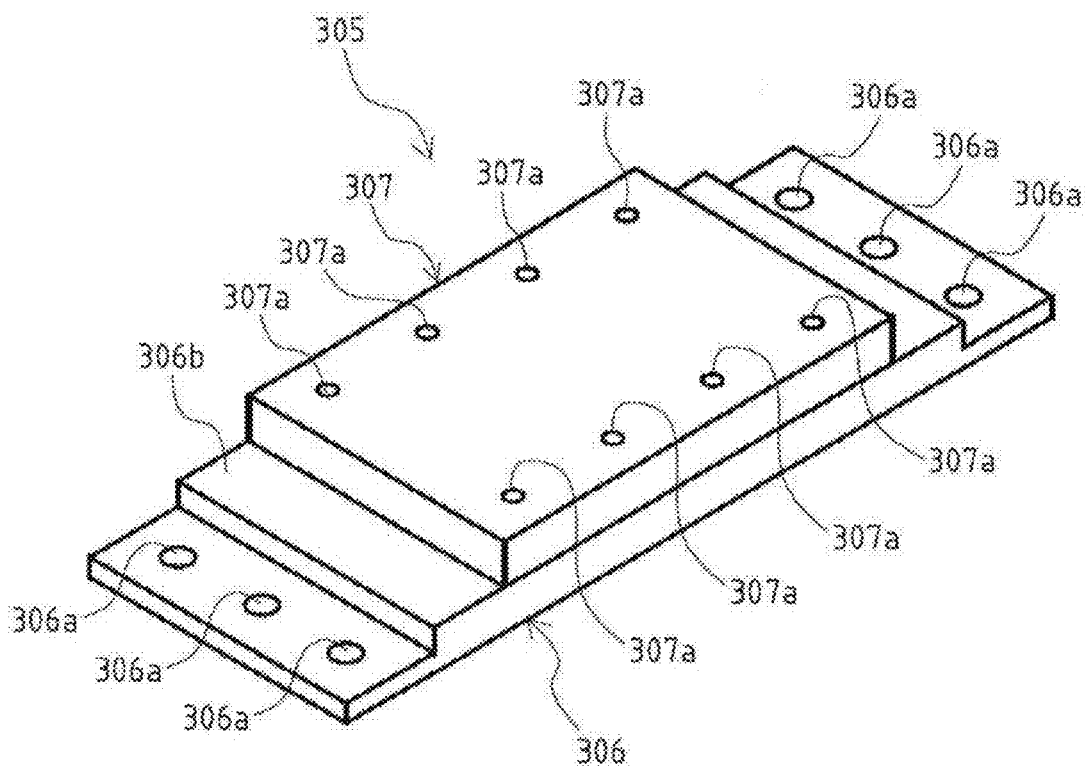
FIG. 45 is a perspective view showing the constitution of an concave/convex slide body mechanism which the vibration damping device according to the third embodiment of the present invention includes.
Figure 46A:
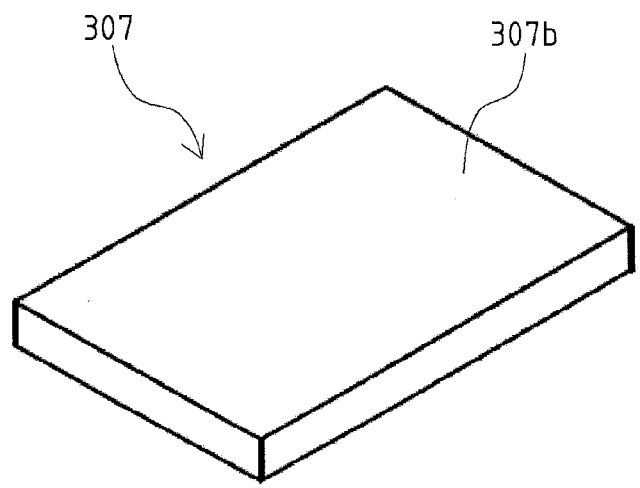
FIGS. 46(a) and 46(b) are perspective views showing the constitution of a flat surface slide body mechanism which the vibration damping device according to the third embodiment of the present invention includes.
Figure 46B:
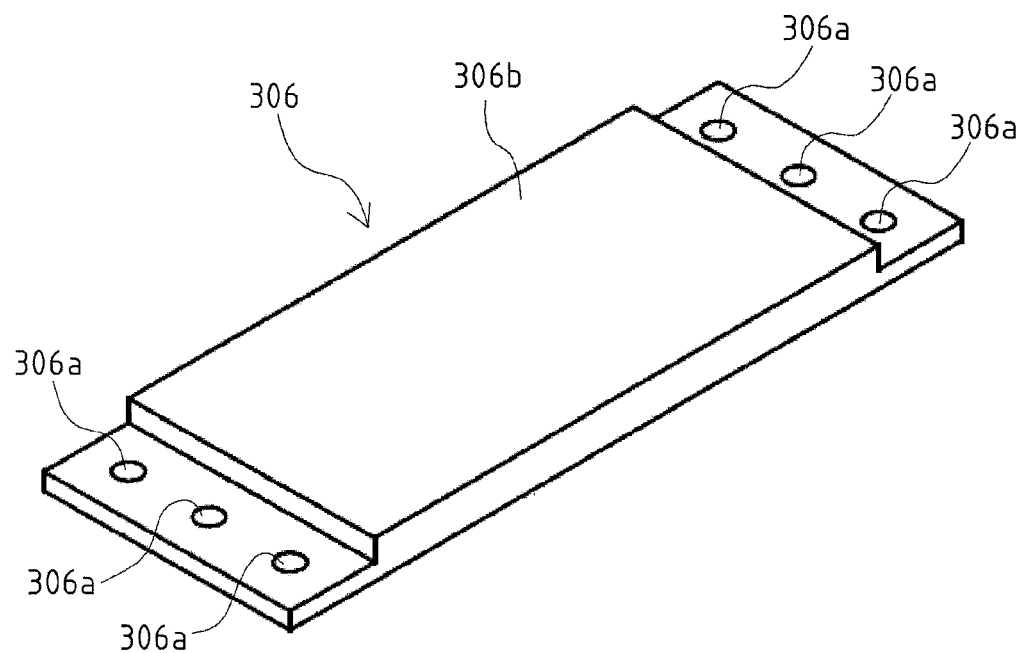
Figure 47:
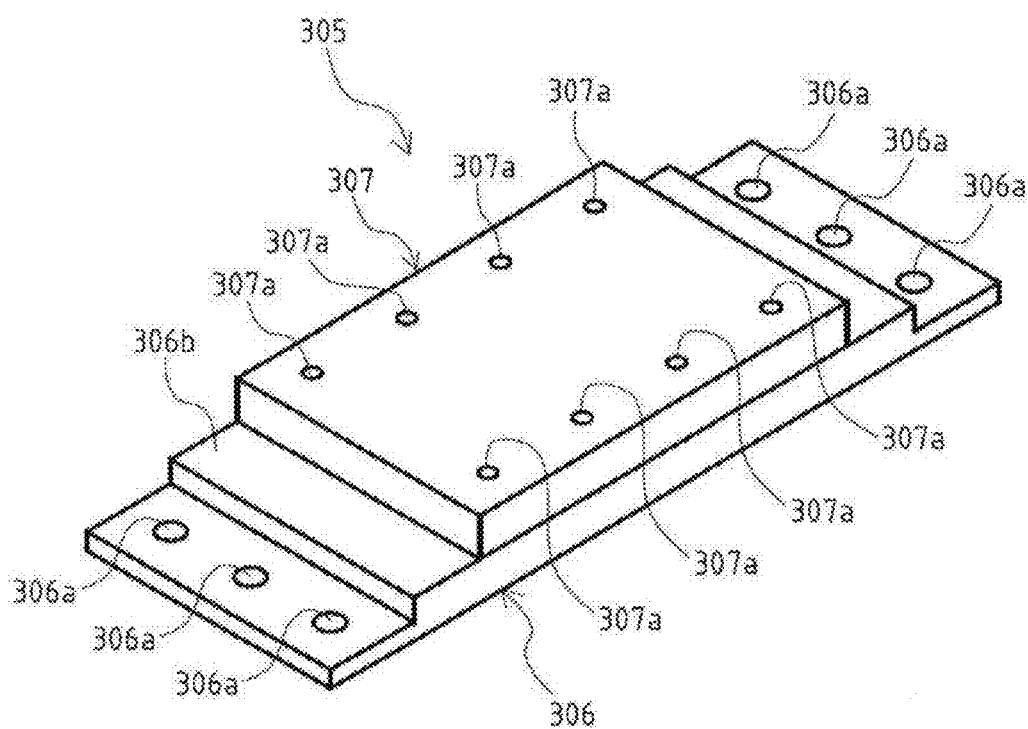
FIG. 47 is a perspective view showing the constitution of the flat surface slide body mechanism which the vibration damping device according to the third embodiment of the present invention includes.

In this manner, the slide mechanism 313 shown in FIG. 42 is constituted of the center axial force member 308, and the concave/convex slide body mechanism 302 and the flat surface slide body mechanism 305 which are mounted on both sides of the center axial force member 308. In this embodiment, as shown in FIG. 44, FIG. 45 and the like, in the concave/convex slide body mechanism 302, a size of the convex slide body 304 in the longitudinal direction is longer than a size of the concave slide body 303 in the longitudinal direction. Further, as shown in FIG. 46, FIG. 47 and the like, in the flat surface slide body mechanism 305, a size of the inner flat plate slide body 306 in the longitudinal direction is longer than a size of the outer flat-plate slide body 307 in the longitudinal direction. As shown in FIG. 42, a size of the center axial force member 308 in the longitudinal direction is several times as long as a size of the concave/convex slide body mechanism 302 and a size of the flat surface slide body mechanism 305 in the longitudinal direction, and the concave/convex slide body mechanism 302 and the flat surface slide body mechanism 305 are mounted on an approximately center portion of the center axial force member 308 in the longitudinal direction. That is, the concave/convex slide body mechanism 302 and the flat surface slide body mechanism 305 are mounted on plate surfaces of the center axial force member 308 on sides opposite to each other respectively at the substantially same position of the approximately center portion in the longitudinal direction of the center axial force member 308.

All of the concave slide body 303 and the convex slide body 304 which constitute the concave/convex slide body mechanism 302 and the inner flat plate slide body 306 and the outer flat-plate slide body 307 which constitute the flat surface slide body mechanism 305, and the center axial force member 308 have a profile of an approximately rectangular plate shape, and have the approximately same width (size in the lateral direction, the same definition being applicable hereinafter). Accordingly, in the slide mechanism 313 which is constituted of the concave/convex slide body mechanism 302, the flat surface slide body mechanism 305 and the center axial force member 308, portions of these parts which overlap with each other in the vertical direction have an approximately rectangular profile as viewed in a cross section in the axial direction of the damping device 301 as shown in FIG. 41.

Figure 40:
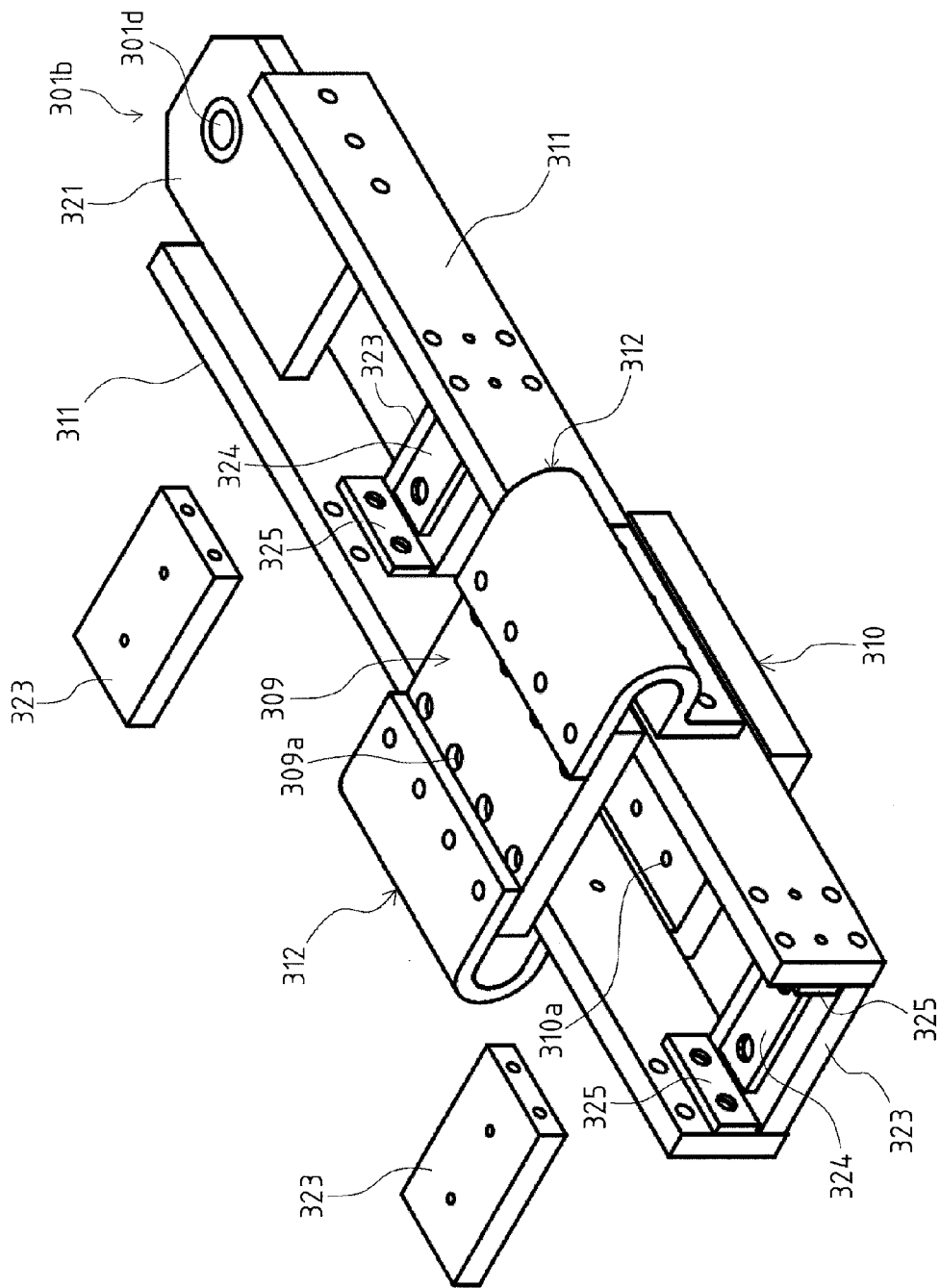
FIG. 40 is a perspective view with a part exploded showing the constitution of the vibration damping device according to the third embodiment of the present invention.
Figure 41:
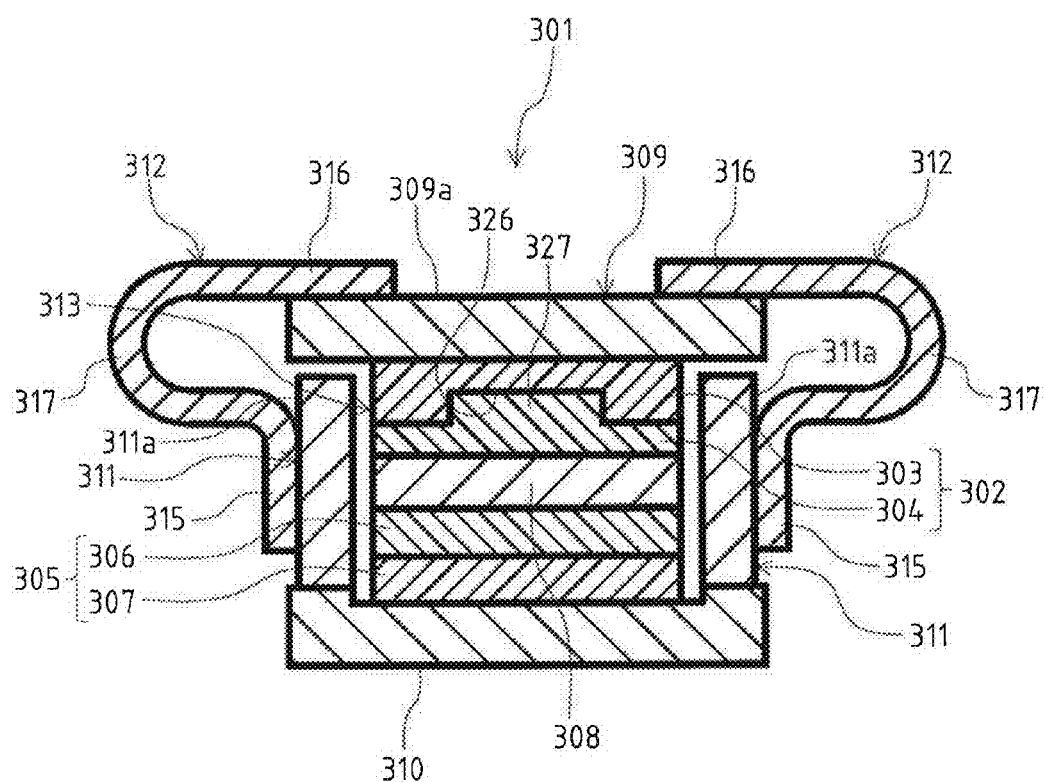
FIG. 41 is a view showing the cross-sectional structure of the vibration damping device according to the third embodiment of the present invention.

As shown in FIG. 41, the slide mechanism 313 which constitutes the damping device 301 is sandwiched by the concave/convex side support plate 309 and the flat surface side support plate 310 from below and above. Accordingly, the concave/convex slide body mechanism 302 is provided in a state where the concave/convex slide body mechanism 302 is sandwiched by the concave/convex side support plate 309 and the center axial force member 308 from below and above, and the flat surface slide body mechanism 305 is provided in a state where the flat surface slide body mechanism 305 is sandwiched by the center axial force member 308 and the flat surface side support plate 310 from below and above. As shown in FIG. 39 to FIG. 41, the concave/convex side support plate 309 and the flat surface side support plate 310 function as a support body which supports the slide mechanism 313 in the damping device 301. Both the concave/convex side support plate 309 and the flat surface side support plate 310 are members having a rectangular plate shape and have the approximately same width.

The concave slide body 303 which constitutes the concave/convex slide body mechanism 302 is fixed to the concave/convex side support plate 309. The concave slide body 303 is fixed to the concave/convex side support plate 309 in a state where a plate surface on a side opposite to a side having a recessed shape into which the convex slide body 304 is fitted is brought into contact with a lower surface of the concave/convex side support plate 309. As shown in FIG. 39, FIG. 40, FIGS. 44(a), 44(b), FIG. 45 and the like, female threaded portions 303a are formed in the concave slide body 303 for fixing the concave slide body 303 to the concave/convex side support plate 309. Fixing holes 309a which are provided corresponding to the female threaded portions 303a formed in the concave slide body 303 are formed in the concave/convex side support plate 309. That is, by allowing fastening jigs such as bolts to pass through the fixing holes 309a formed in the concave/convex side support plate 309 and to be threadedly engaged with the female threaded portions 303a formed in the concave slide body 303, the concave slide body 303 is fixed to the concave/convex side support plate 309. In this embodiment, the female threaded portions 303a and the fixing holes 309a are formed in the concave slide body 303 and the concave/convex side support plate 309 respectively such that the female threaded portions 303a and the fixing holes 309a are formed at four positions along each side in the lateral direction, that is, at eight positions in total.

The outer flat-plate slide body 307 which constitutes the flat surface slide body mechanism 305 is fixed to the flat surface side support plate 310. The outer flat-plate slide body 307 is fixed to the flat surface side support plate 310 in a state where a plate surface on a side opposite to a side having a slide surface which is brought into contact with the inner flat plate slide body 306 is brought into contact with an upper surface of the flat surface side support plate 310. As shown in FIG. 40, FIG. 46, FIG. 47 and the like, female threaded portions 307a are formed in the outer flat-plate slide body 307 for fixing the outer flat-plate slide body 307 to the flat surface side support plate 310. Fixing holes 310a which are provided corresponding to the female threaded portions 307a formed in the outer flat-plate slide body 307 are formed in the flat surface side support plate 310. That is, by allowing fastening jigs such as bolts to pass through the fixing holes 310a formed in the flat surface side support plate 310 and to be threadedly engaged with the female threaded portions 307a formed in the outer flat-plate slide body 307, the outer flat-plate slide body 307 is fixed to the flat surface side support plate 310. In this embodiment, the female threaded portions 307a and the fixing holes 310a are formed in the outer flat-plate slide body 307 and the flat surface side support plate 310 respectively such that the female threaded portions 307a and the fixing holes 310a are formed at four positions along each side in the lateral direction, that is, at eight positions in total.

A pair of side axial force members 311 is provided on both left and right sides of the slide mechanism 313 (FIG. 42). The pair of side axial force members 311 functions as a support body which supports the slide mechanism 313 in the damping device 301. The side axial force members 311 are formed of a strip-like plate-shaped member, and are arranged at positions where the side axial force members 311 sandwich the slide mechanism 313 from both sides in the lateral direction. That is, the pair of side axial force members 311 is arranged so as to make plate surfaces thereof face each other in the lateral direction with the slide mechanism 313 sandwiched therebetween. The pair of side axial force members 311 is arranged in a state where a slight gap is formed between the pair of side axial force members 311 and both left and right side surface portions of the slide mechanism 313 (see FIG. 41).

As shown in FIG. 41, the slide mechanism 313 has four sides thereof, that is, upper and lower sides and left and right sides thereof surrounded by the concave/convex side support plate 309 and the flat surface side support plate 310 which are arranged above and below the slide mechanism 313 and the pair of side axial force members 311 which are arranged on left and right sides of the slide mechanism 313. However, as shown in FIG. 39, FIG. 40 and the like, a size of the concave/convex side support plate 309 and a size of the flat surface side support, plate 310 in the longitudinal direction are an approximately fraction of a total length of the side axial force member 311 in the longitudinal direction. A portion of the slide mechanism 313 in the longitudinal direction is covered by the concave/convex side support plate 309, the flat surface side support plate 310 and the pair of side axial force member 311 from four sides. To be more specific, portions of the slide mechanism 313 where the concave slide body 303 and the outer flat-plate slide body 307 to which the concave/convex side support plate 309 and the flat surface side support plate 310 are fixed respectively are positioned, that is, the portions of the slide mechanism 313 where the concave/convex slide body mechanism 302 and the flat surface slide body mechanism 305 are arranged are surrounded from four sides by the concave/convex side support plate 309, the flat surface side support plate 310 and the pair of side axial force members 311.

Figure 43:
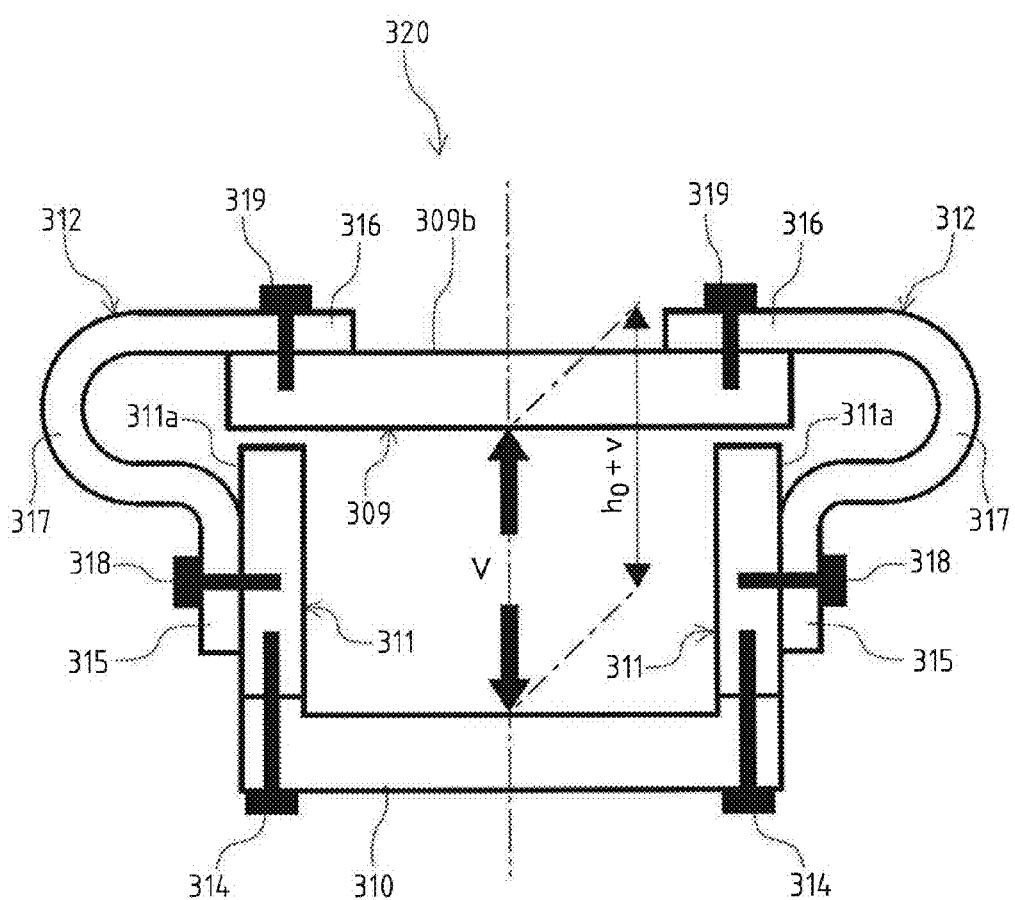
FIG. 43 is a view showing the constitution of a biasing mechanism which the vibration damping device according to the third embodiment of the present invention includes.

The pair of side axial force members 311 is fixed to the flat surface side support plate 310 which is arranged below the slide mechanism 313 in a state where the side axial force members 311 sandwich the side axial force members 311 in the lateral direction as described above. The pair of side axial force members 311 is fixed to the flat surface side support plate 310 in a state where the side axial force members 311 are arranged on end portions of an upper surface portion of the flat surface side support plate 310 on both left and right sides and extend along longitudinal side portions of the flat surface side support plate 310. As shown in FIG. 43, the pair of side axial force members 311 and the flat surface side support plate 310 are fixed to each other by bolts 314 threaded into the side axial force members 311 after penetrating the flat surface side support plate 310 from a lower side of the flat surface side support plate 310. Fixing portions fixed by the bolts 314 are provided at four positions along each side of both left and right sides of the flat surface side support plate 310 in the lateral direction, that is, at eight positions in total.

A pair of leaf springs 312 is arranged on both left and right sides of the constitution including the slide mechanism 313, and the concave/convex side support plate 309, the flat surface side support plate 310 and the pair of side axial force members 311 which surround the slide mechanism 313 from four sides. The leaf springs 312 are respectively formed of an approximately U-shaped leaf spring, wherein one end side of the leaf spring 312 is fixed to the side axial force member 311 and the other end side of the leaf spring 312 is fixed to the concave/convex side support plate 309.

Figure 48:
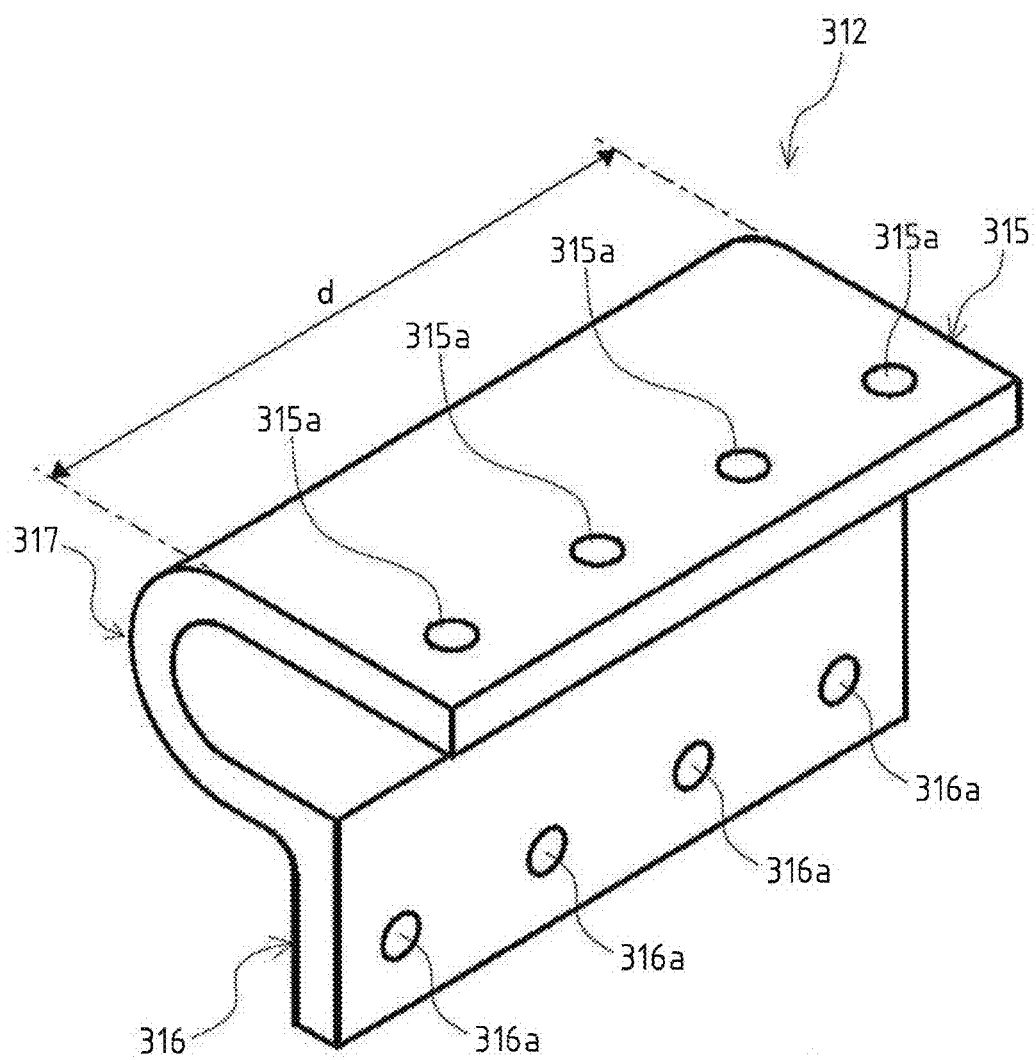
FIG. 48 is a perspective view showing the constitution of a leaf spring which the vibration damping device according to the third embodiment of the present invention includes.

As shown in FIG. 41, FIG. 43 and FIG. 48, the leaf spring 312 includes fixing portions 315, 316 having a flat plate shape and includes a leaf spring portion 317 having a curved plate shape between the fixing portions 315, 316. One fixing portion 315 is a portion which is bent outwardly approximately perpendicular to the leaf spring portion 317 on one end portion side of the U-shaped leaf spring portion 317. The other fixing portion 316 is a portion which is formed by directly extending an end portion of the leaf spring portion 317 on the other end side of the U-shaped leaf spring portion 317.

Accordingly, one fixing portion 315 and the other fixing portion 316 of the leaf spring 312 extend along surfaces approximately perpendicular to each other. Further, as shown in FIG. 41, FIG. 43 and the like, the leaf spring 312 is fixed to the side axial force member 311 and the concave/convex side support plate 309 in a state where the fixing portion 315 which is bent with respect to the leaf spring portion 317 extends along an outer surface 311*a* of the side axial force member 311 and the fixing portion 316 which straightly extends from the leaf spring portion 317 extends along an upper surface 309*b* of the concave/convex side support plate 309.

That is, there exists the relationship where the outer surface 311*a* of the side axial force member 311 and the upper surface 309*b* of the concave/convex side support plate 309 are approximately perpendicular to each other, and the leaf spring 312 is fixed to the side axial force member 311 and the concave/convex side support plate 309 by fixing one fixing portion 315 to the side axial force member 311 from an outer surface 311*a* side and by fixing the other fixing portion 316 to the concave/convex side support plate 309 from an upper surface 309*b* side.

As shown in FIG. 43, one fixing portions 315 are respectively fixed to the side axial force members 311 by bolts 318 which are threaded into the side axial force members 311 after penetrating the fixing portions 315 from the outside of the side axial force members 311 in the lateral direction. The other fixing portions 316 are fixed to the concave/convex side support plate 309 by bolts 319 which are threaded into the concave/convex side support plate 309 after penetrating the fixing portions 316 from above the concave/convex side support plate 309. Accordingly, bolt holes 315*a*, 316*a* which allow the bolts 318, 319 to pass therethrough are formed in the respective fixing portions 315, 316 of the leaf springs 312 (see FIG. 48). In this embodiment, the respective fixing portions 315, 316 are fixed by the bolts 318, 319 at four positions along the longitudinal direction of the side axial force members 311 and the concave/convex side support plate 309.

In this manner, the pair of leaf springs 312 which is arranged on both left and right sides of the damping device 301 is fixed to the side axial force member 311 and the concave/convex side support plate 309 in a state where open sides of the leaf springs 312 having an approximately U shape face each other in the lateral direction. That is, the concave/convex side support plate 309 and the pair of side axial force members 311 are integrally connected to each other by the pair of leaf springs 312.

In this manner, in the leaf spring 312 provided to the damping device 301 of this embodiment, one fixing portion 315 which is fixed to the side axial force member 311 and the other fixing portion 316 which is fixed to the concave/convex side support plate 309 function as a pair of structure-side fixing portions. Further, the leaf spring 312 includes the elastically deformed leaf spring portion 317 having a curved plate shape between the pair of fixing portions 315, 316. That is, the leaf spring 312 of this embodiment includes the pair of fixing portions 315, 316 which constitutes the structure-side fixing portions and the leaf spring portion 317 having a curved plate shape which is formed between the pair of fixing portions 315, 316 and is elastically deformed.

In this embodiment, the leaf springs 312 biasingly push the concave/convex slide body mechanism 302 consisting of the concave slide body 303 and the convex slide body 304, and the flat surface slide body mechanism 305 consisting of the inner flat plate slide body 306 and the outer flat-plate slide body 307 in the vertical direction. That is, the leaf spring 312 applies a biasing force in the direction that the concave slide body 303 and the convex slide body 304 which are slidable relative to each other in a reciprocating manner are pushed to each other in the opposedly facing directions (slide body pushing direction) to the concave/convex slide body mechanism 302, and also applies a biasing force in the direction that the inner flat plate slide body 306 and the inner flat plate slide body 306 which are slidable relative to each other in a reciprocating manner are pushed to each other in the opposedly facing directions to the flat surface slide body mechanism 305.

To be more specific, the leaf spring 312 is fixed to the concave/convex side support plate 309 and the flat surface side support plate 310 which sandwich the slide mechanism 313 from above and below in such a manner that the leaf spring 312 is fixed to the concave/convex side support plate 309 by the upper-side fixing portion 316 and the leaf spring 312 is fixed to the flat surface side support plate 310 by the lower-side fixing portion 315 by way of the side axial force member 311. Here, one fixing portion 315 of the leaf spring 312 is fixed to the side axial force member 311 which is fixed to the flat surface side support plate 310 by the bolts 318 as described above and hence, the leaf spring 312 is indirectly fixed to the flat surface side support plate 310 by way of the side axial force members 311.

In this manner, the leaf springs 312 are directly or indirectly fixed to the concave/convex side support plate 309 and the flat surface side support plate 310 which sandwich the slide mechanism 313 from above and below thus generating a compressive force (biasing force) mainly in the vertical direction by the leaf spring portion 317. That is, due to its elasticity, the leaf springs 312 generate a force which pushes the concave/convex side support plate 309 from an upper side and pushes the flat surface side support plate 310 toward an upper side by way of the side axial force members 311.

Due to such an action of the leaf spring 312, the concave/convex side support plate 309 and the flat surface side support plate 310 which sandwich the slide mechanism 313 where the concave/convex slide body mechanism 302 and the flat surface slide body mechanism 305 are vertically arranged by way of the center axial force member 308 receive a biasing force in the direction that the concave/convex side support plate 309 and the flat surface side support plate 310 approach each other. Accordingly, in the concave/convex slide body mechanism 302 and the flat surface slide body mechanism 305, the pair of slide bodies which constitutes each slide body mechanism receives a force which pushes the slide bodies in the directions that the slide bodies face each other in an opposed manner. In this manner, in the damping device 301 of this embodiment, the leaf spring 312 functions as a biasing means which biases the concave/convex slide body mechanism 302 and the flat surface slide body mechanism 305 in the slide body pushing direction.

In the damping device 301 having the above-mentioned constitution, the biasing mechanism 320 which is formed into an integral frame shape as viewed in the axial direction of the damping device 301 is constituted of the concave/convex side support plate 309 and the flat surface side support plate 310 which are arranged to face each other in an opposed manner in the vertical direction, the pair of side axial force members 311 which is arranged to face each other in an opposed manner in the lateral direction, and the pair of leaf springs 312 which is arranged on both left and right sides (see FIG. 43). That is, the biasing mechanism 320 has the structure where the concave/convex side support plate 309, the flat surface side support, plate 310, the pair of side axial force members 311, and the pair of leaf springs 312 are connected and fixed to each other among these members by the bolts 314, 318 and 319. The slide mechanism 313 is provided to the biasing mechanism 320 in such a manner that the slide mechanism 313 is inserted into the biasing mechanism 320.

Among the members which constitute the slide mechanism 313, the concave slide body 303 of the concave/convex slide body mechanism 302 which is positioned on an uppermost side is fixed to the concave/convex side support plate 309 which constitutes the biasing mechanism 320. Further, among the members which constitute the slide mechanism 313, the outer flat-plate slide body 307 of the flat surface slide body mechanism 305 which is positioned on a lowermost side is fixed to the flat surface side support plate 310 which constitutes the biasing mechanism 320.

Accordingly, in the damping device 301 of this embodiment, the constitution which includes the biasing mechanism 320, the concave slide body 303 which is fixed to the concave/convex side support plate 309 of the biasing mechanism 320, and the outer flat-plate slide body 307 which is fixed to the flat surface side support plate 310 of the biasing mechanism 320 is integrally moved along with the slide movement of the concave/convex slide body mechanism 302 and the flat surface slide body mechanism 305. On the other hand, the constitution which is formed by excluding the concave slide body 303 and the outer flat-plate slide body 307 which are fixed to a biasing mechanism 320 side from the slide mechanism 313 is integrally moved along with the slide movement of the concave/convex slide body mechanism 302 and the flat surface slide body mechanism 305. That is, the constitution which includes the biasing mechanism 320, the concave slide body 303 and the outer flat-plate slide body 307 and the constitution which is formed by excluding the concave slide body 303 and the outer flat-plate slide body 307 from the slide mechanism 313 respectively constitute the integral structures.

The concave slide body 303 and the convex slide body 304 which constitute the concave/convex slide body mechanism 302 are respectively indirectly fixed to the structure. In this embodiment, the concave slide body 303 is fixed to the structure by way of the concave/convex side support plate 309, the pair of leaf springs 312, and the pair of side axial force members 311, while the convex slide body 304 is fixed to the structure by way of the center axial force member 308. The specific constitution is explained as follows.

Firstly, the convex slide body 304 is explained. The convex slide body 304 is, as described above, fixed to the upper surface of the center axial force member 308. The center axial force member 308 which is an elongated member having an approximately rectangular plate shape is provided in a state where one end side of the center axial force member 308 projects more toward one end side in the axial direction of the damping device 301 than the pair of side axial force members 311. A portion of the center axial force member 308 which projects from the side axial force members 311 is a portion which constitutes the first support portion 301a formed on the end portion of the damping device 301 in the axial direction as described above. That is, in the damping device 301, the center axial force member 308 constitutes the first support portion 301a fixed to the structure.

Accordingly, as shown in FIG. 39 and FIG. 42, a hole portion 301c for fixing or connecting the center axial force member 308 to the structure is formed in the end portion of the center axial force member 308 on a side projecting from the side axial force members 311. The hole portion 301c is provided for allowing the insertion of a fixing jig such as a bolt therein and is formed in the plate-shaped center axial force member 308 in a penetrating manner. In this manner, in the damping device 301 of this embodiment, the convex slide body 304 which constitutes the concave/convex slide body mechanism 302 is indirectly fixed to the structure by the center axial force member 308.

On the other hand, as shown in FIG. 39 and FIG. 40, in the damping device 301, a connection plate 321 which constitutes a portion which projects toward a side opposite to the side where the center axial force member 308 projects is provided. The connection plate 321 is, as a whole, a member having an approximately rectangular thick-plate shaped profile. The connection plate 321 is fixed to the pair of side axial force members 311 at the other end portion of the damping device 301 in the axial direction in a state where the connection plate 321 is sandwiched by the pair of side axial force members 311 with the plate thickness direction set as the vertical direction.

The connection plate 321 is fixed between the pair of side axial force members 311 in a state where an end portion of the connection plate 321 on one side in the longitudinal direction projects more toward the other end side of the damping device 61 in the axial direction than the pair of side axial force members 311. The connection plate 321 is fixed to the side axial force members 311 by a suitable method such as bolts or welding, for example, in a state where the connection plate 321 is sandwiched by the pair of side axial force members 311.

The connection plate 321 is, as described above, a portion which constitutes the second support portion 301b which is provided to the end portion of the damping device 301 in the axial direction. Accordingly, as shown in FIG. 39 and FIG. 40, a hole portion 301d for fixing the connection plate 321 to the structure is formed in the end portion of the connection plate 321 on a side projecting from the side axial force members 311. The hole portion 301d is provided for allowing the insertion of a fixing jig such as a bolt therein and is formed in the plate-shaped connection plate 321 in a penetrating manner in the vertical direction. In this manner, in the damping device 301 of this embodiment, the concave slide body 303 is indirectly connected to the structure by way of the concave/convex side support plate 309, the pair of leaf springs 312, the pair of side axial force members 311 and the connection plate 321.

Also the inner flat plate slide body 306 and the outer flat-plate slide body 307 which constitute the flat surface slide body mechanism 305 are indirectly fixed to the structure in the same manner as the concave slide body 303 and the convex slide body 304 which constitute the concave/convex slide body mechanism 302. That is, the inner flat plate slide body 306 is indirectly fixed to the structure by way of the center axial force member 308, and the outer flat-plate slide body 307 is indirectly fixed to the structure by way of the flat surface side support, plate 310, the pair of side axial force members 311 and the connection plate 321.

In the damping device 301 having such fixing structure to the structure, the pair of fixing portions 315, 316 which function as the structure-side fixing portions as described above is indirectly connected to the structure as follows. That is, in this embodiment, as described above, the leaf springs 312 are integral constitutional members of the biasing mechanism 320 and hence, the leaf springs 312 per se are fixed to the structure by way of the side axial force members 311 and the connection plate 321 whereby the pair of fixing portions 315, 316 is indirectly connected to the structure.

In the damping device 301 having the above-mentioned constitution, as described above, out of two constitutions which integrally move along with the slide movement of the concave/convex slide body mechanism 302 and the flat surface slide body mechanism 305, the constitution which includes the center axial force member 308 is connected to the structure at the first support portion 301*a*, and the constitution which includes the pair of side axial force members 311 is connected to the structure at the second support portion 301*b*. The direction of the relative movement, of these two integral constitutions corresponds to the axial direction of the clamping device 301. In the explanation made hereinafter, out of two constitutions which integrally move as described above, the constitution including the center axial force member 308 which supports the concave/convex slide body mechanism 302 and the flat surface slide body mechanism 305 is referred to as "slide-body-side structural body", and the constitution including the biasing mechanism 320 is referred to as "biasing-mechanism-side structural body".

As shown in FIG. 39, the biasing-mechanism-side structural body includes a guide portion 322 which guides the movement of the slide-body-side structural body. In this embodiment, the guide portion 322 is provided at two positions. The guide portion 322 provided at two positions is, in the biasing mechanism 320, arranged on portions where the pair of leaf springs 312 is formed on both sides of the damping device 301 in the axial direction.

One guide portion 322 is mounted on an end portion between the pair of side axial force members 311 on a side where the center axial force member 308 projects, and the other guide portion 322 is arranged between the pair of side axial force members 311 and also between the pair of leaf springs 312 and the connection plate 321. The guide portions 322 at two positions guide the movement of the slide-body-side structural body by supporting the center axial force member 308 parallel to the operating direction in a state where both longitudinal sides of the center axial force member 308 on which the concave/convex slide body mechanism 302 and the flat surface slide body mechanism 305 are mounted at an approximately center portion in the longitudinal direction are inserted into two guide portion 322.

As shown in FIG. 39 and FIG. 40, the guide portion 322 is constituted of a pair of support members 323 which extends between the pair of side axial force members 311, and faces each other in an opposed manner in the vertical direction. The support member 323 is a rectangular plate-shaped member, and is fixed in a sandwiched manner between the pair of side axial force members 311 with plate surfaces thereof facing upwardly and downwardly. The pair of support members 323 constitutes a frame-shaped portion as viewed in the axial direction of the damping device 301 together with the pair of side axial force members 311. The support members 323 are fixed to the side axial force members 311 by a suitable method such as bolts, welding, for example, in a state where the support members 323 are sandwiched by the pair of side axial force members 311. That is, the pair of support members 323 which constitutes the guide portion 322 is fixed to the side axial force members 311 and hence, the pair of support members 323 is included in the biasing-mechanism-side structural body which forms the integral constitution.

Further, as shown in FIG. 40, the guide portion 322 includes a pair of slide plates 324 which faces each other in an opposed manner in the vertical direction and a pair of slide plates 325 which faces each other in an opposed manner in the lateral direction. The pair of slide plates 324 which faces each other in an opposed manner in the vertical direction is provided to opposedly-facing surfaces of the pair of support members 323 which faces each other in an opposed manner in the vertical direction respectively. That is, one slide plate 324 is mounted on a lower surface of the upper-side support member 323 and the other slide plate 324 is mounted on an upper surface of the lower-side support member 323. The pair of slide plates 325 which faces each other in an opposed manner in the lateral direction is provided to opposedly-facing surfaces of the pair of side axial force members 311 which faces each other in an opposed manner in the lateral direction respectively. That is, the respective slide plates 325 are mounted on inner surfaces of the side axial force members 311 respectively.

All of the upper and lower slide plates 324 and the left and right slide plates 325 are formed of a rectangular plate shaped member, and are brought into contact with the center axial force member 308 inserted into the guide portion 322. These upper and lower slide plates 324 and left and right slide plates 325 are members which allow the movement of the center axial force member 308 in the operating direction of the center axial force member 308 and fix the center axial force member 308 in the direction along a plane perpendicular to the operating direction. The respective slide plates 324, 325 are fixed to the support members 323 or the side axial force members 311 by a suitable method such as bolts or welding, for example.

The center axial force member 308 is inserted into the guide portion 322 which is constituted by the pair of support members 323 together with the pair of side axial force members 311 as described above. Accordingly, the guide portion 322 arranged at two positions functions, in the biasing-mechanism-side structural body, as the sheath structure which accommodates a portion of the center axial force member 308 of the slide-body-side structural body therein.

In FIG. 40, to facilitate the understanding of the internal structure of the guide portion 322, the upper support member 323 which constitutes the guide portion 322 is shown at a position away from a position where the upper support member 323 is ought to be positioned originally. Also for the sake of convenience of the explanation. FIG. 40 shows a state where the concave slide body 303 fixed to the concave/convex side support, plate 309 and the outer flat-plate slide body 307 fixed to the flat surface side support plate 310 are removed.

In the damping device 301 having the above-mentioned constitution, when a height (size in the vertical direction, the same definition being applicable hereinafter) of the concave/convex slide body mechanism 302 is changed against a biasing force of the leaf springs 312 due to the relative slide movement, between the concave slide body 303 and the convex slide body 304 which constitute the concave/convex slide body mechanism 302, the concave/convex slide body mechanism 302 receives a biasing force in the slide body pushing direction from the leaf springs 312. In the damping device 301, the concave/convex slide body mechanism 302 receives a biasing force from the biasing mechanism 320. That is, the biasing mechanism 320 is constituted including the leaf springs 312 which generate a biasing force, and forms a ring which accommodates the slide mechanism 313 having the concave/convex slide body mechanism 302 therein and elastically confines the increase of a height which is caused along with a slide operation of the concave/convex slide body mechanism 302.

Then, in the damping device 301, along with the increase of the slide body displacement, amount of the concave slide body 303 and the convex slide body 304 of the concave/convex slide body mechanism 302, the height of the concave/convex slide body mechanism 302 is increased so that the biasing force in the slide body pushing direction which the damping device 301 receives from the leaf spring 312 is increased. Accordingly, the damping device 301 is configured such that a frictional force which is generated between the concave slide body 303 and the convex slide body 304 and acts as a damping force is increased proportionally to the increase of the slide body displacement amount. The frictional force which is increased proportionally includes a frictional force which is generated between the inner flat plate slide body 306 and the outer flat-plate slide body 307 which constitute the flat surface slide body mechanism 305.

In the above-mentioned constitution, by positioning the portion of the slide mechanism 313 where the concave/convex slide body mechanism 302 and the flat surface slide body mechanism 305 are arranged with respect to the biasing mechanism 320 between the concave/convex side support plate 309 and the flat surface side support plate 310 and by accommodating both end sides of the center axial force member 308 in the guide portion 322 which functions as the sheath structure, the damping device 301 is constituted.

In the damping device 301 of this embodiment, a frictional force which is applied to the concave slide body 303 of the concave/convex slide body mechanism 302 is transmitted to the structure connected to the second support portion 301b by the hole portion 301d via the concave/convex side support plate 309, the pair of leaf springs 312, the pair of side axial force members 311 and the connection plate 321. Further, a frictional force which is applied to the outer flat-plate slide body 307 of the flat surface slide body mechanism 305 is transmitted to the structure connected to the second support portion 301b by the hole portion 301d via the flat surface side support plate 310, the pair of side axial force members 311 and the connection plate 321. Further, a frictional force which is applied to the convex slide body 304 of the concave/convex slide body mechanism 302 and a frictional force which is applied to the inner flat plate slide body 306 of the flat surface slide body mechanism 305 are transmitted to the structure connected to the first support portion 301a by the hole portion 301c via the center axial force member 308 respectively.

Figure 49:
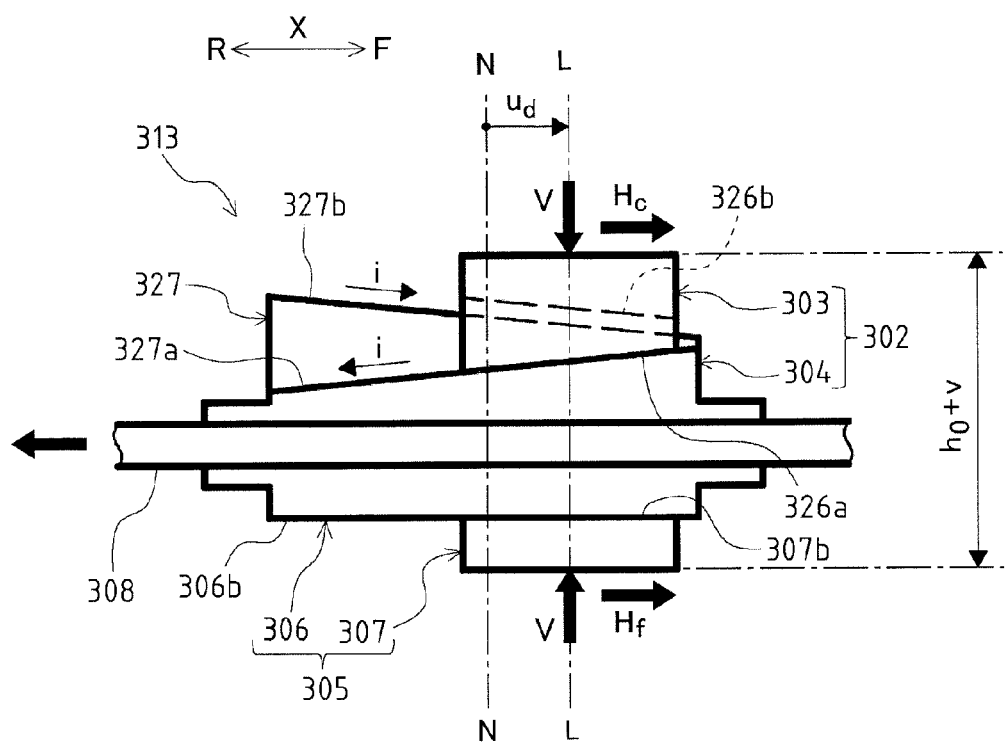
FIG. 49 is a side view showing the constitution of a slide mechanism which the vibration damping device according to the third embodiment of the present invention includes.

The structures of the concave/convex slide body mechanism 302 and the flat, surface slide body mechanism 305 are explained specifically also in conjunction with FIG. 49 and FIG. 50. In the explanation made hereinafter, with respect to the concave/convex slide body mechanism 302, for the sake of convenience, assume the direction that the concave slide body 303 slides relative to the convex slide body 304 in a reciprocating manner (see an arrow X in FIG. 49) as an operating direction, assume one direction (see the direction F of the arrow X on a right side in FIG. 49) of the operating direction as a positive direction, and assume the other direction (see the direction R of the arrow X on a left side in FIG. 49) of the operating direction as a negative direction.

Firstly, the concave/convex slide body mechanism 302 is explained. As shown in FIGS. 44(a), 44(b), FIG. 45 and the like, the concave/convex slide body mechanism 302 includes concave/convex shaped portions at portions of the concave slide body 303 and the convex slide body 304 where the concave slide body 303 and the convex slide body 304 face each other in an opposed manner, and the concave slide body 303 and the convex slide body 304 are slidably engaged with each other by fitting engagement through the concave/convex shaped portions. Accordingly, the concave/convex slide body mechanism 302 has, as the concave/convex shaped portions, the groove portion 326 formed on a concave slide body 303 side and the projecting portion 327 formed on a convex slide body 304 side.

That is, in the damping device 301 of this embodiment, the concave slide body 303 has the groove portion 326 on an end portion (surface portion) thereof on a side which faces the convex slide body 304 constituting a sliding counterpart slide body. The groove portion 326 opens downward while extending in the direction that the concave slide body 303 slides relative to the convex slide body 304 in a reciprocating manner (operating direction), and forms a concave shape as viewed in the operating direction.

On a lower-side surface portion (upper-side surface portion in FIG. 44(a)) of the concave slide body 303 on which the groove portion 326 is formed, groove end surfaces 326a which are two portions forming open-side end surfaces of the groove portion 326 and a groove bottom surface 326b which is a bottom surface of the groove portion 326 are formed. Two groove end surfaces 326a are formed coplanar. Between two groove end surfaces 326a and the groove bottom surface 326b, inner side surfaces 326c which face each other in an opposed manner in the lateral direction are formed. The inner side surfaces 326c which face each other in an opposed manner are formed approximately parallel to each other.

Further, in the damping device 301 of this embodiment, the convex slide body 304 has the projecting portion 327 on an end portion (surface portion) thereof on a side opposite to the concave slide body 303 which is the sliding counterpart slide body. The projecting portion 327 extends along the operating direction and projects upward thus forming a projecting shape as viewed in the operating direction.

The projecting portion 327 is a portion where a projection projects upward at an upper surface portion of the convex slide body 304. Accordingly, on the upper surface portion of the convex slide body 304, shoulder surfaces 327a which are two portions forming proximal end surfaces of the projecting portion 327 and a projecting portion end surface 327b forming a projection-side end surface of the projecting portion 327 are formed. Two shoulder surfaces 327a are surfaces of the projecting portion 327 from which a projection projects, and these shoulder surfaces 327a are formed coplanar. Outer side surfaces 327c which are directed to sides opposite to each other in the lateral direction are formed between two shoulder surfaces 327a and the projecting portion end surface 327b. The outer side surfaces 327c which are directed to sides opposite to each other are formed approximately parallel to each other.

The groove portion 326 and the projecting portion 327 which are slidably engaged with each other by fitting engagement are formed such that a width size of the groove of the groove portion 326 and a width size of the projection of the projecting portion 327 are set substantially equal. That is, a size between the inner side surfaces 326c which form the groove portion 326 and a size between the outer side surfaces 327c which form the projecting portion 327 are set substantially equal.

As described above, in the constitution where the concave slide body 303 and the convex slide body 304 are engaged with each other by slide fitting engagement by the groove portion 326 and the projecting portion 327, in the same manner as the case in the first embodiment, the concave slide body 303 and the convex slide body 304 have two kinds of slide surfaces.

That is, out of two kinds of slide surfaces, slide surfaces of one kind are brought into contact with each other in a state where the concave slide body 303 is positioned in front of the neutral position with respect to the convex slide body 304, and are formed of a slanted surface (front-side-use slide surface) having an ascending gradient toward a front, side such that the concave slide body 303 is raised along with the displacement by sliding of the concave slide body 303 toward a front side from the neutral position of the concave slide body 303. Further, out of two kinds of slide surfaces, the slide surfaces of the other kind are brought into contact with each other in a state where the concave slide body 303 is positioned behind the neutral position with respect to the convex slide body 304, and are formed of a slanted surface (rear-side-use slide surface) having an ascending gradient toward a rear side such that the concave slide body 303 is raised along with the displacement by sliding of the concave slide body 303 toward a rear side from the neutral position of the concave slide body 303.

As shown in FIGS. 44(a), 44(b), FIG. 45, FIG. 49, FIG. 50 and the like, in this embodiment, in the concave slide body 303, the groove end surfaces 326a which forms the groove portion 326 are used as the front-side-use slide surfaces, and the groove bottom surface 326b which form the groove portion 326 is used as the rear-side-use slide surface. In the convex slide body 304, the shoulder surfaces 327a which form the projecting portion 327 are used as the front-side-use slide surfaces, and the projecting portion end surface 327b which forms the projecting portion 327 is used as the rear-side-use slide surface. In this manner, the concave slide body 303 and the convex slide body 304 respectively have two front-side-use slide surfaces and one rear-side-use slide surface.

In the concave/convex slide body mechanism 302, a state where the concave slide body 303 is at a center position in the long-side direction (longitudinal direction) with respect to the convex slide body 304 corresponds to a state where the concave slide body 303 is at a neutral position with respect to the convex slide body 304 (neutral state). In both a moving step of the concave slide body 303 toward a front side from the neutral state and a moving step of the concave slide body 303 toward a rear side from the neutral state, due to the respective gradients of the front-side-use slide surfaces and the rear-side-use slide surfaces, a height of the concave/convex slide body mechanism 302 is increased in proportion to the increase of a displacement amount of the slide body.

Accordingly, during the movement of the concave slide body 303 toward a front side from the neutral state, only the front-side-use slide surfaces of the concave slide body 303 and the front-side-use slide surfaces of the convex slide body 304 are brought into contact with each other. That is, only the groove end surfaces 326a and the shoulder surfaces 327a are brought into contact with each other. On the other hand, during the movement of the concave slide body 303 toward a rear side from the neutral state, only the rear-side-use slide surface of the concave slide body 303 and the rear-side-use slide surface of the convex slide body 304 are brought into contact with each other. That is, only the groove bottom surface 326b and the projecting portion end surface 327b are brought into contact with each oilier. Further, in the neutral state, a state is brought about where the front-side-use slide surfaces of the concave slide body 303 and the front-side-use slide surfaces of the convex slide body 304 are brought into contact with each other and, at the same time, the rear-side-use slide surface of the concave slide body 303 and the rear-side-use slide surface of the convex slide body 304 are brought into contact with each other. Here, FIG. 45 shows a state where the concave/convex slide body mechanism 302 is in a neutral state.

In the clamping device 301 of this embodiment, the groove end surfaces 326a of the concave slide body 303 and the shoulder surfaces 327a of the convex slide body 304 which constitute the front-side-use slide surfaces function as the first slide surfaces respectively. Further, the groove bottom surface 326b of the concave slide body 303 and the projecting portion end surface 327b of the convex slide body 304 which constitute the rear-side-use slide surfaces function as the second slide surfaces respectively.

Next, the flat surface slide body mechanism 305 is explained. As shown in FIGS. 46(a), 46(b), FIG. 47 and the like, the flat surface slide body mechanism 305 has a slide surface on a portion thereof on a side where the inner flat plate slide body 306 and the outer flat-plate slide body 307 face each other in an opposed manner, and the inner flat plate slide body 306 and the outer flat-plate slide body 307 are brought into slide contact with each other by the slide surface.

The inner flat plate slide body 306 has a slide surface 306b formed as a flat surface, and the outer flat-plate slide body 307 has a slide surface 307b formed also as a flat surface. The slide surfaces 306b, 307b which the inner flat plate slide body 306 and the outer flat-plate slide body 307 respectively have are flat surfaces which are parallel to the axial direction (operating direction) and the lateral direction of the damping device 301. That is, the slide surfaces 306b, 307b of the inner flat plate slide body 306 and the outer flat-plate slide body 307 are surfaces parallel to the plate surface of the center axial force member 308.

The inner flat plate slide body 306 and the outer flat-plate slide body 307 are arranged so as to be slidable relative to each other in a state where the slide surfaces 306b, 307b of the inner flat plate slide body 306 and the outer flat-plate slide body 307 are brought into contact with each other. The inner flat plate slide body 306 is, in the same manner as the convex slide body 304 of the concave/convex slide body mechanism 302, a member which is fixed to the center axial force member 308 and hence, the inner flat plate slide body 306 moves integrally with the convex slide body 304. Further, the outer flat-plate slide body 307 is, in the same manner as the concave slide body 303 of the concave/convex slide body mechanism 302, a member which constitutes the biasing mechanism 320 and hence, the outer flat-plate slide body 307 moves integrally with the concave slide body 303.

In the flat surface slide body mechanism 305, a state where the outer flat-plate slide body 307 is positioned at the center in the longitudinal direction (in the fore-and-aft direction) with respect to the inner flat plate slide body 306 corresponds to a neutral state. In the flat surface slide body mechanism 305, regardless of the above-mentioned moving stage of the concave/convex slide body mechanism 302 toward a front side or a rear side from the neutral state, that is, within a slide operation range of the concave/convex slide body mechanism 302, the slide surfaces 306b, 307b are always brought into contact with each other. FIG. 47 shows a state where the flat surface slide body mechanism 305 is in the neutral state.

As described above, the damping device 301 of this embodiment includes, as the slide bodies which are indirectly fixed to the structure and are slidable relative to each other in a reciprocating manner in an opposedly facing state, the concave slide body 303 and the convex slide body 304 which constitute the concave/convex slide body mechanism 302, and the inner flat plate slide body 306 and the outer flat-plate slide body 307 which constitute the flat surface slide body mechanism 305.

The damping device 301 of this embodiment is configured to be extensible and contractable due to relative slide movement between the slide bodies in a reciprocating manner, and a damping force against the vibrations of structure is applied as an axial force along the extending and shrinking direction generated by the relative reciprocating slide movement. That is, the damping device 301 of this embodiment is configured as an axial-force member type damping device where the direction of the relative slide movement between the concave slide body 303 and the convex slide body 304 is set to the axial direction, and the first support, portion 301a and the second support portion 301b which are fixed to the structure are provided at both end sides in the axial direction.

Since the damping device 301 of this embodiment is, in the same manner as the damping device 61 of the second embodiment, the axial-force member type damping device, the damping device 301 of this embodiment can acquire higher general-use property and, further, the number of leaf springs which constitute the biasing means and the number of slide bodies of the concave/convex slide body mechanism which are relatively expensive among the constitutional members can be easily decreased whereby the constitution which is advantageous in terms of cost can be easily realized.

To be more specific, for example, in the damping device 61 of the second embodiment, at least four leaf springs 65 are required. The concave/convex slide mechanism and the U-shaped leaf springs account for the most of a manufacturing cost of the damping device. Accordingly, the decrease of the number of these parts drastically enhances the price competitiveness of the devices. In the damping device 301 of this embodiment, by stacking the concave/convex slide body mechanism 302 and the flat surface slide body mechanism 305, the manufacturing cost is cut down by using the inexpensive flat surface slide body mechanism 305 while maintaining a damping force by a frictional force generated by the flat, surface slide body mechanism 305.

In the damping device 301 of this embodiment, at least a pair of the concave/convex slide body mechanisms 302 is used, at least a pair of the flat surface slide body mechanisms 305 is used, the concave/convex slide body mechanisms 302 and the flat surface slide body mechanisms 305 are stacked each other, and at least two leaf springs 312 are used. Due to such a constitution, the damping device 301 of this embodiment can realize the more inexpensive damping device while possessing the performances equivalent to the performances of the damping device 61 of the second embodiment. By using at least two pairs of the concave/convex slide body mechanisms 302, by using at least two pairs of flat surface slide body mechanisms 305, by stacking the concave/convex slide body mechanisms 302 and flat surface slide body mechanisms 305, and by using at least four leaf springs 312, this embodiment can acquire a vibration damping device of high performance. Further, by increasing the number of stacked flat surface slide body mechanisms 305 without increasing the number of the concave/convex slide body mechanisms 302 and leaf springs 312, this embodiment can acquire a vibration damping device of higher performance. A flat surface slide body mechanism similar to the flat surface slide body mechanism 305 which the damping device 301 of this embodiment includes is applicable to the damping device 1 of the first embodiment or the damping device 61 of the second embodiment by stacking the flat surface slide body mechanism on the concave/convex slide body mechanism.

The damping device 301 of this embodiment is kinetically analyzed. As shown in FIG. 43, assume a compressive force applied to the biasing mechanism 320 which is generated along with the increase in height, caused by the sliding movement of the concave/convex slide body mechanism 302 as V, a height of the biasing mechanism 320 in a neutral state, that is, in a state where the slide displacement is not generated as $h_0$, and an increment of height of the biasing mechanism 320 from the neutral state as v. Although a force which is actually applied to the concave/convex side support plate 309 and the flat surface side support plate 310 is in the form of distributed forces, the distributed forces are expressed as a concentrated compressive force V for modeling. In the explanation hereinafter, as shown in FIG. 43, the biasing mechanism 320 to which the compressive force V is applied is referred to as "ring" since the biasing mechanism 320 forms a ring which elastically confines the increase in height generated by the sliding movement of the concave/convex slide body mechanism 302 as described above.

Assuming a spring constant of the ring in the direction of the compressive force V as S, the relationship between the compressive force V applied to the ring and a change in height v is expressed by the following formula (38).

$$V = V_0 + Sv \tag{38}$$

Here, $V_0$ is an initial compressive force introduced by pressurization or the like.

With respect to the groove end surfaces 326a and the groove bottom surface 326b forming the slide surfaces of the concave slide body 303 which constitutes the concave/convex slide body mechanism 302, the groove end surfaces 326a and the groove bottom surface 326b have the same magnitude of inclination (gradient), while the direction of inclination of the groove end surfaces 326a and the direction of inclination of the groove bottom surface 326b are opposite to each other. In FIG. 44(a), the downward direction of the groove end surfaces 326a and the groove bottom surface 326b with respect to the operating direction (arrow X) are expressed by an arrowed direction. With respect to the shoulder surfaces 327a and the projecting portion end surface 327b forming the slide surfaces of the convex slide body 304 which constitutes the concave/convex slide body mechanism 302, the shoulder surfaces 327a and the projecting portion end surface 327b have the same the magnitude of inclination (gradient), while the direction of inclination of the shoulder surfaces 327a and the direction of inclination of the projecting portion end surface 327b are opposite to each other. In FIG. 44(b), the downward direction with respect to the operating direction (arrow X) of the shoulder surfaces 327a and the projecting portion end surface 327b are expressed by an arrowed direction. All of the groove end surfaces 326a and the groove bottom surface 326b which are the slide surfaces of the concave slide body 303 and the shoulder surfaces 327a and the projecting portion end surface 327b which are the slide surfaces of the convex slide body 304, have the same gradient "i".

FIG. 49 shows the relationship between the slide displacement and the increase in height of the slide mechanism. Here, assume that the slide mechanism is a mechanism where the concave/convex slide body mechanism 302, the center axial force member 308 and the flat surface slide body mechanism 305 are stacked as shown in FIG. 49. FIG. 50 is a cross-sectional view taken along a line M-M in FIG. 49. FIG. 49 shows a state where the center position M-M of the operating direction of the concave slide body 303 and outer flat-plate slide body 307 which integrally move along with the ring is moved in the right direction (forward direction) in FIG. 49 with reference to the neutral position N-N, that is, a state where the positive slide displacement $u_d$ is generated.

In a neutral state ($u_d$=0), the groove end surfaces 326a and the groove bottom surface 326b which are the slide surfaces of the concave slide body 303 are respectively brought into contact with the shoulder surfaces 327a and the projecting portion end surface 327b which are the slide surfaces of the convex slide body 304. Assume a height (size in the vertical direction) of the slide mechanism in a neutral state as $h_0$. As shown in FIG. 49, when the positive slide displacement ($u_d$>0) is generated in the slide mechanism, the groove bottom surface 326b and the projecting portion end surface 327b are separated from each other and the groove end surfaces 326a and the shoulder surfaces 327a are brought into contact with each other. Here, the concave slide body 303 is moved upward due to the inclination of the groove end surfaces 326a and the shoulder surfaces 327a having the gradient "i" so that the height of the slide mechanism is increased. Assume an increment of height of the slide mechanism as v.

When a negative slide displacement ($u_d$>0) is generated, the groove end surfaces 326a and the shoulder surfaces 327a are separated from each other, and the groove bottom surface 326b and the projecting portion end surface 327b are brought into contact with each other. Here, the concave slide body 303 is moved upward due to the inclination of the groove bottom surface 326b and the projecting portion end surface 327b having the gradient "i" so that the height of the slide mechanism is increased. The inner flat plate slide body 306 and the outer flat-plate slide body 307 are brought into contact with each other by way of the slide surface 306b and the slide surface 307b irrespective of whether the slide displacement is positive or negative. Ignoring a change in height of the slide mechanism due to the wear of the slide surfaces and the compressive deformation in the direction perpendicular to the operating direction of the slide mechanism, it may be considered that the increase in height of the slide mechanism is in proportion to an absolute value of the slide displacement, and a proportionality coefficient is the gradient "i" of the slide surfaces of the concave/convex slide body mechanism 302. Accordingly, the increase in height of the slide mechanism is expressed by the following formula (39).

$$v = i|u_d| \quad (39)$$

In the damping device 301 of this embodiment, using the increase in height of the slide mechanism which is generated along with a change in slide displacement, the ring is expanded in the direction of the increase in height of the slide mechanism so that a compressive force which is increased in proportion to an absolute value of the slide displacement is applied to the slide mechanism. Accordingly, by putting the above formula (38) into the formula (39), the compressive force V which is applied to the slide mechanism is expressed by the following formula (40).

$$V = V_0 + iS|u_d| \quad (40)$$

A frictional force in proportion to the compressive force V is generated on the respective slide surfaces of the concave/convex slide body mechanism 302 and the flat surface slide body mechanism 305 in the direction that the slide movement is obstructed. The damping device 301 applies the frictional force to the structure as a damping force by way of center axial force member 308 and side axial force member 311.

Next, the relationship between the damping force and displacement is explained. Under the conditions where $u_d$>0, ($du_d$/dt)>0, to consider the equilibrium among a vertical resisting force and a frictional force applied to the slide surface of the concave slide body 303 and reaction forces V and $H_c$ generated by the ring, the reaction force $H_c$ which is applied to the concave slide body 303 shown in FIG. 49 is expressed by the following formula (41).

[Numerical formula 16]

$$H_c = \left(\frac{\mu_c + i}{1 - i\mu_c}\right)V, \; u_d > 0, \; \dot{u}_d > 0 \quad (41)$$

In the same manner, the reaction force $H_f$ which is applied to the flat surface slide body mechanism 305 is expressed by the following formula (42).

[Numerical formula 17]

$$H_f = \mu_f V, u_d > 0, \dot{u}_d > 0 \quad (42)$$

Accordingly, a damping force H is expressed as the sum of the reaction force $H_c$ and the reaction force $H_f$ by the following formula (43).

[Numerical formula 18]

$$H = H_f + H_c = \left(\mu_f + \frac{\mu_c + i}{1 - i\mu_c}\right)V, \; u_d > 0, \; \dot{u}_d > 0 \quad (43)$$

Here, $\mu_c$ and $\mu_f$ are respectively a dynamic coefficient of friction of the concave/convex slide body mechanism 302 and a dynamic coefficient of friction of the flat surface slide body mechanism 305. To arrange the damping force with respect to the combination with symbols of other displacement and speeds, the relationship between the damping force H and slide displacement $u_d$ of the damping device 301 expressed by the following formula (44) is obtained.

$$H = \lambda(V_0 + iS|u_d|) \quad (44)$$

Here, λ is a motion resistance coefficient determined by the following formula (45).

[Numerical formula 19]

$$\lambda = \begin{cases} \mu_f + (\mu_c + i)(1 - i\mu_c)^{-1}, \; u_d > 0, \; \dot{u}_d > 0 \\ -\mu_f - (\mu_c - i)(1 + i\mu_c)^{-1}, \; u_d > 0, \; \dot{u}_d < 0 \\ -\mu_f - (\mu_c + i)(1 - i\mu_c)^{-1}, \; u_d < 0, \; \dot{u}_d < 0 \\ \mu_f + (\mu_c - i)(1 + i\mu_c)^{-1}, \; u_d < 0, \; \dot{u}_d > 0 \end{cases} \quad (45)$$

Figure 51A:
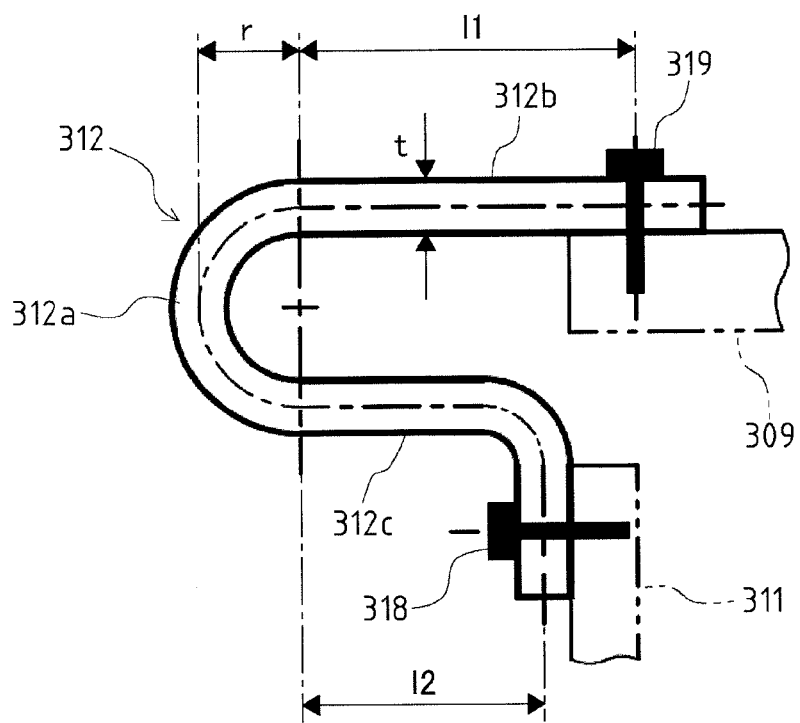
FIGS. 51(a) and 51(b) are views showing shapes and a kinetic model of the leaf spring which the vibration damping device according to the third embodiment of the present invention includes.
Figure 51B:
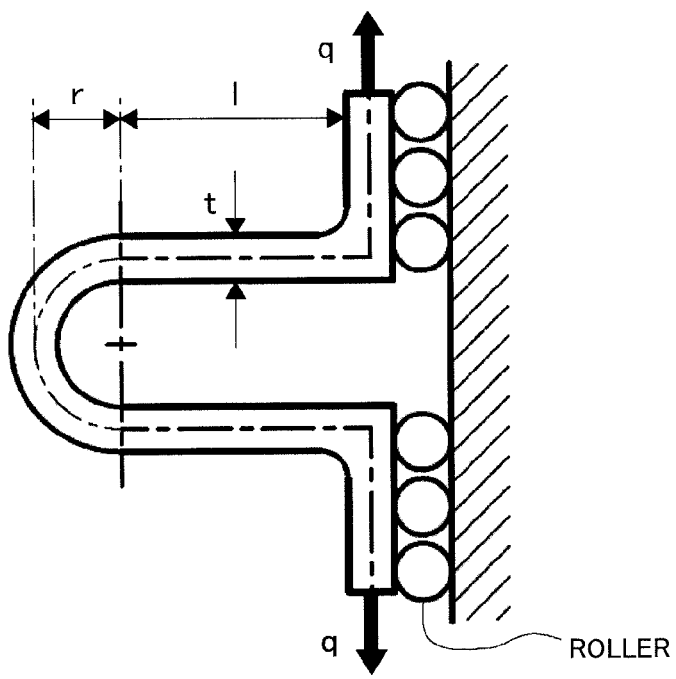

Subsequently, the shape and the spring constant of the leaf spring 312 are explained. FIGS. 51(a), 51(b) show a kinetic model used for provisionally calculating the shape and the spring constant of the U-shaped leaf spring. FIG. 51(a) shows the leaf spring 312 of the damping device 301 of this embodiment, and FIG. 51(b) shows the shape of the leaf spring adopted by the first and second embodiments.

As shown in FIG. 51(a), the leaf spring 312 is constituted of a curved portion 312a having a radius of r, a straight line portion 312b having a representing size of l1, and an L-shaped portion 312c having a representing size of l2. Assume a plate thickness of the leaf spring 312 as "t", and a length (plate width) of the leaf spring 312 in the operating direction as "d" (see FIG. 48). An end of the straight line portion 312b is connected to the concave/convex side support plate 309 by bolts 319, and an end portion of the L-shaped portion 312c is connected to the side axial force member 311 by bolts 318 respectively. To consider that the leaf spring 312 is equivalent to a U-shaped leaf spring having both end fixed shown in FIG. 51(b), a spring constant β in the direction of a load q is expressed by the following formulae (46), (47).

[Numerical formula 20]

$$\beta = \frac{\gamma d E}{2} \times \left(\frac{t}{r}\right)^3 \quad (46)$$

[Numerical formula 21]

$$\gamma = \frac{1}{4(l/r)^3 + 3\pi - \frac{6\{2 - (l/r)^2\}^2}{2(l/r) + \pi}} \quad (47)$$

Here, E is a Young's modulus. A length l of the straight line portion in FIG. 51(b) and the formula (47) is an average of sizes l1, l2 of the leaf spring 312. Assuming that the increase of a height of the ring is mainly generated by bending deformation of the leaf spring 312, it is considered that the spring constant S of the ring can be estimated based on the following formula (48).

$$S = 2\alpha\beta \quad (48)$$

Here, α is a correction coefficient determined by a load test or the like.

Although it is necessary to accurately obtain the spring constant of the ring which is closely associated with a damping force by a load test, at a plan stage of the device or the like, it is considered useful to perform the provisional calculation of the spring constant using the formula (48).

An example of the present invention is explained hereinafter. In this example, a test of confirming a static kinetic characteristic is carried out with respect to the constitution of the damping device 1 according to the first embodiment of the present invention (see FIG. 1). To be more specific, to confirm the functions of the damping device according to the present invention, the validity of the relationship between a horizontal force and the relative displacement of a damping device supported by rollers which is expressed by the formulae (8), (9), (10) and (11), and the validity of the relationship between a horizontal force and the horizontal displacement of a rigid frame on which the damping device is mounted which is expressed by the formulae (31) are verified by carrying out a simulation test. This example relates to the above-mentioned constitution of the damping device 1 of the first embodiment of the present invention and hence, symbols used for describing the damping device 1 of the first embodiment are also used in the explanation of this example.

Firstly, in this example, the test is carried out with respect to the damping device 1 supported by the rollers. In this example, stainless steel (SUS304) is used as a material of the concave slide body 3, and free-cutting brass (C3604) is used as a material of the convex slide body 4. A gradient "i and a horizontal length "$l_d$" of a slide surface are set to 0.02 and 400 mm respectively (i=0.02, $l_d$=400 mm). A height of the assembled concave slide body 3 and convex slide body 4 in a neutral state, that is, a height of the slide body mechanism 2 in a neutral state is 51 mm ($h_d$=51 mm).

A width $b_F$ of a front-side-use slide surface (groove end surface 11a) of the concave slide body 3 and a width $b_B$ of a rear-side-use slide surface (groove bottom surface 11b) of the concave slide body 3 are 5.9 mm and 8.2 mm ($b_F$=5.9 mm, $b_B$=8.2 mm) respectively. A width $b_F$ of a front-side-use slide surface (shoulder surface 12a) of the convex slide body 4 and a width be of a rear-side-use slide surface (projecting portion end surface 12b) of the convex slide body 4 are 6.1 mm and 7.8 mm ($b_F$=6.1 mm, $b_B$=7.8 mm) respectively. Although a machine-finished design value of the slide surface is set such that the average roughness $R_a$ is 1.6 or below ($R_a$=1.6 or below), the actual surface roughness is not measured. A lubricant such as an ethylene-trichloride-based lubricant is applied to the slide surface for decreasing the difference between a dynamic coefficient of friction and a static coefficient of friction. The dynamic coefficient of friction of the slide surface is explained later.

In this example, four leaf springs 5 are arranged on both respective side surfaces of the slide body so that eight leaf springs 5 in total are arranged on the slide body (see FIG. 1). The leaf springs 5 integrally connect the convex slide body 4 and the support beam 6 to each other. A material of the leaf spring 5 is stainless steel strip for spring use (SUS304-CSP), and design sizes of the respective parts of the leaf spring 5 are set such that φ=0.3 mm, α=5 mm, β=5.15 mm, γ=42 mm (see FIG. 12, FIG. 14). Further, the leaf springs 5 are connected to side surfaces of the convex slide body 4 and the support beam 6 respectively using six M3-size bolts (bolts 24, 25) per each leaf spring 5. To be more specific, the lower fixing portion 21 of the leaf spring 5 is fixed to the side surface of the convex slide body 4 by three M3-size bolts, and the upper fixing portion 22 of the leaf spring 5 is fixed to the side surface of the support beam 6 by three M3-size bolts. A vertical spring constant of the damping device 1 is explained later.

An aluminum alloy (A6063) is used as a material of the support beam 6. Sizes of the support beam 6 are set such that a height is 25 mm, a width is 20 mm and a length is 400 mm (25×20×400 mm). A total mass of the convex slide body 4, the leaf springs 5 and the support, beam 6 is 2.57 kg.

Figure 52:
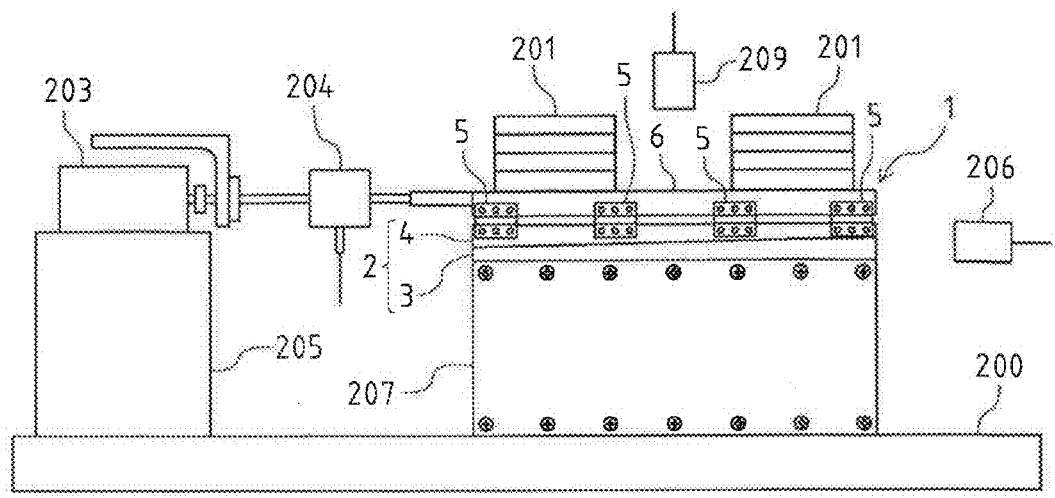
FIG. 52 is a view showing the constitution of a friction test device according to an example of the present invention.

A change in dynamic coefficient of friction and a change in height in the damping device 1 are explained. FIG. 52 is a view showing the constitution of a friction test device which measures a dynamic coefficient of friction of the slide surface in this example. In the friction test device according to this example, the concave slide body 3 of the damping device 1 is fixed to lower side walls 207 which are fixed to the upper portion of the platform 200 using bolts. In this example, the lower side walls 207 are walls made of an aluminum alloy (A5052, t=3 mm×2). A weight 201 is mounted on the support beam 6.

As shown in FIG. 52, in the friction test device of this example, a horizontal force for operating the damping device 1 is applied to the support beam 6 by an actuator 203. The actuator 203 is connected to the support beam 6 in the horizontal direction by way of a load meter 204. The actuator 203 is supported on a support strut 205 which is mounted on the platform 200.

Due to such a constitution, when the actuator 203 is driven in the horizontal direction, a horizontal force necessary for operating the damping device 1 is applied to the support beam 6, and the horizontal force is measured by the load meter 204. A rated capacity of the load meter 204 is 200N, a drive speed of the actuator 203 is 0.048 mm/s, and the resolution of the actuator 203 is 0.004 mm/step.

In the friction test device of this example, the horizontal displacement of the convex slide body 4 is measured by a horizontal displacement meter 206. A change in height of the support beam 6 is measured by a vertical displacement meter 209. The horizontal displacement meter 206 and the vertical displacement meter 209 are respectively formed of a laser displacement meter which has the resolution of 0.002 mm. A mass of the weight 201 mounted on the support beam 6 is selectively set in 4 cases, that is, 4 kg, 8 kg, 12 kg and 16 kg.

Figure 53:
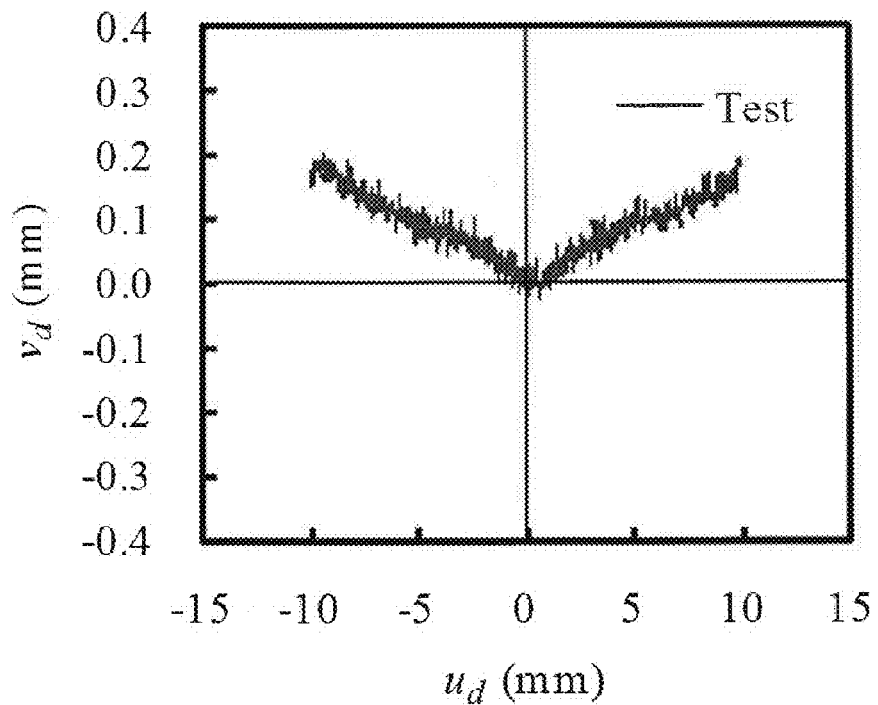
FIG. 53 is a view showing the relationship between a horizontal displacement and a change in height of the vibration damping device according to the example of the present invention.
Figure 54:
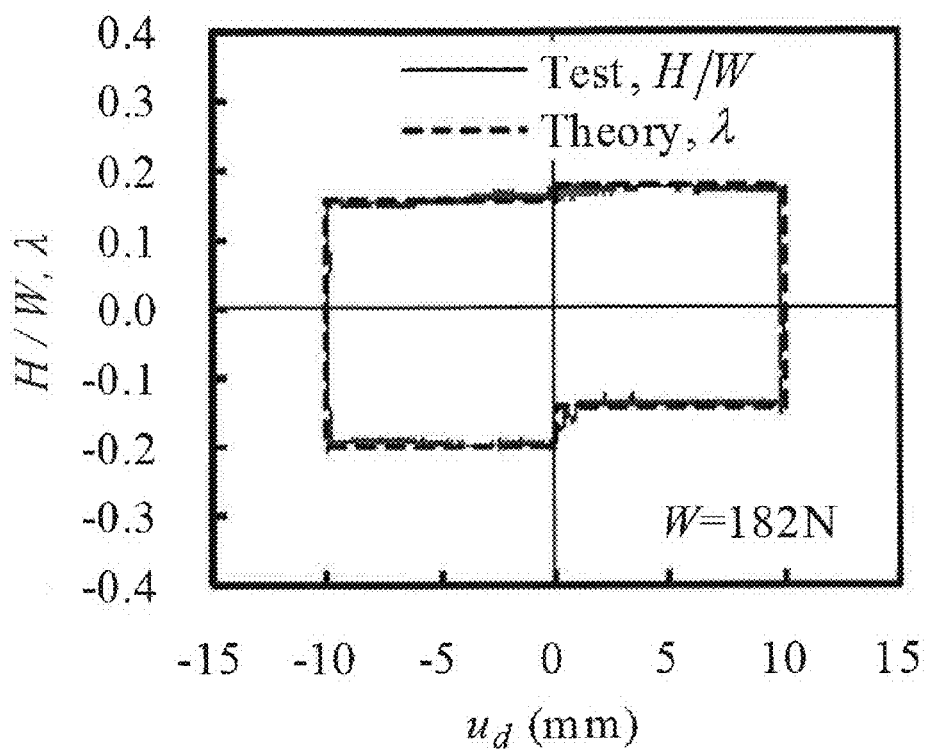
FIG. 54 is a view showing hysteresis curves of a horizontal force and a relative displacement of the vibration damping device according to the example of the present invention.

FIG. 53 shows the relationship between a change in horizontal displacement and a change in height of damping device 1 when the weight of 16 kg is mounted on the support beam 6. FIG. 54 shows a hysteresis curve of a horizontal force and the relative displacement of the damping device 1 when the weight of 16 kg is mounted on the support beam 6 in the same manner. The horizontal force H is divided by a total weight (W=178N) of the weight 201, the convex slide body 4, the leaf springs 5 and the support beam 6 so that the horizontal force H is non-dimensionalized.

As shown in FIG. 53, in the damping device 1, a change in height ($v_d$) of 0.2 mm is generated when the relative displacement (horizontal displacement, $u_d$) is 10 mm. It is confirmed that a gradient "i" of the slide surface is 2% (i=2%) based on such a change in height. Although the change in height has an error of ±0.05 mm, it is considered that such an error is generated clue to following two phenomenon. One phenomenon is that the damping device 1 vibrates in the vertical direction along with the operation of the actuator 203. Another phenomenon is that a reflection surface on which a laser beam irradiated from the vertical displacement meter 209, that is, an upper surface of the support beam 6 moves in the horizontal direction and hence, the unevenness of the reflection surface influences a measured value obtained by the vertical displacement meter 209.

In FIG. 54, a motion resistance coefficient (expressed as Theory) when a dynamic coefficient of friction of the slide surface in the formulae (8), (9), (10) and (11) is set such that the dynamic coefficient of friction tip $\mu_F$ is 0.16 ($\mu_F$=0.16) and the dynamic coefficient of friction $\mu_B$ is 0.18 ($\mu_B$=0.18) and a gradient of the slide surface is set to 0.02 (i=0.02) is also shown. It is confirmed from FIG. 54 that a ratio H/W (expressed as Test) between the horizontal force and the vertical force obtained by the test well conforms to a motion resistance coefficient λ. Also with respect to the case where the weight of the weight 201 is changed to 16 kg, it is confirmed that a ratio H/W between the horizontal force and the vertical force well conforms to the above-mentioned motion resistance coefficient λ.

Figure 55:
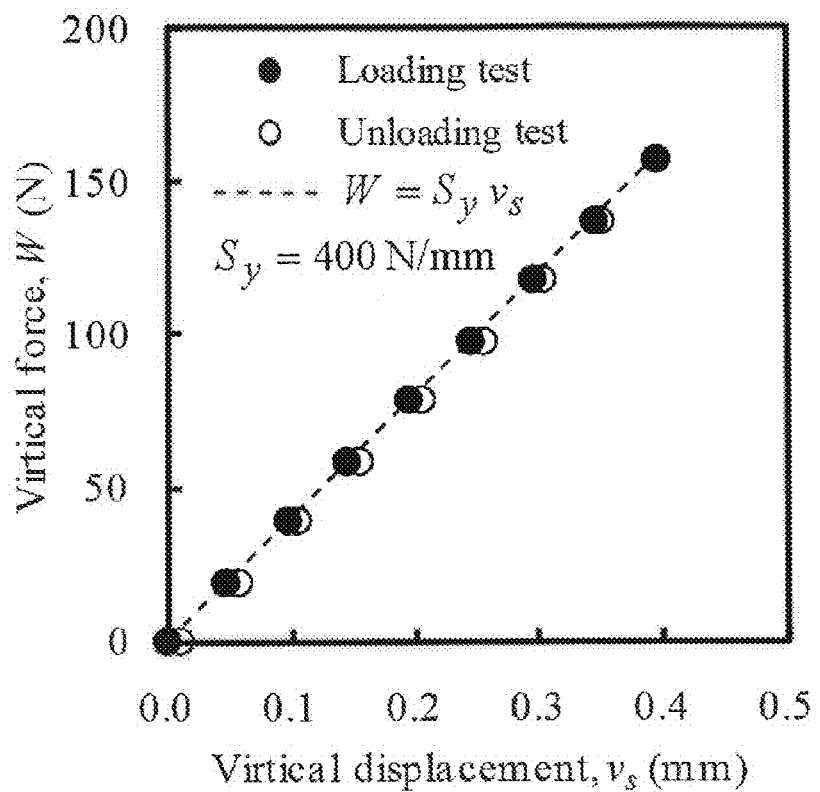
FIG. 55 is a view showing the relationship between a vertical force and a vertical displacement of the vibration damping device according to the example of the present invention.

Subsequently, a vertical spring constant of the damping device 1 according to this example is explained. FIG. 55 shows the relationship between a vertical force and the vertical displacement of support beam 6 generated by the weight 201 in a state where the actuator 203 is removed in the friction test device of this example (see FIG. 52). It is confirmed from FIG. 55 that the relationship between a vertical force and the vertical displacement becomes linear in both at the time of loading a weight (Loading test) and at the time of unloading the weight (Unloading test). From the result of the test, as a vertical spring constant $S_y$ of the damping device 1, is obtained ($S_y$=400 N/mm).

On the other hand, to estimate a vertical spring constant $s_y$ of the leaf spring 5 per one leaf spring using the formula (16) and the formula (17), the vertical spring constant $s_y$ becomes 61.8N/mm ($s_y$=61.8N/mm). Here, a deflection coefficient of stainless steel strip for spring use (SUS304-CSP) prescribed as a reference value in JIS G5443 (Japanese Industrial Standard: stainless steel strip for spring use, JIS G4313, 1977) is set to a Young's modulus (E=167000N/mm$^2$), and a value of G/E is set to 0.385. To estimate the vertical spring constant of the damping device 1 using the above-mentioned theoretical value of the spring constant, the vertical spring constant becomes 494 N/mm. To compare this value with the test value $S_y$ ($S_y$=400 N/mm), the correction coefficient Ψ used in the formula (20) becomes 0.81 (Ψ=0.81).

Figure 56:
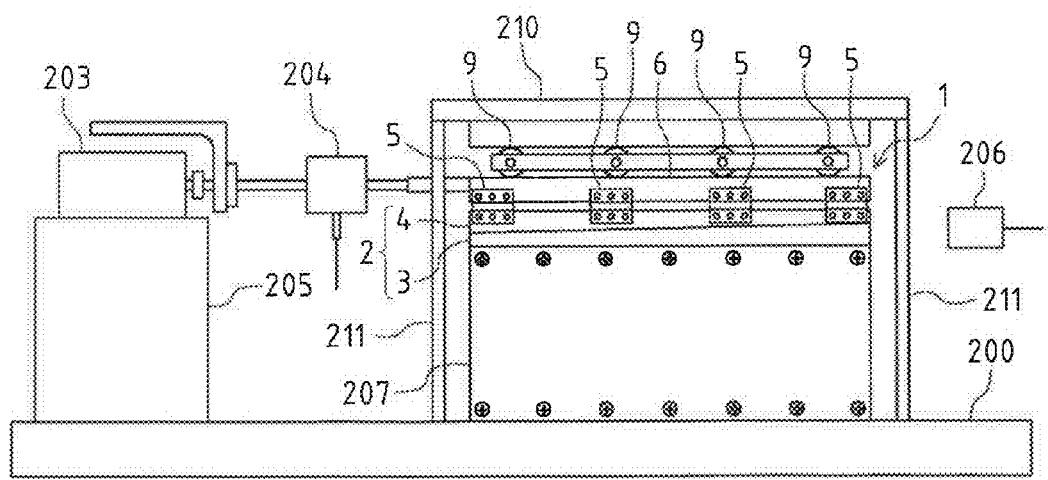
FIG. 56 is a view showing the constitution of test device for the vibration damping device according to the example of the present invention.

Next, a test for verifying the validity of a kinetic model of the damping device 1 is explained. FIG. 56 shows the constitution of a test device of the damping device 1 which is supported on rollers. The test device shown in FIG. 56 corresponds to a kinetic model of the damping device 1 shown in FIG. 8 and FIG. 9. In the test device shown in FIG. 56, parts identical with the parts of the friction test device shown in FIG. 52 are given the same symbols and the explanation of these parts is omitted.

In the test device shown in FIG. 56, a roller mechanism having rollers 9 is arranged on an upper side of the support beam 6 in the friction test device shown in FIG. 52. A beam 210 is arranged above the roller mechanism. The beam 210 supports the roller mechanism in the vertical direction. That is, the beam 210 is arranged on the upper side of the support beam 6 by way of the roller mechanism having the rollers 9. The beam 210 is connected to a platform 200 using four pillars 211 (only two pillars 211 shown in FIG. 56), and is fixed to the platform 200 by a support mechanism such as fixing jigs (not shown in the drawing) and hence, the beam 210 is fixed in the horizontal direction as well as in the vertical direction.

The roller mechanism which this device includes has four rollers 9, and these rollers 9 are respectively supported at positions arranged approximately equidistantly spaced apart in the horizontal direction. The rollers 9 are supported such that the rollers 9 are rotatable along with the horizontal displacement of the support beam 6 in a state where the rollers 9 are sandwiched between the support beam 6 and the beam 210. In this example, the roller 9 is a roller made of aluminum having a diameter of 20 mm. In the test device having the above-mentioned constitution, an actuator 203 is driven in the horizontal direction, a frictional force applied to the damping device 1 is measured by a load meter 204, and a horizontal displacement of a convex slide body 4 is measured by a horizontal displacement, meter 206.

Figure 57:
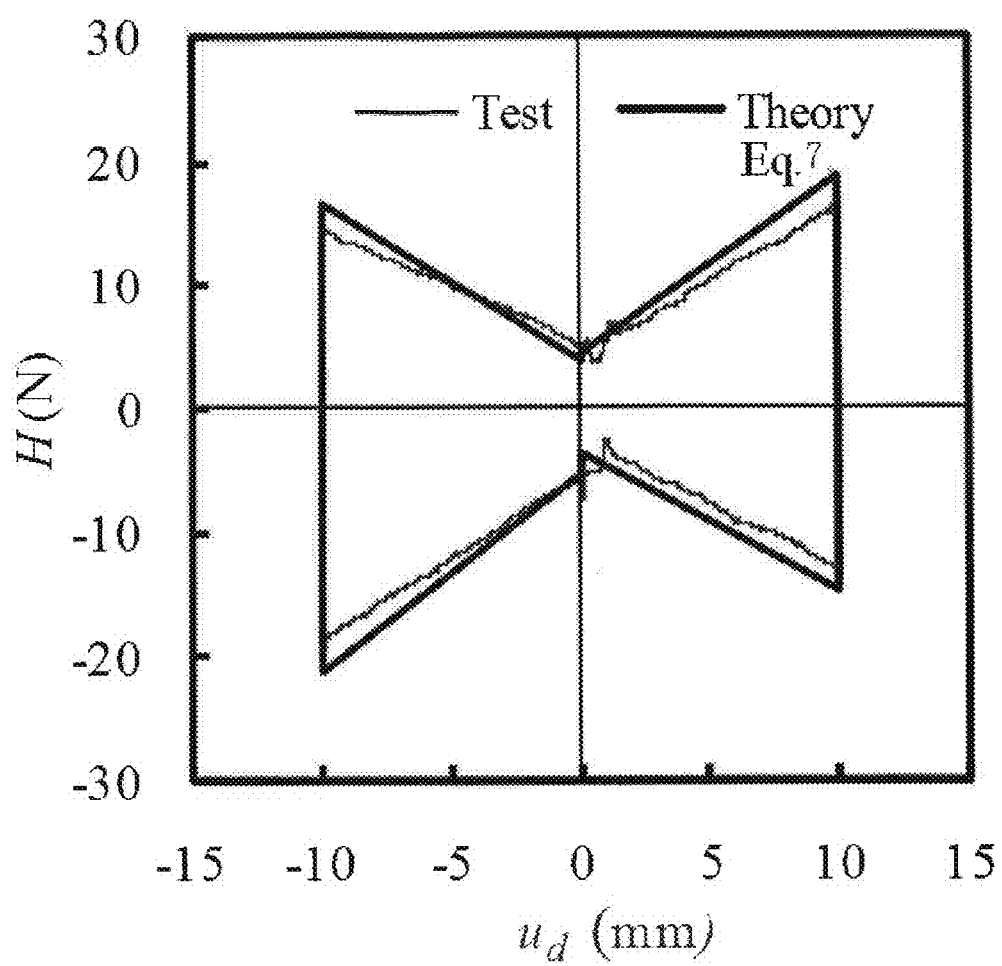
FIG. 57 is a view showing a comparison between a calculated value and a test value with respect, to hysteresis curves of a horizontal force and a horizontal displacement in the vibration damping device according to the example of the present invention.

FIG. 57 shows the comparison between a hysteresis curve calculated by a relational formula between a horizontal force and a horizontal displacement expressed by formulae (7), (8), (9), (10) and (11) and a hysteresis curve obtained by the test. A gradient "i" of a slide surface, an initial compressive force $V_0$, a vertical spring constant $S_y$, and dynamic coefficients of friction $\mu_F$, $\mu_B$ of the slide surfaces are respectively set such that i=0.02, $V_0$=25.2N, $S_y$=400 N/mm, $\mu_F$=0.16 and $\mu_B$=0.18.

From FIG. 57, it is confirmed that a test value matches well with a theoretical value (calculated value), and the hysteresis curves of both the test value and the theoretical value take a shape similar to a shape of a butterfly when the butterfly spreads its wings. Further, the inclination of the hysteresis curve of the test value is slightly smaller than the inclination of the hysteresis curve of the theoretical value. The reason is considered that although the influence exerted by a rolling friction of the rollers 9 is included in the test value, the rolling friction of the rollers is ignored in the theoretical value. Here, a deformation amount of the leaf spring 5 in the horizontal direction is small during the test, and the difference in horizontal displacement between the convex slide body 4 and the support beam 6 which are connected with each other by the leaf springs 5 in the vertical direction is so small that the difference can be ignored.

Figure 58:
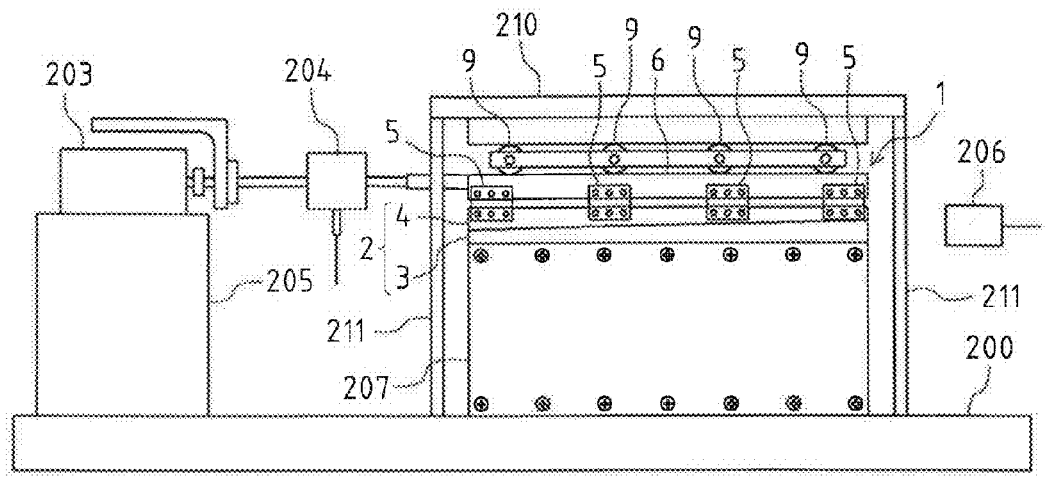
FIG. 58 is a view showing the constitution of a test device for a rigid frame on which the vibration damping device according to the example of the present invention is mounted.

Subsequently, a test for a rigid frame on which the damping device 1 according to this example is mounted is explained. FIG. 58 shows the constitution of a test device for a one-layer rigid frame on which the damping device 1 according to this embodiment is mounted. The test device shown in FIG. 58 is a test device obtained by modifying the test device shown in FIG. 56 is such a manner that the beam 210 is moved to an upper side and the roller mechanism having the rollers 9 is replaced with an upper side wall 208. The upper side wall 208 is a wall made of an aluminum alloy (A5052, t=3 mm×2). The upper side wall 208 is fixed to a support beam 6 and a beam using bolts.

Left and right pillars 211 are formed of two steel bolts (M6, SS400), and the beam 210 is made of bright flat square steel (SS400) having a cross-sectional size of 100×19. A height "h" and a length "l" of the rigid frame are set to 400 mm and 500 mm (h=400 mm, l=500 mm) respectively. Further, a distance "e" between the pillar 211 and the upper side wall 208 and a distance "e" between the pillar 211 and the lower side wall 207 (see FIG. 15) are 50 mm respectively (e=50 mm). Further, in the test device shown in FIG. 58, an actuator 203 is connected with the beam 210 by way of a load meter 204.

In the test device having the above-mentioned constitution, the actuator 203 is driven in the horizontal direction, a horizontal force applied to the rigid frame is measured by the load meter 204, and the horizontal displacement of the rigid frame is measured by a horizontal displacement meter 206. Although the horizontal displacement of the support beam 6 of the damping device 1 and the horizontal displacement of the beam 210 of the rigid frame are respectively measured, the difference between both horizontal displacements is small. Further, the elastic deformation of the upper side wall 208 in the horizontal direction and the elastic deformation of the leaf spring 5 in the horizontal direction are so small compared to the relative displacement of the damping device 1 that the elastic deformation can be ignored.

Figure 59:
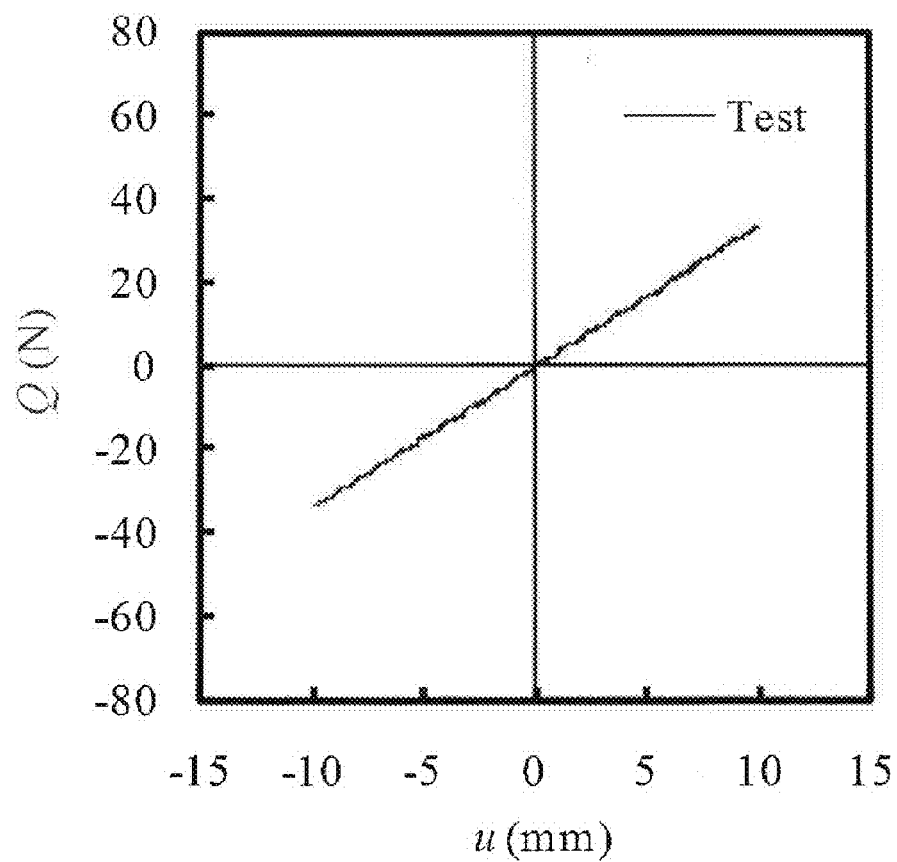
FIG. 59 is a view showing hysteresis curves of a horizontal force and a horizontal displacement of a rigid frame in the form of the single unit according to the example of the present invention.

FIG. 59 is a hysteresis curve of a horizontal force and the horizontal displacement during 1 cycle of loading and unloading a load on or from the rigid frame from which the damping device 1 is removed. From FIG. 59, it is confirmed that, in the rigid frame from which, the damping device 1 is removed, a hysteresis curve takes the substantially same path both at the time of loading a load and at the time of unloading the load, and the relationship between the horizontal force and the horizontal displacement takes a linear shape.

A horizontal spring constant of the rigid frame obtained by the result of the test shown in FIG. 59 is 3.4 N/mm ($K_x$=3.4 N/mm). Bending rigidity of the pillar 211 obtained by a bending test which is carried out separately is $1.1 \times 10^7$ Nmm² ($E_c I_c \cong 1.1 \times 10^7$ Nmm²). A horizontal spring constant which is calculated in the formula (30) using the bending rigidity is 4.2 N/mm. In the formula (30), although it is assumed that the pillar 211 is completely fixed to the beam 210 and a base portion (the beam with both ends fixed), it is thought that the rotation is generated by the elastic deformation of a mounting portion of the rigid frame so that the actual horizontal spring constant becomes smaller than a theoretical value.

Figure 60:
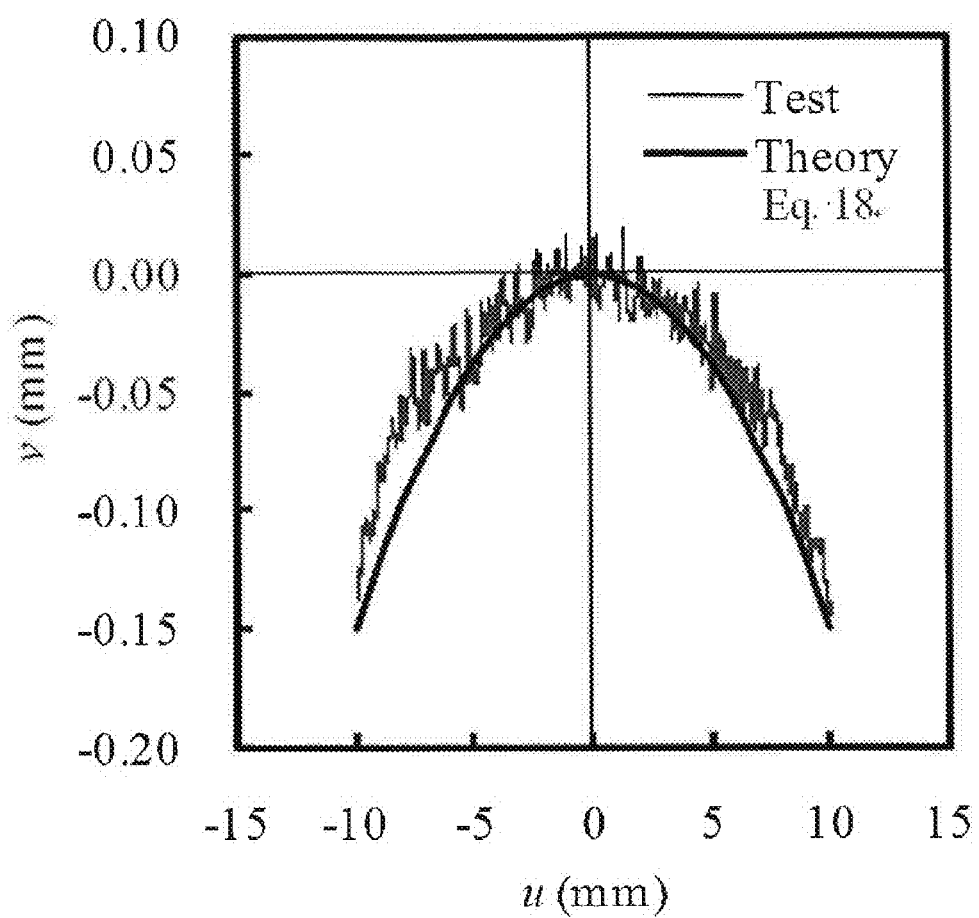
FIG. 60 is a view showing a comparison between a calculated value and a test value with respect to a horizontal displacement and a vertical displacement of the rigid frame in the form of a single unit according to the example of the present invention.

FIG. 60 is a graph showing the comparison between the relationship between a horizontal displacement u and a vertical displacement v of the rigid frame which are calculated by a formula (24) and a test value. From FIG. 60, it is confirmed that the vertical displacement changes in a parabolic shape with respect to the horizontal displacement, and a test value matches well with the theoretical value.

Figure 61:
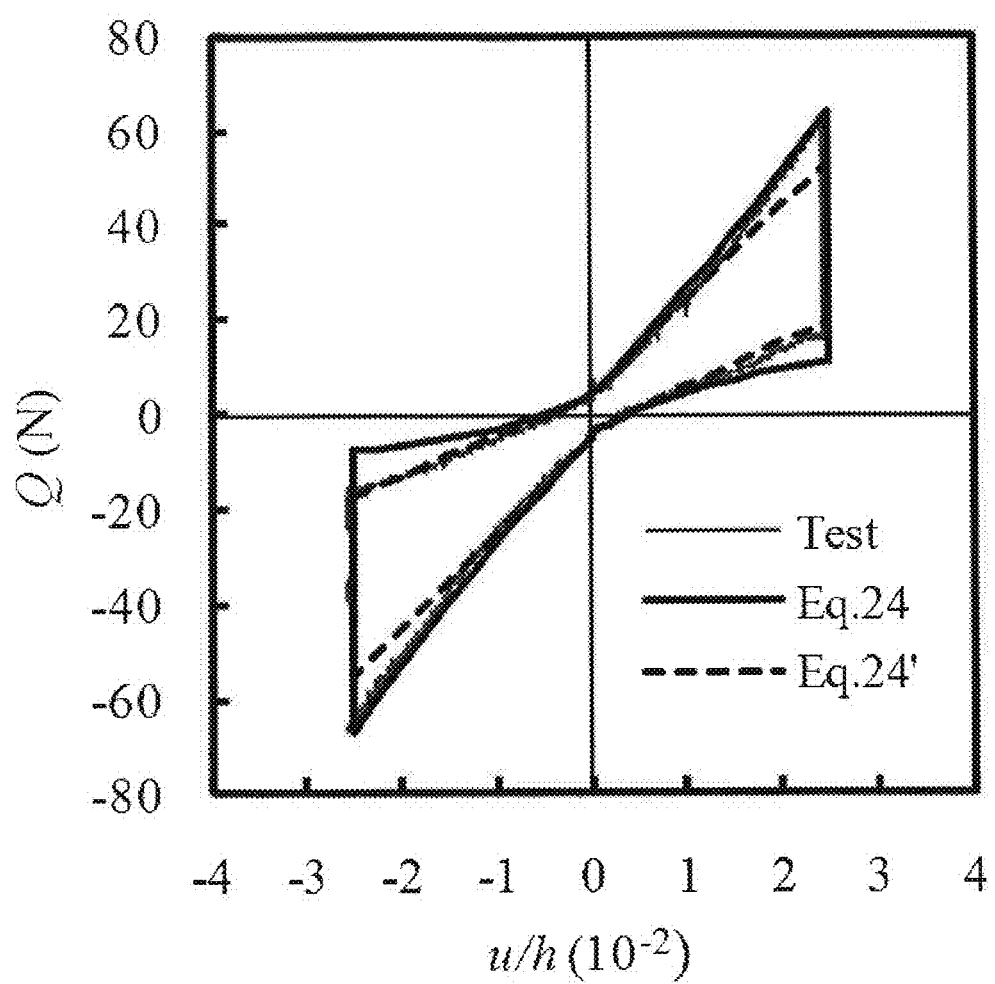
FIG. 61 is a view showing hysteresis curves of a horizontal force and a horizontal displacement of a rigid frame on which the vibration damping device according to the example of the present invention is mounted.

Next, hysteresis curves of a horizontal force and a horizontal displacement of the rigid frame on which the damping device 1 according to this example is mounted is explained. FIG. 61 shows the comparison between the hysteresis curve (Test) of a horizontal force and a horizontal displacement during 1 cycle of the rigid frame on which the damping device 1 is mounted which are obtained by a test, a hysteresis curve (Eq. 31) calculated by the formula (31), and a hysteresis curve (Eq. 31') calculated by the formula (31) while ignoring a secondary displacement of the rigid frame in the vertical direction. Here, the calculation condition of the formula (31) is set such that, i=0.02, $V_0$=25.2N, $\mu_F$=0.16, $\mu_B$=0.18, $K_x$=3.4 N/mm, and $S_y$=400 N/mm. Further, to provisionally calculate a spring constant of the rigid frame in the vertical direction based on a section modulus of the pillar 211, the spring constant becomes 39000 N/mm ($K_y \cong$ 39000 N/mm). Since the relationship between $K_y$ and $S_y$ becomes $K_y \gg S_y$ and hence, $S_{yc}$ becomes substantially equal to $S_y$ ($S_{yc} \cong S_y$).

From FIG. 61, it is confirmed that, when a horizontal displacement falls within a range of u/h<0.01, the influence exerted by the secondary displacement of the rigid, frame in the vertical direction is small so that a theoretical value in which a secondary displacement is ignored and a test value match well with each other. Mien the horizontal displacement falls within a range of u/h≥0.01, it is confirmed that a theoretical value in which a secondary displacement is ignored matches well with a test value in a frontward moving time/at a point of time of retracting and in a rearward moving time/at a point of time of advancing. However, it is confirmed that the difference between a theoretical value and a test value is increased in a frontward moving time/at a point of time of advancing and in a rearward moving time/at a point of time of retracting. With respect to a theoretical value in which a secondary displacement is taken into consideration, it is confirmed that although the theoretical value relatively matches well with a test value in a frontward moving time/at a point of time of advancing and in a rearward moving time/at a point of time of retracting, the difference between the theoretical value and the test value is increased in a frontward moving time/at a point of time of retracting and in a rearward moving time/at a point of time of advancing. Since it is thought that a practical horizontal displacement of the rigid frame falls within a range of u/h<0.01, practically, it is thought that the secondary displacement may be ignored in the formula (31).

Further, it is understood from FIG. 61 that even when a horizontal displacement region where the secondary displacement should be taken into consideration is taken into consideration, a hysteresis curve which is calculated using the formula (31) while ignoring the secondary displacement falls inside a hysteresis curve obtained by the test so that an area which the former hysteresis curve surrounds is smaller than an area which the latter hysteresis curve surrounds. In FIG. 61, the area which the hysteresis curve obtained while ignoring the secondary displacement surrounds corresponds to the dissipation energy in the formula (13) and hence, it is thought that the equivalent viscous damping coefficient shown by the formula (34) can be ensured by the damping device 1 of this embodiment with high possibility.

Assuming a dynamic coefficient of friction of a front-side-use slide surface and a dynamic friction coefficient of a rear-side-use slide surface as 0.17 ($\mu$0=0.17), and applying various constants relating to the rigid frame and the damping device 1 which are proposed previously, that is, i (=0.02), $V_0$ (=25.2N), $K_x$ (=3.4 N/mm), and $S_y$ (=400 N/mm) to the formula (34), a following equivalent viscous damping coefficient can be obtained.

$$\zeta_e = 0.127 + (0.802/a) \tag{49}$$

It is estimated from the formula (49) that an equivalent viscous damping coefficient of the rigid frame on which the damping device 1 according to this example is mounted when the rigid frame resonates is approximately 0.2 in the case where amplitude "a" is approximately 10 mm, and the equivalent viscous damping coefficient gradually approaches to 0.127 along with the increase of the amplitude "a".

Due to the above-mentioned embodiment of the present invention, the static kinetic characteristic is clarified with respect to the constitution of the damping device 1 according to the first embodiment of the present invention. According to the embodiment of the present invention, although model tests are carried out under limited conditions, since the theoretical value and the test value match well with each other with respect, to the static kinetic characteristic of the rigid frame on which the damping device is mounted and hence, it is safe to say that there is high possibility that the damping device according to the present invention functions as a damping device which suppresses vibrations of structure.

Findings which are made with respect to the present invention based on the above-mentioned embodiments of the present invention and the like are recapitulated as follows.

(a) The damping device according to the present invention can generate a frictional force which is increased in proportion to an absolute value of the relative displacement by suppressing a change in height caused by a relative displacement of the slide body using the members arranged in the inside of the structure.

(b) With respect to a hysteresis curve of a horizontal force and a horizontal displacement of the damping device which is supported on the rollers and a hysteresis curve of a horizontal force and a horizontal displacement of the rigid frame on which the damping device is mounted, a theoretical value and a test value match well with each other, and the hysteresis curves take a shape similar to a shape of a butterfly when the butterfly spreads its wings.

(c) By suitably combining a gradient and a friction coefficient of the slide surface, a vertical spring constant of the leaf spring which constitutes the biasing means, and an initial compressive force, an area which a hysteresis curve of a horizontal force and a horizontal displacement of the damping device surround can be changed.

(d) From the characteristic of a hysteresis curve of a horizontal force and a relative displacement of the damping device which is supported on the rollers, an equivalent viscous damping coefficient of the damping device is inversely in proportion to the number of vibrations and hence, the smaller the number of vibrations, the larger the equivalent viscous damping coefficient becomes.

(e) By sufficiently decreasing the initial compressive force of the damping device, the equivalent viscous damping coefficient can be made approximately constant ranging from vibrations of small amplitude to vibrations of large amplitude.

Next, the explanation is made with respect to an example where the constitution of a damping device 301 according to the third embodiment is adopted as an example of the present invention. Firstly, design conditions and data on the damping device 301 of this embodiment are explained.

In this embodiment, the following conditions are used as the design conditions. A designed damping force is set to 10 kN. This value is a target value. Data on a high-rise building which is an object of vibration control is assumed such that an eaves height is 250 m, a natural period is 5 seconds, a height of story is 4 m, and a maximum interlayer deformation angle of the high-rise building which resonances with an earthquake motion is 1/200. Design width $a_d$ of the device is set to 20 mm based on the height of story and the maximum interstory deflection angle. However, the maximum amplitude of the device is set to 40 mm.

Further, a gradient of a slide surface of the concave/convex slide body mechanism 302 is set to 0.02 (gradient i=0.02). A dynamic coefficient of friction μ of the slide surface is set to 0.2 or more. In expectation of ensuring the stability of a dynamic coefficient of friction by setting the dynamic coefficient of friction to 0.2 or more and by making use of a solid lubrication action of lead, a sliding member is formed by combining a soft material which is made of bronze casting (CAC406C) containing 4 to 6% of lead and a hard material which is made of stainless steel (SUS304) having high weather resistance. A wear loss of the soft material is larger than a wear loss of the hard material. Accordingly, in expectation of making the wear loss of the soft material uniform in the operating direction, the concave slide body 303 and the outer flat-plate slide body 307 having a short size in the operating direction with respect to a counterpart are made of a soft material, and the convex slide body 304 and the inner flat plate slide body 306 which constitute the counterpart are made of a hard material. The leaf springs 312, the center axial force member 308, the concave/convex side support plate 309, the flat surface side support plate 310, the side axial force members 311, the connection plate 321, and the support member 323 are made of carbon steel (S50C).

Figures 62, 63:
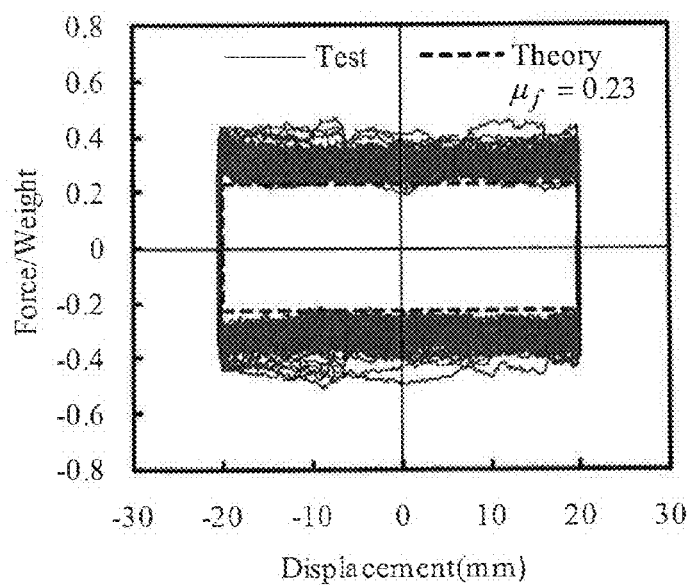
FIG. 62 is a view showing a table with respect to various data on the vibration damping device according to the example of the present invention.
FIG. 63 is a view showing hysteresis curves of a motion resistance force and a slide displacement of a flat surface slide body mechanism of the vibration damping device according to the example of the present invention.

In Table shown in FIG. 62, as data on the damping device 301, sizes and apparent contact surfaces of the slide surfaces of the concave slide body 303, the convex slide body 304, and the inner flat plate slide body 306 and the outer flat-plate slide body 307 which constitute two flat surface slide bodies are described. Surface roughnesses are confirmed with naked eyes using a roughness gauge while setting machine-finished design values of slide surfaces of these slide bodies to 1.6 $\mu m R_a$ or below.

Sizes (width×thickness×length) of the center axial force member 308, the side axial force member 311, the connection plate 321 and the support member 323 are respectively set to 165×25×990 mm, 100×25×990 mm, 165×25×255 mm, and 100×25×165 mm. The slide plates 324, 325 which are mounted on the side axial, force members 311 and the support members 323 are respectively made of a brass alloy plate having a thickness of 10 mm in which molybdenum disulfide is embedded. To connect the damping device 301 to a reciprocation sliding test device by pin connection, a spherical bearing is embedded in the hole portion 301c formed in the center axial force member 308 and in the hole portion 301d formed in the connection plate 321. An outer diameter of a connecting pin is 30 mm.

With respect to the leaf spring 312, the outer periphery of a material for forming the leaf spring 312 is formed using a wire saw and, thereafter, the inner periphery of the material is cut. Then, the inner and outer peripheries are ground for finishing thus providing the leaf spring 312 having a predetermined size. A plate thickness of the leaf spring 312 is 16 mm. Sizes of respective portions of the leaf spring 312 are set such that a radius "r" is 30 mm, a representative size "l1" is 111 mm, a representative size "l2" is 91 mm, a plate thickness "t" is 16 mm, and a plate width "d" is 220 mm.

A plate thickness of the concave/convex side support plate 309 and a plate thickness of the flat surface side support plate 310 are 30 mm respectively. A total length and a total mass of the damping device 301 are 1,185 mm and 171 kg respectively. The connection between the flat surface side support plate 310 and the side axial force member 311 is made by a high strength bolted tensile/friction joint (bolts 314 shown in FIG. 43), and the connection between all other members is made by a high strength bolted friction joint. The connection between the concave/convex side support plate 309 and the concave slide body 303, and the connection between the flat surface side support plate 310 and the flat surface slide body mechanism 305 is made using M10 bolts, the connection of all other members is made using M12 bolts. All bolts belong to a division of strength of 10.9. A fastening force of the bolts is managed by a torque control method.

Figure 64:
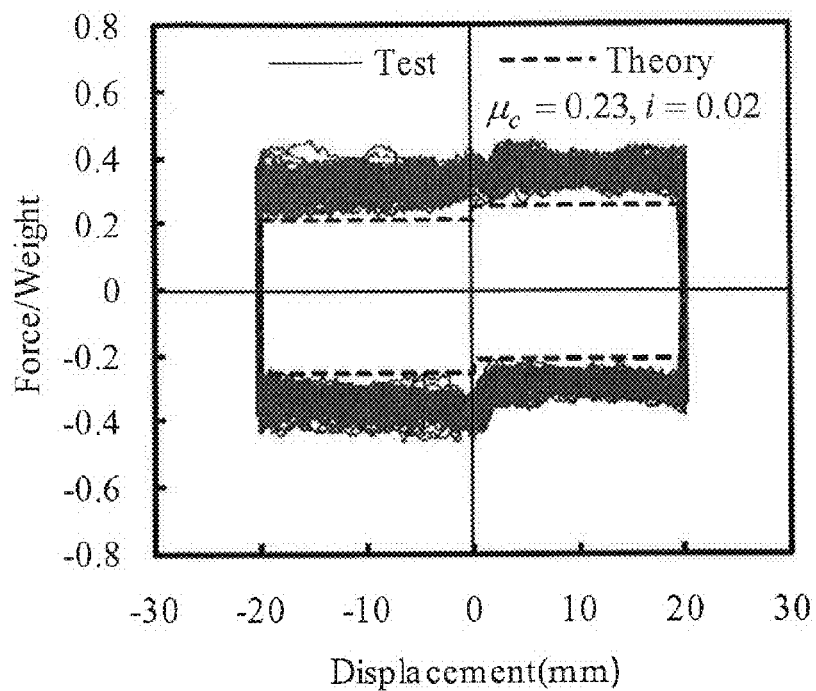
FIG. 64 is a view showing hysteresis curves of a motion resistance force and a slide displacement of a concave/convex slide body mechanism of the vibration damping device according to the example of the present invention.

A reciprocating sliding mechanism test is carried out Under the above-mentioned design conditions and data on the damping device 301. FIG. 63 and FIG. 64 show a hysteresis curve of a motion resistance force and a slide displacement with respect to the concave/convex slide body mechanism 302 and a hysteresis curve of a motion resistance force and a slide displacement with respect to the flat surface slide body mechanism 305 respectively which are obtained by carrying out the slide mechanism test 100 times continuously.

FIG. 63 shows a hysteresis curve of the flat surface slide body mechanism 305. A weight is placed on the flat surface slide body mechanism 305 shown in FIG. 47, the inner flat plate slide body 306 is fixed, and the outer flat-plate slide body 307 is slid in a reciprocating manner in the operating direction (arrow X) using an electrically-operated actuator. A drive force of the actuator at the time of sliding the outer flat-plate slide body 307 in a reciprocating manner is measured by a load meter, and the measured drive force is set as a motion resistance force.

A load applied from above which is set to a total weight of the weight and the outer flat-plate slide body 307 is 354N. Slide amplitude, a slide speed and an apparent slide face pressure are set to 20 mm, 1.76 mm/sec, and 0.011 N/mm² respectively. In FIG. 63 and FIG. 64, a hysteresis curve (Theory) when a dynamic coefficient of friction $\mu_f$ is 0.23 ($\mu_f$=0.23) is also described. From FIG. 63 and FIG. 64, it is confirmed that a ratio between a motion resistance force and a load applied from above is distributed within a range from 0.23 to 0.45.

FIG. 64 shows a hysteresis curve of the concave/convex slide body mechanism 302. A testing method and testing conditions are equal to the testing method and testing conditions used with respect to the hysteresis curve of the flat surface slide body mechanism 305. Here, an apparent slide face pressure is set to 0.024 N/mm². FIG. 63 and FIG. 64 also show a hysteresis curve (Theory) of a motion resistance coefficient obtained by calculating the formula (45) where a dynamic coefficient of friction $\mu_f$ is set to 0 ($\mu_f$=0) and a dynamic coefficient of friction $\mu_c$ is set to 0.23 ($\mu_c$=0.23).

From FIG. 63 and FIG. 64, it is understood that, with respect to both the flat surface slide body mechanism 305 and the concave/convex slide body mechanism 302, a lower limit value of a ratio between a motion resistance force and a load applied from above matches well with a theoretical hysteresis curve obtained where a dynamic coefficient of friction is set to 0.23. Accordingly, since the combination of the slide members is equal between the respective slide mechanisms, it is estimated that dynamic coefficients of friction $\mu_f$, $\mu_c$ of the respective slide mechanisms are 0.23 ($\mu_f$=$\mu_c$=0.23). Here, it is estimated that an apparent maximum face pressure of the flat surface slide body mechanism 305 and an apparent maximum face pressure of the concave/convex slide body mechanism 302 of the damping device 301 are approximately 0.5 N/mm² and 1.0 N/mm² respectively and hence, attention must be paid that that the reciprocating sliding mechanism test is carried out under a condition that a face pressure is smaller than the maximum face pressure.

Figure 65:
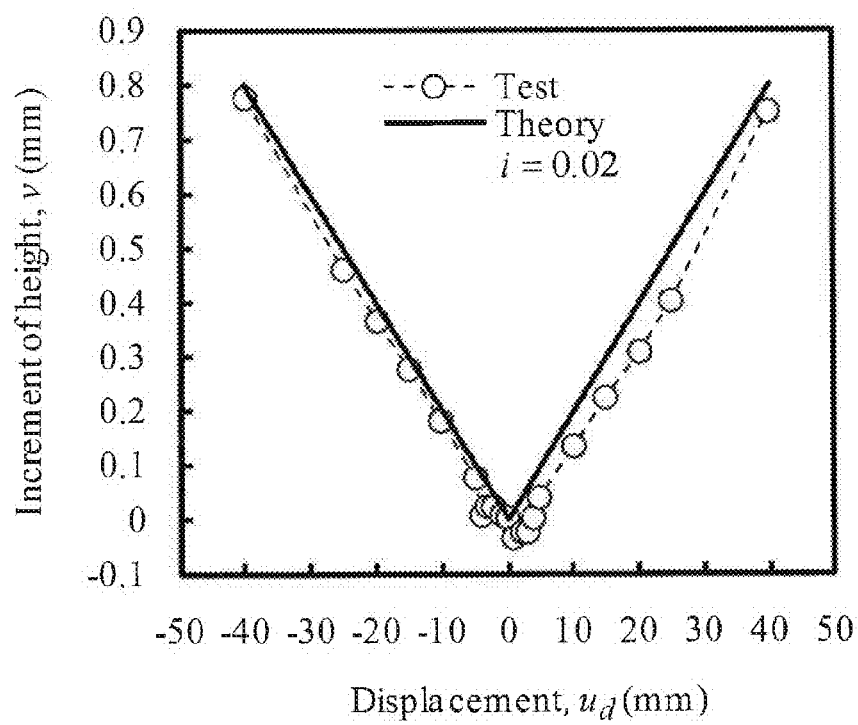
FIG. 65 is a view showing the relationship between a slide displacement and a height of the concave/convex slide body mechanism of the vibration damping device according to the example of the present invention.

FIG. 65 is a graph showing the relationship between a slide displacement $u_d$ and the increase of height v of the slide mechanism shown in FIG. 45 which is obtained by an operation test of the concave/convex slide body mechanism 302. A height of the concave/convex slide body mechanism 302 is measured at 6 points using a vernier caliper, and an increment of height is determined based on an average value of the measured heights. Although a true neutral position at which a minimum height is measured is displaced from a temporary neutral position at the time of carrying out the test by approximately 1 mm, it is confirmed that the relationship between the slide displacement and the increase of height of the concave/convex slide body mechanism 302 matches well with a theoretical value when a gradient "1" is 0.02 (i=0.02).

Figure 66:
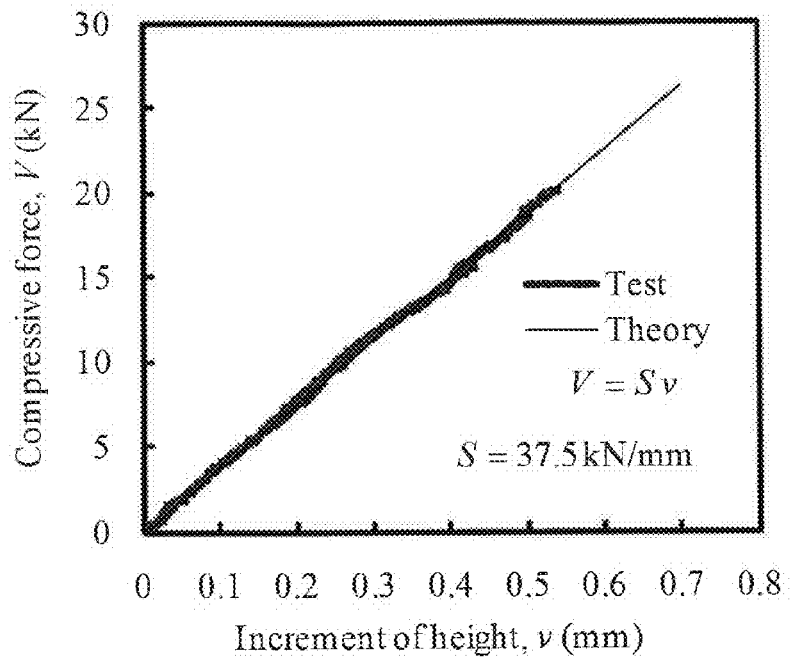
FIG. 66 is a view showing the relationship between a height of a ring and a compressive force in the vibration damping device according to the example of the present invention.

Subsequently, the support mechanism test is explained. FIG. 66 is a graph showing the relationship between a compressive force and the increase of a height of the ring shown in FIG. 43 which is confirmed by the support mechanism test. A thin load meter and a thin hydraulic cylinder are stacked in the inside of the ring, a compressive force is applied by the hydraulic cylinder, and a compressive force is measured by the load meter. A displacement of the of the concave/convex side support plate 309 at the center of an upper surface and the displacement of the flat surface side support plate at the center of a lower surface are respectively measured by a laser displacement meter (resolution: 0.002 mm). The increase of height of the ring corresponding to design amplitude of 20 mm of the damping device 301 is 0.4 mm, and the loading is performed such that a change in height becomes 0.5 mm, and the unloading is performed after making the ring stand still for approximately 3 minutes.

From FIG. 66, it is confirmed that a hysteresis curve of loading and a hysteresis curve of unloading take a straight line. From FIG. 66, it is estimated that a spring constant S of the ring is 37.5 kN/mm (S=37.5 kN/mm). On the other hand, to estimate a spring constant β of the leaf spring 312 using the formula (46), the spring constant β becomes (β=30.6 kN/mm). A Young's module E is set to 200000 N/mm² (E=200000 N/mm²), and a length is set to 101 mm (l=101 mm). A correction coefficient α for provisionally calculating a spring constant of the ring based on the formula (48) is 0.61 (α=0.61).

Next, a reciprocation sliding test is explained. This test is carried out by mounting the damping device 301 on a reciprocation sliding test device. The reciprocation sliding test device includes a hydraulic actuator to which the first support portion 301a of the damping device 301 is connected by a connecting pin, a load meter to which the second support portion 301b of the damping device 301 is connected by a connecting pin, and a reaction force beam on which the load meter is mounted.

In assembling the device, initial deflection of 0.05 mm is introduced to the ring by applying an adjusting shim plate (0.05 mm) to respective mounting bolts 314 for mounting the flat surface side support plate 310. Assuming a spring constant S of the ring as 37.5 kN/mm (S=37.5 kN/mm), an initial compressive force $V_0$ which is introduced by the initial deflection of 0.05 mm is estimated to be 1.9 kN ($V_0$1.9 kN). The center axial force member 308 which constitutes the first support, portion 301a is connected to the hydraulic actuator (maximum axial force; 50 kN) using a pin, and the connection plate 321 which constitutes the second support portion 301b is connected to the load meter mounted on the reaction force beam using a pin. A damping force is measured by the load meter mounted on the reaction force beam, and the displacement is measured by a laser displacement meter (resolution; 0.02 mm) mounted on the device. Further, a temperature of the slide body is measured by a thin thermocouple.

Assuming that a scenario earthquake motion is a long period earthquake motion which continues for 500 seconds, the reciprocation sliding test is carried out by a displacement control of a sinusoidal wave having maximum amplitude of 20 mm and a cycle of 5 seconds. Two preliminary tests, that is, a preliminary test where the reciprocation sliding is performed 1 time (Test-A) and a preliminary test where the reciprocation is performed 10 times (Test-B) are carried out and, thereafter, a main test where the reciprocation is performed 100 times (Test-C) is carried out.

Figure 67:
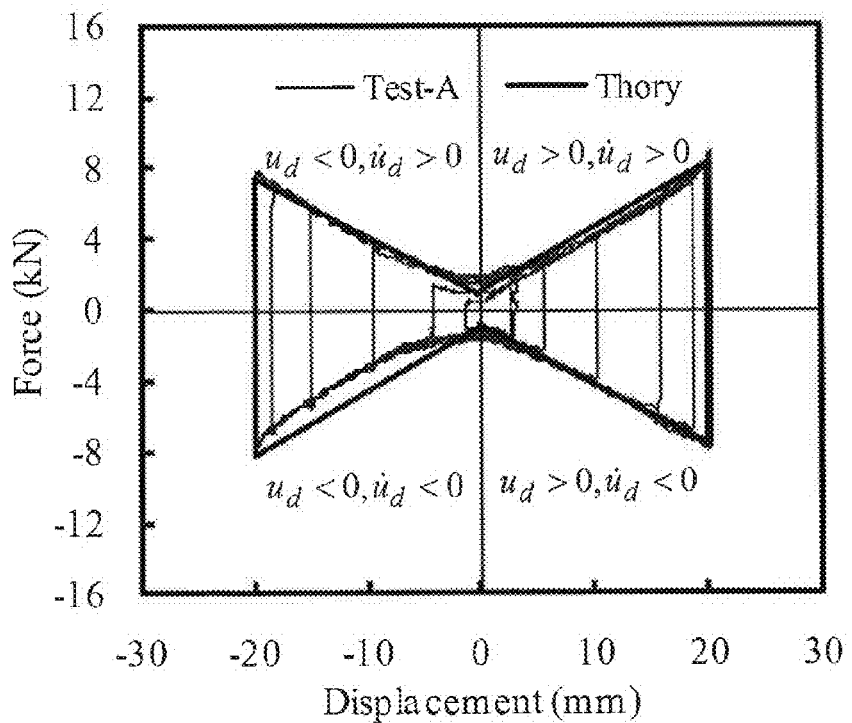
FIG. 67 is a view showing a comparison between hysteresis curves and theoretical curves according to the vibration damping device of the example of the present invention.

FIG. 67 is a graph showing a comparison between a hysteresis curve obtained by the preliminary test where the reciprocation sliding is performed 1 time (Test-A) and a theoretical curve expected in accordance with the formula (44) and the formula (45) under a condition that the dynamic coefficients of friction $\mu_f$ and $\mu_c$ are set to 0.23 ($\mu_f=\mu_c=0.23$). From FIG. 67, it is confirmed that although a test curve is not a straight line so that there is the difference between the test hysteresis curve and the theoretical curve under a condition that the relationships $u_d<0$ and $(du_d/dt)<0$ are established, the test curve is a straight line and matches well with the theoretical curve under other conditions.

Figure 68:
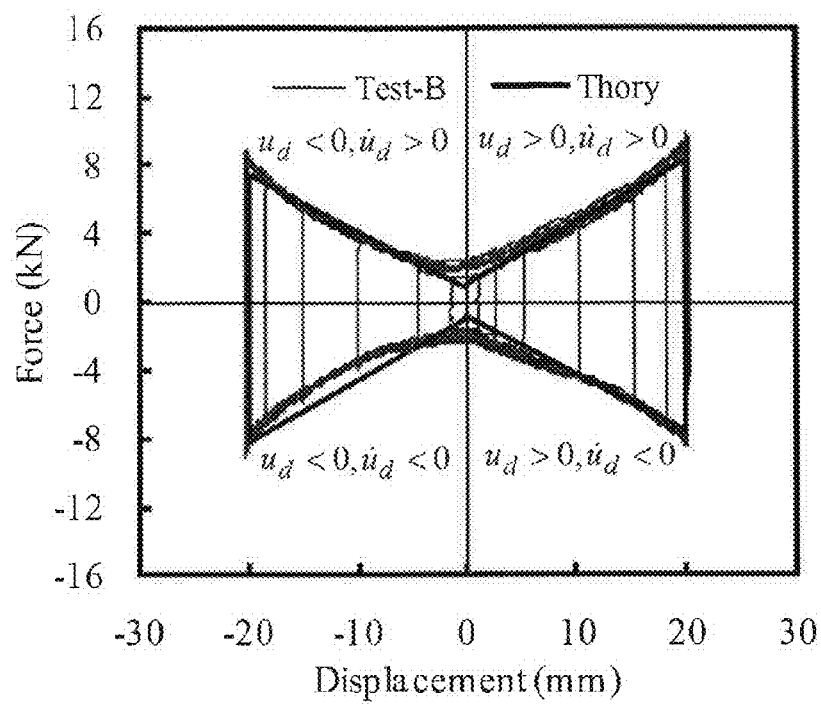
FIG. 68 is a view showing a comparison between hysteresis curves and theoretical curves according to the vibration damping device of the example of the present invention.

FIG. 68 is a graph showing the comparison between a hysteresis curve obtained by the preliminary test of 10 times of reciprocation and the theoretical curve. In FIG. 68, a test curve exhibits the substantially same characteristic as in the case of the test-A. Here, it is confirmed that, in the test-B, a damping force is increased in a region where the displacement is small compared to the test-A.

Figure 69:
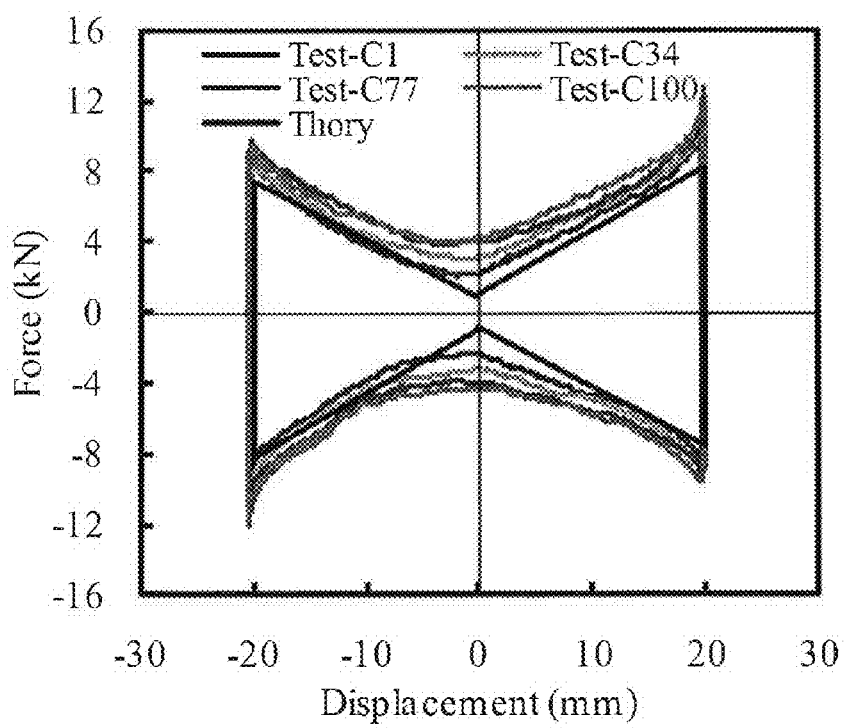
FIG. 69 is a view showing a comparison between hysteresis curves and theoretical curves according to the vibration damping device of the example of the present invention.

FIG. 69 is a graph showing a comparison between a hysteresis curve obtained by the main test where the reciprocation sliding is performed 100 times and the theoretical curve. FIG. 69 shows a hysteresis curve obtained when the reciprocation sliding is performed 1 time, a hysteresis curve obtained when the reciprocation sliding is performed 34 times, a hysteresis curve obtained when the reciprocation sliding is performed 77 times, and a hysteresis curve obtained when the reciprocation sliding is performed 100 times. From FIG. 69, it is confirmed that, along with the increase of the number of times of reciprocation, a damping force is gradually increased, and an area which the hysteresis curve surrounds is increased. Further, a tendency that a damping force is increased is large when the displacement is small, and is small when the displacement is large.

Next, the wear of the slide surface is explained. The device is disassembled after the reciprocation sliding test is finished, and a wear state of each slide body is checked. Wear powders generated from the slide body fall directly below the concave/convex slide body mechanism 302 and the flat surface slide body mechanism 305, and these powders are stacked such that generation sources of these powders can be clearly identified. A mass of wear powder stacked on the concave/convex slide body mechanism 302 including wear powder adhered to the slide bodies and a mass of wear powder stacked on the flat surface slide body mechanism 305 including wear powder adhered to the slide bodies are 0.39 g and 0.63 g respectively.

Wear marks formed on the concave slide body 303 made of bronze casting are recognized at two positions close to the center in the vicinity of boundaries between the groove end surfaces 326a and the groove bottom surface 326b which constitute the slide surfaces respectively. The wear marks formed on the groove end surfaces 326a are concentrated at a center portion in the operating direction and inner portions in the lateral direction, and a total area of the wear marks is approximately 1600 mm³. The wear marks formed on the groove bottom surface 326b are concentrated at a center portion in the operating direction and at outer portions in the lateral direction, and a total area of the wear marks is approximately 1000 mm².

Wear marks formed on the convex slide body 304 made of stainless steel are recognized at positions corresponding to the wear marks of the concave slide body 303. Here, the wear marks are obscure compared to the wear marks formed on the concave slide body 303. A total area of the groove end surfaces 326a which constitute the slide surface of the concave slide body 303 and a total area of the groove bottom surface 326b which constitutes the slide surface of the concave slide body 303 are 14.916 mm² respectively and hence, it is estimated that these slide surfaces are partially brought into contact with the convex slide body 304 at positions where the wear marks are recognized in view of the area of the wear marks.

Wear marks formed on the outer flat-plate slide body 307 made of bronze casting are concentrated at two positions on a side axial force member 311 side, and a total area of the wear marks is approximately 2100 mm². Wear marks formed on the inner flat plate slide body 306 made of stainless steel are recognized at positions corresponding to the wear marks formed on the outer flat-plate slide body 307. However, the wear marks formed on the inner flat plate slide body 306 are obscure compared to the wear marks formed on the outer flat-plate slide body 307.

Figure 70:
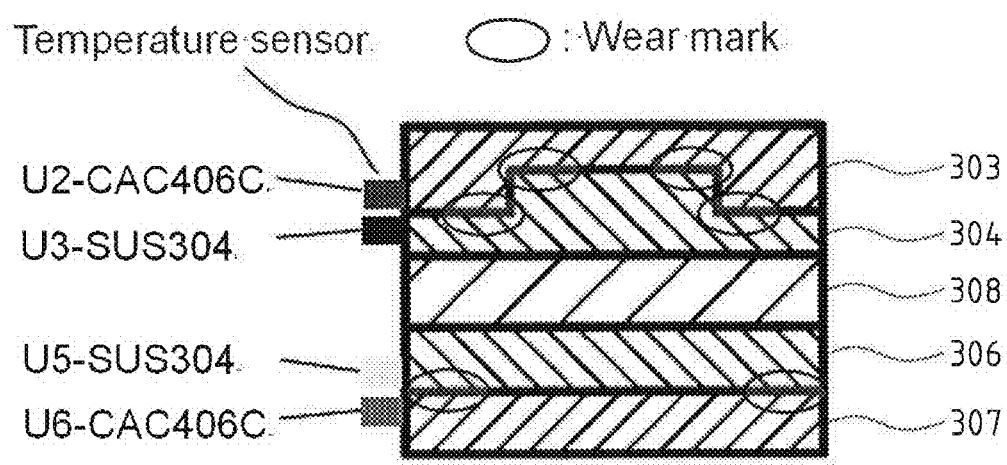
FIG. 70 is a view showing a temperature measuring position and a material in the vibration damping device according to the example of the present invention.
Figure 71:
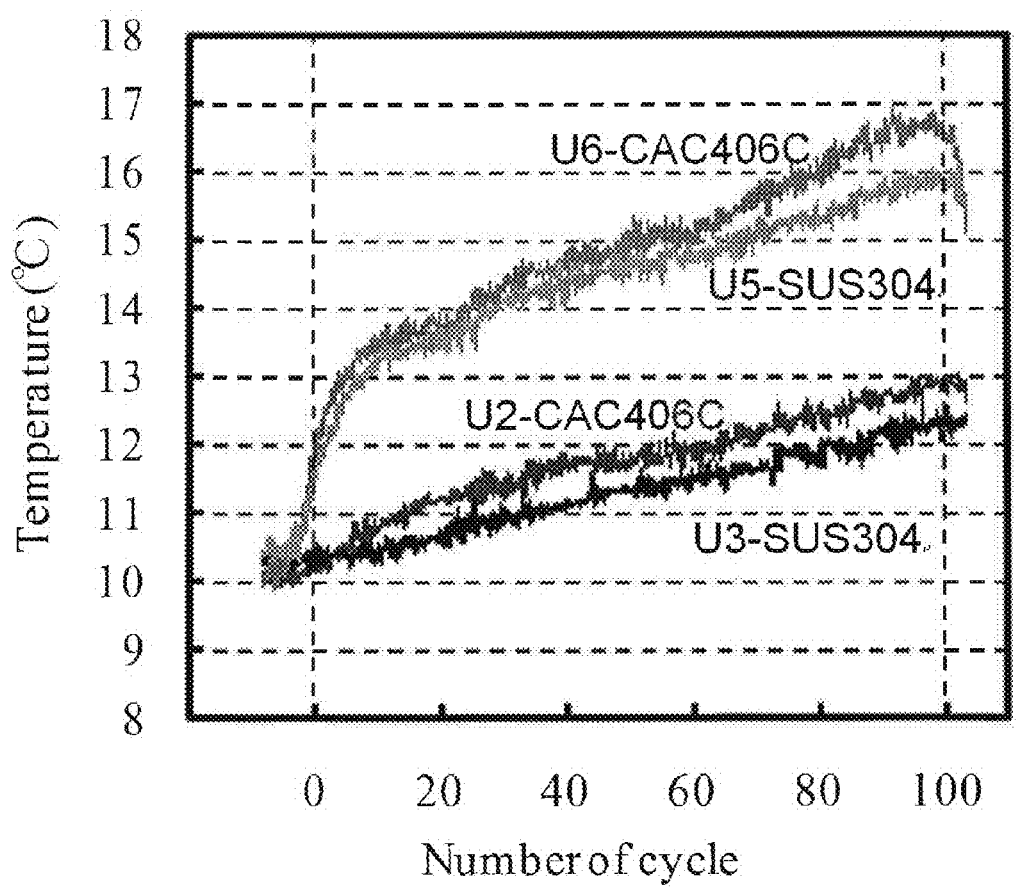
FIG. 71 is a view showing a change in temperature corresponding to the number of sliding in the vibration damping device according to the example of the present invention.

FIG. 70 is a view showing temperature measuring positions on the slide bodies, and FIG. 71 is a graph showing a temperature change when the main test where the reciprocation sliding is performed 100 times is carried out. The temperature change is measured by adhering thin thermocouples to side surfaces of the slide bodies shown in FIG. 70. FIG. 70 also shows positions at which wear marks are formed.

As shown in FIG. 71, a temperature of the concave/convex, slide body mechanism 302 (the concave slide body 303, the convex slide body 304) is elevated in proportion to the number of times of reciprocation sliding, and, a temperature is elevated by an approximately 2 to 3° C. after reciprocation sliding is performed 100 times. A temperature of the flat surface slide body mechanism 305 (the inner flat plate slide body 306, the outer flat-plate slide body 307) is rapidly elevated by an approximately 2° C. in run-up processing of the actuator for acquiring fixed amplitude, and when the number of times of reciprocation sliding exceeds 10 times, the temperature is elevated in proportion to the number of times of reciprocation sliding. In the flat surface slide body mechanism 305, a temperature is elevated by an approximately 6 to 7° C. after reciprocation sliding is performed 100 times. A mass of wear powder generated from the flat surface slide body mechanism 305 is approximately 1.6 times as large as a mass of wear powder generated from the concave/convex slide body mechanism 302, and the temperature elevation of the flat surface slide body mechanism 305 is approximately two times or more as high as the temperature elevation of the concave/convex slide body mechanism 302.

From the above-mentioned result, it is considered that the wear formed on the flat surface slide body mechanism 305 is larger than wear formed on the concave/convex slide body mechanism 302. Particularly, a temperature of the flat surface, slide body mechanism 305 is elevated by an approximately 4° C. during a period from a point of time that a run-up operation starts to a point of time that reciprocation sliding is performed 10 times and hence, it is estimated that wear marks formed on the flat surface slide body mechanism 305 are generated in an initial stage from the point of time that the run-up operation starts to the point of time that reciprocation sliding is performed 10 times. It is considered that such local wear is generated due to the initial unevenness of the slide surfaces at the time of manufacturing the slide bodies and the unevenness of the slide surfaces due to the elastic deformation of the respective parts during the operation of the device. Further, it is estimated that wear powder generated by wear is relevant to a phenomenon that a frictional force is increased along with the increase of the number of times of sliding. In this example, however, the analysis of such a phenomenon is not performed.

Next, a manufacturing cost is explained. Out of a total manufacturing cost, a manufacturing cost of the leaf springs 312 accounts for 33%, a manufacturing cost of the concave/convex slide body mechanism 302 accounts for 23%, and a manufacturing cost of the flat surface slide body mechanism 305 accounts for 10% of all manufacturing costs. The leaf spring 312 is manufactured such that the outer periphery of a material for forming the leaf spring 312 is formed by a wire saw and, thereafter, the inner periphery of the material is cut and, then, the inner and outer peripheries are shaped into a predetermined size by grinding. Although the springs can be manufactured by hot bending, an estimated amount of cost for manufacturing the springs by hot bending is 460,000 yen so that the estimated amount is higher than the manufacturing cost of springs manufactured by cutting and grinding by 15%. Hot bending is more suited for manufacturing springs having high strength than cutting and polishing and hence, there is a room to study hot bending in a case where springs are to be miniaturized.

In forming two inclined slide surfaces of the concave/convex slide body mechanism 302 with high accuracy, a dedicated jig for adjusting the inclination is required. Because of a manufacturing cost of the jig and a working time for two slide surfaces, it is considered that a manufacturing cost of the concave/convex slide body mechanism 302 is higher than a manufacturing cost of the flat surface slide body mechanism 305. A total manufacturing cost of the leaf springs 312, the concave/convex slide body mechanism 302 and the flat surface slide body mechanism 305 accounts for 66% of the total cost for manufacturing the damping device 301 so that, it is considered necessary to reduce the manufacturing cost of these parts for reducing the manufacturing cost of the damping device 301.

From the result of the reciprocation sliding test in this example, provided that the number of times of sliding is small, a theoretical curve and a test curve match well with respect to a hysteresis curve of a damping force and the displacement. Accordingly, it is considered that the vibration damping device of this example can generate a damping force having a characteristic that the damping force is increased in proportion to an absolute value of the displacement. Here, in the course of manufacturing the device as a product to be marketed, there arises a drawback that, a damping force is gradually increased along with the increase of the number of times of sliding. Accordingly, it is necessary to overcome such a drawback in such a manner that the initial unevenness of the slide surfaces is reduced by enhancing manufacturing accuracy of the slide surfaces, and the unevenness of the slide surfaces generated due to the elastic deformation of respective parts during operation is predicted and the predicted unevenness are reflected on shapes of the slide surfaces. Further, the manufacturing cost of the leaf springs 312, the concave/convex slide body mechanism 302 and the flat surface slide body mechanism 305 accounts for the most part of the manufacturing cost of the damping device 301 and hence, it is considered necessary to rethink about the miniaturization of these members or a working method of these members.

The development of the damping device in future is described. The damping device 61 of the second embodiment requires at least four leaf springs 65 and at least two sets of the concave/convex slide mechanisms. To estimate a manufacturing cost of a test device, it is expected that a manufacturing cost of the U-shaped leaf springs and the concave/convex slide mechanism accounts for 77% or more of the manufacturing cost of the whole damping device. In the case of the damping device 61 of the second embodiment, to put the damping device into practical use, it is important for the damping device to acquire price competitiveness while securing a damping performance. Accordingly, it is considered necessary to largely reduce the manufacturing cost of the damping device.

In view of the above, the basic structure of the vibration damping device is restudied. As the result of the restudy, it is considered that by stacking the concave/convex slide body mechanism and the flat surface slide body mechanism to each other, the number of U-shaped leaf springs and the number of the concave/convex slide body mechanisms can be halved and hence, the manufacturing cost of the damping device can be largely reduced. Further, theoretically, it is considered that such a vibration damping device can also secure the damping performance substantially equal to the damping performance of the damping device 61 of the second embodiment.

With respect to the damping device 301 of the third embodiment where the concave/convex slide body mechanism 302 and the flat surface slide body mechanism 305 are stacked to each other, a test device is manufactured, and a damping force and a hysteresis characteristic of the displacement of the test device are examined by a reciprocation sliding test. As the result of the test, it is confirmed that the test device can generate a damping force having a characteristic that the damping force is increased in proportion to an absolute value of the displacement. With respect to the damping device 301, however, it is found that the damping device 301 has a drawback that when the number of times of reciprocation sliding is increased, a damping force is gradually increased. It is assumed that the damping force is increased due to wear powder which is generated because of the initial unevenness of the slide surfaces of the slide device in a manufacturing stage and the unevenness of the slide surfaces caused by the deformation of respective parts of the damping device during the operation of the damping device.

In the damping device 301 of the third embodiment, it is confirmed that a manufacturing cost of the leaf springs 312, the concave/convex slide body mechanism 302 and the flat surface slide body mechanism 305 accounts for 66% of a manufacturing cost of the damping device 301. Further, compared to the damping device 61 of the second embodiment, it is found that the manufacturing cost of the device of this embodiment is reduced by 32%. The leaf springs 312 and parts of the concave/convex slide body mechanism 302 are now custom-manufactured individually. Accordingly, it is considered possible to reduce the manufacturing cost of the damping device 301 by rethinking about a manufacturing method of these parts or the like in a stage where the damping device 301 is marketed as a product.

As described above, the damping device 301 which has been studied in this example where the concave/convex slide body mechanism 302 and the flat surface slide body mechanism 305 are stacked is superior to the damping device 61 of the second embodiment in practicability. A damping force of an existing vibration damping device which is used for a high-rise building or the like is approximately 100 kN to 1000 kN. A maximum damping force of the damping device 301 of this example is approximately 10 kN. Although there still exist problems to be solved, there is a room for amplitude and a PV value (slide face pressure×sliding speed) of the test device and hence, it is considered possible to develop a vibration damping device having a maximum damping force of approximately 100 kN based on the test device.

As a research agenda, the enhancement of the manufacturing accuracy of the slide surfaces, the prediction and the elimination of unevenness of the slide surfaces caused by the elastic deformation of the device, performance improvement/miniaturization of the U-shaped leaf springs, and the study on the combination of the slide members can be named. With respect to the combination of the slide members, the combination of a slide member made of a copper-system alloy which contains lead or the like as a lubricant and a slide member made of stainless steel may be used usually. As advanced slide members which remarkably reduce an amount of wear compared to the combination of slide members made of copper alloy/stainless steel, the combination of a slide member made of a ceramic-system sintering material which contains copper as a lubricant and a slide member made of a titanium alloy can be also considered. If such advanced slide members whose amount of wear is small can be developed, fields to which the vibration damping device of the present invention is applicable are broadened including a countermeasure against vibrations caused by wind in addition to the countermeasure against an earthquake motion of a skyscraper building.

As has been described heretofore, the present invention has been made to develop the damping device which can effectively absorb vibration energy ranging from vibrations of small amplitude to large amplitude irrespective of a length of a natural period of a structure, and proposes the slide-type damping device where a frictional force which constitutes a damping force is increased in proportion to an absolute value of displacement. According to the slide device of the present invention, the damping force is in proportion to the displacement so that the damping force can effectively absorb vibration energy of various structures ranging from small amplitude to large amplitude without depending on a proper period of the structure.

The invention claimed is:

1. A vibration damping device for suppressing vibrations of a structure, the vibration damping device comprising:
    a slide body mechanism having at least a pair of slide bodies facing each other in an opposed manner, the slide bodies being directly or indirectly fixed to the structure and being arranged so as to be slidable relative to each other in a reciprocating manner; and
    a biasing means for applying a compressive force which pushes the slide bodies to each other;
    wherein one pair among said at least one pair of slide bodies, comprises:
    a first slide body configured to be directly or indirectly fixed to a first part of the structure, and having a first slide surface; and
    a second slide body configured to be directly or indirectly fixed to a second part of the structure, and having a second slide surface in contact with and facing the first slide surface, the second slide surface being arranged so as to be slidable in a reciprocating manner along the first slide surface; and
    wherein the slide body mechanism is configured to have a height that varies depending on relative position of the first slide surface along the second slide surface;
    wherein each one slide body of the first slide body and the second slide body has a neutral position at which the slide body mechanism has a first height;
    wherein said each one slide body is configured so that when said vibrations of the structure act on said one slide body causing relative sliding motion among said first slide body and second slide body, said height of the slide body mechanism changes to a second height different from the first height and said compressive force of the biasing means changes; and
    wherein a direction of said reciprocating sliding differs from a direction of said compressive force.

2. The vibration damping device according to claim 1,
    wherein one slide surface of the first slide surface and second slide surface is configured to have a groove which gives said one slide surface a concave shape, and an other slide surface of the first slide surface and second slide surface has a projecting portion which gives said other slide surface a convex shape;
    wherein said groove has a shape conforming to the projecting portion so that the projecting portion slides within the groove during said sliding in said reciprocating manner, and
    wherein said groove extends along a longitudinal direction of said one slide surface to at least one end of said one slide surface.

3. The vibration damping device according to claim 1, wherein the biasing means comprises:
    a slide-body side fixing portion which is directly or indirectly fixed to one of the first and second slide bodies and not to the other of the first and second slide bodies;
    a structure side fixing portion which is directly or indirectly fixed to the structure; and
    a leaf spring portion having a curved plate shape which is formed between the slide-body side fixing portion and the structure side fixing portion and is elastically deformable.

4. The vibration damping device according to claim 1, wherein the slide body mechanism and the slide surfaces are planar.

5. The vibration damping device according to claim 1, wherein the slide body mechanism is configured to extend and contract in length by said relative reciprocating sliding, and a damping force against the vibrations of the structure is generated as an axial force by the relative reciprocating sliding.

6. The vibration damping device according to claim 1, wherein the biasing means is in direct physical contact with only one of the first slide body and second slide body of said one pair of slide bodies.

7. The vibration damping device according to claim 1, wherein the biasing means and sliding body mechanism are configured so that a magnitude difference in height between the second height and first height is compensated for by a change in compression of the biasing means to dampen changing of distance between said first part and second part of the structure during said vibrations of said structure.

* * * * *